(12) United States Patent
Aravanis et al.

(10) Patent No.: US 12,179,190 B2
(45) Date of Patent: Dec. 31, 2024

(54) SYSTEMS AND METHODS FOR BIOCHEMICAL ANALYSIS INCLUDING A BASE INSTRUMENT AND A REMOVABLE CARTRIDGE

(71) Applicant: ILLUMINA, INC., San Diego, CA (US)

(72) Inventors: Alex Aravanis, San Mateo, CA (US); Boyan Boyanov, San Diego, CA (US); M. Shane Bowen, Encinitas, CA (US); Dale Buermann, San Diego, CA (US); Alexander Hsiao, San Diego, CA (US); Behnam Javanmardi, Saratoga, CA (US); Tarun Khurana, Fremont, CA (US); Poorya Sabounchi, Atherton, CA (US); Hai Quang Tran, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 18/087,499

(22) Filed: Dec. 22, 2022

(65) Prior Publication Data
US 2023/0145389 A1 May 11, 2023

Related U.S. Application Data

(63) Continuation of application No. 16/433,969, filed on Jun. 6, 2019, now Pat. No. 11,590,494, which is a (Continued)

(51) Int. Cl.
*B01L 3/00* (2006.01)
*B01L 7/00* (2006.01)
*F16K 99/00* (2006.01)

(52) U.S. Cl.
CPC ... *B01L 3/502715* (2013.01); *B01L 3/502738* (2013.01); *B01L 7/525* (2013.01);
(Continued)

(58) Field of Classification Search
CPC ......... B01L 3/502715; B01L 3/502738; B01L 7/525; B01L 2200/025; B01L 2200/027;
(Continued)

(56) References Cited

U.S. PATENT DOCUMENTS 5,405,585 A 4/1995 Coassin
5,641,658 A 6/1997 Adams et al.
(Continued)

FOREIGN PATENT DOCUMENTS

EP 1 258 720 A2 11/2002
JP 2003-500674 A 1/2003
(Continued)

OTHER PUBLICATIONS

Cockroft et al., "A single-molecule nanopore device detects DNA polymerase activity with single-nucleotide resolution." J. Am. Chem. Soc. 130, 818-820 (2008).
(Continued)

*Primary Examiner* — Jill A Warden
*Assistant Examiner* — Jacqueline Brazin
(74) *Attorney, Agent, or Firm* — MARSHALL, GERSTEIN & BORUN LLP

(57) ABSTRACT

Systems and methods for conducting designated reactions utilizing a base instrument and a removable cartridge. The removable cartridge includes a fluidic network that receives and fluidically directs a biological sample to conduct the designated reactions. The removable cartridge also includes a flow-control valve that is operably coupled to the fluidic network and is movable relative to the fluidic network to control flow of the biological sample therethrough. The
(Continued)

removable cartridge is configured to separably engage a base instrument. The base instrument includes a valve actuator that engages the flow-control valve of the removable cartridge. A detection assembly held by at least one of the removable cartridge or the base instrument may be used to detect the designated reactions.

29 Claims, 71 Drawing Sheets

Related U.S. Application Data continuation of application No. 15/313,643, filed as application No. PCT/US2015/032545 on May 27, 2015, now Pat. No. 10,427,155.

(60) Provisional application No. 62/003,264, filed on May 27, 2014.

(52) U.S. Cl.
CPC ...... *F16K 99/0013* (2013.01); *F16K 99/0015* (2013.01); *F16K 99/0028* (2013.01); *B01L 2200/025* (2013.01); *B01L 2200/027* (2013.01); *B01L 2200/04* (2013.01); *B01L 2200/0689* (2013.01); *B01L 2200/10* (2013.01); *B01L 2200/16* (2013.01); *B01L 2300/0663* (2013.01); *B01L 2300/0816* (2013.01); *B01L 2300/0867* (2013.01); *B01L 2300/0883* (2013.01); *B01L 2300/0887* (2013.01); *B01L 2300/1805* (2013.01); *B01L 2300/1827* (2013.01); *B01L 2400/0633* (2013.01); *B01L 2400/0638* (2013.01); *B01L 2400/0644* (2013.01); *B01L 2400/065* (2013.01); *B01L 2400/0655* (2013.01); *F16K 2099/0074* (2013.01); *F16K 2099/0084* (2013.01)

(58) Field of Classification Search
CPC ......... B01L 2200/04; B01L 2200/0689; B01L 2200/10; B01L 2200/16; B01L 2300/0663; B01L 2300/0816; B01L 2300/0867; B01L 2300/0883; B01L 2300/0887; B01L 2300/1805; B01L 2300/1827; B01L 2400/0633; B01L 2400/0638; B01L 2400/0644; B01L 2400/065; B01L 2400/0655; B01L 7/52; B01L 2300/0874; B01L 7/00; F16K 99/0013; F16K 99/0015; F16K 99/0028; F16K 2099/0074; F16K 2099/0084; F16K 99/0059; F16K 2099/008
USPC ...................................................... 435/6.11
See application file for complete search history.

(56) References Cited

U.S. PATENT DOCUMENTS

| 6,090,592 | A | 7/2000 | Adams et al. |
|---|---|---|---|
| 6,172,218 | B1 | 1/2001 | Brenner |
| 6,306,597 | B1 | 10/2001 | Macevicz |
| 6,969,488 | B2 | 11/2005 | Bridgham et al. |
| 7,001,792 | B2 | 2/2006 | Sauer et al. |
| 7,057,026 | B2 | 6/2006 | Barnes et al. |
| 7,115,400 | B1 | 10/2006 | Adessi et al. |
| 7,211,414 | B2 | 5/2007 | Hardin et al. |
| 7,315,019 | B2 | 1/2008 | Turner et al. |
| 7,329,492 | B2 | 2/2008 | Hardin et al. |
| 7,329,860 | B2 | 2/2008 | Feng et al. |
| 7,405,281 | B2 | 7/2008 | Xu et al. |
| 7,427,673 | B2 | 9/2008 | Balasubramanian et al. |
| 7,595,883 | B1 | 9/2009 | El Gamal et al. |
| 8,906,320 | B1 | 12/2014 | Eltoukhy et al. |
| 8,951,781 | B2 | 2/2015 | Reed et al. |
| 2001/0012612 | A1 | 8/2001 | Petersen et al. |
| 2002/0055100 | A1 | 5/2002 | Kawashima et al. |
| 2002/0146817 | A1 | 10/2002 | Cannon et al. |
| 2003/0106682 | A1* | 6/2003 | Reid .................. B01L 7/52 165/206 |
| 2004/0002090 | A1 | 1/2004 | Mayer et al. |
| 2004/0086872 | A1* | 5/2004 | Childers ........... B01L 3/502707 435/6.19 |
| 2004/0096853 | A1 | 5/2004 | Mayer |
| 2004/0126279 | A1 | 7/2004 | Renzi et al. |
| 2005/0100900 | A1 | 5/2005 | Kawashima et al. |
| 2005/0244870 | A1 | 11/2005 | Chee et al. |
| 2006/0188901 | A1 | 8/2006 | Barnes et al. |
| 2006/0240439 | A1 | 10/2006 | Smith et al. |
| 2006/0281109 | A1 | 12/2006 | Barr Ost et al. |
| 2007/0026421 | A1 | 2/2007 | Sundberg et al. |
| 2007/0062583 | A1 | 3/2007 | Cox et al. |
| 2007/0128624 | A1 | 6/2007 | Gormley et al. |
| 2007/0166705 | A1 | 7/2007 | Milton et al. |
| 2008/0009420 | A1 | 1/2008 | Schroth et al. |
| 2008/0037008 | A1 | 2/2008 | Shepard et al. |
| 2008/0108082 | A1 | 5/2008 | Rank et al. |
| 2009/0026082 | A1 | 1/2009 | Rothberg et al. |
| 2009/0127589 | A1 | 5/2009 | Rothberg et al. |
| 2010/0111768 | A1 | 5/2010 | Banerjee et al. |
| 2010/0137143 | A1 | 6/2010 | Rothberg et al. |
| 2010/0282617 | A1 | 11/2010 | Rothberg et al. |
| 2011/0059865 | A1 | 3/2011 | Smith et al. |
| 2011/0065101 | A1 | 3/2011 | Bell et al. |
| 2012/0270305 | A1 | 10/2012 | Reed et al. |
| 2013/0079232 | A1 | 3/2013 | Kain et al. |
| 2013/0116128 | A1 | 5/2013 | Shen et al. |
| 2013/0260372 | A1 | 10/2013 | Buermann et al. |
| 2014/0026413 | A1 | 1/2014 | Chen |
| 2014/0079923 | A1 | 3/2014 | George et al. |
| 2014/0098252 | A1* | 4/2014 | Chang ................... H04N 23/00 348/207.99 |

FOREIGN PATENT DOCUMENTS

| JP | 2004-510431 A | 4/2004 |
|---|---|---|
| JP | 2005-195492 A | 7/2005 |
| JP | 2009-2899 A | 1/2009 |
| JP | 2010-075072 A | 4/2010 |
| JP | 2015-523571 A | 8/2015 |
| RU | 2532176 | 10/2014 |
| WO | WO-1991/006678 A1 | 5/1991 |
| WO | WO-00/72970 A1 | 12/2000 |
| WO | WO-2002/028996 A1 | 4/2002 |
| WO | WO-04/018497 A2 | 3/2004 |
| WO | WO-2004/079342 A2 | 9/2004 |
| WO | WO-2005/065814 A1 | 7/2005 |
| WO | WO-2006/064199 A1 | 6/2006 |
| WO | WO-2007/010251 A2 | 1/2007 |
| WO | WO-2007/123744 A2 | 11/2007 |
| WO | WO-2011/071772 A2 | 6/2011 |
| WO | WO-2011/086488 A1 | 7/2011 |
| WO | WO-2012/058095 A1 | 5/2012 |
| WO | WO-2014/008381 A2 | 1/2014 |
| WO | WO-2014/143010 A1 | 9/2014 |
| WO | WO-2015/138648 A1 | 9/2015 |

OTHER PUBLICATIONS

Deamer et al. "Nanopores and nucleic acids: prospects for ultrarapid sequencing." Trends Biotechnol. 18, 147-151 (2000).
Deamer et al., "Characterization of nucleic acids by nanopore analysis". Acc. Chem. Res. 35:817-825 (2002).
Giraud et al., "Fluorescence Lifetime Biosensing with DNA Microarryas and a CMOS-SPAD Imager," Biomedical Optics Express 1: 1302-1308 (2010).
Healy, "Nanopore-based single-molecule DNA analysis." Nanomed. 2, 459-481 (2007).

(56) References Cited

OTHER PUBLICATIONS

Korlach et al., "Selective aluminum passivation for targeted immobilization of single DNA polymerase molecules in zero-mode waveguide nano structures." Proc. Natl. Acad. Sci. USA 105, 1176-1181 (2008).
Levene et al., "Zero-mode waveguides for single-molecule analysis at high concentrations." Science 299, 682-686 (2003).
Li et al., "DNA molecules and configurations in a solid-state nanopore microscope" Nat. Mater. 2:611-615 (2003).
Lundquist et al., "Parallel confocal detection of single molecules in real time." Opt. Lett. 33, 1026-1028 (2008).
Metzker, "Emerging Technologies in DNA Sequencing," Genome Res. 15:1767-1776 (2005).
Ronaghi et al., "DNA Sequencing: A Sequencing Method Based on Real-Time Pyrophospate," Science, 281(5375):363-365 (1998).
Ronaghi et al., "Real-Time DNA Sequencing Using Detection of Pyrophosphate Release," Analytical Biochemistry, 242:84-89 (1996).
Ronaghi, "Pyrosequencing Sheds Light on DNA Sequencing," Genome Research, 11:3-11 (2001).
Ruparel et al., "Design and Synthesis of a 3'-)-allyl Photocleavable Fluorescent Nucleotide as a Reversible Terminator for DNA Sequencing by Synthesis," Proc Natl Acad Sci USA 102: 5932-5937 (2005).
Soni et al., "Progress toward ultrafast DNA sequencing using solid-state nanopores." Clin. Chem. 53(11): 1996-2001 (2007).
Stoppa et al., IEEE European Solid-State Device Conference (ESSCIRC), Athens, Greece, IEEE, pp. 204-207 (2009).

\* cited by examiner

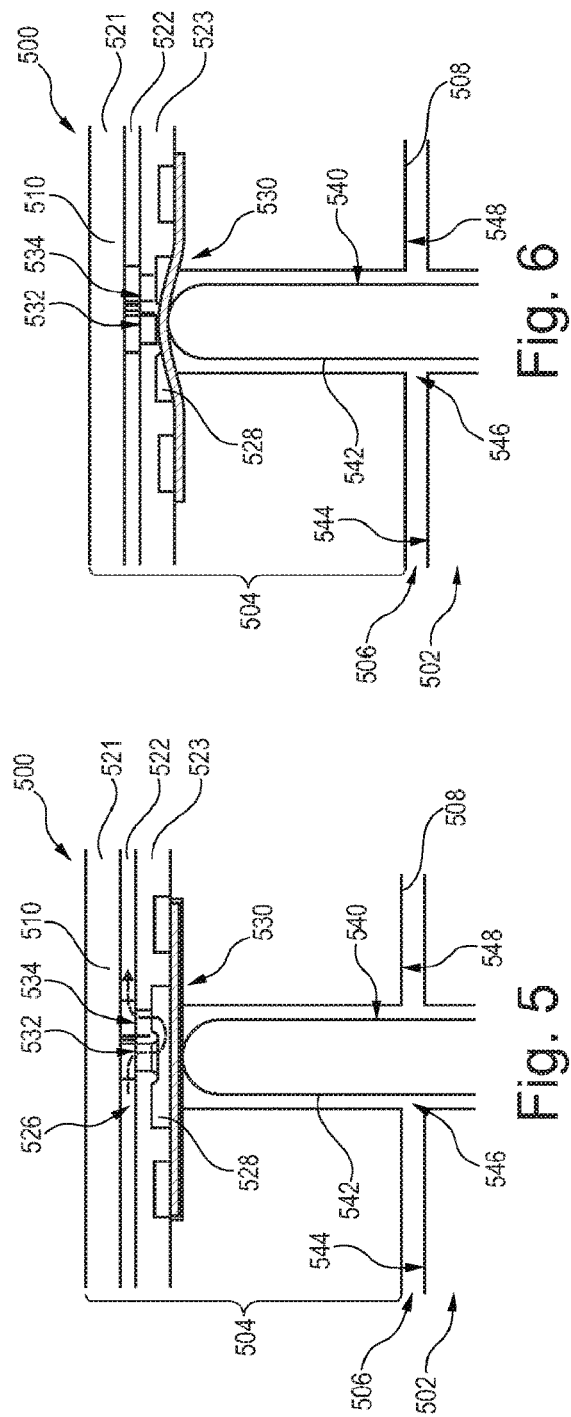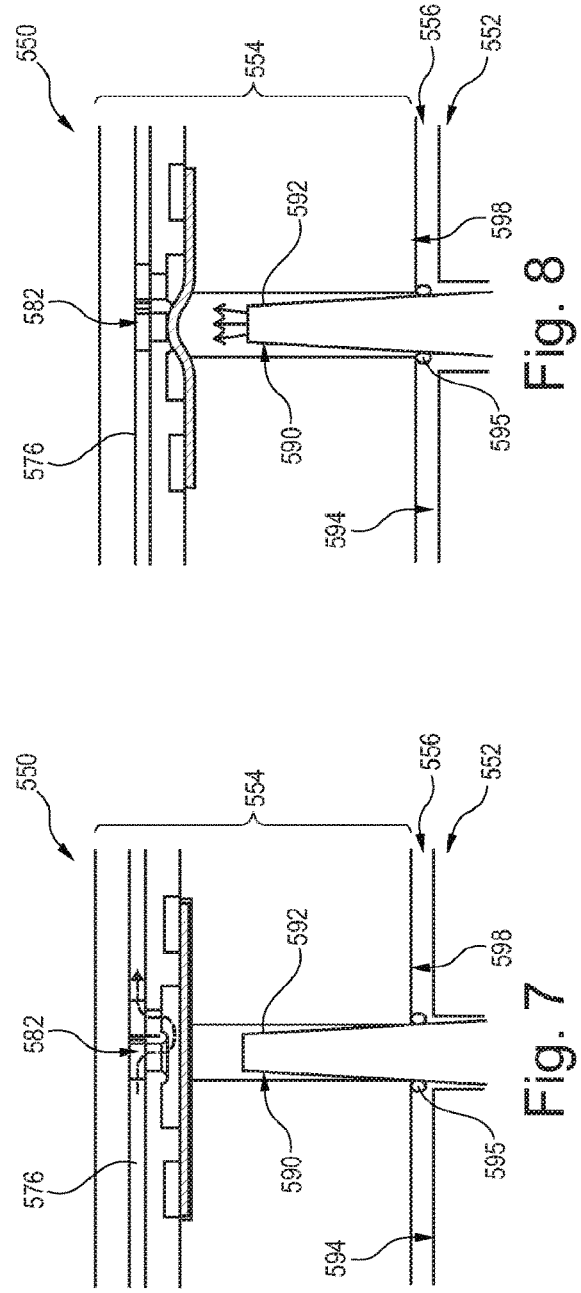

SYSTEMS AND METHODS FOR BIOCHEMICAL ANALYSIS INCLUDING A BASE INSTRUMENT AND A REMOVABLE CARTRIDGE

RELATED APPLICATIONS

This application is a continuation of U.S. application Ser. No. 16/433,969 filed on Jun. 6, 2019, which is a continuation of U.S. application Ser. No. 15/313,643 (now U.S. Pat. No. 10,427,155) filed on Nov. 23, 2016, which is a national stage entry of PCT Application No. PCT/US2015/032545, entitled "SYSTEMS AND METHODS FOR BIOCHEMICAL ANALYSIS INCLUDING A BASE INSTRUMENT AND A REMOVABLE CARTRIDGE", filed on May 27, 2015, which claims priority to U.S. Provisional Application No. 62/003,264 filed on May 27, 2014. Each of the foregoing applications is hereby incorporated by reference in its entirety.

BACKGROUND

Embodiments of the present application relate generally to systems and methods for conducting biochemical reactions and, more particularly, to systems and methods in which a base instrument interacts with a removable cartridge to conduct reactions for at least one of sample preparation or biochemical analysis.

Various biochemical protocols involve performing a large number of controlled reactions on support surfaces or within designated reaction chambers. The controlled reactions may be conducted to analyze a biological sample or to prepare the biological sample for subsequent analysis. The analysis may identify or reveal properties of chemicals involved in the reactions. For example, in a cyclic-array sequencing assay (e.g., sequencing-by-synthesis (SBS)), a dense array of DNA features (e.g., template nucleic acids) are sequenced through iterative cycles of enzymatic manipulation. After each cycle, an image may be captured and subsequently analyzed with other images to determine a sequence of the DNA features. In another biochemical assay, an unknown analyte having an identifiable label (e.g., fluorescent label) may be exposed to an array of known probes that have predetermined addresses within the array. Observing chemical reactions that occur between the probes and the unknown analyte may help identify or reveal properties of the analyte.

There has been a general demand for systems that automatically perform assays, such as those described above, in which the system requires less work by, or involvement with, the user. Presently, most platforms require a user to separately prepare the biological sample prior to loading the biological sample into a system for analysis. It may be desirable for a user to load one or more biological samples into the system, select an assay for execution by the system, and have results from the analysis within a predetermined period of time, such as a day or less. At least some systems used today are not capable of executing certain protocols, such as whole genome sequencing, that provide data having a sufficient level of quality and within a certain cost range.

BRIEF DESCRIPTION

In an embodiment, a system is provided that includes a removable cartridge having a cartridge housing. The removable cartridge also includes a fluidic network that is disposed within the cartridge housing. The fluidic network is configured to receive and fluidically direct a biological sample to conduct at least one of sample analysis or sample preparation. The removable cartridge also includes a flow-control valve that is operably coupled to the fluidic network and is movable relative to the fluidic network to control flow of the biological sample therethrough. The cartridge housing includes a housing side that defines an exterior of the removable cartridge and permits operative access to the flow-control valve. The system also includes a base instrument having a control side that is configured to separably engage the housing side of the removable cartridge. The housing and control sides collectively define a system interface. The base instrument includes a valve actuator that engages the flow-control valve through the system interface. The removable cartridge also includes a detection assembly that is held by at least one of the removable cartridge or the base instrument. The detection assembly includes an imaging detector and a reaction chamber that is in flow communication with the fluidic network. The imaging detector is configured to detect designated reactions within the reaction chamber.

In an embodiment, a method of sequencing nucleic acids is provided. The method includes providing a removable cartridge having a cartridge housing, a fluidic network disposed within the cartridge housing, and a flow-control valve that is operably coupled to the fluidic network and movable relative to the fluidic network. The cartridge housing includes a housing side that defines an exterior of the removable cartridge. The method also includes contacting the removable cartridge to a base instrument. The housing side of the removable cartridge separably engages a control side of the base instrument to collectively define a system interface. The base instrument includes a valve actuator that engages the flow-control valve through the system interface. The method also includes fluidically directing a biological sample to flow through the fluidic network of the cartridge to conduct at least one of sample analysis or sample preparation in the cartridge. The biological sample is directed to flow into a reaction chamber, wherein the flow of the biological sample is controlled by action of the valve actuator on the flow-control valve. The method also includes detecting the biological sample using an imaging detector directed to the reaction chamber, wherein the detection assembly is held by at least one of the removable cartridge or the base instrument.

In an embodiment, a removable cartridge is provided that includes a cartridge housing having a sample port that opens to an exterior of the cartridge housing and is configured to receive a biological sample. The cartridge housing has an array of electrical contacts and a mechanical interface that are exposed to the exterior. The cartridge housing is configured to be removably coupled to a base instrument. The removable cartridge may also include a fluidic network having a plurality of channels, a reaction chamber, and a storage module. The storage module includes a plurality of reservoirs for storing reagents. The fluidic network is configured to direct reagents from the reservoirs to the reaction chamber, wherein the mechanical interface is movable relative to the fluidic network to control flow of fluid through the fluidic network. The system also includes an imaging device disposed within the cartridge housing and positioned to detect designated reactions within the reaction chamber. The imaging device is electrically coupled to the array of electrical contacts for communicating with the base instrument. The mechanical interface may be configured to be moved by a base instrument when the removable cartridge is coupled to the base instrument.

In an embodiment, a removable cartridge is provided that includes a cartridge housing having a sample port that opens to an exterior of the cartridge housing and is configured to receive a biological sample. The removable cartridge may also include a rotatable valve that is disposed within the cartridge housing. The rotatable valve has a fluidic side and a plurality of valve ports that open at the fluidic side. The rotatable valve has at least one flow channel extending between the valve ports, wherein the rotatable valve is rotatable between different rotational positions. The removable cartridge may also include a microfluidic body having a body side that is slidably coupled to the fluidic side of the rotatable valve. The microfluidic body may at least partially define a fluidic network that includes a sample channel in flow communication with the sample port. The sample channel has a network port that opens to the body side of the microfluidic body. The fluidic network may also include a reservoir configured to hold a reagent. The reservoir is in flow communication with a reservoir port that opens to the fluidic side of the microfluidic body. The fluidic network also includes a feed channel in flow communication with a reaction chamber of the fluidic network. The feed channel has a feed port that opens to the body side of the microfluidic body. The rotatable valve is configured to rotate between first and second rotational positions. The network port is fluidically coupled to the feed port through the rotatable valve when the rotatable valve is in the first rotational position. The reservoir port is fluidically coupled to the feed port through the rotatable valve when the rotatable valve is in the second rotational position.

In an embodiment, a removable cartridge is provided that includes a cartridge housing having a sample port that opens to an exterior of the cartridge housing and is configured to receive a biological sample. The cartridge housing may include a mating side that is configured to face and removably couple to a base instrument. The removable cartridge also includes a fluidic network that is disposed within the housing. The fluidic network includes a sample channel that is in flow communication with the sample port. The removable cartridge also includes a channel valve having a flex member that is configured to move between first and second positions. The flex member blocks flow through the sample channel when in the first position and permits flow through the sample channel when in the second position. The mating side of the cartridge housing includes an access opening that exposes the channel valve to the exterior of the cartridge housing. The access opening is configured to receive a valve actuator of the base instrument for moving the flex member between the first and second positions.

In an embodiment, a base instrument is provided that includes a system housing having a mating side that is configured to engage a removable cartridge. The base instrument also includes a rotating motor that is configured to engage a rotatable valve of the removable cartridge. The base instrument also includes a valve actuator that is configured to engage a channel valve of the removable cartridge and an array of electrical contacts configured to electrically couple to the removable cartridge. The base instrument also includes a system controller that is configured to control the rotating motor and the actuator to perform an assay protocol within the removable cartridge. The system controller is configured to receive imaging data from the removable cartridge through the array of electrical contacts. Optionally, the base instrument includes a thermal block for heating a portion of the removable cartridge.

In an embodiment, a removable cartridge is provided that includes a cartridge housing having a sample port that opens to an exterior of the cartridge housing and is configured to receive a biological sample. The cartridge housing includes a mating side that is configured to face and removably couple to a base instrument. The removable cartridge also includes a microfluidic body disposed within the cartridge housing. The microfluidic body has a body side and includes a fluidic network. The fluidic network has a plurality of discrete channels and corresponding ports that open at the body side at a valve-receiving area. The removable cartridge also includes a rotatable valve disposed within the cartridge housing. The rotatable valve has a fluidic side and at least one flow channel that extends between a plurality of valve ports. The valve ports open to the fluidic side. The fluidic side is rotatably coupled to the valve-receiving area of the body side of the microfluidic body, wherein the rotatable valve is movable between different rotational positions to fluidically couple the discrete channels. The rotatable valve has a mechanical interface that is accessible along the mating side and configured to engage the base instrument such that the rotatable valve is controlled by the base instrument.

In an embodiment, a removable cartridge is provided that includes a cartridge housing having a sample port that opens to an exterior of the cartridge housing and is configured to receive a biological sample. The cartridge housing has a mating side that is configured to removably couple to a base instrument. The removable cartridge also includes a microfluidic structure that is disposed within the cartridge housing and includes a plurality of stacked printed circuit board (PCB) layers. The PCB layers include fluidic layers that define channels and a reaction chamber when the PCB layers are stacked. The PCB layers also include a wiring layer. The removable cartridge also includes a CMOS imager that is configured to be mounted to the microfluidic structure and electrically coupled to the conductive wiring layer. The CMOS imager is oriented to detect designated reactions within the reaction chamber.

BRIEF DESCRIPTION OF THE DRAWINGS

FIG. 5 is a cross-section of a portion of a system formed in accordance with an embodiment illustrating a flow-control valve having a first position.

FIG. 6 is a cross-section of a portion of the system of FIG. 5 illustrating the flow-control valve having a second position.

FIG. 7 is a cross-section of a portion of a system formed in accordance with an embodiment illustrating a flow-control valve having a first position.

FIG. 8 is a cross-section of a portion of the system of FIG. 5 illustrating the flow-control valve having a second position.

DETAILED DESCRIPTION

Figure 1A:
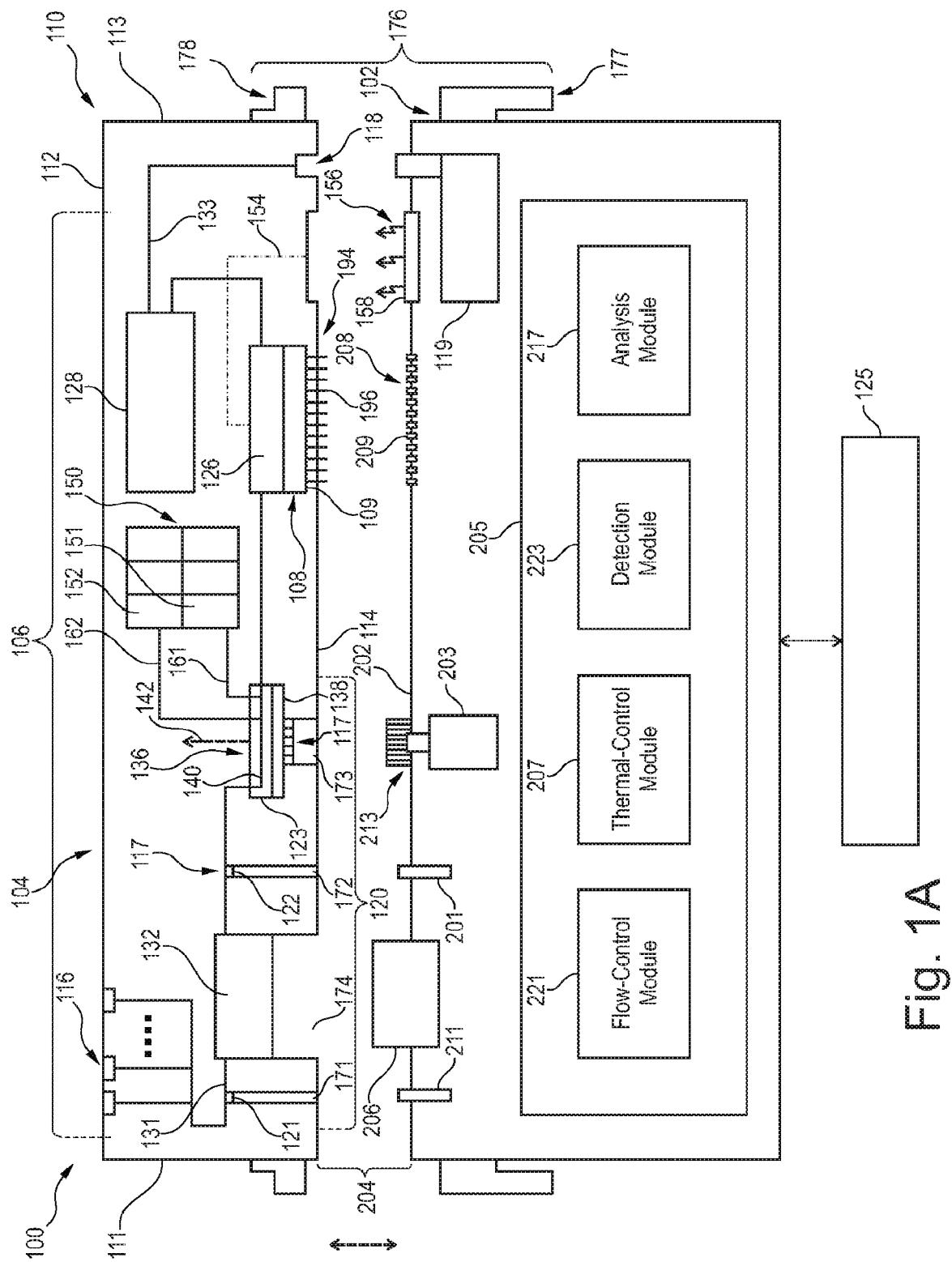
FIG. 1A is a schematic diagram of a system formed in accordance with an embodiment that is configured to conduct at least one of biochemical analysis or sample preparation.

Embodiments set forth herein may be used to perform designated reactions for sample preparation and/or biochemical analysis. The term "biochemical analysis" may include at least one of biological analysis or chemical analysis. FIG. 1A is a schematic diagram of a system 100 that is configured to conduct biochemical analysis and/or sample preparation. The system 100 includes a base instrument 102 and a removable cartridge 104 that is configured to separably engage the base instrument 102. The base instrument 102 and the removable cartridge 104 may be configured to interact with each other to transport a biological sample to different locations within the system 100, to conduct designated reactions that include the biological sample in order to prepare the biological sample for subsequent analysis, and, optionally, to detect one or more events with the biological sample. The events may be indicative of a designated reaction with the biological sample. In some embodiments, the removable cartridge 104 is similar to the integrated microfluidic cartridge 1100 (shown in FIG. 24) or the microfluidic cartridge assembly 1200 (shown in FIGS. 25 and 26).

Although the following is with reference to the base instrument 102 and the removable cartridge 104 as shown in FIG. 1A, it is understood that the base instrument 102 and the removable cartridge 104 illustrate only one exemplary embodiment of the system 100 and that other embodiments exist. For example, the base instrument 102 and the removable cartridge 104 include various components and features that, collectively, execute a number of operations for preparing the biological sample and/or analyzing the biological sample. In the illustrated embodiment, each of the base instrument 102 and the removable cartridge 104 are capable of performing certain functions. It is understood, however, that the base instrument 102 and the removable cartridge 104 may perform different functions and/or may share such functions. For example, in the illustrated embodiment, the removable cartridge 104 is configured to detect the designated reactions using an imaging device. In alternative embodiments, the base instrument 102 may include the imaging device. As another example, in the illustrated embodiment, the base instrument 102 is a "dry" instrument that does not provide, receive, or exchange liquids with the removable cartridge 104. In alternative embodiments, the base instrument 102 may provide, for example, reagents or other liquids to the removable cartridge 104 that are subsequently consumed (e.g., used in designated reactions) by the removable cartridge 104.

As used herein, the biological sample may include one or more biological or chemical substances, such as nucleosides, nucleic acids, polynucleotides, oligonucleotides, proteins, enzymes, polypeptides, antibodies, antigens, ligands, receptors, polysaccharides, carbohydrates, polyphosphates, nanopores, organelles, lipid layers, cells, tissues, organisms, and/or biologically active chemical compound(s), such as analogs or mimetics of the aforementioned species. In some instances, the biological sample may include whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes.

In some embodiments, the biological sample may include an added material, such as water, deionized water, saline solutions, acidic solutions, basic solutions, detergent solutions and/or pH buffers. The added material may also include reagents that will be used during the designated assay protocol to conduct the biochemical reactions. For example, added liquids may include material to conduct multiple polymerase-chain-reaction (PCR) cycles with the biological sample.

It should be understood, however, that the biological sample that is analyzed may be in a different form or state than the biological sample loaded into the system 100. For example, the biological sample loaded into the system 100 may include whole blood or saliva that is subsequently treated (e.g. via separation or amplification procedures) to provide prepared nucleic acids. The prepared nucleic acids may then be analyzed (e.g., quantified by PCR or sequenced by SBS) by the system 100. Accordingly, when the term "biological sample" is used while describing a first operation, such as PCR, and used again while describing a subsequent second operation, such as sequencing, it is understood that the biological sample in the second operation may be modified with respect to the biological sample prior to or during the first operation. For example, a sequencing step (e.g. SBS) may be carried out on amplicon nucleic acids that were produced from template nucleic acids that were amplified in a prior amplification step (e.g. PCR). In this case the amplicons are copies of the templates and the amplicons are present in higher quantity compared to the quantity of the templates.

In some embodiments, the system 100 may automatically prepare a sample for biochemical analysis based on a substance provided by the user (e.g., whole blood or saliva). However, in other embodiments, the system 100 may analyze biological samples that are partially or preliminarily prepared for analysis by the user. For example, the user may provide a solution including nucleic acids that were already isolated and/or amplified from whole blood.

As used herein, a "designated reaction" includes a change in at least one of a chemical, electrical, physical, or optical property (or quality) of an analyte-of-interest. In particular embodiments, the designated reaction is an associative binding event (e.g., incorporation of a fluorescently labeled biomolecule with the analyte-of-interest). The designated reaction can be a dissociative binding event (e.g., release of a fluorescently labeled biomolecule from an analyte-of-interest). The designated reaction may be a chemical transformation, chemical change, or chemical interaction. The designated reaction may also be a change in electrical properties. For example, the designated reaction may be a change in ion concentration within a solution. Exemplary reactions include, but are not limited to, chemical reactions such as reduction, oxidation, addition, elimination, rearrangement, esterification, amidation, etherification, cyclization, or substitution; binding interactions in which a first chemical binds to a second chemical; dissociation reactions in which two or more chemicals detach from each other; fluorescence; luminescence; bioluminescence; chemiluminescence; and biological reactions, such as nucleic acid replication, nucleic acid amplification, nucleic acid hybridization, nucleic acid ligation, phosphorylation, enzymatic catalysis, receptor binding, or ligand binding. The designated reaction can also be addition or elimination of a proton, for example, detectable as a change in pH of a surrounding solution or environment. An additional designated reaction can be detecting the flow of ions across a membrane (e.g., natural or synthetic bilayer membrane), for example as ions flow through a membrane the current is disrupted and the disruption can be detected. Field sensing of charged tags can also be used as can thermal sensing and other analytical sensing techniques known in the art In particular embodiments, the designated reaction includes the incorporation of a fluorescently-labeled molecule to an analyte. The analyte may be an oligonucleotide and the fluorescently-labeled molecule may be a nucleotide. The designated reaction may be detected when an excitation light is directed toward the oligonucleotide having the labeled nucleotide, and the fluorophore emits a detectable fluorescent signal. In alternative embodiments, the detected fluorescence is a result of chemiluminescence or bioluminescence. A designated reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore or decrease fluorescence by co-locating a quencher and fluorophore.

As used herein, a "reaction component" includes any substance that may be used to obtain a designated reaction. For example, reaction components include reagents, catalysts such as enzymes, reactants for the reaction, samples, products of the reaction other biomolecules, salts, metal cofactors, chelating agents and pH buffer solutions (e.g., hydrogenation buffer). The reaction components may be delivered, individually in solutions or combined in one or more mixture, to various locations in a fluidic network. For instance, a reaction component may be delivered to a reaction chamber where the biological sample is immobilized. The reaction component may interact directly or indirectly with the biological sample. In some embodiments, the removable cartridge 104 is pre-loaded with one or more of the reaction components that are necessary for carrying out a designated assay protocol. Preloading can occur at one location (e.g. a manufacturing facility) prior to receipt of the cartridge 104 by a user (e.g. at a customer's facility).

In some embodiments, the base instrument 102 may be configured to interact with one removable cartridge 104 per session. After the session, the removable cartridge 104 may be replaced with another removable cartridge 104. In other embodiments, the base instrument 102 may be configured to interact with more than one removable cartridge 104 per session. As used herein, the term "session" includes performing at least one of sample preparation and/or biochemical analysis protocol. Sample preparation may include separating, isolating, modifying and/or amplifying one or more component of the biological sample so that the prepared biological sample is suitable for analysis. In some embodiments, a session may include continuous activity in which a number of controlled reactions are conducted until (a) a designated number of reactions have been conducted, (b) a designated number of events have been detected, (c) a designated period of system time has elapsed. (d) signal-to-noise has dropped to a designated threshold; (e) a target component has been identified; (f) system failure or malfunction has been detected and/or (g) one or more of the resources for conducting the reactions has depleted. Alternatively, a session may include pausing system activity for a period of time (e.g., minutes, hours, days, weeks) and later completing the session until at least one of (a)-(g) occurs.

An assay protocol may include a sequence of operations for conducting the designated reactions, detecting the designated reactions, and/or analyzing the designated reactions. Collectively, the removable cartridge 104 and the base instrument 102 may include the components that are necessary for executing the different operations. The operations of an assay protocol may include fluidic operations, thermal-control operations, detection operations, and/or mechanical operations. A fluidic operation includes controlling the flow of fluid (e.g., liquid or gas) through the system 100, which may be actuated by the base instrument 102 and/or by the removable cartridge 104. For example, a fluidic operation may include controlling a pump to induce flow of the biological sample or a reaction component into a detection zone. A thermal-control operation may include controlling a temperature of a designated portion of the system 100. By way of example, a thermal-control operation may include raising or lowering a temperature of a polymerase chain reaction (PCR) zone where a liquid that includes the biological sample is stored. A detection operation may include controlling activation of a detector or monitoring activity of the detector to detect predetermined properties, qualities, or characteristics of the biological sample. As one example, the detection operation may include capturing images of a designated area that includes the biological sample to detect fluorescent emissions from the designated area. The detection operation may include controlling a light source to illuminate the biological sample or controlling a detector to observe the biological sample. A mechanical operation may include controlling a movement or position of a designated component. For example, a mechanical operation may include controlling a motor to move a valve-control component in the base instrument 102 that operably engages a rotatable valve in the removable cartridge 104. In some cases, a combination of different operations may occur concurrently. For example, the detector may capture images of the detection zone as the pump controls the flow of fluid through the detection zone. In some cases, different operations directed toward different biological samples may occur concurrently. For instance, a first biological sample may be undergoing amplification (e.g., PCR) while a second biological sample may be undergoing detection.

A "liquid," as used herein, is a substance that is relatively incompressible and has a capacity to flow and to conform to a shape of a container or a channel that holds the substance. A liquid may be aqueous based and include polar molecules exhibiting surface tension that holds the liquid together. A liquid may also include non-polar molecules, such as in an oil-based or non-aqueous substance. It is understood that references to a liquid in the present application may include a liquid that was formed from the combination of two or more liquids. For example, separate reagent solutions may be later combined to conduct designated reactions.

The removable cartridge 104 is configured to separably engage or removably couple to the base instrument 102. As used herein, when the terms "separably engaged" or "removably coupled" (or the like) are used to describe a relationship between a removable cartridge and a base instrument, the term is intended to mean that a connection between the removable cartridge and the base instrument is readily separable without destroying the base instrument. Accordingly, the removable cartridge may be separably engaged to the base instrument in an electrical manner such that the electrical contacts of the base instrument are not destroyed. The removable cartridge may be separably engaged to the base instrument in a mechanical manner such that features of the base instrument that hold the removable cartridge are not destroyed. The removable cartridge may be separably engaged to the base instrument in a fluidic manner such that the ports of the base instrument are not destroyed. The base instrument is not considered to be "destroyed," for example, if only a simple adjustment to the component (e.g., realigning) or a simple replacement (e.g., replacing a nozzle) is required. Components (e.g., the removable cartridge 104 and the base instrument 102) may be readily separable when the components can be separated from each other without undue effort or a significant amount of time spent in separating the components. In some embodiments, the removable cartridge 104 and the base instrument 102 may be readily separable without destroying either the removable cartridge 104 or the base instrument 102.

In some embodiments, the removable cartridge 104 may be permanently modified or partially damaged during a session with the base instrument 102. For instance, containers holding liquids may include foil covers that are pierced to permit the liquid to flow through the system 100. In such embodiments, the foil covers may be damaged such that it may be necessary to replace the damaged container with another container. In particular embodiments, the removable cartridge 104 is a disposable cartridge such that the removable cartridge 104 may be replaced and optionally disposed after a single use.

In other embodiments, the removable cartridge 104 may be used for more than one session while engaged with the base instrument 102 and/or may be removed from the base instrument 102, reloaded with reagents, and re-engaged to the base instrument 102 to conduct additional designated reactions. Accordingly, the removable cartridge 104 may be refurbished in some cases such that the same removable cartridge 104 may be used with different consumables (e.g., reaction components and biological samples). Refurbishing can be carried out at a manufacturing facility after the cartridge has been removed from a base instrument located at a customer's facility.

As shown in FIG. 1A, the removable cartridge 104 includes a fluidic network 106 that may hold and direct fluids (e.g., liquids or gases) therethrough. The fluidic network 106 includes a plurality of interconnected fluidic elements that are capable of storing a fluid and/or permitting a fluid to flow therethrough. Non-limiting examples of fluidic elements include channels, ports of the channels, cavities, storage modules, reservoirs of the storage modules, reaction chambers, waste reservoirs, detection chambers, multipurpose chambers for reaction and detection, and the like. The fluidic elements may be fluidically coupled to one another in a designated manner so that the system 100 is capable of performing sample preparation and/or analysis.

As used herein, the term "fluidically coupled" (or like term) refers to two spatial regions being connected together such that a liquid or gas may be directed between the two spatial regions. In some cases, the fluidic coupling permits a fluid to be directed back and forth between the two spatial regions. In other cases, the fluidic coupling is uni-directional such that there is only one direction of flow between the two spatial regions. For example, an assay reservoir may be fluidically coupled with a channel such that a liquid may be transported into the channel from the assay reservoir. However, in some embodiments, it may not be possible to direct the fluid in the channel back to the assay reservoir. In particular embodiments, the fluidic network 106 is configured to receive a biological sample and direct the biological sample through sample preparation and/or sample analysis. The fluidic network 106 may direct the biological sample and other reaction components to a waste reservoir.

One or more embodiments may include retaining the biological sample (e.g., template nucleic acid) at a designated location where the biological sample is analyzed. As used herein, the term "retained," when used with respect to a biological sample, includes substantially attaching the biological sample to a surface or confining the biological sample within a designated space. As used herein, the term "immobilized," when used with respect to a biological sample, includes substantially attaching the biological sample to a surface in or on a solid support. Immobilization may include attaching the biological sample at a molecular level to the surface. For example, a biological sample may be immobilized to a surface of a substrate using adsorption techniques including non-covalent interactions (e.g., electrostatic forces, van der Waals, and dehydration of hydrophobic interfaces) and covalent binding techniques where functional groups or linkers facilitate attaching the biological sample to the surface. Immobilizing a biological sample to a surface of a substrate may be based upon the properties of the surface of the substrate, the liquid medium carrying the biological sample, and the properties of the biological sample itself. In some cases, a substrate surface may be functionalized (e.g., chemically or physically modified) to facilitate immobilizing the biological sample to the substrate surface. The substrate surface may be first modified to have functional groups bound to the surface. The functional groups may then bind to the biological sample to immobilize the biological sample thereon. In some cases, a biological sample can be immobilized to a surface via a gel, for example, as described in US Patent Publ. Nos. 2011/0059865 A1 and 2014/0079923 A1, each of which is incorporated herein by reference in its entirety.

In some embodiments, nucleic acids can be immobilized to a surface and amplified using bridge amplification. Useful bridge amplification methods are described, for example, in U.S. Pat. No. 5,641,658; WO 07/010251, U.S. Pat. No. 6,090,592; U.S. Patent Publ. No. 2002/0055100 A1; U.S. Pat. No. 7,115,400; U.S. Patent Publ. No. 2004/0096853 A1; U.S. Patent Publ. No. 2004/0002090 A1; U.S. Patent Publ. No. 2007/0128624 A1; and U.S. Patent Publ. No. 2008/0009420 A1, each of which is incorporated herein in its entirety. Another useful method for amplifying nucleic acids on a surface is rolling circle amplification (RCA), for example, using methods set forth in further detail below. In some embodiments, the nucleic acids can be attached to a surface and amplified using one or more primer pairs. For example, one of the primers can be in solution and the other primer can be immobilized on the surface (e.g., 5'-attached). By way of example, a nucleic acid molecule can hybridize to one of the primers on the surface followed by extension of the immobilized primer to produce a first copy of the nucleic acid. The primer in solution then hybridizes to the first copy of the nucleic acid which can be extended using the first copy of the nucleic acid as a template. Optionally, after the first copy of the nucleic acid is produced, the original nucleic acid molecule can hybridize to a second immobilized primer on the surface and can be extended at the same time or after the primer in solution is extended. In any embodiment, repeated rounds of extension (e.g., amplification) using the immobilized primer and primer in solution provide multiple copies of the nucleic acid. In some embodiments, the biological sample may be confined within a predetermined space with reaction components that are configured to be used during amplification of the biological sample (e.g., PCR).

In the illustrated embodiment, the removable cartridge 104 includes a cartridge housing 110 having a plurality of housing sides 111-114. The housing sides 111-114 include non-mating sides 111-113 and a mating side 114. The mating side 114 is configured to engage the base instrument 102. In the illustrated embodiment, the cartridge housing 110 forms a substantially unitary structure. In alternative embodiments, the cartridge housing 110 may be constructed by one or more sub-components that are combined by a user of the system 100. The sub-components may be combined before the removable cartridge 104 is separably engaged to the base instrument 102 or after one of the sub-components is separably engaged to the base instrument 102. For example, a storage module 150 may be held by a first sub-housing (not shown) and a remainder of the removable cartridge 104 (e.g., fluidic network and imaging device) may include a second sub-housing (not shown). The first and second sub-housings may be combined to form the cartridge housing 110.

The fluidic network 106 is held by the cartridge housing 110 and includes a plurality of sample ports 116 that open to the non-mating side 112. In alternative embodiments, the sample ports 116 may be located along the non-mating sides 111 or 113 or may be located along the mating side 114. Each of the sample ports 116 is configured to receive a biological sample. By way of example only, the biological sample may be whole blood or saliva. In some embodiments, the biological sample may be nucleic acids and other materials (e.g., reagents, buffers, etc.) for conducting PCR. Although three sample ports 116 are shown in FIG. 1A, embodiments may include only one sample port, two sample ports, or more than three sample ports.

The fluidic network 106 also includes a fluidic-coupling port 118 that opens to the mating side 114 and is exposed to an exterior of the cartridge housing 110. The fluidic-coupling port 118 is configured to fluidically couple to a system pump 119 of the base instrument 102. The fluidic-coupling port 118 is in flow communication with a pump channel 133 that is part of the fluidic network 106. During operation of the system 100, the system pump 119 is configured to provide a negative pressure for inducing a flow of fluid through the pump channel 133 and through a remainder of the fluidic network 106. For example, the system pump 119 may induce flow of the biological sample from the sample port 116 to a sample-preparation region 132, wherein the biological sample may be prepared for subsequent analysis. The system pump 119 may induce flow of the biological sample from the sample-preparation region 132 to a reaction chamber 126, wherein detection operations are conducted to obtain data (e.g., imaging data) of the biological sample. The system pump 119 may also induce flow of fluid from reservoirs 151, 152 of a storage module 150 to the reaction chamber 126. After the detection operations are conducted, the system pump 119 may induce flow of the fluid into a waste reservoir 128.

In addition to the fluidic network 106, the removable cartridge 104 may include one or more mechanical interfaces 117 that may be controlled by the base instrument 102. For example, the removable cartridge 104 may include a valve assembly 120 having a plurality of flow-control valves 121-123 that are operably coupled to the fluidic network 106. Each of the flow-control valves 121-123 may represent a mechanical interface 117 that is controlled by the base instrument 102. For instance, the flow-control valves 121-123 may be selectively activated or controlled by the base instrument 102, in conjunction with selective activation of the system pump 119, to control a flow of fluid within the fluidic network 106.

For example, in the illustrated embodiment, the fluidic network 106 includes a sample channel 131 that is immediately downstream from and in flow communication with the sample ports 116. Only a single sample channel 131 is shown in FIG. 1A, but alternative embodiments may include multiple sample channels 131. The sample channel 131 may include the sample-preparation region 132. The valve assembly 120 includes a pair of channel valves 121, 122. The channel valves 121, 122 may be selectively activated by the base instrument 102 to impede or block flow of the fluid through the sample channel 131. In particular embodiments, the channel valves 121, 122 may be activated to form a seal that retains a designated volume of liquid within the sample-preparation region 132 of the sample channel 131. The designated volume within the sample-preparation region 132 may include the biological sample.

The valve assembly 120 may also include a movable valve 123. The movable valve 123 may be similar to the rotatable valve assembly 1410 (shown in FIGS. 27A, 27B). The movable valve 123 has a valve body 138 that may include at least one flow channel 140 that extends between corresponding ports. The valve body 138 is capable of moving between different positions to align the ports with corresponding ports of the fluidic network 106. For example, a position of the movable valve 123 may determine the type of fluid that flows into the reaction chamber 126. In a first position, the movable valve 123 may align with a corresponding port of the sample channel 131 to provide the biological sample to the reaction chamber 126. In a second position, the movable valve 123 may align with one or more corresponding ports of reservoir channels 161, 162 that are in flow communication with the reservoirs 151, 152, respectively, of the storage module 150. Each reservoir 151, 152 is configured to store a reaction component that may be used to conduct the designated reactions. The reservoir channels 161, 162 are located downstream from and in flow communication with the reservoirs 151, 152, respectively. In some embodiments, the movable valve 123 may move, separately, to different positions to align with the corresponding ports of the reservoir channels.

In the illustrated embodiment, the movable valve 123 is a rotatable valve that is configured to rotate about an axis 142. Accordingly, the movable valve 123 is hereinafter referred to as the rotatable valve 123. However, it should be understood that alternative embodiments may include movable valves that do not rotate to different positions. In such embodiments, the movable valve may slide in one or more linear directions to align the corresponding ports. Rotatable valves and linear-movement valves set forth herein may be similar to the apparatuses described in International Application No. PCT/US2013/032309, filed on Mar. 15, 2013, which is incorporated herein by reference in its entirety.

In some embodiments, the biological sample is illuminated by a light source 158 of the base instrument 102. Alternatively, the light source 158 may be incorporated with the removable cartridge 104. For example, the biological sample may include one or more fluorophores that provide light emissions when excited by a light having a suitable wavelength. In the illustrated embodiment, the removable cartridge 104 has an optical path 154. The optical path 154 is configured to permit illumination light 156 from the light source 158 of the base instrument 102 to be incident on the biological sample within the reaction chamber 126. Thus, the reaction chamber may have one or more optically transparent sides or windows. The optical path 154 may include one or more optical elements, such as lenses, reflectors, fiber-optic lines, and the like, that actively direct the illumination light 156 to the reaction chamber 126. In an exemplary embodiment, the light source 158 may be a light-emitting diode (LED). However, in alternative embodiments, the light source 158 may include other types of light-generating devices such as lasers or lamps.

In some embodiments, the detection assembly 108 includes an imaging detector 109 and the reaction chamber 126. The imaging detector 109 is configured to detect designated reactions within the reaction chamber 126. The imaging detector 109 may be similar to the CMOS image sensor 262 (shown in FIG. 40). In some embodiments, the imaging detector 109 may be positioned relative to the reaction chamber 126 to detect light signals (e.g., absorbance, reflection/refraction, or light emissions) from the reaction chamber 126. The imaging detector 109 may include one or more imaging devices, such as a charge-coupled device (CCD) camera or complementary-metal-oxide semiconductor (CMOS) imager. In some embodiments, the imaging detector 109 may detect light signals that are emitted from chemilluminescence. Yet still in other embodiments, the detection assembly 108 may not be limited to imaging applications. For example, the detection assembly 108 may be one or more electrodes that detect an electrical property of a liquid.

As set forth herein, the base instrument 102 is configured to operably engage the removable cartridge 104 and control various operations within the removable cartridge 104 to conduct the designated reactions and/or obtain data of the biological sample. To this end, the mating side 114 is configured to permit or allow the base instrument 102 to control operation of one or more components of the removable cartridge 104. For example, the mating side 114 may include a plurality of access openings 171-173 that permit the valves 121-123 to be controlled by the base instrument 102. The mating side 114 may also include an access opening 174 that is configured to receive a thermal block 206 of the base instrument 102. The access opening 174 extends along the sample channel 131. As shown, the access openings 171-174 open to the mating side 114.

The base instrument 102 has a control side 202 configured to separably engage the mating side 114 of the removable cartridge 104. The mating side 114 of the removable cartridge 104 and the control side 202 of the base instrument 102 may collectively define a system interface 204. The system interface 204 represents a common boundary between the removable cartridge 104 and the base instrument 102 through which the base instrument 102 and the removable cartridge 104 are operably engaged. More specifically, the base instrument 102 and the removable cartridge 104 are operably engaged along the system interface 204 such that the base instrument 102 may control various features of the removable cartridge 104 through the mating side 114. For instance, the base instrument 102 may have one or more controllable components that control corresponding components of the removable cartridge 104.

In some embodiments, the base instrument 102 and the removable cartridge 104 are operably engaged such that the base instrument 102 and the removable cartridge 104 are secured to each other at the system interface 204 with at least one of an electric coupling, thermal coupling, optical coupling, valve coupling, or fluidic coupling established through the system interface 204. In the illustrated embodiment, the base instrument 102 and the removable cartridge 104 are configured to have an electric coupling, a thermal coupling, a valve coupling, and an optical coupling. More specifically, the base instrument 102 and the removable cartridge 104 may communicate data and/or electrical power through the electric coupling. The base instrument 102 and the removable cartridge 104 may convey thermal energy to and/or from each other through the thermal coupling, and the base instrument 102 and the removable cartridge 104 may communicate light signals (e.g., the illumination light) through the optical coupling.

In the illustrated embodiment, the system interface 204 is a single-sided interface 204. For example, the control side 202 and the housing side 114 are generally planar and face in opposite directions. The system interface 204 is single-sided such that that the removable cartridge 104 and the base instrument 102 are operably coupled to each other only through the mating side 114 and the control side 202. In alternative embodiments, the system interface may be a multi-sided interface. For example, at least 2, 3, 4, or 5 sides of a removable cartridge may be mating sides that are configured to couple with a base instrument. The multiple sides may be planar and may be arranged orthogonally or opposite each other (e.g. surrounding all or part of a rectangular volume).

To control operations of the removable cartridge 104, the base instrument 102 may include valve actuators 211-213 that are configured to operably engage the flow-control valves 121-123, a thermal block 206 that is configured to provide and/or remove thermal energy from the sample-preparation region 132, and a contact array 208 of electrical contacts 209. The base instrument 102 may also include the light source 158 positioned along the control side 202. The base instrument 102 may also include the system pump 119 having a control port 210 positioned along the control side 202.

The system 100 may also include a locking mechanism 176. In the illustrated embodiment, the locking mechanism 176 includes a rotatable latch 177 that is configured to engage a latch-engaging element 178 of the removable cartridge 104. Alternatively, the removable cartridge 104 may include the rotatable latch 177 and the base instrument 102 may include the latch-engaging element 178. When the removable cartridge 104 is mounted to the base instrument 102, the latch 177 may be rotated and engage the latching-engaging element 176. A camming effect generated by the locking mechanism 176 may urge or drive the removable cartridge 104 toward the base instrument 102 to secure the removable cartridge 104 thereto.

The base instrument 102 may include a user interface 125 that is configured to receive user inputs for conducting a designated assay protocol and/or configured to communicate information to the user regarding the assay. The user interface 125 may be incorporated with the base instrument 102. For example, the user interface 125 may include a touchscreen that is attached to a housing of the base instrument 102 and configured to identify a touch from the user and a location of the touch relative to information displayed on the touchscreen. Alternatively, the user interface 125 may be located remotely with respect to the base instrument 102.

The base instrument 102 may also include a system controller 220 that is configured to control operation of at least one of the valve actuators 211-213, the thermal block 206, the contact array 208, the light source 158, or the system pump 119. The system controller 220 is illustrated conceptually as a collection of circuitry modules, but may be implemented utilizing any combination of dedicated hardware boards, DSPs, processors, etc. Alternatively, the system controller 220 may be implemented utilizing an off-the-shelf PC with a single processor or multiple processors, with the functional operations distributed between the processors. As a further option, the circuitry modules described below may be implemented utilizing a hybrid configuration in which certain modular functions are performed utilizing dedicated hardware, while the remaining modular functions are performed utilizing an off-the-shelf PC and the like.

The system controller 220 may include a plurality of circuitry modules 221-224 that are configured to control operation of certain components of the base instrument 102 and/or the removable cartridge 104. For instance, the circuitry module 221 may be a flow-control module 221 that is configured to control flow of fluids through the fluidic network 106. The flow-control module 221 may be operably coupled to the valve actuators 211-213 and the system pump 119. The flow-control module 221 may selectively activate the valve actuators 211-213 and the system pump 119 to induce flow of fluid through one or more paths and/or to block flow of fluid through one or more paths.

By way of example only, the valve actuator 213 may rotatably engage the rotatable valve 123. The valve actuator 213 may include a rotating motor 214 that is configured to drive (e.g., rotate) the valve actuator 213. The flow-control module 221 may activate the valve actuator 213 to move the rotatable valve 123 to a first rotational position. With the rotatable valve 123 in the first rotational position, the flow-control module 221 may activate the system pump 219 thereby drawing the biological sample from the sample-preparation region 132 and into the reaction chamber 126. The flow-control module 221 may then activate the valve actuator 213 to move the rotatable valve 123 to a second rotational position. With the rotatable valve 123 in the second rotational position, the flow-control module 221 may activate the system pump 219 thereby drawing one or more of the reaction components from the corresponding reservoir(s) and into the reaction chamber 126. In some embodiments, the system pump 219 may be configured to provide positive pressure such that the fluid is actively pumped in an opposite direction. Such operations may be used to add multiple liquids into a common reservoir thereby mixing the liquids within the reservoir. Accordingly, the fluidic-coupling port 118 may permit fluid (e.g., gas) to exit the cartridge housing 110 or may receive fluid into the cartridge housing 110.

The system controller 220 may also include a thermal-control module 222. The thermal-control module 222 may control the thermal block 206 to provide and/or remove thermal energy from the sample-preparation region 132. In one particular example, the thermal block 206 may increase and/or decrease a temperature that is experienced by the biological sample within the sample channel 131 in accordance with a PCR protocol. Although not shown, the system 100 may include additional thermal devices that are positioned adjacent to the sample-preparation region 132. For example, the removable cartridge 104 may include a thermal device that is similar to the flexible PCB heater 1412 (shown in FIGS. 27A, 27B).

The system controller 220 may also include a detection module 223 that is configured to control the detection assembly 108 to obtain data regarding the biological sample. The detection module 223 may control operation of the detection assembly 108 through the contact array 208. For example, the detection assembly 108 may be communicatively engaged to a contact array 194 of electrical contacts 196 along the mating side 114. In some embodiment, the electrical contacts 196 may be flexible contacts (e.g., pogo contacts or contact beams) that are capable of repositioning to and from the mating side 114. The electrical contacts 196 are exposed to an exterior of the cartridge housing and are electrically coupled to the detection assembly 108. The electrical contacts 196 may be referenced as input/output (I/O) contacts. When the base instrument 102 and the removable cartridge 104 are operably engaged, the detection module 223 may control the detection assembly 108 to obtain data at predetermined times or for predetermined time periods. By way of example, the detection module 223 may control the detection assembly 108 to capture an image of the reaction chamber 126 when the biological sample has a fluorophore attached thereto. A number of images may be obtained.

Optionally, the system controller 220 includes an analysis module 224 that is configured to analyze the data to provide at least partial results to a user of the system 100. For example, the analysis module 224 may analyze the imaging data provided by the imaging detector 109. The analysis may include identifying a sequence of nucleic acids of the biological sample.

The system controller 220 and/or the circuitry modules 221-224 may include one or more logic-based devices, including one or more microcontrollers, processors, reduced instruction set computers (RISC), application specific integrated circuits (ASICs), field programmable gate array (FPGAs), logic circuits, and any other circuitry capable of executing functions described herein. In an exemplary embodiment, the system controller 220 and/or the circuitry modules 221-224 execute a set of instructions that are stored therein in order to perform one or more assay protocols. Storage elements may be in the form of information sources or physical memory elements within the base instrument 102 and/or the removable cartridge 104. The protocols performed by the assay system 100 may be to carry out, for example, quantitative analysis of DNA or RNA, protein analysis, DNA sequencing (e.g., sequencing-by-synthesis (SBS)), sample preparation, and/or preparation of fragment libraries for sequencing.

The set of instructions may include various commands that instruct the system 100 to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The software may be in various forms such as system software or application software. Further, the software may be in the form of a collection of separate programs, or a program module within a larger program or a portion of a program module. The software also may include modular programming in the form of object-oriented programming. After obtaining the detection data, the detection data may be automatically processed by the system 100, processed in response to user inputs, or processed in response to a request made by another processing machine (e.g., a remote request through a communication link).

The system controller 220 may be connected to the other components or sub-systems of the system 100 via communication links, which may be hardwired or wireless. The system controller 220 may also be communicatively connected to off-site systems or servers. The system controller 220 may receive user inputs or commands, from a user interface (not shown). The user interface may include a keyboard, mouse, a touch-screen panel, and/or a voice recognition system, and the like.

The system controller 220 may serve to provide processing capabilities, such as storing, interpreting, and/or executing software instructions, as well as controlling the overall operation of the system 100. The system controller 220 may be configured and programmed to control data and/or power aspects of the various components. Although the system controller 220 is represented as a single structure in FIG. 1A, it is understood that the system controller 220 may include multiple separate components (e.g., processors) that are distributed throughout the system 100 at different locations. In some embodiments, one or more components may be integrated with a base instrument and one or more components may be located remotely with respect to the base instrument.

Figure 1B:
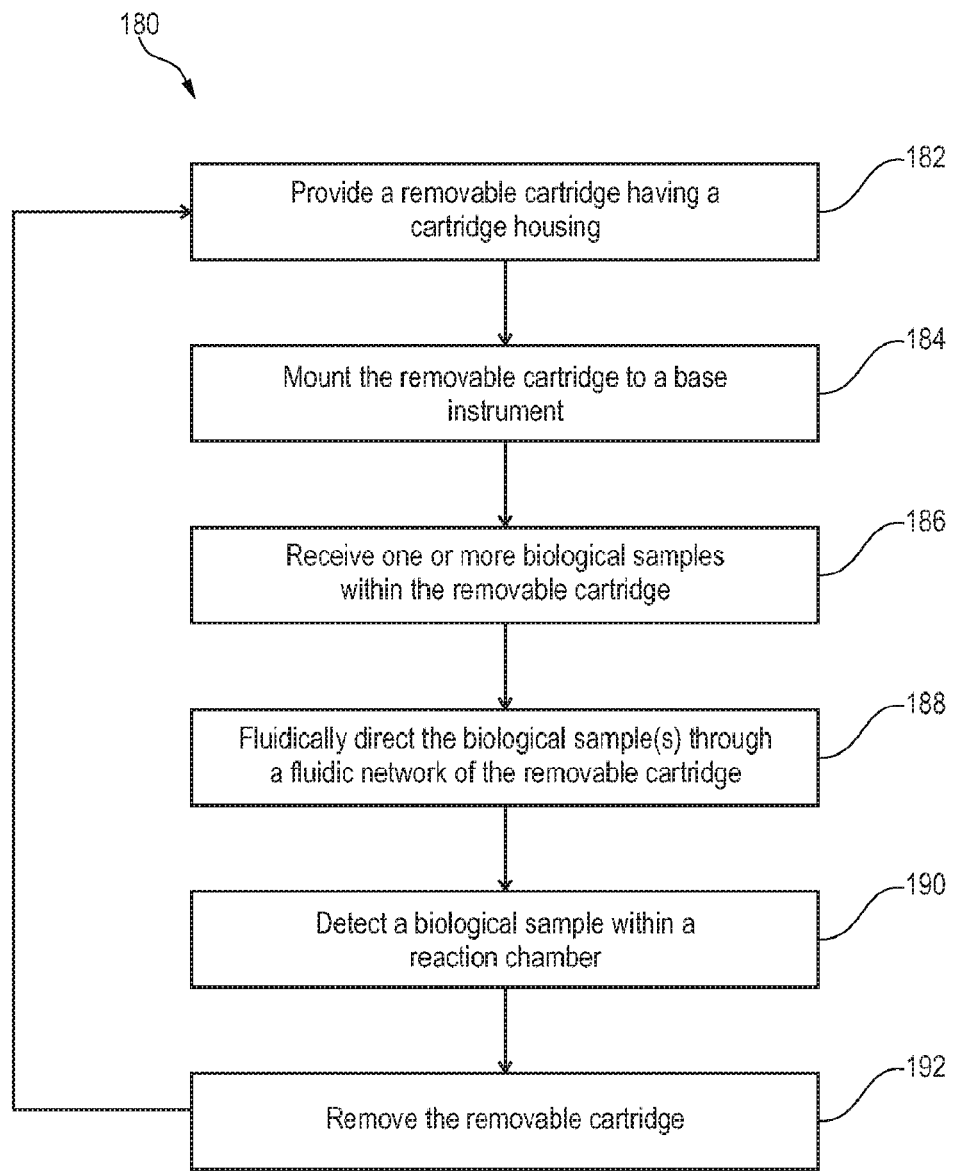
FIG. 1B is a flow chart illustrating a method of conducting designated reactions for at least one of sample preparation or sample analysis.

FIG. 1B is a flow chart illustrating a method 180 of conducting designated reactions for at least one of sample preparation or sample analysis. In particular embodiments, the method 180 may include sequencing nucleic acids. The method 180 may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

For example, the method 180 may include providing, at 182, a removable cartridge having a cartridge housing. The removable cartridge may include a fluidic network disposed within the cartridge housing. The removable cartridge may also include a flow-control valve that is operably coupled to the fluidic network and movable relative to the fluidic network. The flow-control valve may be, for example, a channel valve or a movable valve, such as a rotatable valve. The cartridge housing may include a housing side that defines an exterior of the removable cartridge.

The method 180 may also include mounting (e.g., contacting), at 184, the removable cartridge to a base instrument. The housing side of the removable cartridge may separably engage a control side of the base instrument to collectively define a system interface. The base instrument includes a valve actuator that engages the flow-control valve through the system interface. For example, the valve actuator may include an elongated body that clears the control side and is inserted into an access opening along the housing side of the removable cartridge. Optionally, the valve actuator directly engages a portion of the flow-control valve.

At 186, one or more biological samples may be received by the removable cartridge. For example, a user may use a pipettor to add the biological sample(s) to sample ports that are in flow communication with the fluidic network. The receiving at 186 may occur before or after the contacting at 184. The method 180 may include fluidically directing, at 188, a biological sample to flow through the fluidic network of the removable cartridge to conduct at least one of sample analysis or sample preparation in the cartridge. For example, the biological sample may be directed to a sample-preparation region of the fluidic network, wherein the flow of the biological sample is controlled by action of the valve actuator on the flow-control valve. The biological sample may undergo an amplification process, such as PCR, while the biological sample is sealed within the sample-preparation region. As another example, the biological sample may be directed to flow into a reaction chamber, wherein the flow of the biological sample is controlled by action of the valve actuator on the flow-control valve.

Optionally, at 190, the method 180 includes detecting the biological sample using an imaging detector directed to the reaction chamber. The detection assembly may be held by at least one of the removable cartridge or the base instrument. For example, the detection assembly may be incorporated within the removable cartridge. The base instrument may electrically couple to the detection assembly to control operation of the detection assembly. Optionally, fluidically directing the biological sample at 186 and/or imaging the biological sample at 190 may be repeated multiple times in accordance with a predetermined schedule or sequence.

In some embodiments, the method 180 includes removing, at 192, the removable cartridge from the base instrument. After the assay protocol has been completed, the removable cartridge may be removed from the base instrument. In some cases, the removable cartridge may be re-filled or refurbished. For example, the removable cartridge may be decontaminated and/or sterilized and the used storage module may be replaced by a new storage module. The method 180 may then return to 182 in which another removable cartridge is provided and mounted, at 184, with respect to the same base instrument. In a similar manner as the first removable cartridge, the housing side of the second removable cartridge may separably engage the control side of the base instrument to collectively define the system interface.

Figure 2:
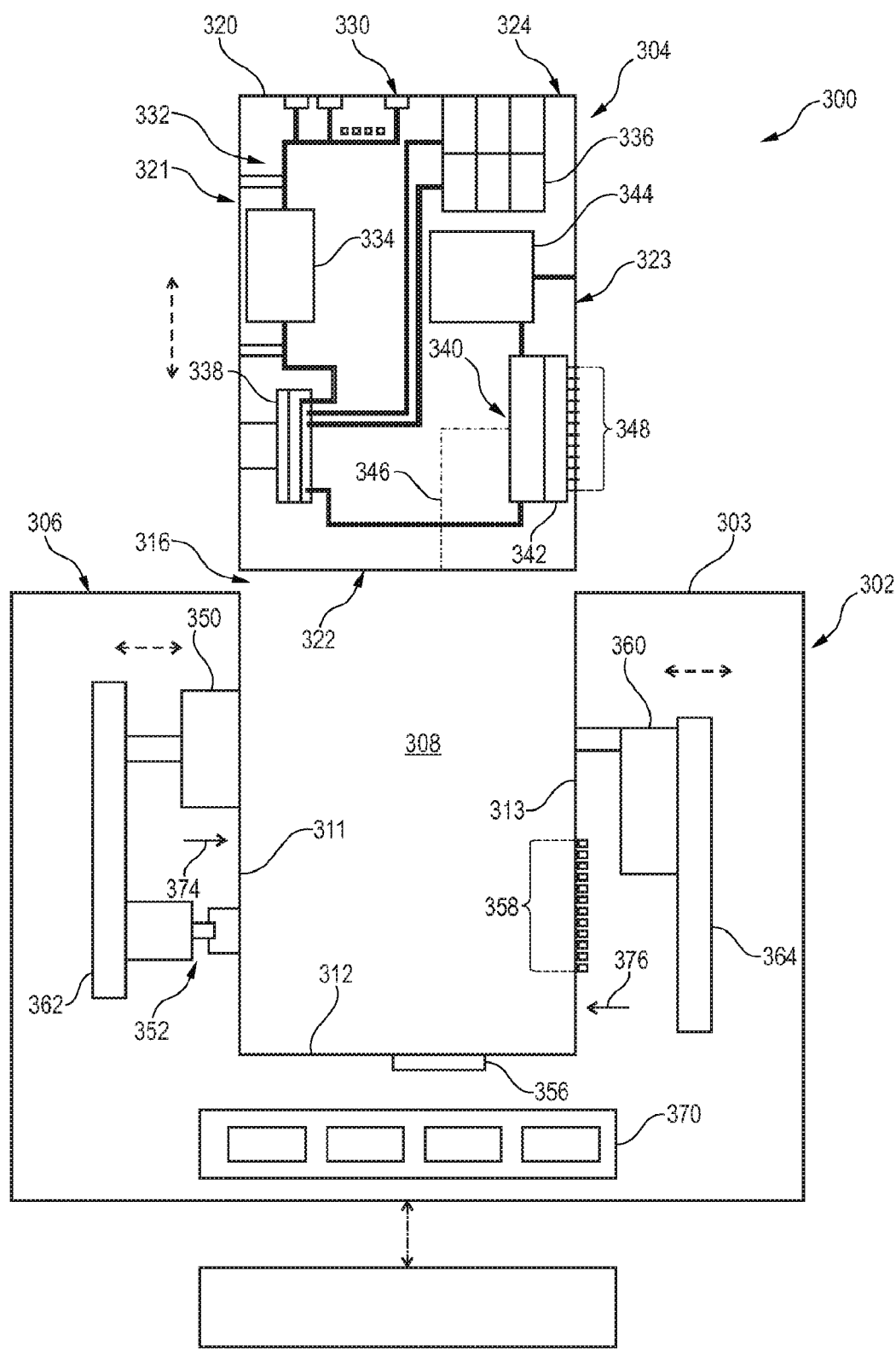
FIG. 2 is a schematic diagram of a system formed in accordance with an embodiment that is configured to conduct at least one of biochemical analysis or sample preparation.

FIG. 2 is a schematic diagram of a system 300 that is configured to conduct at least one of biochemical analysis or sample preparation. The system 300 may include identical or similar features as the system 100 (FIG. 1A). For example, the system 300 includes a base instrument 302 and a removable cartridge 304 that is configured to separably engage the base instrument 302. The base instrument 302 and the removable cartridge 304 may have similar features as the base instrument 102 and the removable cartridge 104, respectively, (shown in FIG. 1A). As shown in FIG. 2, the base instrument 302 has an instrument housing 303 that includes an instrument side 306 and a cartridge-receiving slot 308 that opens to the instrument side 306. In some embodiments, the instrument side 306 may represent a top, with respect to gravity, of the base instrument 302 and partially form an exterior of the instrument housing 303. In the illustrated embodiment, the cartridge-receiving slot 308 is defined by interior docking or control sides 311-313 of the instrument housing 303. The control sides 311 and 313 oppose each other and the control side 312 extends between the control sides 311, 313. The control side 312 may face an opening 316 to the cartridge-receiving slot 308.

The removable cartridge 304 is sized and shaped to be disposed within the cartridge-receiving slot 308 and operably engage the base instrument 302. As shown, the removable cartridge 304 includes a cartridge housing 320 that has housing sides 321-324. The housing sides 321-323 are configured to operably engage the docking or control sides 311-313 such that the base instrument 302 and the removable cartridge 304 establish at least one of an electric coupling, thermal coupling, optical coupling, and/or fluidic coupling. As such, the housing sides 321-323 are hereinafter referred to as the mating sides 321-323. The housing side 324 does not operably engage the base instrument 302. Accordingly, the housing side 324 may be referred to as the non-mating side 324.

Similar to the removable cartridge 104 (FIG. 1A), the removable cartridge 304 includes a plurality of features and components for controlling operations within the removable cartridge 304 to conduct designated reactions. For example, the removable cartridge 304 has sample ports 330 that open to the non-mating side 324 and are configured to receive one or more biological samples. Alternatively, the sample ports 330 may open to one of the mating sides 321-323. In such embodiments, the biological sample(s) may be deposited within the sample ports 330 prior to the removable cartridge 304 being loaded into the cartridge-receiving slot 308.

The removable cartridge 304 may also include a fluidic network 332 having a sample-preparation region 334. The fluidic network 332 may include or fluidically interconnect a number of other components of the removable cartridge 304, such as a storage module 336, a movable valve 338, a detection assembly 340 having an imaging detector 342, and a waste reservoir 344. Optionally, the removable cartridge 304 may also include an optical path 346 and a contact array 348. The components of the removable cartridge 304 may be similar to components described above with reference to the removable cartridge 304.

The base instrument 302 may have corresponding components that operably engage the removable cartridge 304 to conduct the designated reactions. For example, the base instrument 302 includes a thermal block 350, a valve actuator 352, a light source 356, a contact array 358, and a system pump 360. As the removable cartridge 304 is loaded into the cartridge-receiving slot 308 or after the removable cartridge 304 is loaded into the cartridge-receiving slot 308, the various components of the removable cartridge 304 and the base instrument 302 may engage one another. More specifically, when the removable cartridge 304 is operably loaded into the base instrument 302, the thermal block 350 may be located proximate to the sample-preparation region 334, the valve actuator 352 may operably engage the movable valve 338, the light source 356 may communicatively couple to the optical path 346, the contact array 358 may electrically engage the contact array 348, and the system pump 360 may communicatively engage the fluidic network 332. Accordingly, the removable cartridge 304 may be controlled by the base instrument 302 in a similar manner as the removable cartridge 104 is controlled by the base instrument 102.

The base instrument 302 may be configured to permit the removable cartridge 304 to be inserted freely into the cartridge-receiving slot 308 without damaging components located on the control sides 311-313 or the mating sides 321-323. For example, one or more of the components of the base instrument 302 are biased toward or moved toward the removable cartridge 304. In some embodiments, the thermal block 350 and the valve actuator 352 are secured to a component support 362. The component support 362 may be biased toward the mating side 321 or moved toward the mating side 321 after the removable cartridge 304 is disposed within the cartridge-receiving slot 308. In a similar manner, the system pump 360 may be secured to a component support 364. The component support 364 may be biased toward the mating side 323 or moved toward the mating side 323 after the removable cartridge 304 is disposed within the cartridge-receiving slot 308.

The component supports 362, 364 may be automatically activated by a system controller 370. For example, the system controller 370 may determine that the removable cartridge 304 is being loaded or has already been loaded into the cartridge-receiving slot 308. The system controller 370 may then activate a driving mechanism or multiple mechanisms to drive the component supports 362, 364 toward the mating sides 321, 323. Alternatively, the component supports 362, 364 may be operably linked to an operator-controlled mechanism or mechanisms that, once activated by a user of the system 300, may drive the component supports 362, 364 toward the mating sides 321, 323, respectively. Accordingly, the base instrument 302 may be configured to permit the removable cartridge 304 to be advanced freely (e.g., without substantial snagging or stubbing) into the cartridge-receiving slot 308.

Embodiments set forth herein include systems in which the removable cartridge and the base instrument may form a system interface that is multi-sided. For example, each of the mating sides 321-323 operably engages a corresponding control side that defines the cartridge-receiving slot 308. Collectively, the mating sides 321-323 and the corresponding control sides 311-313 define a system interface, which may be referred to as a multi-sided interface. Such embodiments may be desirable to balance forces experienced by the removable cartridge 304. For example, the thermal block 350 and the valve actuator 352 may apply a force 374 in a first direction (as indicated by the arrow). The system pump 360 may apply a force 376 in an opposite second direction (as indicated by the arrow). An interaction between the contact arrays 348, 358 may also provide a portion of the force 376.

In some embodiments, at least one of the forces 374, 376 facilitates providing intimate contact between the corresponding components. For instance, the force 374 may provide intimate contact between the thermal block 350 and the sample-preparation region 334 to enable thermal control of the sample-preparation region 334. Likewise, the force 374 may permit the valve actuator 352 and the movable valve 338 to suitably engage each other so that the valve actuator 352 may selectively control the movable valve 338. The force 376 may enable an intimate contact between corresponding electrical contacts of the contact arrays 348, 358.

Figure 3:
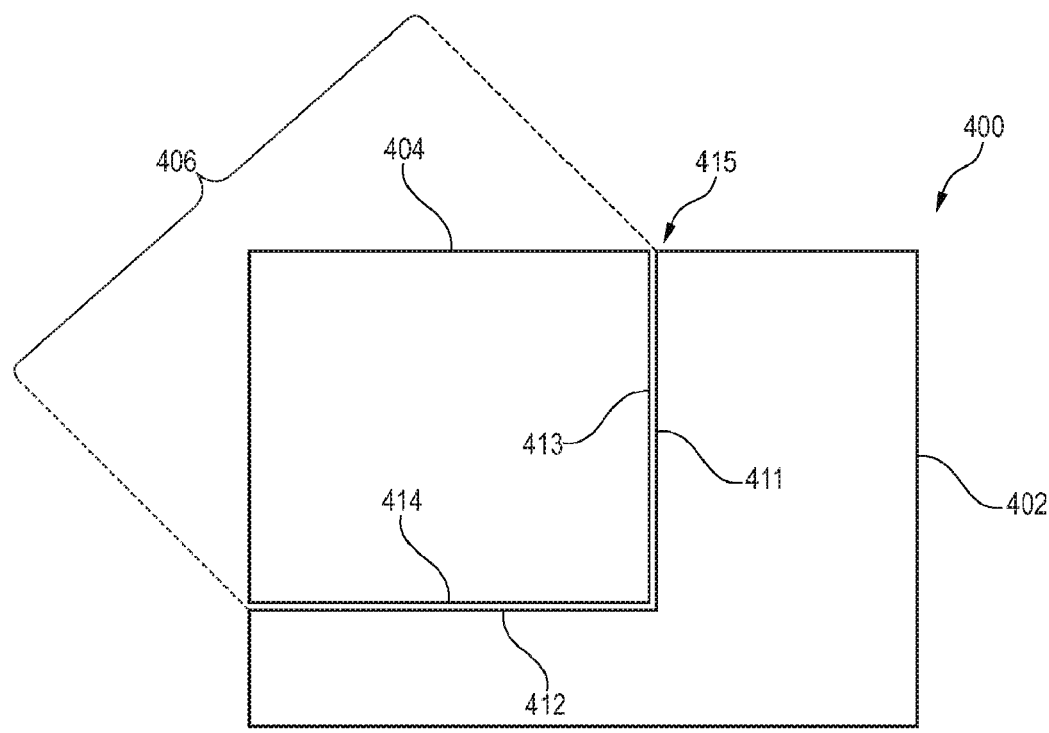
FIG. 3 is a side view of a system formed in accordance with an embodiment that includes a base instrument and a removable cartridge.
Figure 4:
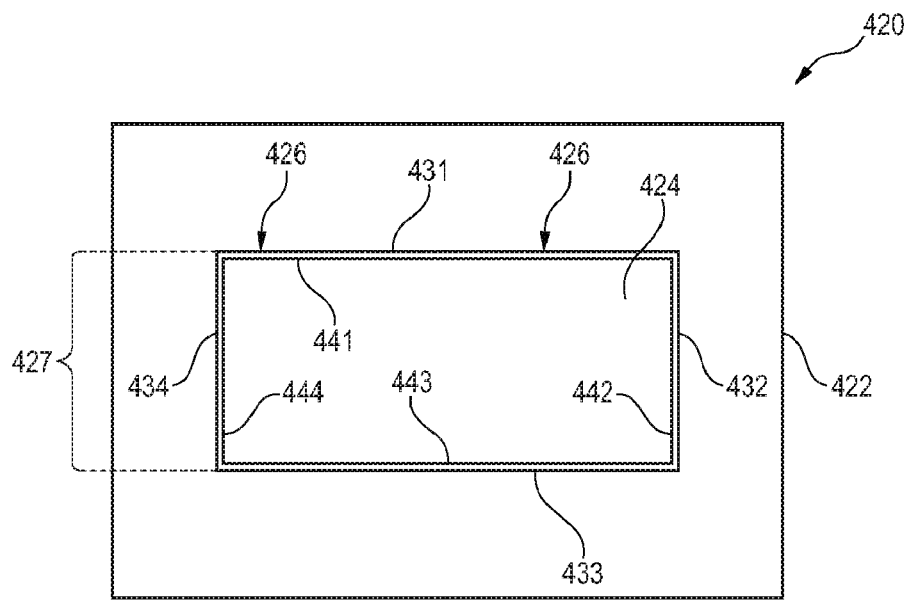
FIG. 4 is a top-down view of a system formed in accordance with an embodiment that includes a base instrument and a removable cartridge.

FIGS. 3 and 4 illustrate different systems having corresponding base instruments and removable cartridges and, in particular, illustrate different multi-sided interfaces that may be utilized by one or more embodiments. For example, FIG. 3 is an end view of a system 400 that includes a base instrument 402 and a removable cartridge 404. The base instrument 402 includes an open-sided recess 406 that is sized and shaped to receive the removable cartridge 404. As shown, the open-sided recess 406 is formed by first and second control sides 411, 412 that face in perpendicular directions with respect to each other. More specifically, the first and second control sides 411, 412 form an L-shaped recess. The first and second control sides 411, 412 operably engage first and second mating sides 413, 414, respectively, of the removable cartridge 404. Collectively, a multi-sided interface 415 is formed between the first control side 411 and the first mating side 413 and the second control side 412 and the second mating side 414. More specifically, at least one of a valve coupling, fluidic coupling, electrical coupling, optical coupling, or thermal coupling may be established along each of the first and second mating sides 413, 414.

FIG. 4 is a top-down view of a system 420 that includes a base instrument 422 and a removable cartridge 424. The base instrument 422 includes a cartridge-receiving slot 426, which may be similar or identical to the cartridge-receiving slot 308 (FIG. 2). The cartridge-receiving slot 426 is sized and shaped to receive the removable cartridge 424. As shown, the cartridge-receiving slot 426 is formed by control sides 431-434. The control sides 431, 433 oppose each other, and the control sides 432, 434 oppose each other. The control sides 431-434 operably engage mating sides 441-444, respectively, of the removable cartridge 424. Collectively, a multi-sided interface 427 is formed between the corresponding sides of the removable cartridge 424 and the base instrument 422.

FIGS. 5-12 illustrate different valving mechanisms through which a base instrument may control (e.g., regulate) flow through a fluidic network of a removable cartridge. Each of FIGS. 5-12 illustrates a cross-section of a system in which a valve coupling has been established between the base instrument and the removable cartridge through a system interface. Each of FIGS. 5-12 illustrates a channel valve in which the base instrument may activate the channel valve to open and close a corresponding channel. For example, FIGS. 5 and 6 illustrates a portion of a system 500, which may be similar to the systems described above, such as the systems 100 (FIG. 1A), 300 (FIG. 2), 400 (FIG. 3), 420 (FIG. 4).

FIGS. 5 and 6 illustrate a cross-section of a portion of a system 500 having a base instrument 502 and a removable cartridge 504 that are operably engaged along a system interface 506. As shown, the removable cartridge 504 has a cartridge housing 508 and a microfluidic body 510 that is held by the cartridge housing 508. In the illustrated embodiment, the microfluidic body 510 includes a plurality of layers 521-523 that are stacked side-by-side. The layers 521-523 may be printed circuit board (PCB) layers, such as those described below with respect to FIGS. 14-75. One or more of the layers 521-523 may be etched such that, when the layers 5212-523 are stacked side-by-side, the microfluidic body 510 forms a sample channel 526. The sample channel 526 is a portion of a fluidic network, such as the fluidic network 106 (FIG. 1A), and includes a valve or interior cavity 528.

The removable cartridge 504 includes a channel valve 530 that is configured to regulate flow of a fluid through the sample channel 526. For example, the channel valve 530 may permit maximum clearance so that the fluid may flow unimpeded. The channel valve 530 may also impede the flow of fluid therethrough. As used herein, the term "impede" may include slowing the flow of fluid or entirely blocking the flow of fluid. As shown, the sample channel 530 includes first and second ports 532, 534 that are in flow communication with the valve cavity 528. Fluid is configured to flow into the valve cavity 528 through the first port 532 and out of the valve cavity 528 through the second port 534. In the illustrated embodiment, the channel valve 530 constitutes a flexible membrane that is capable of being flexed between first and second conditions. The flexible membrane is in the first condition in FIG. 5 and in the second condition in FIG. 6. In particular embodiments, the flexible membrane is a flexible layer, such as the membrane layer 918 (shown in FIGS. 23A, 23B). The flexible layer is configured to be pushed into the valve cavity 528 to block the flow of fluid therethrough. In alternative embodiments, the channel valve 530 may be another physical element that is capable of moving between different conditions or positions to regulate flow of the fluid.

Also shown, the base instrument 502 includes a valve actuator 540 that is configured to activate the channel valve 530. For instance, the valve actuator 540 may flex the flexible membrane between the first and second conditions. The valve actuator 540 includes an elongated body 542, such as a post or rod, that extends through the system interface 506. More specifically, the elongated body 542 clears a control side 544 of the base instrument 502. The removable cartridge 504 has an access opening 546 that receives the valve actuator 540. The access opening 546 opens to a mating side 548 of the removable cartridge 504. As shown, the elongated body 542 projects away from the control side 544 and into the access opening 546 of the mating side 548. The access opening 546 permits the valve actuator 540 to directly engage the channel valve 530, which is a flexible membrane in the illustrated embodiment. In FIG. 5, the valve actuator 540 is in a first state or position. In FIG. 6, the valve actuator 540 is in a second state or position. In the second position, the valve actuator 540 has been moved a distance toward the channel valve 530 and is engaged with the channel valve 530. The valve actuator 540 may deform the channel valve 530 such that the channel valve 530 covers the first port 532. As such, a fluid flow through the first port 532 is blocked by the channel valve 530.

In some embodiments, the system 500 may have first and second channel valves that are similar or identical to the channel valve 530 shown in FIGS. 5 and 6, wherein the first channel valve is upstream with respect to a sample-preparation region (not shown) of the fluidic network and the second channel valve is downstream with respect to the sample-preparation region. As such, the first and second channel valves may effectively seal a fluid, which may contain the biological sample, within the sample-preparation region. The fluid having the biological sample may then be heated to subject the fluid to an amplification protocol, such as a PCR protocol.

FIGS. 7 and 8 illustrate a cross-section of a portion of a system 550 having a base instrument 552 and a removable cartridge 554 that are operably engaged along a system interface 556. The base instrument 552 and the removable cartridge 554 may be similar to the base instrument 502 and the removable cartridge 504, respectively, shown in FIGS. 5 and 6. The base instrument 552 has a valve actuator 590 having an elongated body 592, such as a nozzle, that clears a control side 594 of the base instrument 552 and is inserted into an access opening 596 of a mating side 598 of the removable cartridge 554. The valve actuator 590 extends through the system interface 556. Optionally, the base instrument 552 may include a sealing member 595, such as an O-ring, that surrounds the elongated body 592 and seals the access opening 596 to provide a closed chamber. In an exemplary embodiment, the removable cartridge 554 includes a channel valve 580, which may be a flexible membrane, that is pneumatically activated by the valve actuator 590. More specifically, the valve actuator 590 is configured to provide a fluid (e.g., air) to increase a pressure within the closed chamber thereby causing the channel valve 580 to deform. When the channel valve 580 is deformed, the channel valve may cover a first port 582 of a sample channel 576 thereby blocking flow through the sample channel 576.

Figure 9:
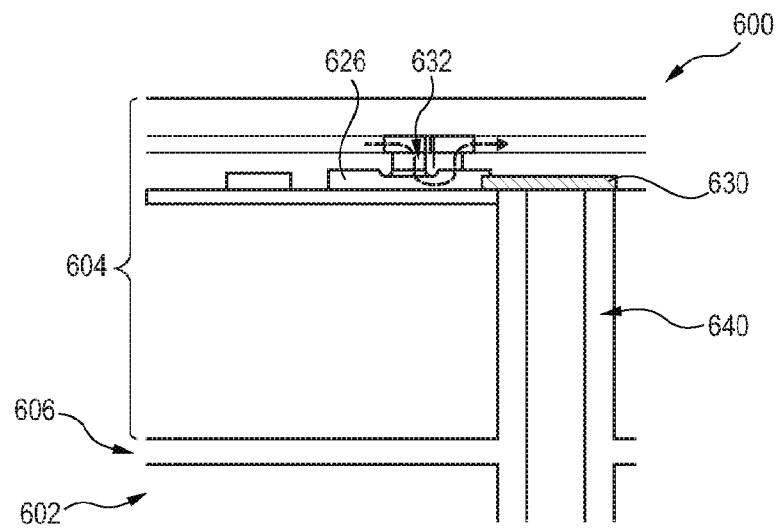
FIG. 9 is a cross-section of a portion of a system formed in accordance with an embodiment illustrating a flow-control valve having a first position.
Figure 10:
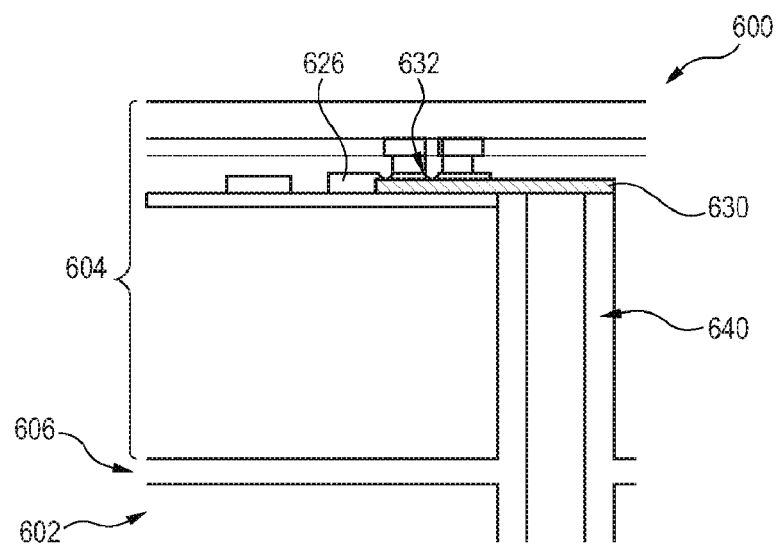
FIG. 10 is a cross-section of a portion of the system of FIG. 5 illustrating the flow-control valve having a second position.

FIGS. 9-10 illustrate a system 600 that is similar to the systems 500 and 550. More specifically, FIGS. 9 and 10 illustrate a system 600 having a base instrument 602 and a removable cartridge 604 that are operably engaged along a system interface 606. The removable cartridge 604 includes a movable valve 630 that is rotatably engaged by a valve actuator 640 of the base instrument 602. The movable valve 630 is a planar body that is shaped to permit flow through a sample channel 626 when in a first rotational position (shown in FIG. 9) and block flow through the sample channel 626 when in a second rotational position (shown in FIG. 10). More specifically, the movable valve 630 may cover a port 632 when in the second rotational position.

Figure 11:
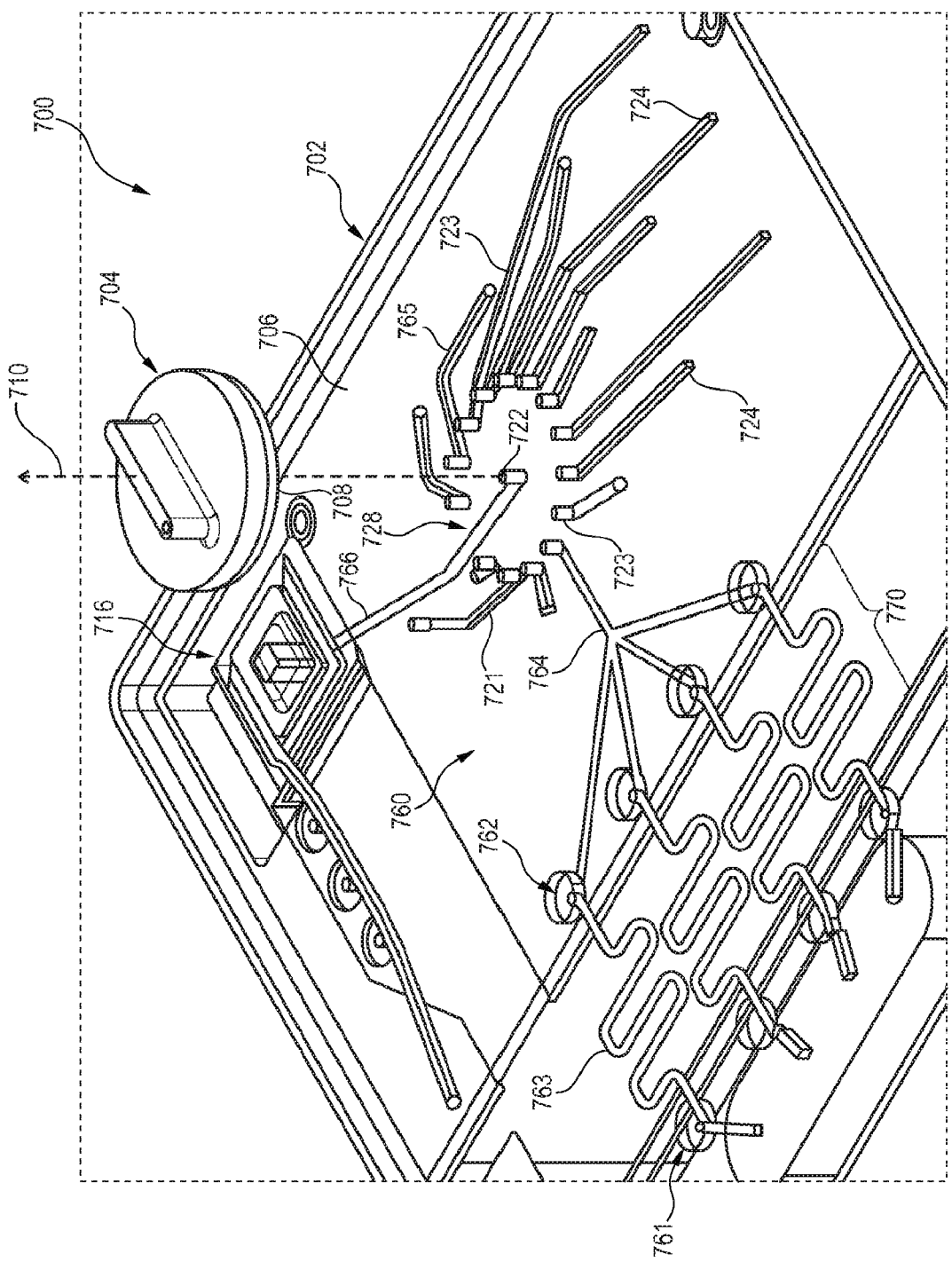
FIG. 11 is a perspective view of an exposed portion of a removable cartridge formed in accordance with an embodiment.

FIG. 11 is a perspective view of an exposed portion of a removable cartridge 700 having a microfluidic body 702 and a rotatable valve 704. The removable cartridge 700 may be similar to the removable cartridge 104 (FIG. 1) and other removable cartridges described herein. The rotatable valve 704 may be similar to the movable valve 123 (FIG. 1). The rotatable valve 704 is configured to be rotatably mounted to a body side or surface 706 of the microfluidic body 702. The rotatable valve 704 has a fluidic side 708 that is configured to slidably engage the body side 706 when rotated about an axis 710. The microfluidic body 702 may include a fluidic network 760 having a plurality of sample channels 763, 764, a plurality of reservoir channels 765, and a feed channel 766. The channels 763-766 are discrete channels. For example, the channels 763-766 are capable of being disconnected based on a rotational position of the rotatable valve 704.

The channels 763-766 have corresponding ports that open to the body side 706. In the illustrated embodiment, four sample channels 763 are in flow communication with a single sample channel 764. As such, the sample channels 763 may be referred to as channel portions, and the sample channel 764 may be referred to as a common sample channel. Each of the sample channels 763 is operably coupled to a pair of channel valves 761, 762. The channel valves 761, 762 may be similar to the channel valves described herein, such as the channel valve 530. When in corresponding closed positions, the channel valves 761, 762 may seal a liquid containing a corresponding biological sample. In some embodiments, the sample channels 763 extend adjacent to a thermal-control area 770. When the biological samples are sealed within the corresponding sample channels 763, a heating element (not shown) and a thermal block (not shown) may be positioned adjacent to the thermal-control area 770. The heating element and the thermal block may coordinate to increase and/or decrease a temperature experienced by the biological samples within the sample channels 763. In such embodiments, the sample channels 763 may constitute sample-preparation regions.

The feed channel 766 is in flow communication with a reaction chamber 716, and the reservoir channels 765 may be in flow communication with corresponding reservoirs (not shown) of a storage module (not shown). The sample channel 764 has a network port 721, the feed channel 766 has a feed port 722, and the reservoir channels 765 have corresponding reservoir ports 723. The network port 721, the feed port 722, and the reservoir ports 723 open to the body side 706. The reservoir ports 723 are in flow communication with corresponding module ports 724 through the corresponding reservoir channel 765. As shown, the module ports 724 may be positioned at various locations along the body side 706 away from feed port 722 or the axis 710. The module ports 724 are configured to fluidically couple to the reservoirs (not shown). The module ports 724 may have locations that are based on sizes of the reservoirs.

In the illustrated embodiment, the microfluidic body 702 has a total of fifteen channels that directly interconnect to the rotatable valve 704. More specifically, only one sample channel 764 and only one feed channel 766, but thirteen reservoir channels 765 may directly interconnect (fluidically) to the rotatable valve 704. In other embodiments, the microfluidic body 702 may include multiple sample channels 764 and/or multiple feed channels 766 that directly interconnect with the rotatable valve 704. Each of the sample channels 763 may be fluidically coupled to a corresponding sample port (not shown) that is configured to receive a biological sample from the user.

The fluidic side 708 is configured to slidably engage the body side 706 at a valve-receiving area 728. The rotatable valve 704 is sized and shaped such that the fluidic side 708 covers the valve-receiving area 728 and one or more of the ports 721-723 along the body side 706. The rotatable valve 704 includes a flow channel 744 (shown in FIG. 12) that is configured to fluidically interconnect the feed port 722 to one or more of the ports 721, 723. The rotatable valve 704 may block flow through one or more ports and permit flow through one or more other ports based on a position and a configuration of the rotatable valve 704.

Figure 12:
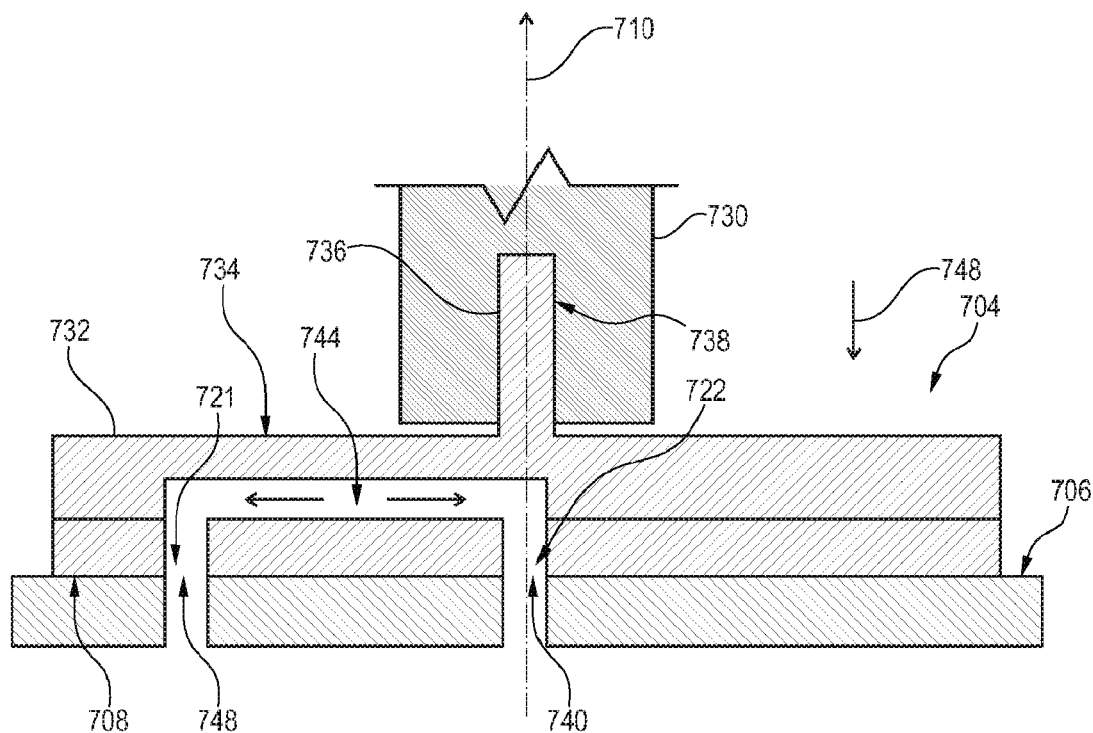
FIG. 12 is a cross-section of a rotatable valve that may be used with the removable cartridge of FIG. 11.

FIG. 12 illustrates a cross-section of the rotatable valve 704 that is operably engaged with a valve actuator 730. More specifically, the rotatable valve 704 includes a valve body 732 having the fluidic side 708 and an operative side 734. The operative side 734 may include a mechanical interface 736 that is configured to engage the valve actuator 730. In the illustrated embodiment, the mechanical interface 736 includes a planar body or fin that coincides with the axis 710. The valve actuator 730 includes a slot 738 that is configured to receive the mechanical interface 736 such that the valve actuator 730 operably engages the rotatable valve 704. More specifically, the valve actuator 730 may engage the rotatable valve 704 so that the valve actuator 730 is capable of rotating the rotatable valve 704 about the axis 710.

The fluidic side 708 includes a plurality of valve ports 740, 742 and a flow channel 744 extending between the valve ports 740, 742. The fluidic side 708 is slidably engaged to the body surface 706 at the valve-receiving area 728. In an exemplary embodiment, the rotatable valve 704 includes only two valve ports 740, 742 and only one flow channel 744. In other embodiments, the rotatable valve 704 may include more than two valve ports and/or more than one flow channel.

As shown in FIG. 12, the feed port 722 is fluidically aligned and coupled to the valve port 740, and the valve port 742 is fluidically aligned and coupled to the network port 721. Based on the rotational position of the rotatable valve 704, the valve port 742 may also be fluidically coupled to one of the component ports 723. As noted above, the rotatable valve 704 is configured to rotate about the axis 710. In some embodiments, the feed port 722 and the valve port 740 are positioned such that the feed port 722 and the valve port 740 are aligned with the axis 710. More specifically, the axis 710 extends through each of the feed port 722 and the valve port 740.

When the valve actuator 730 is operably engaged to the rotatable valve 704, the valve actuator 730 may apply an actuator force 748 in a direction against the body side 706. In such embodiments, the actuator force 748 may be sufficient to seal the flow channel 744 between the valve ports 740, 742 and to seal the reservoir ports 723 and/or the network port 721.

Accordingly, the rotatable valve 704 may fluidically couple the feed port 722 and the network port 721 at a first rotational position and fluidically couple the feed port 722 and a corresponding reservoir port 723 at a second rotational position. When the rotatable valve 704 is rotated between the different rotational positions, the rotatable valve 704 effectively changes a flow path of the fluidic network.

The fluid may flow in either direction through the flow channel 744. For example, a system pump (not shown), such as the system pump 119 (FIG. 1) may be in flow communication with the feed port 722. The system pump may generate a suction force that pulls the fluid through the network port 721 (or a corresponding reservoir port 723) then into the flow channel 744 and then through the feed port 722. Alternatively, the system pump may provide a positive pressure that displaces fluid within the flow channel 744 such that the fluid flows through the feed port 722 then into the flow channel 744 and then through the network port 721 (or a corresponding reservoir port 723).

Figure 13:
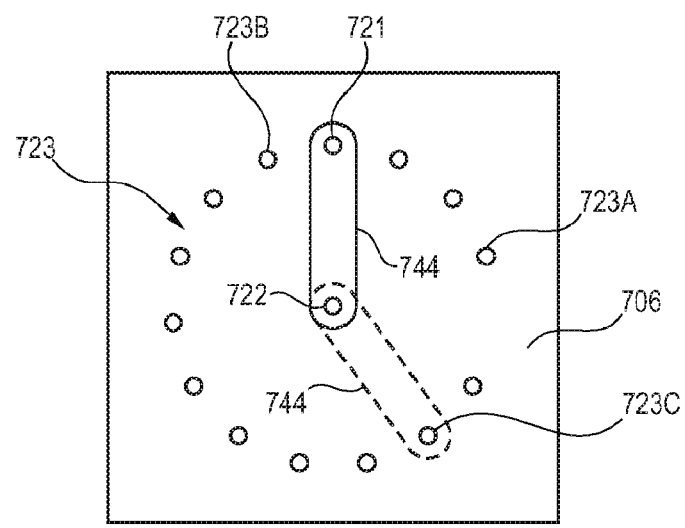
FIG. 13 illustrates an arrangement of ports that may be fluidically interconnected using the rotatable valve.

FIG. 13 is a top-down view of the body side 706 illustrating the network port 721, the feed port 722, and the reservoir ports 723. The flow channel 744 is represented in two different rotational positions. The reservoir ports 723 may include reservoir ports 723A-723D. Each of the reservoir ports 723A-723D is fluidically coupled to a corresponding reservoir through the corresponding reservoir channel 765 (FIG. 10). More specifically, the reservoir port 723A is fluidically coupled to a hydrogenation buffer, the reservoir port 723B is fluidically coupled to a nucleotides solution, the reservoir port 723C is fluidically coupled to a wash solution, and the reservoir port 723D is fluidically coupled to a cleaving solution. As described above, based on a rotational position of the rotatable valve 704 (FIG. 11), the flow channel 744 may fluidically couple the feed port 722 to the sample channels 763, 764 or to a corresponding reservoir.

Table 1 illustrates various stages of a sequencing-by-synthesis (SBS) protocol, but it is understood that other assay protocols may be implemented. At stage 1, the flow channel 744 has a rotational position that fluidically couples the network port 721 and the feed port 722. At stage 1, the channel valves (not shown) may be selectively activated to seal the second, third, and fourth biological samples within the corresponding sample-preparation region, but permit the first biological sample to flow through the network port 721. Accordingly, at stage 1, the system pump may apply a suction force that draws the first biological sample into the flow channel 744. At stage 2, the rotatable valve 704 is rotated to a second rotational position, while the first biological sample is stored within the flow channel 744, so that the flow channel 744 fluidically couples the reservoir port 723A and the feed port 722. In the second rotational position, the system pump may provide a positive displacement force that pushes the first biological sample through the reservoir port 723A and into the hydrogenation buffer reservoir.

At stage 3, the rotatable valve 704 is rotated back to the first rotational position and the channel valves are selectively activated so that the second biological sample may be drawn into the flow channel 744. At stage 4, the rotatable valve 704 is rotated back to the second rotational position, while the first biological sample is stored within the flow channel 744, and the second biological sample is added to the hydrogenation buffer with the first biological sample. During stages 5-8, the third and fourth biological samples are removed from the corresponding sample-preparation regions and added to the hydrogenation buffer. Accordingly, four biological samples may be stored within a single reservoir having hydrogenation buffer. Reactions may occur with the biological samples and the hydrogenation buffer that prepare the biological samples for SBS sequencing.

At stage 9, the combined biological samples/hydrogenation buffer is drawn through the reservoir port 723A, through the flow channel 744, through the feed port 722, and into the reaction chamber (not shown). The biological samples may be immobilized to surfaces that define the reaction chamber. For example, clusters may be formed that include the biological samples. Stages 10-13 represent a sequencing cycle. At stage 10, the rotatable valve 704 may be at a third rotational position so that a nucleotides solution may be drawn through the flow channel 744 and into the reaction chamber. At such time, a base may be incorporated into the corresponding biological samples (e.g., template nucleic acids). At stage 11, the rotatable valve 704 may be at a fourth rotational position so that a wash solution may flow through the reaction chamber and carry the nucleotides solution away from the reaction chamber. After stage 11, the reaction chamber may be imaged by the imaging detector. The color of light emitted from the clusters may be used to identify the bases incorporated by the clusters. At stage 12, the rotatable valve 704 may be at a fourth rotational position so that a cleaving solution may flow through the reaction chamber and the fluorophores (and, if present, reversible terminator moieties) may be removed from the clusters. At stage 13, the rotatable valve 704 may be at the third rotational position again and the wash solution may flow through the reaction chamber to remove the cleaving solution. Stages 10-13 may be repeated until completion of the sequencing and/or until reagents are depleted.

TABLE 1

| | Port | Type of Fluid Flowing into Flow Channel | Flow Direction |
|---|---|---|---|
| Stage 1 | 721 | 1st Biological Sample | Downstream |
| Stage 2 | 723A | 1st Biological Sample | Upstream |
| Stage 3 | 721 | 2nd Biological Sample | Downstream |
| Stage 4 | 723A | 2nd Biological Sample | Upstream |
| Stage 5 | 721 | 3rd Biological Sample | Downstream |
| Stage 6 | 723A | 3rd Biological Sample | Upstream |
| Stage 7 | 721 | 4th Biological Sample | Downstream |
| Stage 8 | 723A | 4th Biological Sample | Upstream |
| Stage 9 | 723A | Combined Biological Samples + Hydrogenation Buffer | Downstream |
| Stage 10 | 723B | Nucleotides Solution | Downstream |
| Stage 11 | 723C | Wash Solution | Downstream |
| Stage 12 | 723D | Cleaving Solution | Downstream |
| Stage 13 | 723C | Wash Solution | Downstream |
| Repeat Stages 10-13 until detection complete | | | |

The above-mentioned embodiments may be used in conjunction with the subject matter of U.S. Provisional Patent Application No. 61/951,462 (hereinafter the "'462 Application"), which is incorporated herein by reference in its entirety. At least a portion of the '462 Application is provided below.

The methods described herein can be used in conjunction with a variety of nucleic acid sequencing techniques. Particularly applicable techniques are those wherein nucleic acids are attached at fixed locations in an array such that their relative positions do not change and wherein the array is repeatedly detected or imaged. Embodiments in which images are obtained in different color channels, for example, coinciding with different labels used to distinguish one nucleotide base type from another are particularly applicable. In some embodiments, the process to determine the nucleotide sequence of a target nucleic acid can be an automated process. Preferred embodiments include sequencing-by-synthesis ("SBS") techniques.

"Sequencing-by-synthesis ("SBS") techniques" generally involve the enzymatic extension of a nascent nucleic acid strand through the iterative addition of nucleotides against a template strand. In traditional methods of SBS, a single nucleotide monomer may be provided to a target nucleotide in the presence of a polymerase in each delivery. However, in the methods described herein, more than one type of nucleotide monomer can be provided to a target nucleic acid in the presence of a polymerase in a delivery.

SBS can utilize nucleotide monomers that have a terminator moiety or those that lack any terminator moieties. Methods utilizing nucleotide monomers lacking terminators include, for example, pyrosequencing and sequencing using gamma-phosphate-labeled nucleotides, as set forth in further detail below. In methods using nucleotide monomers lacking terminators, the number of nucleotides added in each cycle is generally variable and dependent upon the template sequence and the mode of nucleotide delivery. For SBS techniques that utilize nucleotide monomers having a terminator moiety, the terminator can be effectively irreversible under the sequencing conditions used as is the case for traditional Sanger sequencing which utilizes dideoxynucleotides, or the terminator can be reversible as is the case for sequencing methods developed by Solexa (now Illumina, Inc.).

SBS techniques can utilize nucleotide monomers that have a label moiety or those that lack a label moiety. Accordingly, incorporation events can be detected based on a characteristic of the label, such as fluorescence of the label; a characteristic of the nucleotide monomer such as molecular weight or charge; a byproduct of incorporation of the nucleotide, such as release of a proton or pyrophosphate; or the like. In embodiments, where two or more different nucleotides are present in a sequencing reagent, the different nucleotides can be distinguishable from each other, or alternatively, the two or more different labels can be the indistinguishable under the detection techniques being used. For example, the different nucleotides present in a sequencing reagent can have different labels and they can be distinguished using appropriate optics as exemplified by the sequencing methods developed by Solexa (now Illumina, Inc.).

In another exemplary type of SBS, cycle sequencing is accomplished by stepwise addition of reversible terminator nucleotides containing, for example, a cleavable or photobleachable dye label as described, for example, in International Patent Pub. No. WO 04/018497 and U.S. Pat. No. 7,057,026, the disclosures of which are incorporated herein by reference. This approach is being commercialized by Illumina Inc., and is also described in International Patent Pub. No. WO 91/06678 and International Patent Pub. No. WO 07/123,744, each of which is incorporated herein by reference. The availability of fluorescently-labeled terminators in which both the termination can be reversed and the fluorescent label cleaved facilitates efficient cyclic reversible termination (CRT) sequencing. Polymerases can also be co-engineered to efficiently incorporate and extend from these modified nucleotides.

Preferably in reversible terminator-based sequencing embodiments, the labels do not substantially inhibit extension under SBS reaction conditions. However, the detection labels can be removable, for example, by cleavage or degradation. Images can be captured following incorporation of labels into arrayed nucleic acid features. In particular embodiments, each cycle involves simultaneous delivery of four different nucleotide types to the array and each nucleotide type has a spectrally distinct label. Four images can then be obtained, each using a detection channel that is selective for one of the four different labels. Alternatively, different nucleotide types can be added sequentially and an image of the array can be obtained between each addition step. In such embodiments each image will show nucleic acid features that have incorporated nucleotides of a particular type. Different features will be present or absent in the different images due the different sequence content of each feature. However, the relative position of the features will remain unchanged in the images. Images obtained from such reversible terminator-SBS methods can be stored, processed and/or analyzed as set forth herein. Following the image capture step, labels can be removed and reversible terminator moieties can be removed for subsequent cycles of nucleotide addition and detection. Removal of the labels after they have been detected in a particular cycle and prior to a subsequent cycle can provide the advantage of reducing background signal and crosstalk between cycles. Examples of useful labels and removal methods are set forth below.

In particular embodiments some or all of the nucleotide monomers can include reversible terminators. In such embodiments, reversible terminators/cleavable fluors can include fluor linked to the ribose moiety via a 3' ester linkage (Metzker, Genome Res. 15:1767-1776 (2005), which is incorporated herein by reference). Other approaches have separated the terminator chemistry from the cleavage of the fluorescence label (Ruparel et al., Proc Natl Acad Sci USA 102:5932-7 (2005), which is incorporated herein by reference in its entirety). Ruparel et al described the development of reversible terminators that used a small 3' allyl group to block extension, but could easily be deblocked by a short treatment with a palladium catalyst. The fluorophore was attached to the base via a photocleavable linker that could easily be cleaved by a 30 second exposure to long wavelength UV light. Thus, either disulfide reduction or photocleavage can be used as a cleavable linker. Another approach to reversible termination is the use of natural termination that ensues after placement of a bulky dye on a dNTP. The presence of a charged bulky dye on the dNTP can act as an effective terminator through steric and/or electrostatic hindrance. The presence of one incorporation event prevents further incorporations unless the dye is removed. Cleavage of the dye removes the fluor and effectively reverses the termination. Examples of modified nucleotides are also described in U.S. Pat. Nos. 7,427,673, and 7,057,026, the disclosures of which are incorporated herein by reference in their entireties.

Additional exemplary SBS systems and methods which can be utilized with the methods and systems described herein are described in U.S. Patent Pub. No. 2007/0166705, U.S. Patent Pub. No. 2006/0188901, U.S. Pat. No. 7,057,026, U.S. Patent Pub. No. 2006/0240439, U.S. U.S. Patent Pub. No. 2006/0281109, International Patent Pub. No. WO 05/065814, U.S. Patent Pub. No. 2005/0100900, International Patent Pub. No. WO 06/064199, International Patent Pub. No. WO 07/010,251, U.S. U.S. Patent Pub. No. 2012/0270305 and U.S. Patent Pub. No. 2013/0260372, the disclosures of which are incorporated herein by reference in their entireties.

Some embodiments can utilize detection of four different nucleotides using fewer than four different labels. For example, SBS can be performed utilizing methods and systems described in the incorporated materials of U.S. Patent Pub. No. 2013/0079232. As a first example, a pair of nucleotide types can be detected at the same wavelength, but distinguished based on a difference in intensity for one member of the pair compared to the other, or based on a change to one member of the pair (e.g., via chemical modification, photochemical modification or physical modification) that causes apparent signal to appear or disappear compared to the signal detected for the other member of the pair. As a second example, three of four different nucleotide types can be detected under particular conditions while a fourth "dark-state" nucleotide type lacks a label that is detectable under those conditions, or is minimally detected under those conditions (e.g., minimal detection due to background fluorescence, etc). Incorporation of the first three nucleotide types into a nucleic acid can be determined based on presence of their respective signals and incorporation of the fourth nucleotide type into the nucleic acid can be determined based on absence or minimal detection of any signal. As a third example, one nucleotide type can include label(s) that are detected in two different channels, whereas other nucleotide types are detected in no more than one of the channels. The aforementioned three exemplary configurations are not considered mutually exclusive and can be used in various combinations. An exemplary embodiment that combines all three examples, is a fluorescent-based SBS method that uses a first nucleotide type that is detected in a first channel (e.g., dATP having a label that is detected in the first channel when excited by a first excitation wavelength), a second nucleotide type that is detected in a second channel (e.g., dCTP having a label that is detected in the second channel when excited by a second excitation wavelength), a third nucleotide type that is detected in both the first and the second channel (e.g., dTTP having at least one label that is detected in both channels when excited by the first and/or second excitation wavelength) and a fourth nucleotide type that lacks a label that is not, or minimally, detected in either channel (e.g., dGTP having no label).

Further, as described in the incorporated materials of U.S. Patent Pub. No. 2013/0079232, sequencing data can be obtained using a single channel. In such so-called one-dye sequencing approaches, the first nucleotide type is labeled but the label is removed after the first image is generated, and the second nucleotide type is labeled only after a first image is generated. The third nucleotide type retains its label in both the first and second images, and the fourth nucleotide type remains unlabeled in both images.

Some embodiments can utilize sequencing by ligation techniques. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. As with other SBS methods, images can be obtained following treatment of an array of nucleic acid features with the labeled sequencing reagents. Each image will show nucleic acid features that have incorporated labels of a particular type. Different features will be present or absent in the different images due the different sequence content of each feature, but the relative position of the features will remain unchanged in the images. Images obtained from ligation-based sequencing methods can be stored, processed and analyzed as set forth herein. Exemplary sequencing systems and methods which can be utilized with the methods and systems described herein are described in U.S. Pat. Nos. 6,969,488, 6,172,218, and 6,306,597, the disclosures of which are incorporated herein by reference in their entireties.

Some embodiments can utilize nanopore sequencing (Deamer, D. W. & Akeson, M. "Nanopores and nucleic acids: prospects for ultrarapid sequencing." Trends Biotechnol. 18, 147-151 (2000); Deamer, D. and D. Branton, "Characterization of nucleic acids by nanopore analysis". Acc. Chem. Res. 35:817-825 (2002); Li, J., M. Gershow, D. Stein, E. Brandin, and J. A. Golovchenko, "DNA molecules and configurations in a solid-state nanopore microscope" Nat. Mater. 2:611-615 (2003), the disclosures of which are incorporated herein by reference in their entireties). In such embodiments, the target nucleic acid passes through a nanopore. The nanopore can be a synthetic pore or biological membrane protein, such as alpha-hemolysin. As the target nucleic acid passes through the nanopore, each base-pair can be identified by measuring fluctuations in the electrical conductance of the pore. (U.S. Pat. No. 7,001,792; Soni, G. V. & Meller, "A. Progress toward ultrafast DNA sequencing using solid-state nanopores." Clin. Chem. 53, 1996-2001 (2007); Healy, K. "Nanopore-based single-molecule DNA analysis." Nanomed. 2, 459-481 (2007); Cockroft, S. L., Chu, J., Amorin, M. & Ghadiri, M. R. "A single-molecule nanopore device detects DNA polymerase activity with single-nucleotide resolution." J. Am. Chem. Soc. 130, 818-820 (2008), the disclosures of which are incorporated herein by reference in their entireties). In other embodiments, an endonuclease can be coupled with a nanopore such that nucleotides released sequentially from an end of the nucleic acid by endonuclease are detected when they pass through the nanopore. Each nucleotide can be distinguished based on the different base moieties or based on added moieties. Data obtained from nanopore sequencing can be stored, processed and analyzed as set forth herein. In particular, the data can be treated as an image in accordance with the exemplary treatment of optical images and other images that is set forth herein.

Some embodiments can utilize methods involving the real-time monitoring of DNA polymerase activity. Nucleotide incorporations can be detected through fluorescence resonance energy transfer (FRET) interactions between a fluorophore-bearing polymerase and gamma-phosphate-labeled nucleotides as described, for example, in U.S. Pat. Nos. 7,329,492 and 7,211,414 (each of which is incorporated herein by reference) or nucleotide incorporations can be detected with zero-mode waveguides as described, for example, in U.S. Pat. No. 7,315,019 (which is incorporated herein by reference) and using fluorescent nucleotide analogs and engineered polymerases as described, for example, in U.S. Pat. No. 7,405,281 and U.S. Patent Pub. No. 2008/0108082 (each of which is incorporated herein by reference). The illumination can be restricted to a zeptoliter-scale volume around a surface-tethered polymerase such that incorporation of fluorescently labeled nucleotides can be observed with low background (Levene, M. J. et al. "Zero-mode waveguides for single-molecule analysis at high concentrations." Science 299, 682-686 (2003); Lundquist, P. M. et al. "Parallel confocal detection of single molecules in real time." Opt. Lett. 33, 1026-1028 (2008); Korlach, J. et al. "Selective aluminum passivation for targeted immobilization of single DNA polymerase molecules in zero-mode waveguide nano structures." Proc. Natl. Acad. Sci. USA 105, 1176-1181 (2008), the disclosures of which are incorporated herein by reference in their entireties). Images obtained from such methods can be stored, processed and analyzed as set forth herein.

Some SBS embodiments include detection of a proton released upon incorporation of a nucleotide into an extension product. For example, sequencing based on detection of released protons can use an electrical detector and associated techniques that are commercially available from Ion Torrent (Guilford, CT, a Life Technologies subsidiary) or sequencing methods and systems described in U.S. Patent Pub. No. 2009/0026082; U.S. Patent Pub. No. 2009/0127589; U.S. Patent Pub. No. 2010/0137143; or U.S. Patent Pub. No. 2010/0282617, each of which is incorporated herein by reference.

The above SBS methods can be advantageously carried out in multiplex formats such that multiple different target nucleic acids are manipulated simultaneously. In particular embodiments, different target nucleic acids can be treated in a common reaction vessel or on a surface of a particular substrate. This allows convenient delivery of sequencing reagents, removal of unreacted reagents and detection of incorporation events in a multiplex manner. In embodiments using surface-bound target nucleic acids, the target nucleic acids can be in an array format. In an array format, the target nucleic acids can be typically bound to a surface in a spatially distinguishable manner. The target nucleic acids can be bound by direct covalent attachment, attachment to a bead or other particle or binding to a polymerase or other molecule that is attached to the surface. The array can include a single copy of a target nucleic acid at each site (also referred to as a feature) or multiple copies having the same sequence can be present at each site or feature. Multiple copies can be produced by amplification methods such as, bridge amplification or emulsion PCR as described in further detail below.

The methods set forth herein can use arrays having features at any of a variety of densities including, for example, at least about 10 features/cm$^2$, 100 features/cm$^2$, 500 features/cm², 1,000 features/cm², 5,000 features/cm², 10,000 features/cm², 50,000 features/cm², 100,000 features/cm², 1,000,000 features/cm², 5,000,000 features/cm², or higher. The methods and apparatus set forth herein can include detection components or devices having a resolution that is at least sufficient to resolve individual features at one or more of these exemplified densities.

An advantage of the methods set forth herein is that they provide for rapid and efficient detection of a plurality of target nucleic acids in parallel. Accordingly the present disclosure provides integrated systems capable of preparing and detecting nucleic acids using techniques known in the art such as those exemplified above. Thus, an integrated system of the present disclosure can include fluidic components capable of delivering amplification reagents and/or sequencing reagents to one or more immobilized DNA fragments, the system comprising components such as pumps, valves, reservoirs, fluidic lines and the like. A flow cell can be configured and/or used in an integrated system for detection of target nucleic acids. Exemplary flow cells are described, for example, in U.S. Patent Pub. No. 2010/0111768 A1 and U.S. patent application Ser. No. 13/273,666, each of which is incorporated herein by reference. As exemplified for flow cells, one or more of the fluidic components of an integrated system can be used for an amplification method and for a detection method. Taking a nucleic acid sequencing embodiment as an example, one or more of the fluidic components of an integrated system can be used for an amplification method set forth herein and for the delivery of sequencing reagents in a sequencing method such as those exemplified above. Alternatively, an integrated system can include separate fluidic systems to carry out amplification methods and to carry out detection methods. Examples of integrated sequencing systems that are capable of creating amplified nucleic acids and also determining the sequence of the nucleic acids include, without limitation, the MiSeq™ or NextSeq™ platform (Illumina, Inc., San Diego, CA) or devices described in U.S. Pat. App. Pub. Nos. 2012/0270305 A1 or 2013/0260372 A1, each of which is incorporated herein by reference.

"Activity detector" means any device or component that is capable of detecting the activity that is indicative of a particular reaction or process. An activity detector may be able detect predetermined events, properties, qualities, or characteristics within a predefined volume or area. For example, an activity detector may be able to capture an image of the predefined volume or area. An activity detector may be able detect an ion concentration within a predefined volume of a solution or along a predefined area. Exemplary activity detectors include charged-coupled devices (CCD's) (e.g., CCD cameras); photomultiplier tubes (PMT's); molecular characterization devices or detectors, such as those used with nanopores; microcircuit arrangements, such as those described in U.S. Pat. No. 7,595,883, which is incorporated herein by reference in the entirety; and CMOS-fabricated sensors having field effect transistors (FET's), including chemically sensitive field effect transistors (chemFET), ion-sensitive field effect transistors (ISFET), and/or metal oxide semiconductor field effect transistors (MOSFET). Exemplary activity detectors are described, for example, in International Patent Pub. No. WO2012/058095.

The term "Biosensor" includes any structure having a plurality of reaction sites. A biosensor may include a solid-state imaging device (e.g., CCD or CMOS imager) and, optionally, a flow cell mounted thereto. The flow cell may include at least one flow channel that is in fluid communication with the reaction sites. As one specific example, the biosensor is configured to fluidly and electrically couple to a bioassay system. The bioassay system may deliver reactants to the reaction sites according to a predetermined protocol (e.g., sequencing-by-synthesis) and perform a plurality of imaging events. For example, the bioassay system may direct solutions to flow along the reaction sites. At least one of the solutions may include four types of nucleotides having the same or different fluorescent labels. The nucleotides may bind to corresponding oligonucleotides located at the reaction sites. The bioassay system may then illuminate the reaction sites using an excitation light source (e.g., solid-state light sources, such as light-emitting diodes or LEDs). The excitation light may have a predetermined wavelength or wavelengths, including a range of wavelengths. The excited fluorescent labels provide emission signals that may be detected by the light detectors.

In one aspect, the solid-state imager includes a CMOS image sensor comprising an array of light detectors that are configured to detect the emission signals. In some embodiments, each of the light detectors has only a single pixel and a ratio of the pixels to the detection paths defined by the filter walls can be substantially one-to-one. Exemplary biosensors are described, for example, in U.S. patent application Ser. No. 13/833,619.

"Detection surface" means any surface that includes an optical detector. The detector can be based upon any suitable technology, such as those including a charge coupled device (CCD) or a complementary metal-oxide-semiconductor (CMOS). In particular embodiments a CMOS imager having a single-photon avalanche diode (CMOS-SPAD) can be used, for example, to distinguish fluorophores using fluorescence lifetime imaging (FLIM). Exemplary CMOS based systems that can be used for FLIM are described in U.S. Patent Pub. No. 2008/0037008 A1; Giraud et al., Biomedical Optics Express 1:1302-1308 (2010); or Stoppa et al., IEEE European Solid-State Device Conference (ESSCIRC), Athens, Greece, IEEE, pp. 204-207 (2009), each of which is incorporated herein by reference in its entirety. Other useful detection devices that can be used include, for example, those described in U.S. Pat. No. 7,329,860 and U.S. Patent Pub. No. 2010/0111768, each of which is incorporated herein by reference in its entirety.

In addition, it will be appreciated that other signal detecting devices as known in the art can be used to detect signals produced in a method set forth herein. For example detectors used to detect pyrophosphate or protons are particularly useful. Pyrophosphate release can be detected using detectors such as those commercially available from 454 Life Sciences (Branford, Conn., a Roche Company) or described in U.S. Patent Pub. No. 2005/0244870, which is incorporated herein by reference in its entirety. Exemplary systems for detecting primer extension based on proton release include those that are commercially available from Ion Torrent (Guilford, Conn., a ThermoFisher subsidiary) or described in U.S. Patent Pub. Nos. 2009/0026082; 2009/0127589; 2010/0137143; and 2010/0282617, each of which is incorporated herein by reference in its entirety. Exemplary detection surfaces and detectors are described, for example, in U.S. Patent Pub. No. 2013/0116128A1, which is incorporated herein by reference.

"Sequencing module" means a CMOS chip that has been adapted for sequencing applications. The module can comprise a surface comprising a substrate of hydrophilic regions for nucleic acid attachment and amplification surrounded by hydrophobic regions. For example, dynamic pads having a hydrophilic patch, such as those described above, can be used. Alternatively or additionally, a collection of dynamic pads including some that are in a hydrophilic state while surrounding pads are in a hydrophobic state can form a hydrophilic regions surrounded by a hydrophobic region. The surface for nucleic acid attachment would optionally comprise a plurality of isolated regions such that each isolated region contains a plurality of nucleic acid molecules that is preferably derived from one nucleic acid molecule for sequencing. For example, the hydrophilic region can include a gel. The hydrophilic regions could be smooth, textured, porous, non-porous, etc. The hydrophobic regions are preferably located between the hydrophilic regions. Reagents move across the surface by way of any number of forces.

The subject matter described herein includes, in one or more embodiments, a disposable, integrated microfluidic cartridge and methods of making and using same. The method of making the disposable, integrated microfluidic cartridge optionally utilizes a flexible printed circuit board (PCB) and roll-2-roll (R2R) printed electronics for the monolithic integration of CMOS technology and digital fluidics. Namely, the disposable, integrated microfluidic cartridge includes a stack of fluidics layers in which a CMOS sensor is integrated, all installed in a housing. Accordingly, conventional injection molded fluidics can be integrated with flexible PCB technology. The fluidics layers are formed using materials that suitable for use in a R2R printed electronics process. Further, the fluidics layers include a polymerase chain reaction (PCR) region and a reagent mixing and distribution region. The fluidics layers also include a set of membrane valves by which the PCR region can be completely sealed off.

The method of using the disposable, integrated microfluidic cartridge includes performing multiplex PCR and downstream mixing needed for sequencing.

Embodiments set forth herein include a CMOS flow cell, wherein most or up to about 100% of the biosensor active area is accessible for reagent delivery and illumination.

Figure 14:
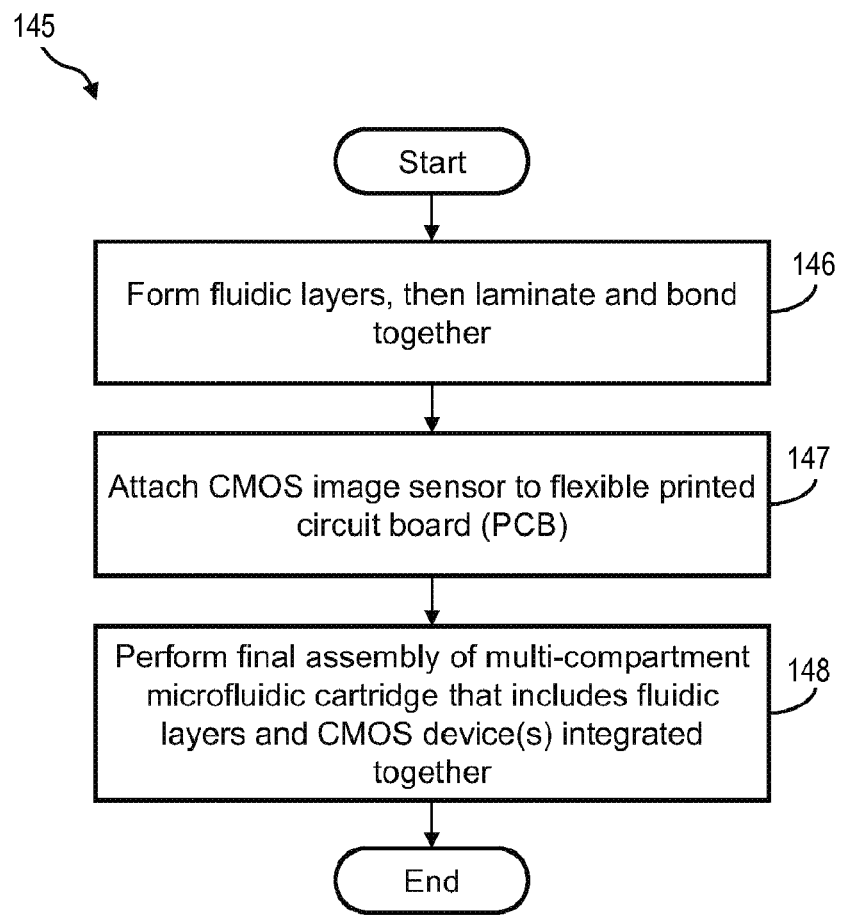
FIG. 14 illustrates a flow diagram of an example of a method of using a flexible printed circuit board (PCB) and roll-2-roll (R2R) printed electronics for the monolithic integration of CMOS technology and digital fluidics.

FIG. 14 illustrates a flow diagram of an example of a method 100 of using a flexible printed circuit board (PCB) and roll-2-roll (R2R) printed electronics for the monolithic integration of CMOS technology and digital fluidics. Namely, using method 100, multilayer laminated fluidics can be integrated with flexible PCB technology (see FIG. 15). Further, using the structure formed using method 100, conventional injection molded fluidics can be integrated with flexible PCB technology (see FIGS. 26 through 45). Method 100 may include, but is not limited to, the following steps.

Figure 15:
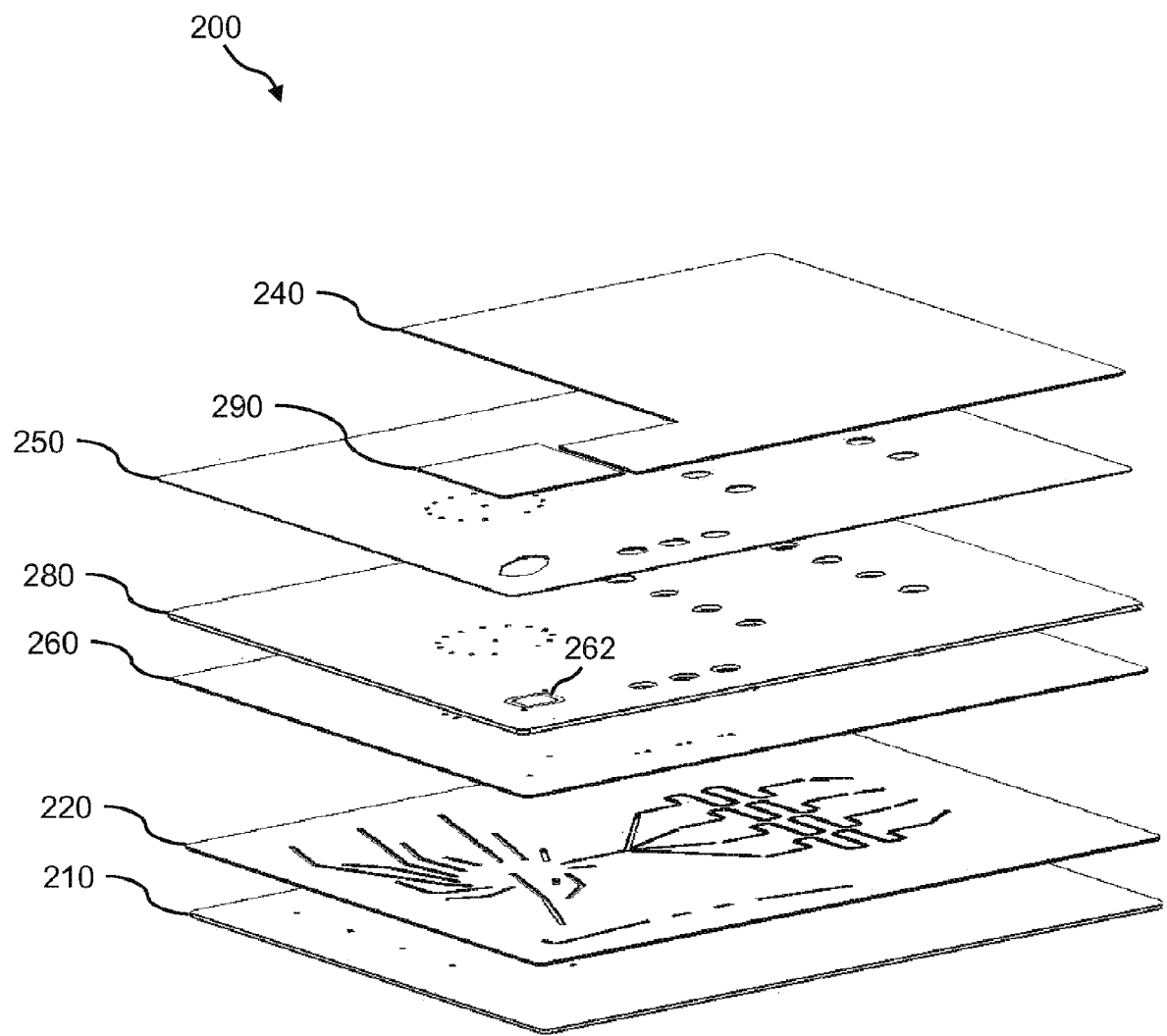
FIG. 15 illustrates an exploded view of an example of a fluidics stack having certain layers that can be laminated and bonded together using the method of FIG. 16.

At a step 110, the fluidic layers are formed and then laminated and bonded together. For example, FIG. 15 illustrates an exploded view of a set of fluidics layers 200 that can be laminated and bonded together in this step. In this example, fluidics layers 200 comprises, in order, an inlet/outlet ports layer 210, a fluidics channels layer 220, a flexible PCB layer 260, a sequencing chamber bottom layer 280, a sequencing chamber layer 250, and a membrane layer 240 that is coplanar with a sequencing chamber top layer 290. Inlet/outlet ports layer 210, fluidics channels layer 220, flexible PCB layer 260, sequencing chamber bottom layer 280, sequencing chamber layer 250, membrane layer 240, and sequencing chamber top layer 290 are suitable for forming using a R2R printed electronics process.

Inlet/outlet ports layer 210 can be formed of, for example, polycarbonate, poly(methyl methacrylate) (PMMA), cyclic olefin copolymer (COC), and/or polyimide. Inlet/outlet ports layer 210 can be from about 25 µm to about 1000 µm thick in one example, or is about 250 µm thick in another example. An arrangement of openings (or holes) is provided in inlet/outlet ports layer 210. The openings (or holes) provide fluid paths the can serve as inlet ports and/or outlet ports to, for example, various liquid supply reservoirs (not shown). More details of inlet/outlet ports layer 210 are shown and described herein below with reference to FIGS. 55A and 55B.

Fluidics channels layer 220 can be formed of, for example, polycarbonate, PMMA, COC, and/or polyimide. Fluidics channels layer 220 can be from about 25 µm to about 1000 µm thick in one example, or is about 250 µm thick in another example. An arrangement of fluidics channels is provided in fluidics channels layer 220. The fluidics channels provide fluid paths from one destination to another along fluidics layers 200. Because fluidics channels layer 220 is sandwiched between inlet/outlet ports layer 210 and flexible PCB layer 260, fluid can be confined within the fluidics channels by inlet/outlet ports layer 210 on the bottom and by flexible PCB layer 260 on the top. In one example, fluidics channels layer 220 is used to perform PCR and downstream mixing needed for sequencing. More details of fluidics channels layer 220 are shown and described herein below with reference to FIGS. 56A and 56B.

Flexible PCB layer 260 can be formed of, for example, polycarbonate, PMMA, COC, and/or polyimide. Flexible PCB layer 260 can be from about 30 µm to about 300 µm thick in one example, or is about 200 µm thick in another example. An arrangement of openings (or holes) is provided in flexible PCB layer 260. The openings (or holes) provide fluid paths the can serve as inlets and/or outlets of membrane valves that are used to control the flow of liquid in the fluidics channels of fluidics channels layer 220. More details of flexible PCB layer 260 are shown and described herein below with reference to FIGS. 57A and 57B.

Sequencing chamber bottom layer 280 can be formed of, for example, polycarbonate, PMMA, COC, and/or polyimide. Sequencing chamber bottom layer 280 can be from about 25 µm to about 1000 µm thick in one example, or is about 250 µm thick in another example. An arrangement of openings is provided in sequencing chamber bottom layer 280 for forming the membrane valves within the stack of fluidics layers 200. Sequencing chamber bottom layer 280 also includes a CMOS device, such as a CMOS image sensor 262, that is located in proximity to the sequencing chamber of sequencing chamber layer 250. Sequencing chamber bottom layer 280 is coplanar with the CMOS device and acts as the fluid connecting layer to the inlet/outlet of the sequencing chamber of sequencing chamber layer 250. More details of sequencing chamber bottom layer 280 can are shown and described herein below with reference to FIGS. 58A and 58B.

Sequencing chamber layer 250 can be formed of, for example, polycarbonate, PMMA, COC, and/or polyimide. Sequencing chamber layer 250 can be from about 50 µm to about 300 µm thick in one example, or is about 100 µm thick in another example. An arrangement of openings is provided in sequencing chamber layer 250 for forming the membrane valves within the stack of fluidics layers 200. Sequencing chamber layer 250 also includes a sequencing chamber. More details of sequencing chamber layer 250 are shown and described herein below with reference to FIGS. 59A and 59B.

Membrane layer 240 can be formed of, for example, silicone elastomer. Membrane layer 240 can be from about 25 µm to about 1000 µm thick in one example, or is about 250 µm thick in another example. Membrane layer 240 serves as the elastic membrane for opening and closing the membrane valves within the stack of fluidics layers 200, wherein the membrane valves are created by the combination of, in order, flexible PCB layer 260, sequencing chamber bottom layer 280, sequencing chamber layer 250, and membrane layer 240. More details of membrane valves are shown and described herein below with reference to FIGS. 22A, 22B, 23A and 23B. More details of membrane layer 240 are shown and described herein below with reference to FIGS. 60A and 60B.

Sequencing chamber top layer 290 is formed of a low auto-fluorescent material that has good optical properties, such as COC. Sequencing chamber top layer 290 can be from about 25 µm to about 1000 µm thick in one example, or is about 250 µm thick in another example. Sequencing chamber top layer 290 is used to cover the sequencing chamber in sequencing chamber layer 250. More details of sequencing chamber top layer 290 are shown and described herein below with reference to FIGS. 60A and 60B.

Figure 16:
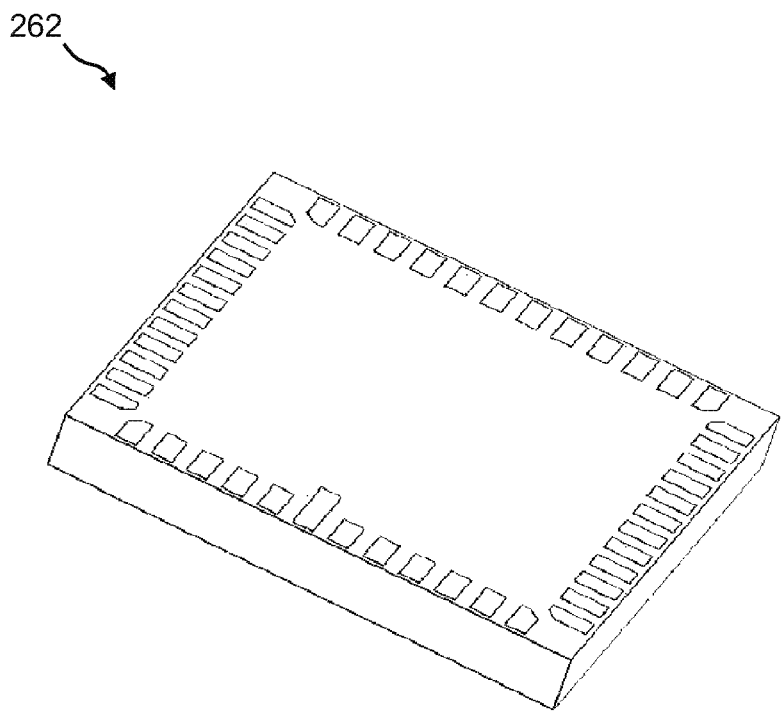
FIG. 16 illustrates a perspective view of an example of a CMOS device that can be integrated into the fluidics layers of a microfluidic cartridge using the method of FIG. 14.

Referring now again to FIG. 14, at a step 115, a CMOS device is attached to the flexible PCB. For example, a CMOS image sensor 262 (see FIG. 15) is attached to sequencing chamber bottom layer 280 of fluidics layers 200. FIG. 16 illustrates a perspective view of an example of CMOS image sensor 262. In one example, CMOS image sensor 262 is about 9200 µm long, about 8000 µm wide, and about 800-1000 µm thick; and can have about 50 I/O pads. CMOS image sensor 262 can comprise a pixel array. In one example, the pixel array is 4384×3292 pixels, with overall dimensions of 7272 µm×5761 µm. It will be understood that a CMOS die can have a wide range of dimensions and I/O pad counts. For example, a rectangular die (e.g. non-square dimensions that appear long skinny) can be used with digital fluidics to utilize only part of the die in any given analytical protocol.

Figure 17A:
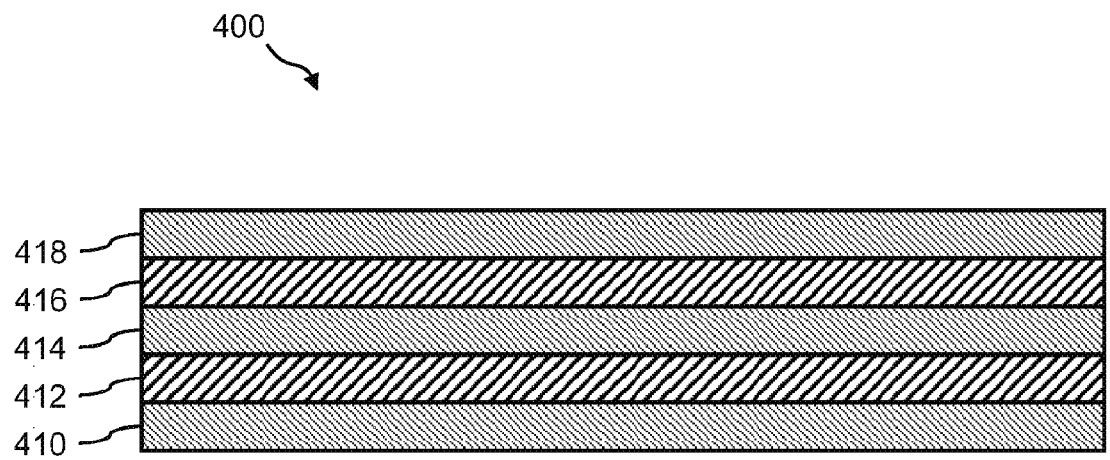
FIGS. 17A, 17B, 18, 19, and 20 illustrate side views of a structure and showing an example of a process of attaching a CMOS device to a flexible PCB using the method of FIG. 14.

Continuing step 115, FIGS. 17A, 17B, 18, 19, and 20 illustrate side views of a structure 400, which shows an example of a process of attaching a CMOS device to a flexible PCB. Structure 400 is a multilayer structure. Referring now to FIG. 17A, the initial formation of structure 400 begins with a flexible PCB. For example, the flexible PCB includes, in order, a polyimide layer 410, a PCB heater layer 412, a polyimide layer 414, a PCB wiring layer 416, and a polyimide layer 418. Namely, FIG. 17 shows a flexible PCB having a PCB heater layer and a PCB wiring layer, aka coupon foil.

Figure 17B:
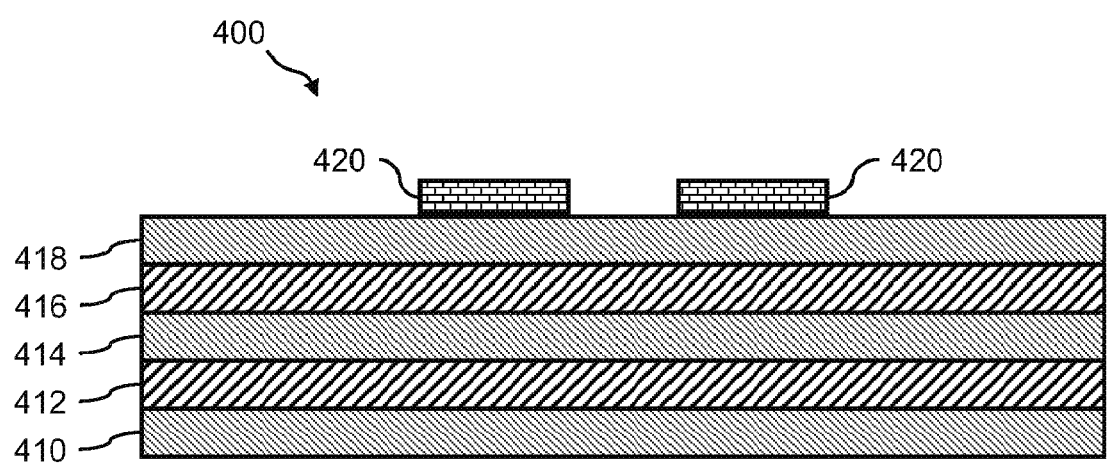

Next and referring now to FIG. 17B, a low-temperature isotropic conductive adhesive (low-temp ICA) 420 is dispensed atop polyimide layer 418.

Figure 18:
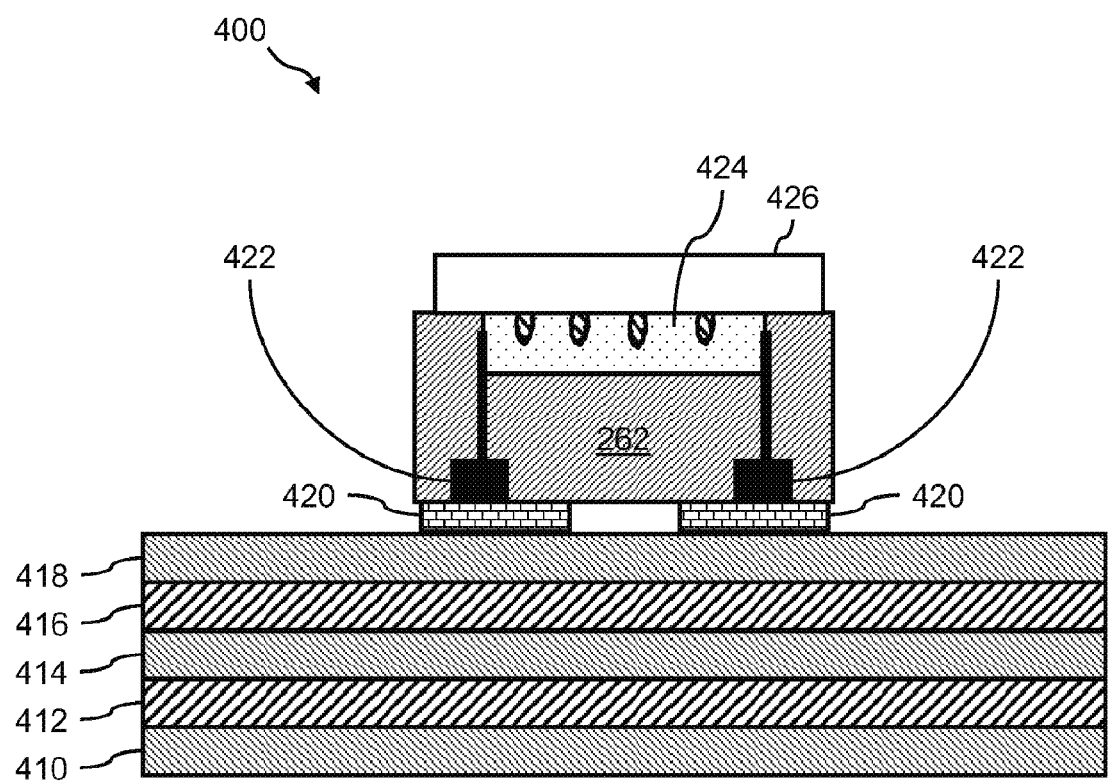

Next and referring now to FIG. 18, a CMOS device, such as CMOS image sensor 262, is placed on the coupon foil; namely, atop low-temp ICA 420. In one example, CMOS image sensor 262 is placed atop low-temp ICA 420 using a pick and place process that is well known. FIG. 18 shows I/O pads 422 of CMOS image sensor 262 are in contact with low-temp ICA 420 and thereby electrically connected to PCB wiring layer 416. There are other attachment options available as well, including but not limited to, controlled collapse/flipchip bonding, wirebonding, and the like. FIG. 18 also shows that CMOS image sensor 262 includes a biolayer 424 that is facing away from polyimide layer 418. A protection film 426 can be placed atop biolayer 424 until ready for use.

Figure 19:
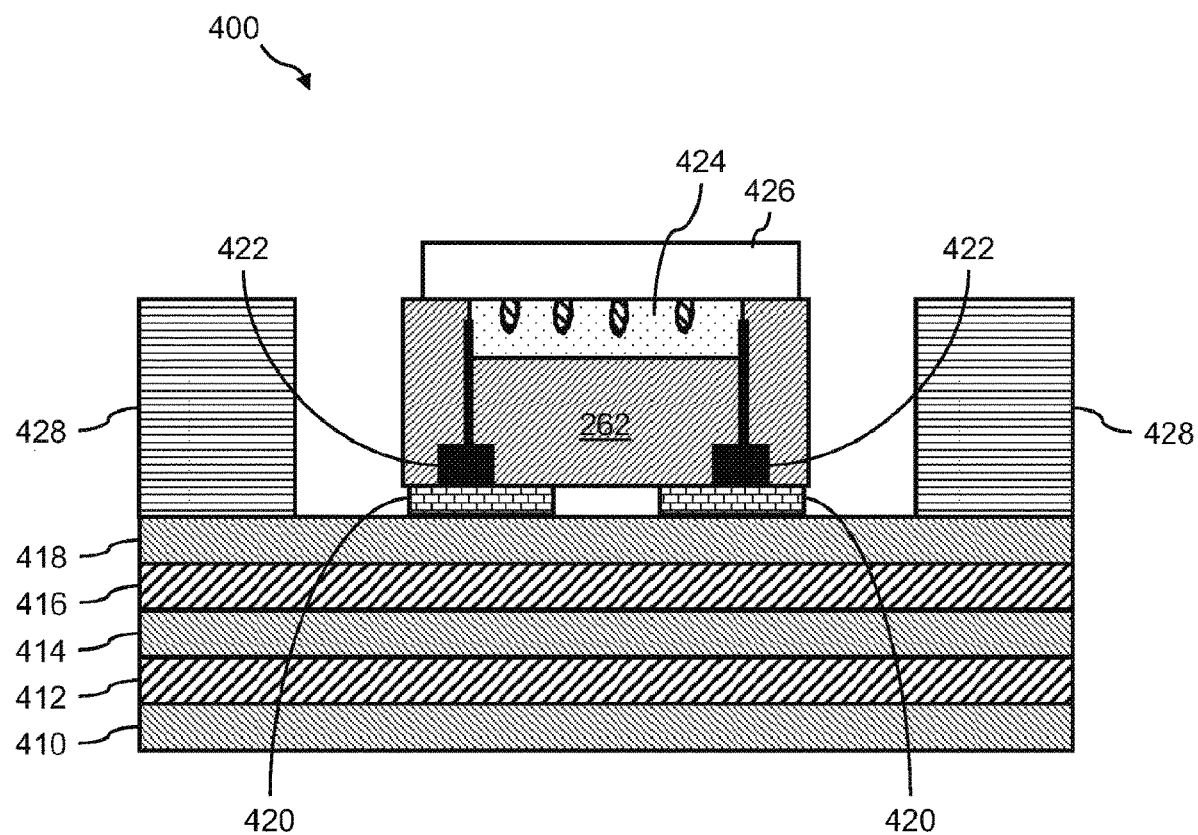

Next and referring now to FIG. 19, a set of fluidic layers 428 is provided atop polyimide layer 418 of the flexible PCB. Namely, a laminated polycarbonate film is provided that is coplanar to the CMOS surface. An example of fluidic layers 428 is fluidics layers 200 shown in FIG. 15.

Figure 20:
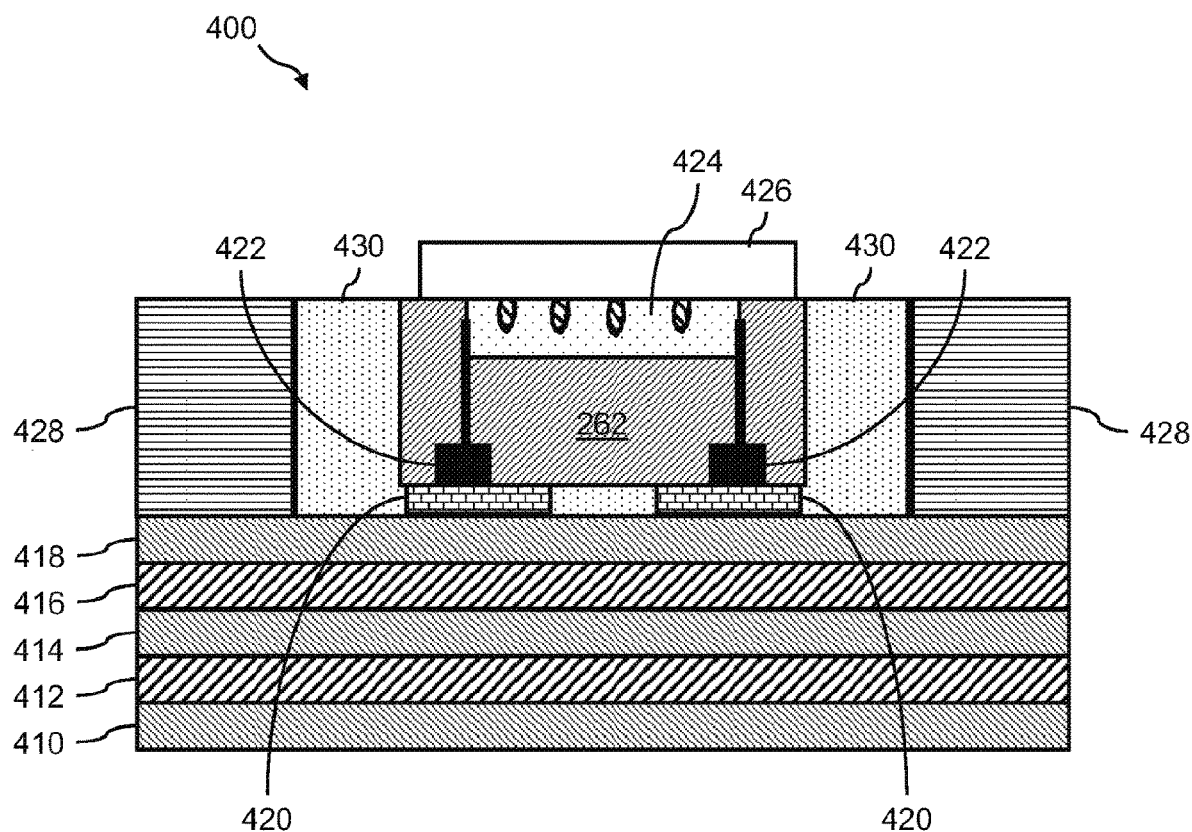

Next and referring now to FIG. 20, the flip-chip bonding of CMOS image sensor 262 on the coupon foil is completed by dispensing under-fill epoxy adhesive 430 in the gaps around CMOS image sensor 262.

Figure 21:
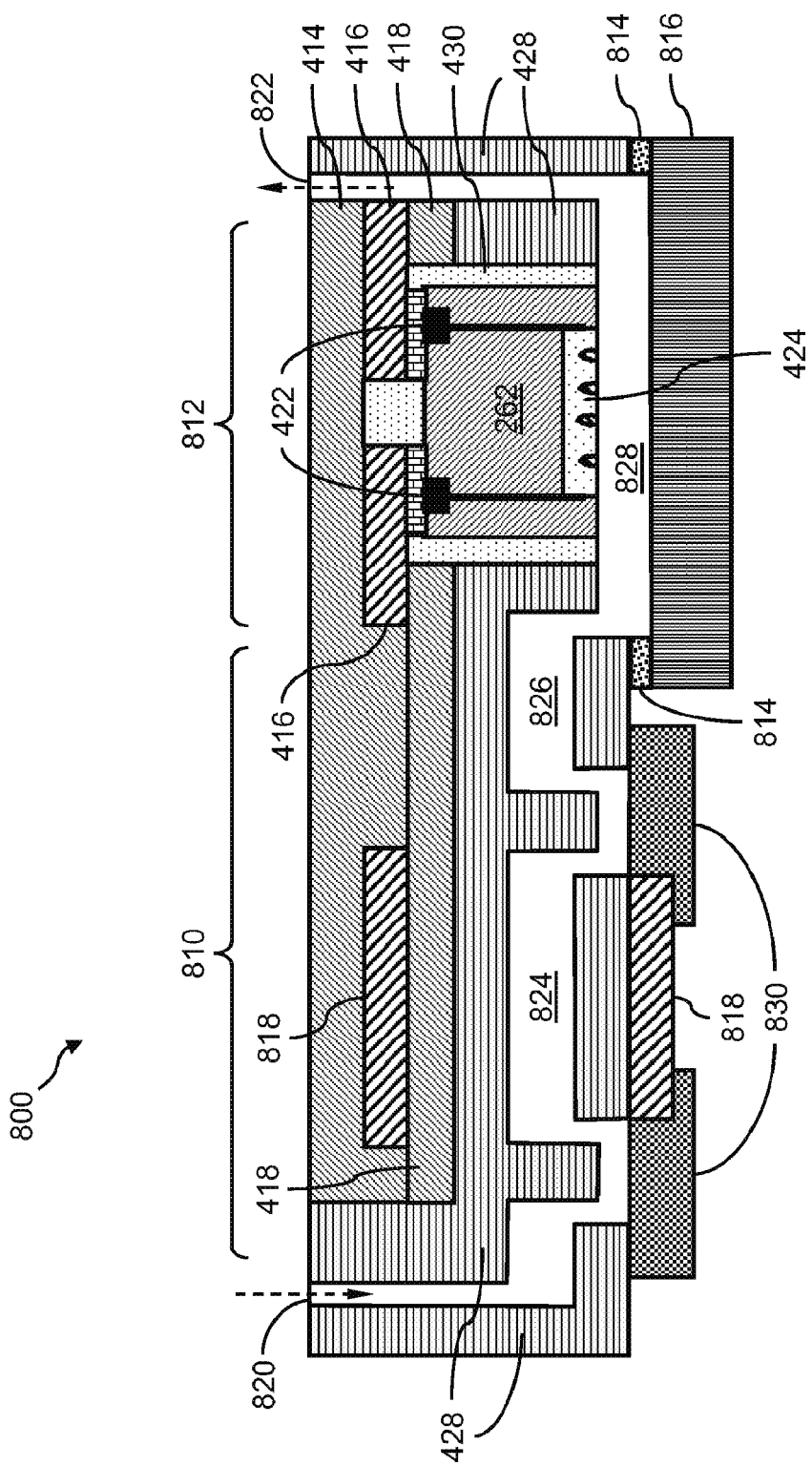
FIG. 21 illustrates a side view of an example of a structure formed using the method of FIG. 14, wherein the fluidics layers and a CMOS device are integrated together in a microfluidic cartridge.

Referring now again to FIG. 14, at a step 120, the final assembly of a microfluidic cartridge that includes fluidic layers and CMOS device(s) integrated together is performed. For example, FIG. 21 illustrates a side view of an example of a microfluidic cartridge 800. Microfluidic cartridge 800 includes a fluidics portion 810 and a CMOS portion 812, which is based on structure 400 shown in FIG. 20. Final assembly steps may include, for example, dispensing (printing) the under-fill epoxy adhesive 430, removing the protection film 426, laminating a low-temperature non-conductive adhesive 814 (e.g., UV or thermal non-conductive adhesive) at CMOS portion 812, laminating a low-autofluorescent cyclic olefin copolymer (COC) layer 816 to CMOS portion 812 of microfluidic cartridge 800, and laminating a flexible PCB heater 818 on both sides of fluidics portion 810. In the process of forming microfluidic cartridge 800, it is critical to use a self-aligned process flow so that the surfaces of the CMOS device and the fluidic layers are flush with each other.

A fluid path is formed through microfluidic cartridge 800. Namely, a sample inlet 820 is provided at the input of fluidics portion 810 and an outlet 822 is provided downstream of CMOS portion 812. Sample inlet 820 supplies a PCR chamber 824. Then PCR chamber 824 supplies a reagent distribution region 826. Then reagent distribution region 826 supplies a sequencing chamber 828. Biolayer 424 of CMOS image sensor 262 is oriented toward sequencing chamber 828. Then sequencing chamber 828 supplies outlet 822. Further, microfluidic cartridge 800 includes certain membrane valves 830 that control the flow of liquid in and out of PCR chamber 824.

Figure 22A:
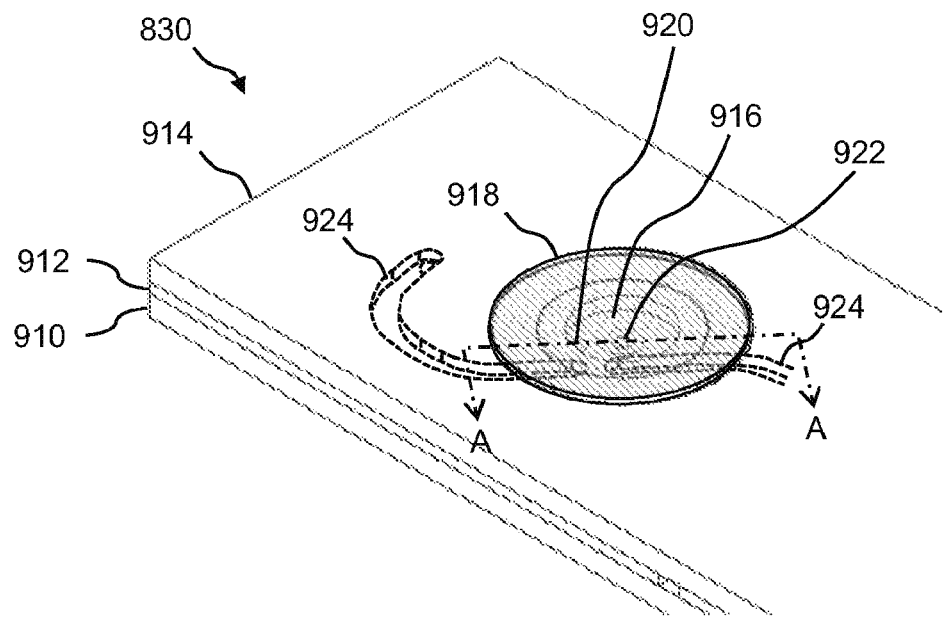
FIGS. 22A and 22B illustrate perspective views of an example of a membrane valve, wherein membrane valves can be integrated into the fluidics layers.
Figure 22B:
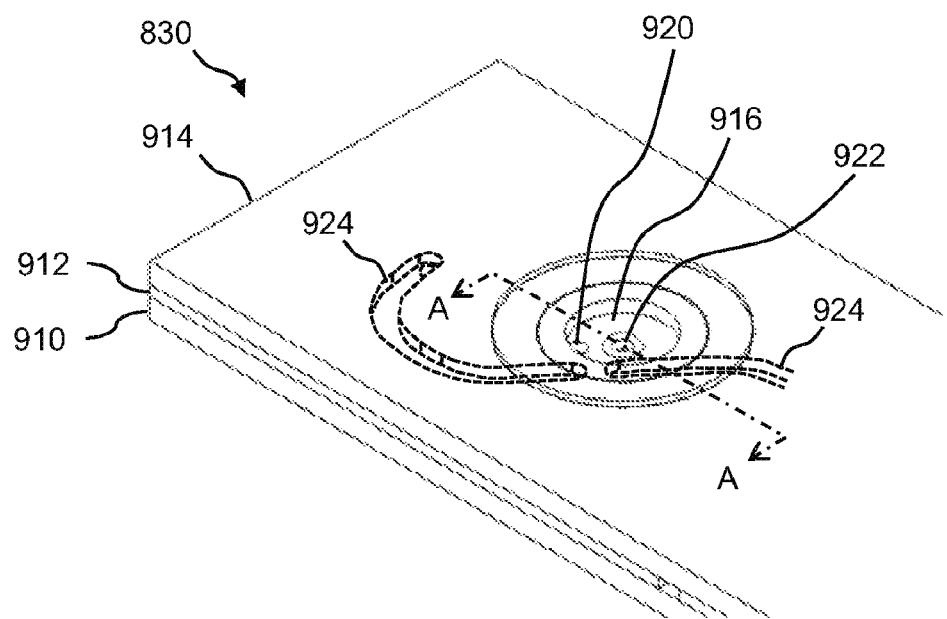

FIGS. 22A and 22B illustrate perspective views of an example of membrane valve 830, wherein membrane valves can be integrated into, for example, fluidics layers 200. Referring now to FIG. 22A is a perspective view of membrane valve 830. In this example, membrane valve 830 includes, in order, a base layer 910, a fluidics channel layer 912, and a reservoir layer 914. Base layer 910, fluidics channel layer 912, and reservoir layer 914 can be formed of, for example, polycarbonate, PMMA, COC, and/or polyimide. Reservoir layer 914 has a recessed region that creates a small reservoir 916 in reservoir layer 914. A membrane layer 918 is stretched across reservoir 916. Reservoir 916 has an inlet 920 and an outlet 922, which provide a flow path to respective fluidics channels 924. In order to better show the features of reservoir 916 as well as inlet 920 and outlet 922, FIG. 22B shows membrane valve 830 without membrane layer 918 covering reservoir 916. Membrane layer 918 is formed of an elastomeric membrane material (e.g., silicone elastomer) that is flexible and stretchable.

Figure 23A:
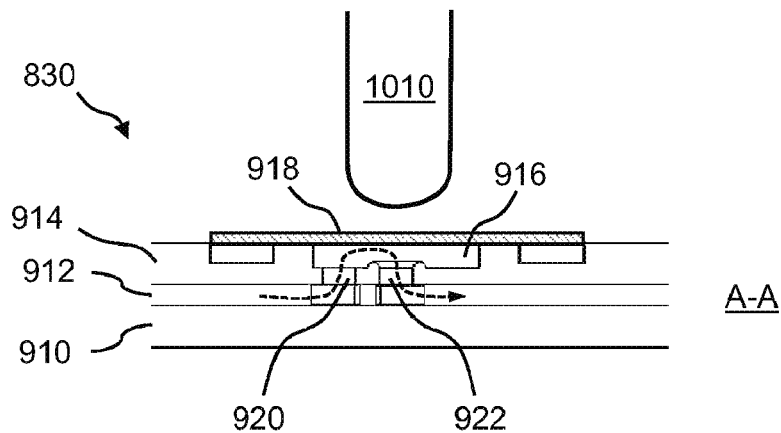
FIGS. 23A and 23B illustrate cross-sectional views of the membrane valve in the open and closed states, respectively.
Figure 23B:
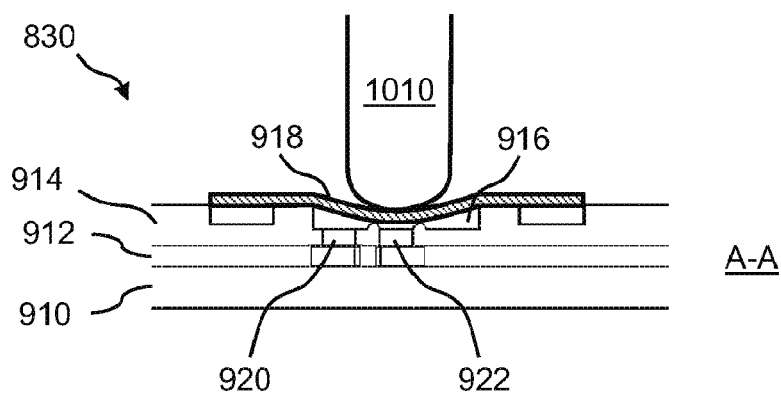

FIGS. 23A and 23B each show a cross-sectional view of membrane valve 830 taken along line A-A of FIG. 22A. An actuator, such as an actuator 1010, can be used to open and close membrane valve 830. For example, FIG. 23A shows membrane valve 830 in the open state in which actuator 1010 is not engaged with membrane layer 918. By contrast, FIG. 23B shows membrane valve 830 in the closed state in which actuator 1010 is engaged with membrane layer 918. Namely, the tip of actuator 1010 is used to push the center portion of membrane layer 918 against outlet 922 and thereby blocking the flow of liquid therethrough. Membrane valve 830 (i.e., membrane valves 242, 244, and 246) can be actuated using, for example, mechanical or air actuation, such as solenoids or pneumatic pumps.

Figure 24:
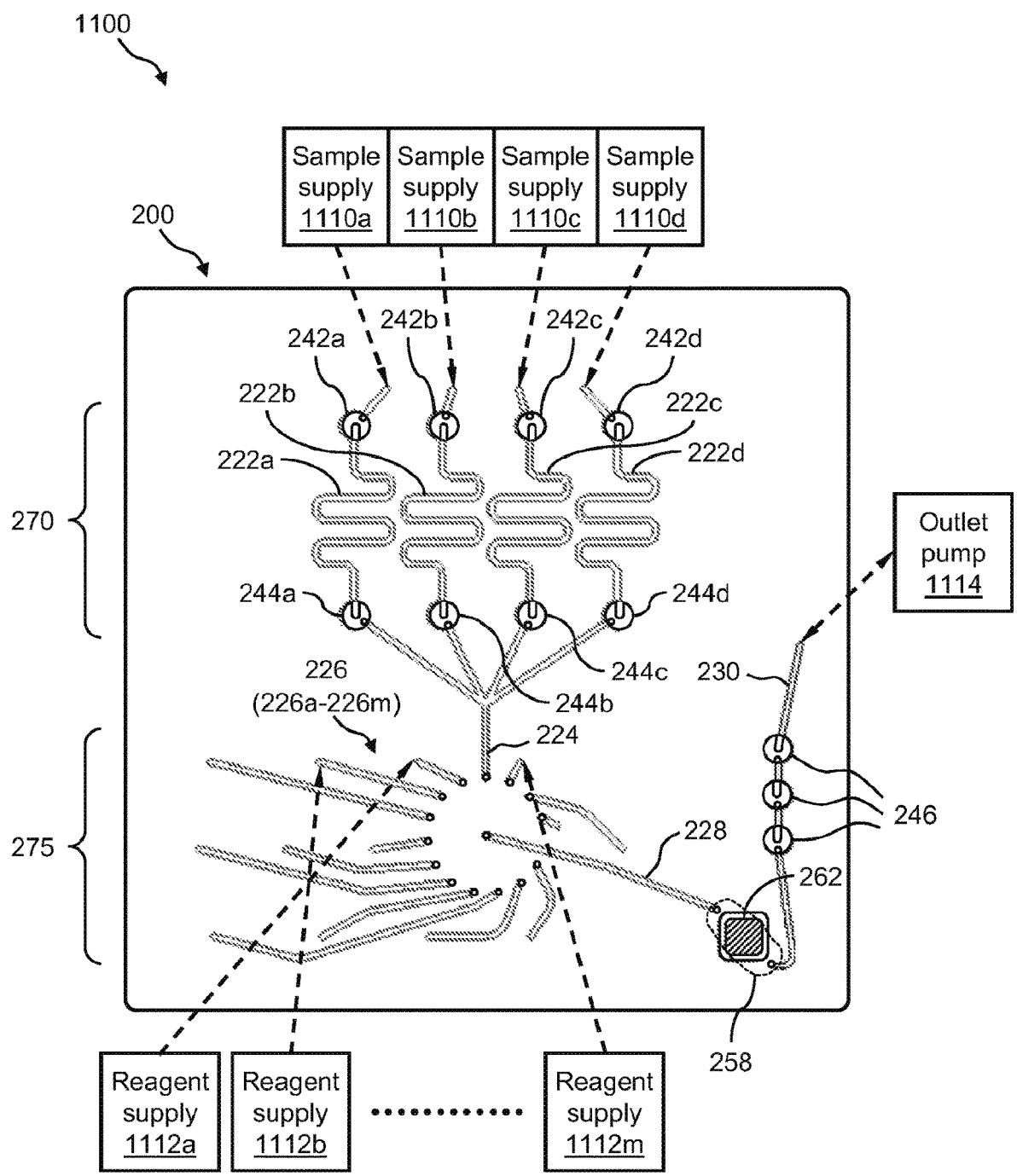
FIG. 24 illustrates a schematic diagram of an example of a microfluidic cartridge that includes both CMOS technology and digital fluidics integrated together.

FIG. 24 illustrates a schematic diagram of an example of a microfluidic cartridge 1100 that includes both CMOS technology and digital fluidics integrated together. Namely, microfluidic cartridge 1100 includes fluidics layers 200 that are fluidly and operatively connected to four sample supplies 1110 (e.g., sample supplies 1110a, 1110b, 1110c, 1110d), thirteen reagent supplies 1112 (e.g., reagent supplies 1112a-1112m), and an outlet pump 1114. Fluidics layers 200 includes a PCR region 270 and a reagent mixing and distribution region 275. PCR region 270 includes, for example, four PCR channels 222 (e.g., PCR channels 222a, 222b, 222c, 222d). The inlets of PCR channels 222a, 222b, 222c, and 222d are supplied by sample supplies 1110a, 1110b, 1110c, and 1110d, respectively. Because microfluidic cartridge 1100 includes four PCR channels 222 that are supplied by the four sample supplies 1110, microfluidic cartridge 1100 is configured for 4× sample multiplexing.

The inputs of the four PCR channels 222 are controlled using four membrane valves 242. Namely, the inputs of PCR channels 222a, 222b, 222c, and 222d are controlled using membrane valves 242a, 242b, 242c, and 242d, respectively. Similarly, the outputs of the four PCR channels 222 are controlled using four membrane valves 244. Namely, the outputs of PCR channels 222a, 222b, 222c, and 222d are controlled using membrane valves 244a, 244b, 244c, and 244d, respectively. The outputs of the four PCR channels 222 supply a common PCR output channel 224, which then supplies reagent mixing and distribution region 275. The presence of membrane valves 242 and membrane valves 244 in fluidics layers 200 allow PCR region 270 to be completely sealed off.

Reagent mixing and distribution region 275 includes an arrangement of thirteen reagent channels 226 (e.g., reagent channels 226a-226m). Further, the thirteen reagent channels 226a-226m are supplied via the thirteen reagent supplies 1112a-1112m, respectively. A rotatable valve assembly (not shown) is used to fluidly connect a certain PCR channel 222 to a certain reagent supply 1112. In so doing, a certain PCR Mix can be created. The rotatable valve assembly (not shown) is also used to fluidly connect a certain PCR Mix to a sequencing feed channel 228, which supplies an inlet of a sequencing chamber 258. Further, CMOS image sensor 262 is positioned at sequencing chamber 258.

A sequencing outlet channel 230 is provided at the outlet of sequencing chamber 258. An outlet pump 1114 is fluidly and operatively connected to sequencing outlet channel 230. Outlet pump 1114 is used to provide positive or negative pressure in order to move liquid in any direction along the flow paths of fluidics layers 200. Further, a series of three membrane valves 246 are provided along the length of sequencing outlet channel 230. Membrane valves 242, 244, and 246 can be implemented according to membrane valve 830 that is shown and described in FIGS. 22A, 22B, 23A, and 23C.

The three membrane valves 246 at sequencing outlet channel 230 can be used as pumps in place of or in combination with outlet pump 1114. Therefore, in one embodiment, microfluidic cartridge 1100 includes outlet pump 1114 only and the three membrane valves 246 are omitted. In another embodiment, microfluidic cartridge 1100 includes the three membrane valves 246 only and outlet pump 1114 is omitted. In yet another embodiment, microfluidic cartridge 1100 includes both outlet pump 1114 and the three membrane valves 246. In still another embodiment, microfluidic cartridge 1100 includes any other type of pumping mechanism in place of outlet pump 1114 and/or the three membrane valves 246. More details of an example of implementing microfluidic cartridge 1100 are shown and described herein below with reference to FIGS. 25 through 60B.

Figure 25:
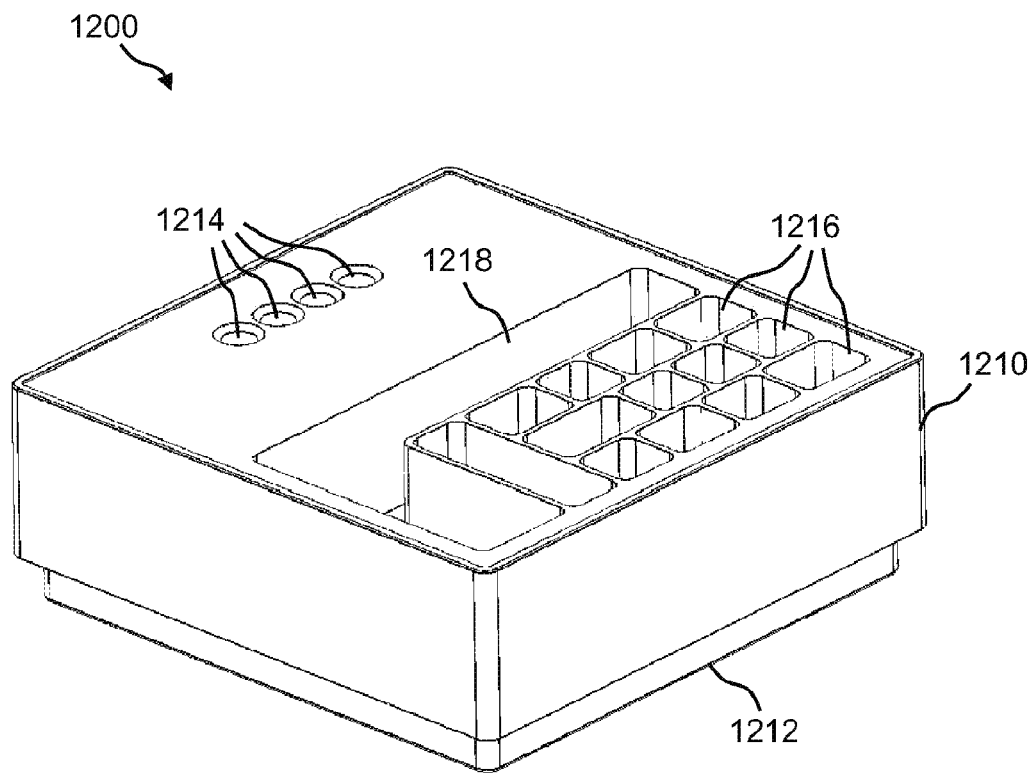
FIGS. 25 and 26 illustrate perspective views of a microfluidic cartridge assembly, which is one example of the physical instantiation of the integrated microfluidic cartridge shown in FIG. 24.
Figure 26:
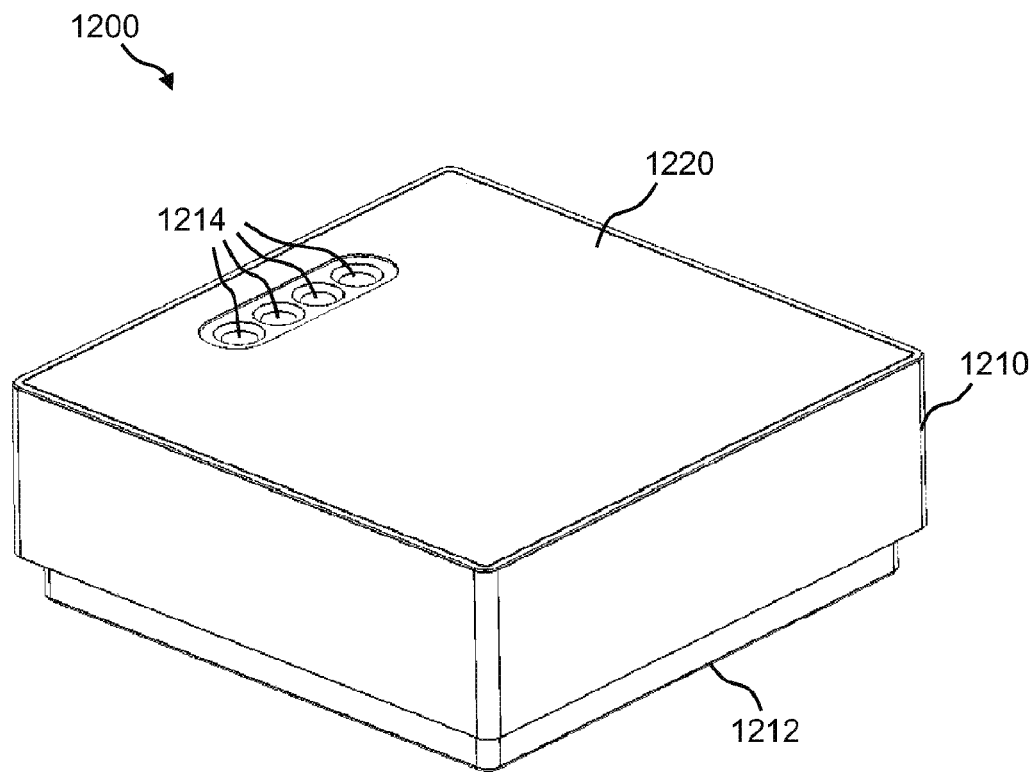

FIGS. 25 and 26 illustrate perspective views of a microfluidic cartridge assembly 1200, which is one example of the physical instantiation of the integrated microfluidic cartridge 1100 shown in FIG. 24. Microfluidic cartridge assembly 1200 is an example of conventional injection molded fluidics that is integrated with flexible PCB technology. In this example, microfluidic cartridge assembly 1200 is a multi-compartment microfluidic cartridge that includes a housing 1210 fastened atop a base plate 1212. Housing 1210 and base plate 1212 can be formed, for example, of molded plastic and fastened together via screws (see FIG. 32). The overall height of microfluidic cartridge assembly 1200 can be, for example, from about 12 mm to about 100 mm. The overall length of microfluidic cartridge assembly 1200 can be, for example, from about 100 mm to about 200 mm. The overall width of microfluidic cartridge assembly 1200 can be, for example, from about 100 mm to about 200 mm.

Figure 27A:
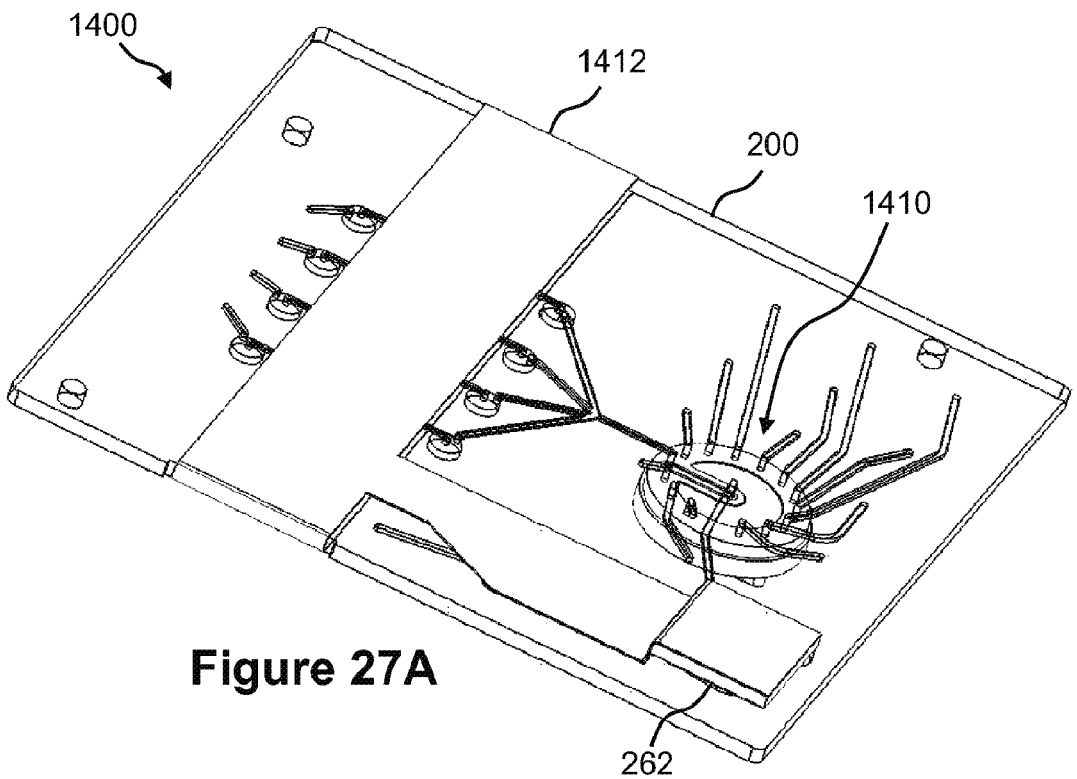
FIGS. 27A and 27B illustrate perspective views of an example of a fluidics assembly that is installed in the microfluidic cartridge assembly shown in FIGS. 25 and 26.
Figure 27B:
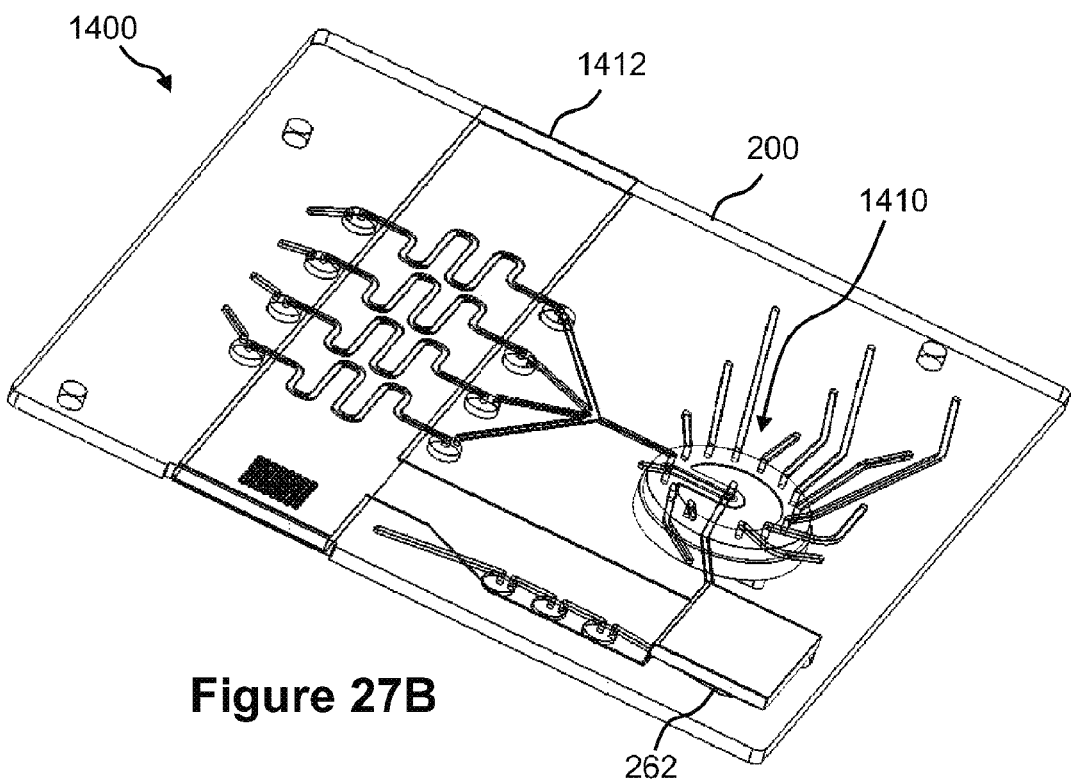

Inside of housing 1210 is a fluidics assembly 1400, which is shown in FIGS. 27A and 27B. Namely, FIGS. 27A and 27B illustrate perspective views of an example of fluidics assembly 1400, which is installed in microfluidic cartridge assembly 1200 shown in FIGS. 25 and 28. Fluidics assembly 1400 is based on the integrated microfluidic cartridge 1100 shown in FIG. 24. Namely, fluidics assembly 1400 includes fluidics layers 200 that is shown and described in FIGS. 15 and 24. Fluidics assembly 1400 also includes a rotatable valve assembly 1410 that is arranged with respect to the thirteen reagent channels 226a-226m in reagent mixing and distribution region 275 of fluidics layers 200. The length of fluidics layers 200 can be, for example, from about 100 mm to about 200 mm. The width of fluidics layers 200 can be, for example, from about 100 mm to about 200 mm.

Further, fluidics assembly 1400 includes a flexible PCB heater 1412 that wraps around both sides of PCR region 270 of fluidics layers 200. Two individually controlled heater traces are provided in flexible PCB heater 1412 such that there is one heater trace on one side of PCR region 270 and another heater trace on the other side of PCR region 270. Flexible PCB heater 1412 is an example of the flexible PCB heater 818 of microfluidic cartridge 800 shown in FIG. 21. More details of an example of a heater tracer are shown and described herein below with reference to FIGS. 28A and 28B. More details of an example of flexible PCB heater 1412 are shown and described herein below with reference to FIGS. 54A, 54B, and 54C.

Referring now again to FIGS. 25 and 26, housing 1210 of microfluidic cartridge assembly 1200 also includes four sample loading ports 1214 (e.g., sample loading ports 1214a, 1214b, 1214c, 1214d) that substantially align with inputs of the four PCR channels 222 (e.g., PCR channels 222a, 222b, 222c, 222d) of fluidics layers 200. Housing 1210 of microfluidic cartridge assembly 1200 also includes thirteen reagent reservoirs 1216 that supply the thirteen reagent channels 226 (e.g., reagent channels 226a-226m) of fluidics layers 200. The thirteen reagent reservoirs 1216 can be the same size or different. For example, the reagent reservoirs 1216 can hold volumes of liquid ranging from about 0.001 ml to about 0.150 ml.

Housing 1210 of microfluidic cartridge assembly 1200 also includes a waste reservoir 1218 that is supplied by sequencing outlet channel 230. Waste reservoir 1218 can hold a volume of liquid ranging, for example, from about 25 ml to about 100 ml. FIG. 26 shows that reagent reservoirs 1216 and waste reservoir 1218 may be covered and sealed with, for example, a foil seal 1220.

Figure 28A:
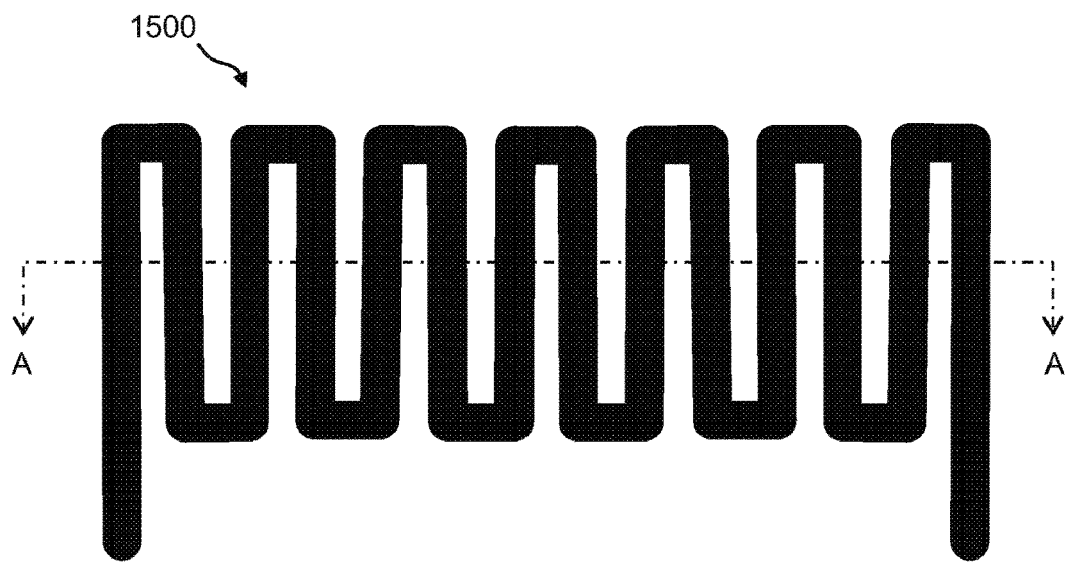
FIGS. 28A and 28B illustrate a plan view and a cross-sectional view, respectively, of an example of a heater trace that can be installed in the fluidics assembly shown in FIGS. 27A and 27B.
Figure 28B:
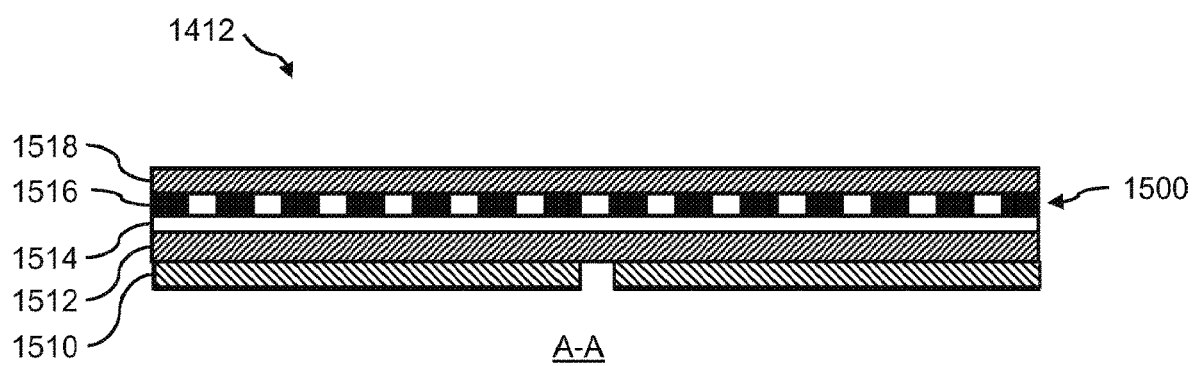

FIGS. 28A and 28B illustrate a plan view and a cross-sectional view, respectively, of an example of a heater trace 1500 that can be installed in fluidics assembly 1400 shown in FIGS. 27A and 27B. Namely, FIG. 28A shows a plan view of an example of heater trace 1500, which is has a serpentine type of layout. FIG. 28B shows a cross-sectional view of one side of flexible PCB heater 1412 of fluidics assembly 1400, which includes heater trace 1500. Flexible PCB heater 1412 is a multilayer structure that includes, for example, in order, a single-sided flexible copper layer 1510, an adhesive layer 1512, a dielectric layer 1514, a copper heater layer 1516 in which heater trace 1500 is patterned, and a Kapton® layer 1518. Copper heater layer 1516 shows the cross-section of heater trace 1500 taken along the line A-A of FIG. 28A.

Figure 29:
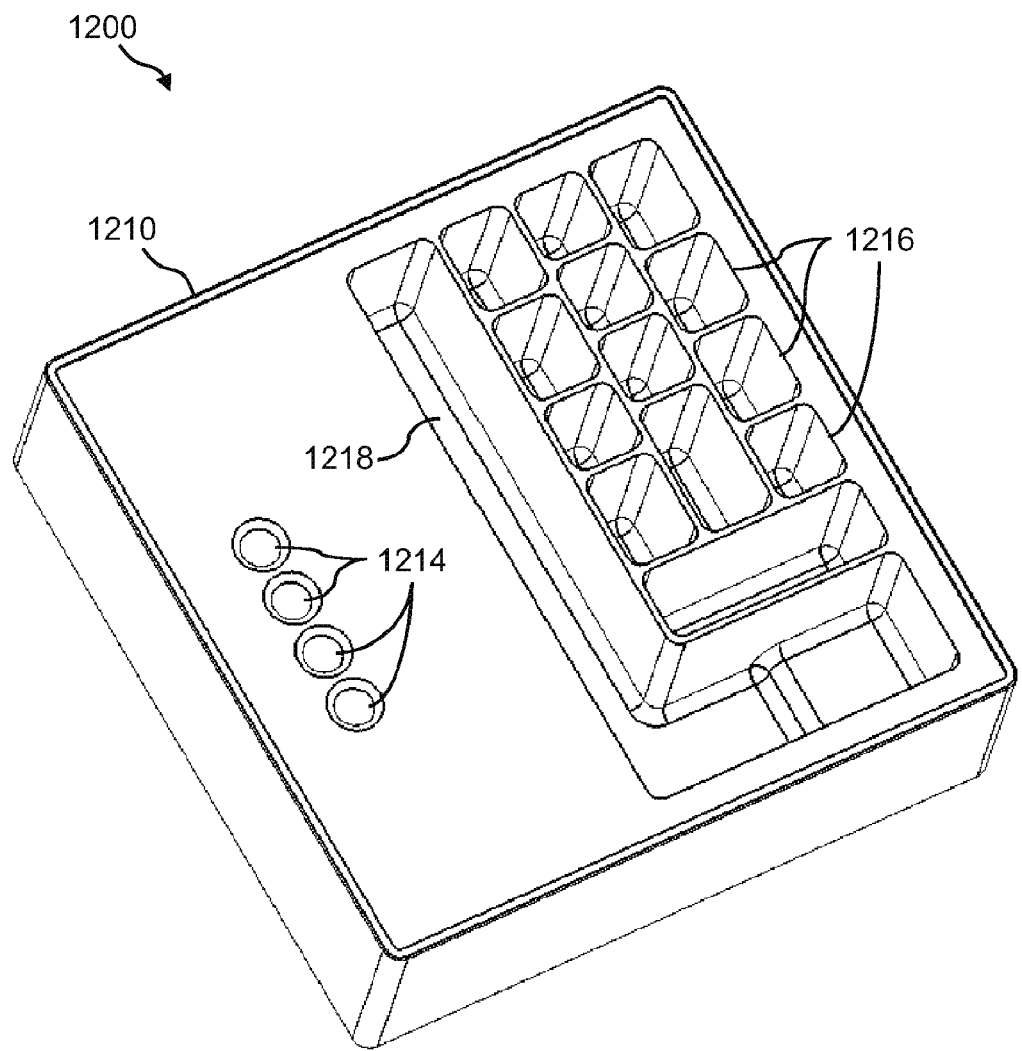
FIGS. 29, 30, 31, 32, 33A and 33B illustrate various other views of the microfluidic cartridge assembly of FIG. 25, showing more details thereof.
Figure 30:
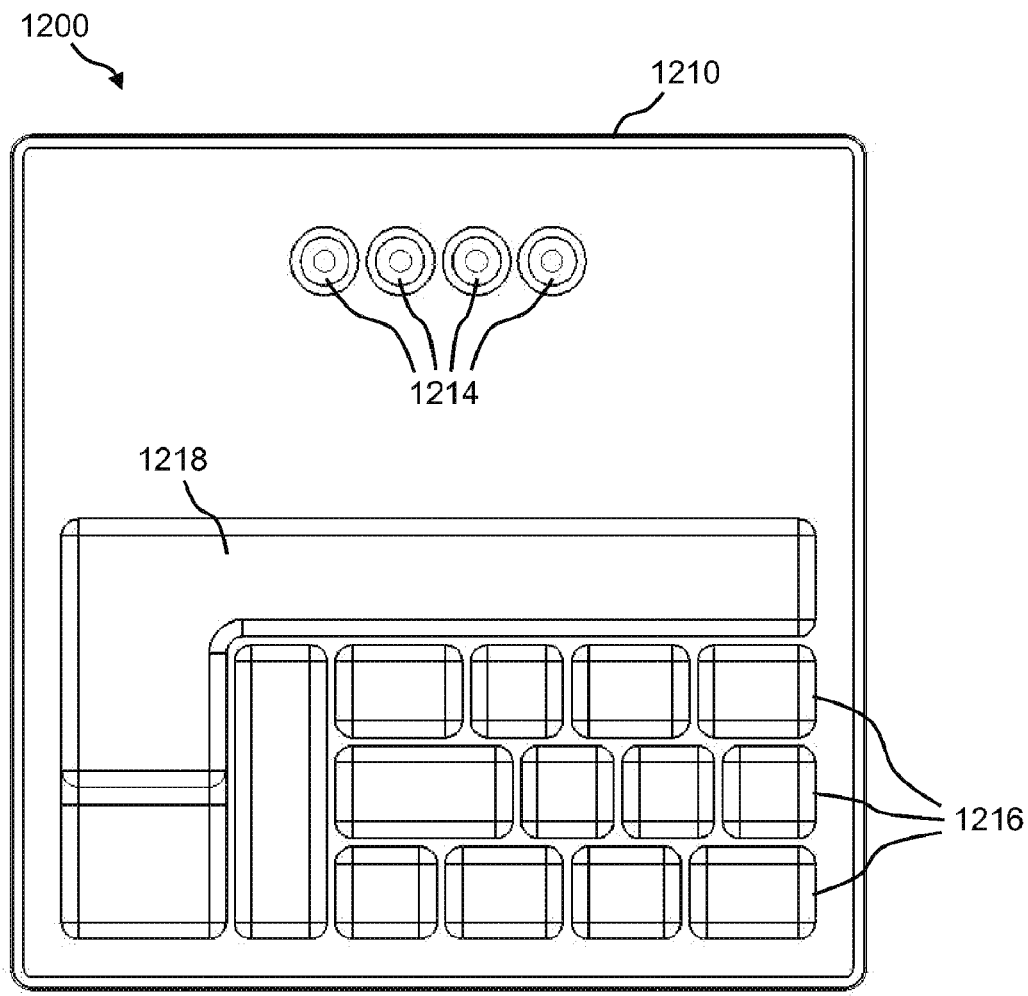
Figure 31:
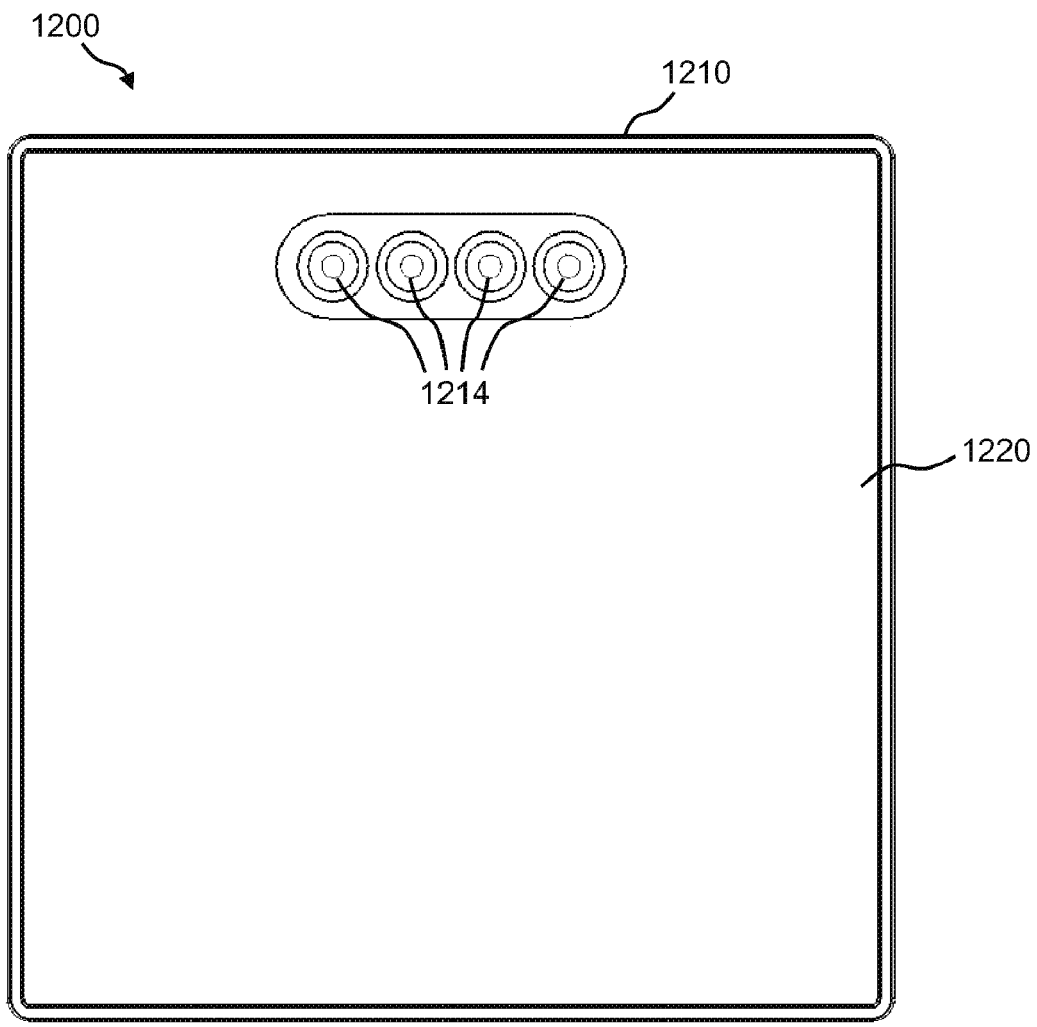

FIGS. 29, 30, 31, 32, 33A and 33B illustrate various other views of microfluidic cartridge assembly 1200 of FIG. 25, showing more details thereof. Namely, FIG. 29 shows a perspective view and FIG. 30 shows a plan view of the housing 1210-side of microfluidic cartridge assembly 1200, both showing more details of the configuration of the thirteen reagent reservoirs 1216 and waste reservoir 1218. FIG. 31 shows a plan view of the housing 1210-side of microfluidic cartridge assembly 1200 with the foil seal 1220 installed. Foil seal 1220 has an opening so that the four sample loading ports 1214 remain exposed and accessible.

Figure 32:
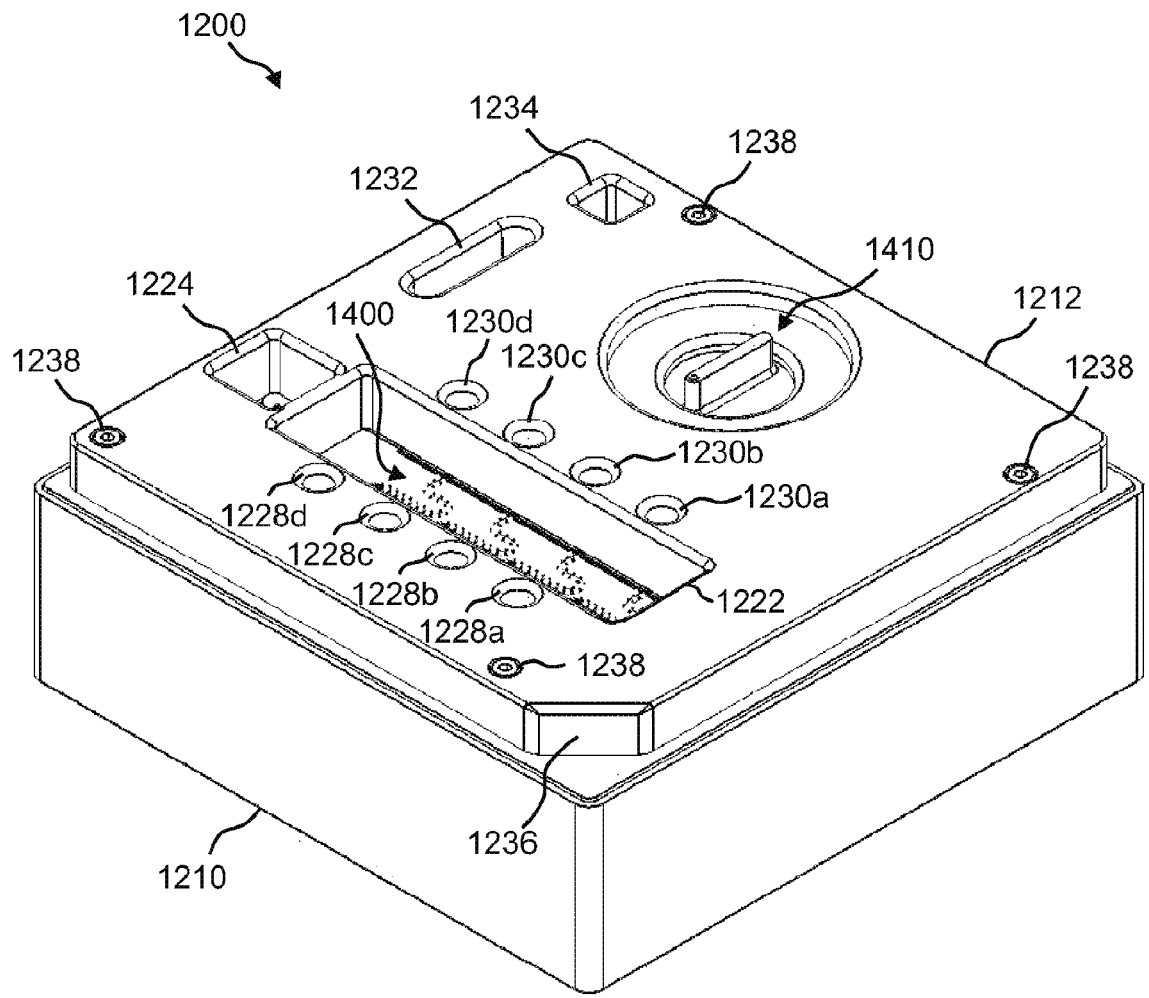
Figure 33A:
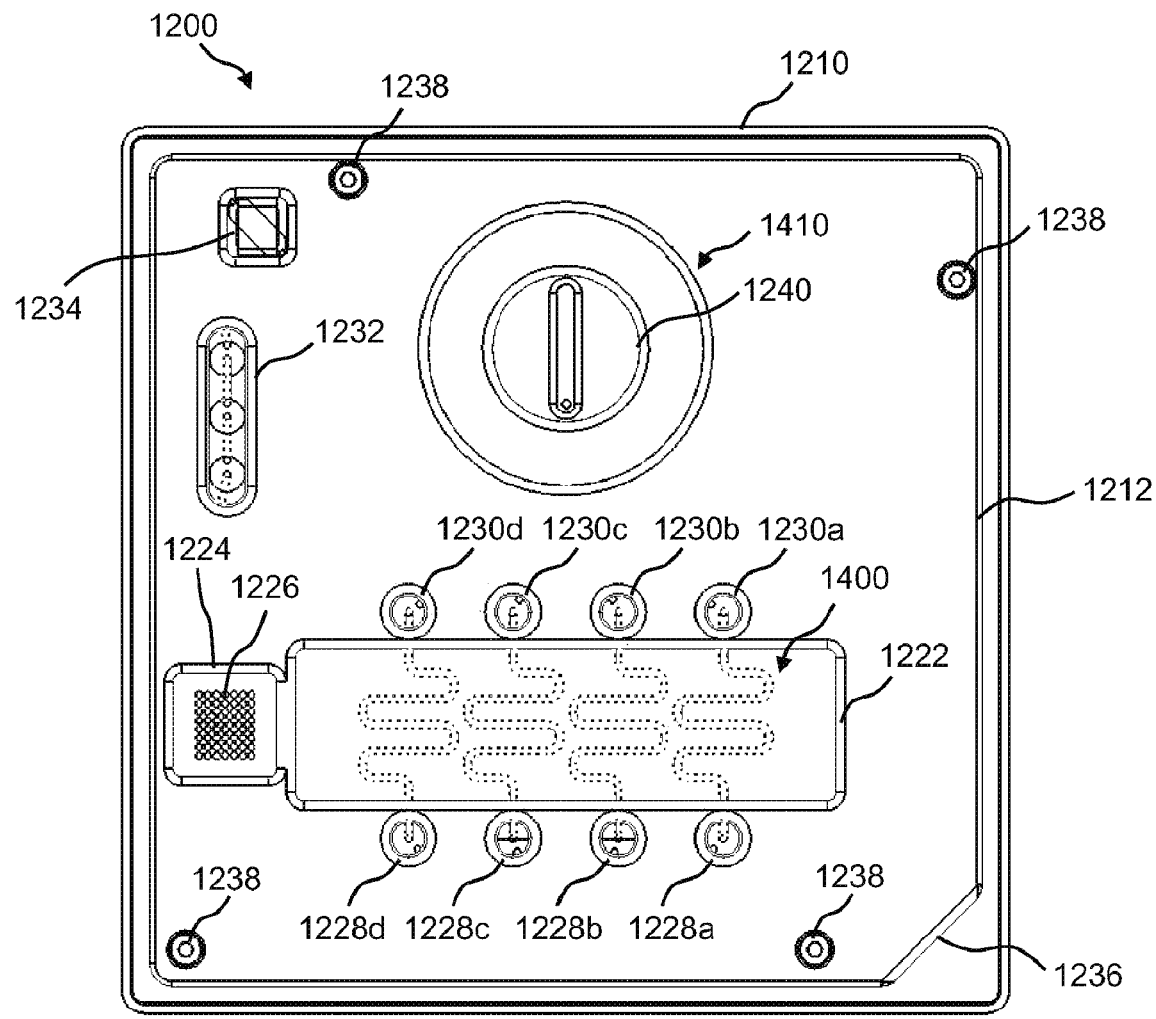
Figure 33B:
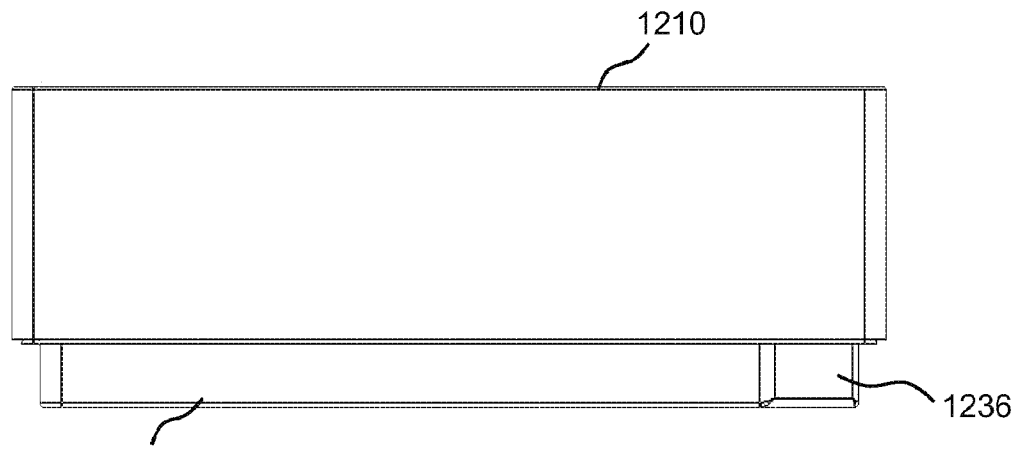

FIG. 32 shows a perspective view of the base plate 1212-side of microfluidic cartridge assembly 1200. FIG. 33A shows a plan view of the base plate 1212-side of microfluidic cartridge assembly 1200. FIG. 33B shows a side view of microfluidic cartridge assembly 1200. FIGS. 32, 33A, and 33B show more details of base plate 1212. Namely, base plate 1212 includes an opening 1222 and an opening 1224 for revealing portions of PCR region 270 of fluidics layers 200 of fluidics assembly 1400. Shown through opening 1224 is a set of I/O pads 1226 for contacting flexible PCB heater 1412 of fluidics assembly 1400.

Along one edge of opening 1222 are four openings 1228 for accessing and actuating the four membrane valves 242 of fluidics layers 200 of fluidics assembly 1400. Namely, opening 1228a substantially aligns with membrane valve 242a. Opening 1228b substantially aligns with membrane valve 242b. Opening 1228c substantially aligns with membrane valve 242c. Opening 1228d substantially aligns with membrane valve 242d.

Along the opposite edge of opening 1222 are four openings 1230 for accessing and actuating the four membrane valves 244 of fluidics layers 200 of fluidics assembly 1400. Namely, opening 1230a substantially aligns with membrane valve 244a. Opening 1230b substantially aligns with membrane valve 244b. Opening 1230c substantially aligns with membrane valve 244c. Opening 1230d substantially aligns with membrane valve 244d.

Additionally, base plate 1212 includes an opening 1232 for accessing and actuating the membrane valves 246 of fluidics layers 200 of fluidics assembly 1400. Base plate 1212 also includes an opening 1234 at sequencing chamber 258. One corner of base plate 1212 has a bevel 1236, which is used for orienting microfluidic cartridge assembly 1200 in, for example, the instrument deck of a microfluidics system (not shown). FIGS. 32 and 33A also show four screws 1238 that are used to fasten base plate 1212 to housing 1210. Further, rotatable valve assembly 1410 is shown with respect to reagent mixing and distribution region 275 of fluidics layers 200 of fluidics assembly 1400. Rotatable valve assembly 1410 includes a knob that has a grip portion 1240 by which a user or an apparatus may turn a flow controller portion 1242 (see FIG. 35).

Figure 34:
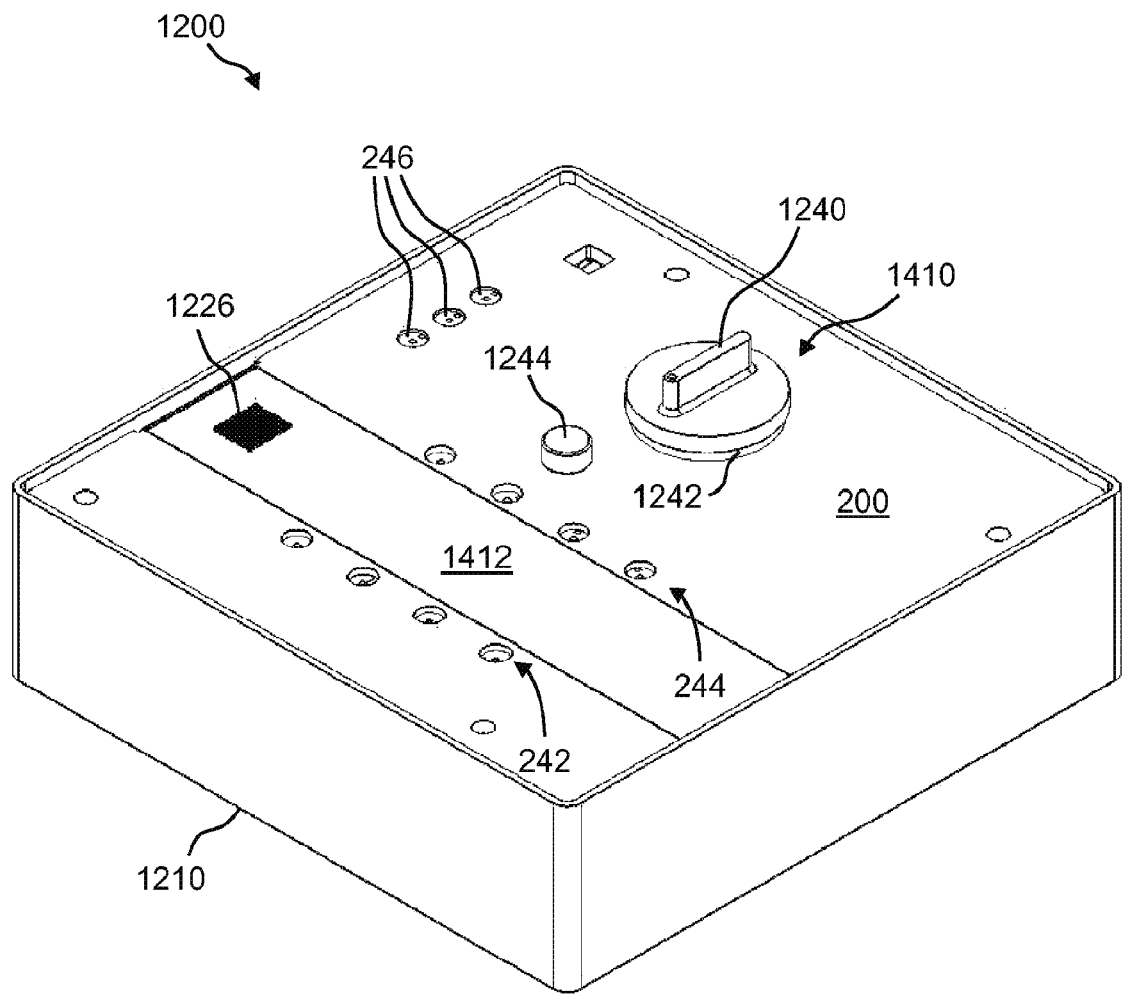
FIGS. 34 through 42 illustrate a process of deconstructing of the microfluidic cartridge assembly of FIG. 25 as a means to reveal the interior components thereof.

Starting with microfluidic cartridge assembly 1200 oriented base plate 1212-side up, FIGS. 34 through 42 essentially show a step-by-step deconstruction of microfluidic cartridge assembly 1200 as a means to reveal the placement and installation of the interior components thereof. First, FIG. 34 shows microfluidic cartridge assembly 1200 with base plate 1212 removed in order to reveal fluidics assembly 1400. In so doing, the flexible PCB layer 260-side of fluidics layers 200 is visible. Further, one side of flexible PCB heater 1412 is visible. Also revealed is a spacer 1244 between fluidics layers 200 and base plate 1212. In FIG. 34, membrane valves 242, 244, and 246 are visible.

Figure 35:
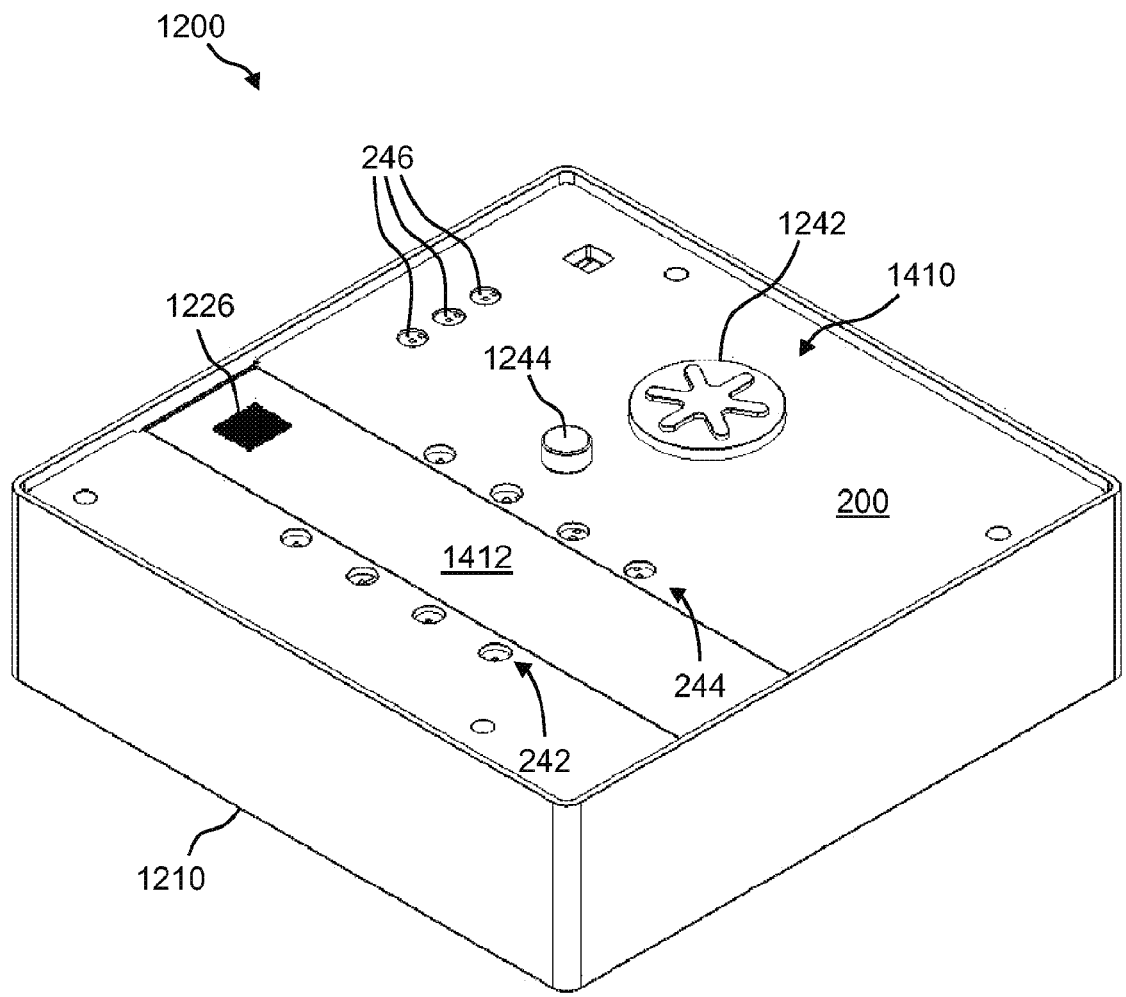

Referring now to FIG. 35, grip portion 1240 of rotatable valve assembly 1410 has been removed so that flow controller portion 1242 is now visible. The underside (not shown) of grip portion 1240 is designed to engage with flow controller portion 1242 so that flow controller portion 1242 can be rotated to direct the flow of liquid through one of the thirteen reagent channels 226.

Figure 36:
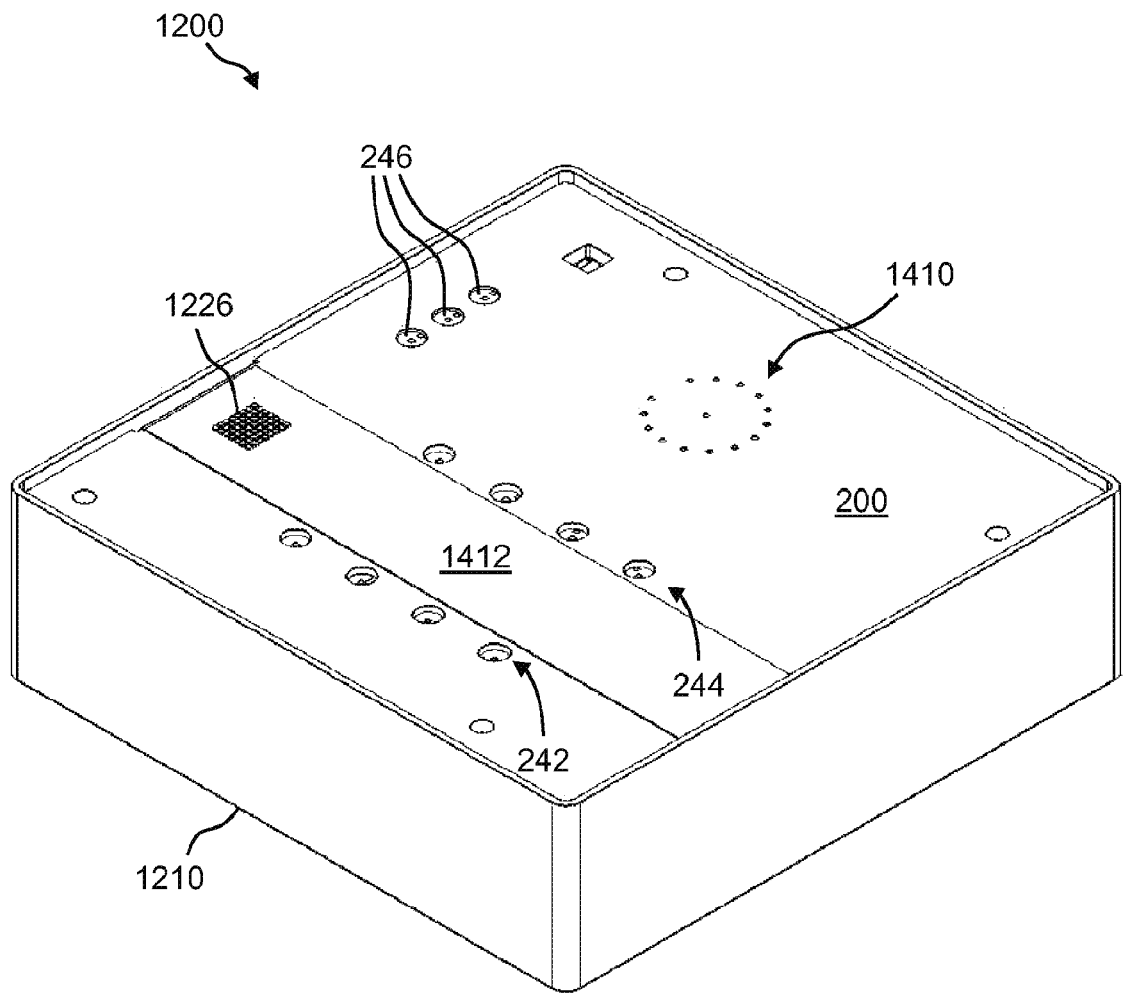

Referring now to FIG. 36, flow controller portion 1242 of rotatable valve assembly 1410 has been removed so that the fluid paths associated with PCR output channel 224, reagent channels 226, and sequencing feed channel 228 of fluidics layers 200 are visible.

Figure 37:
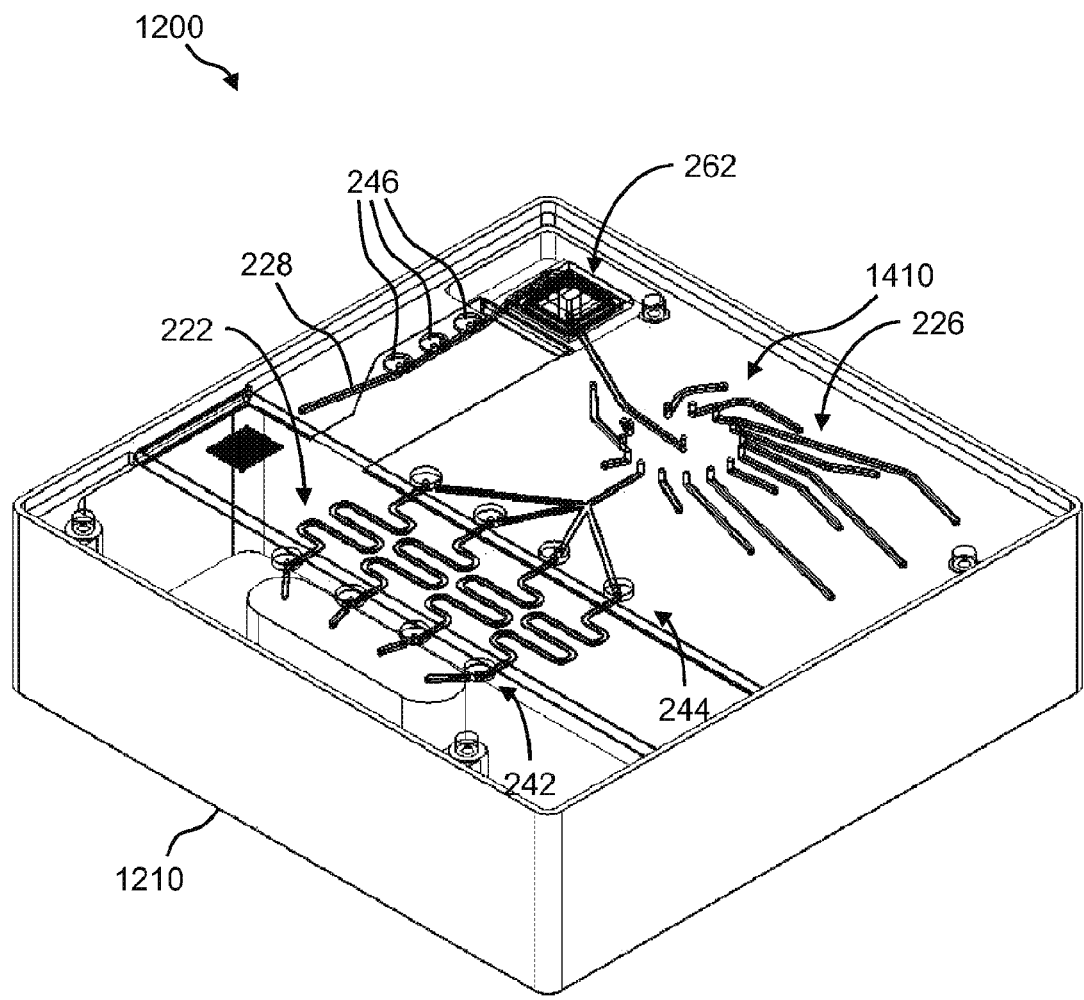

Referring now to FIG. 37, fluidics layers 200 are shown with transparency so that the fluid paths are visible within microfluidic cartridge assembly 1200.

Figure 38:
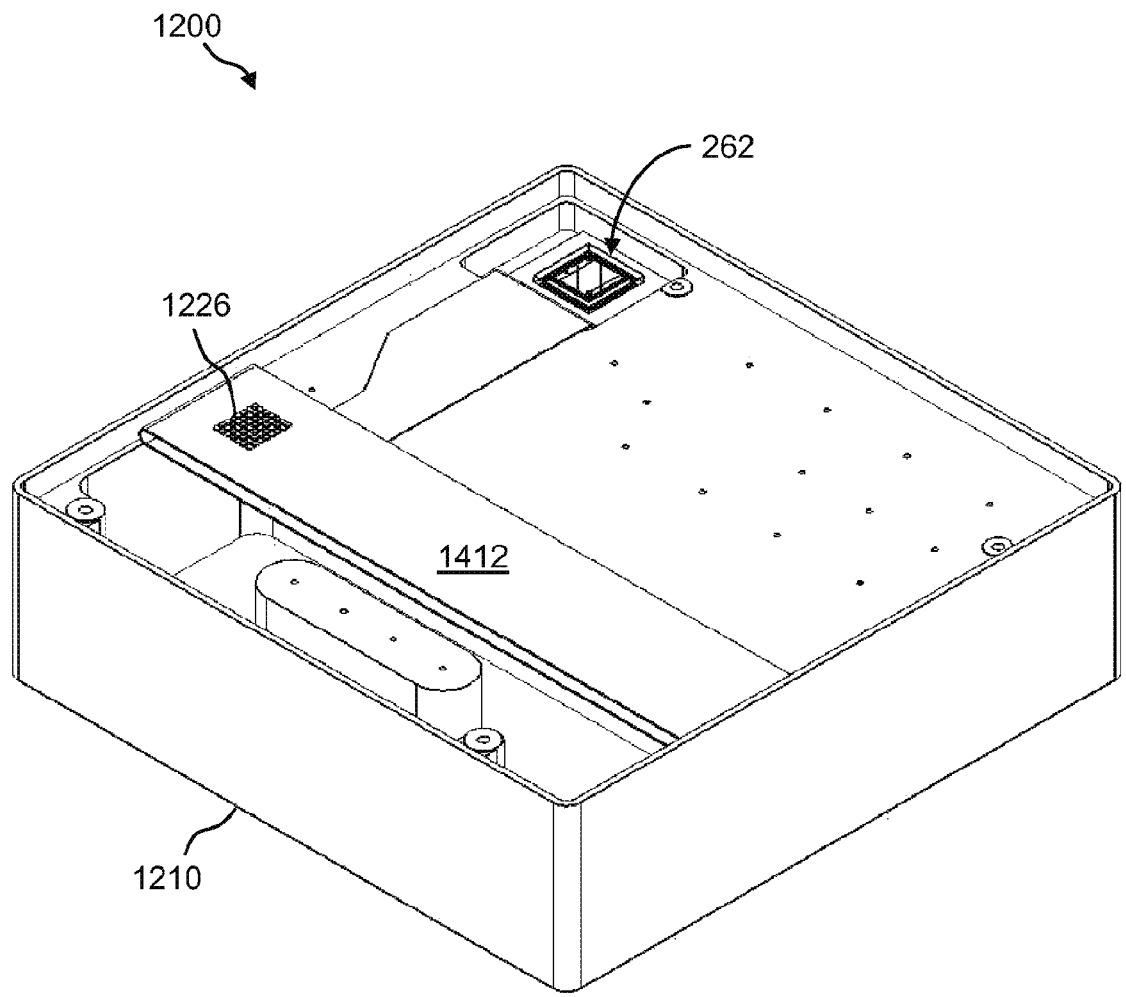
Figure 39:
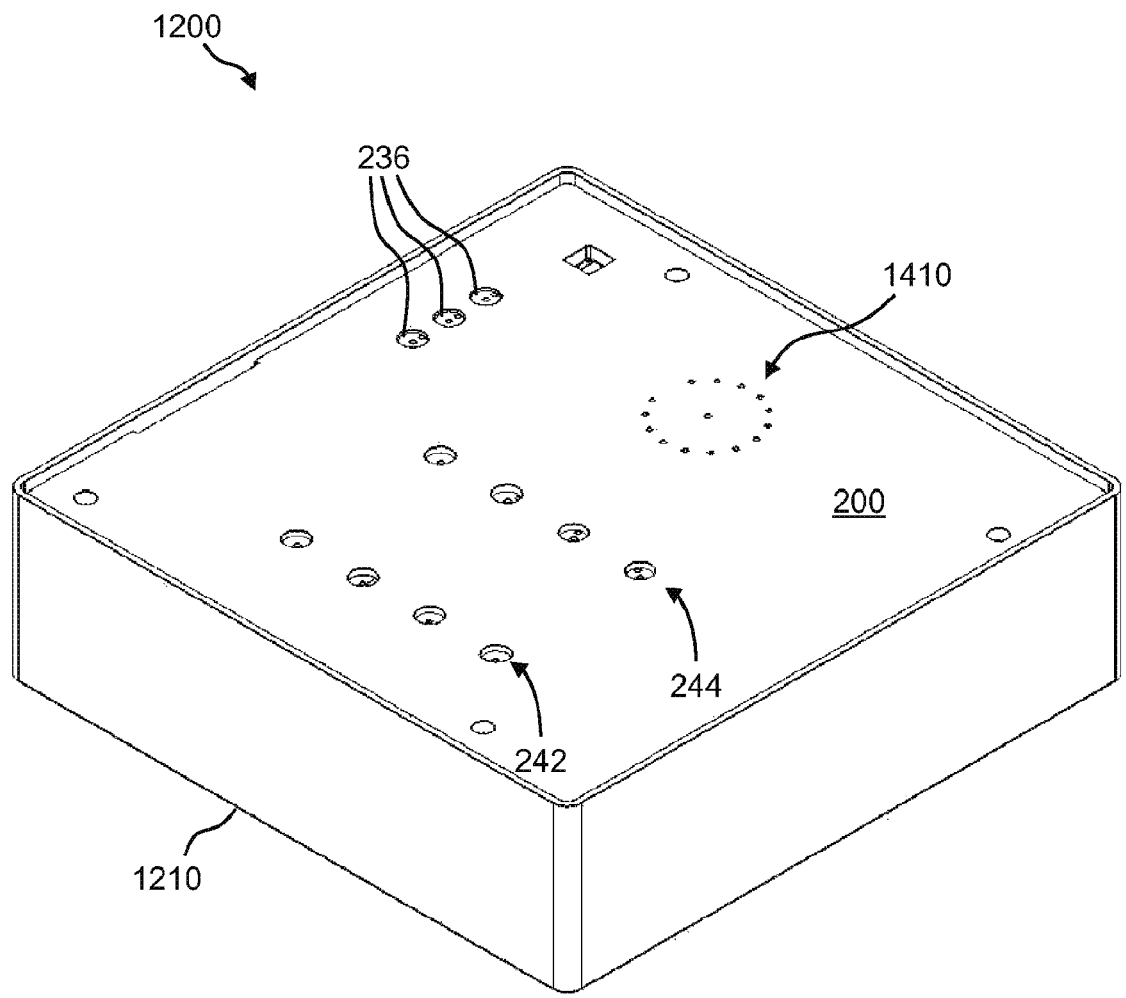

Referring now to FIG. 38, fluidics layers 200 has been removed and flexible PCB heater 1412 is shown alone within housing 1210. Referring now to FIG. 39, flexible PCB heater 1412 has been removed and fluidics layers 200 are shown alone within housing 1210.

Figure 40:
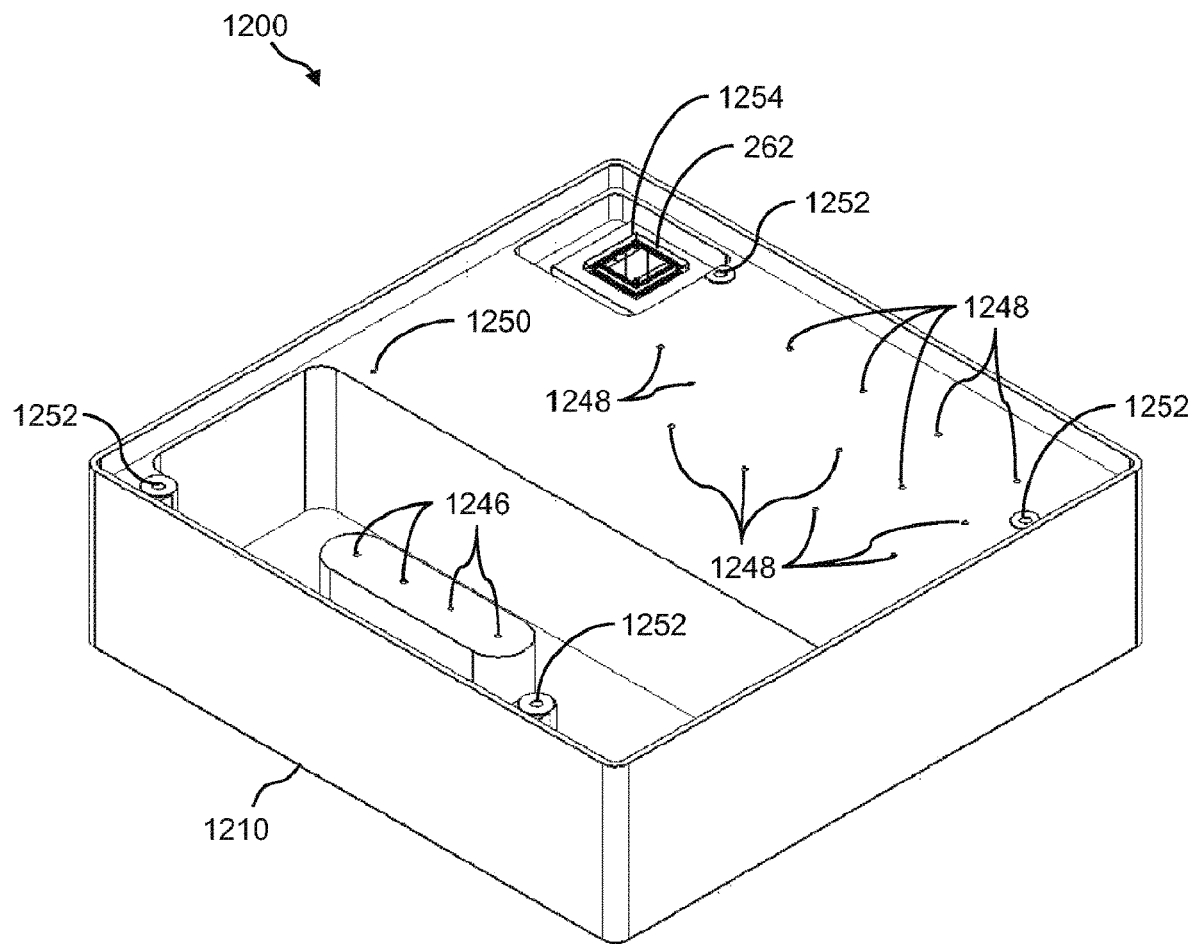
Figure 41:
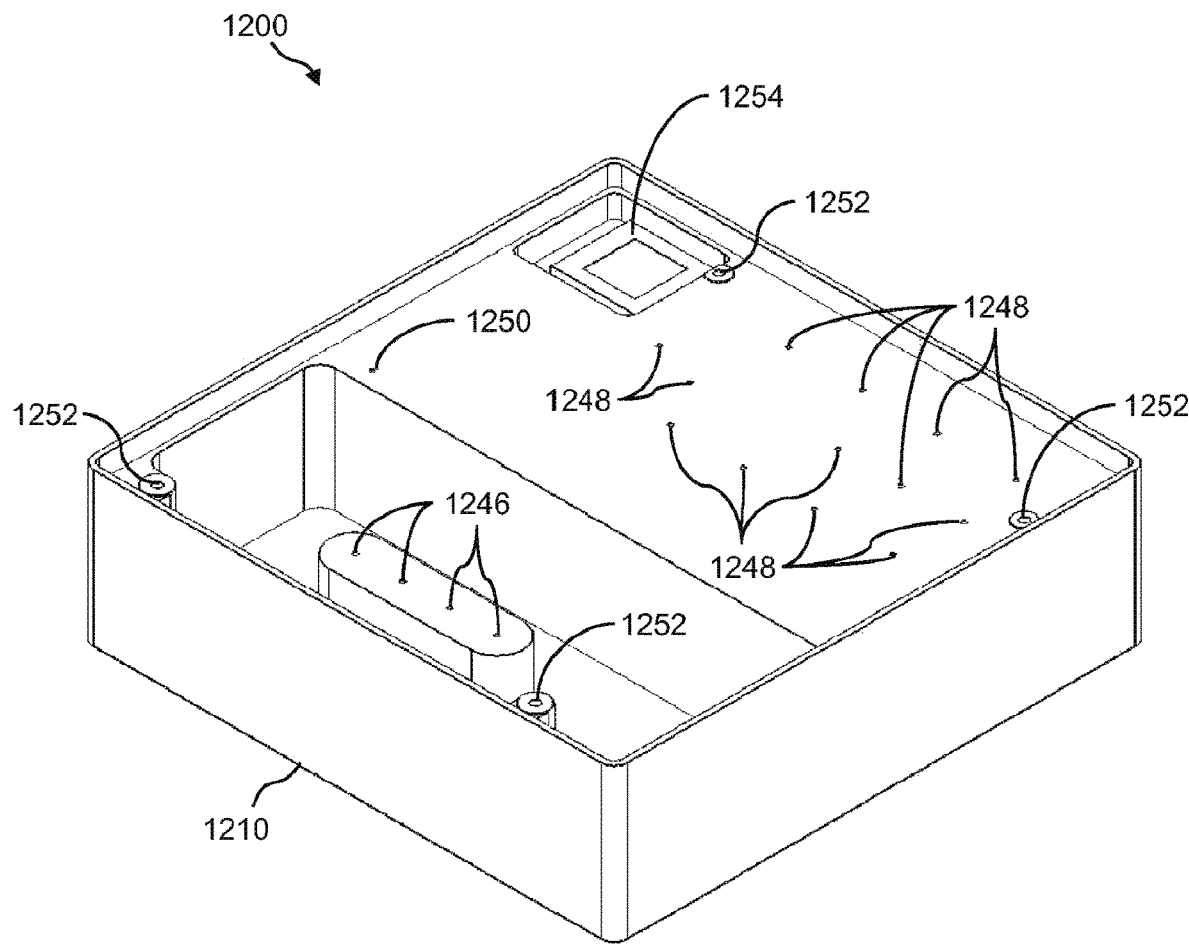
Figure 42:
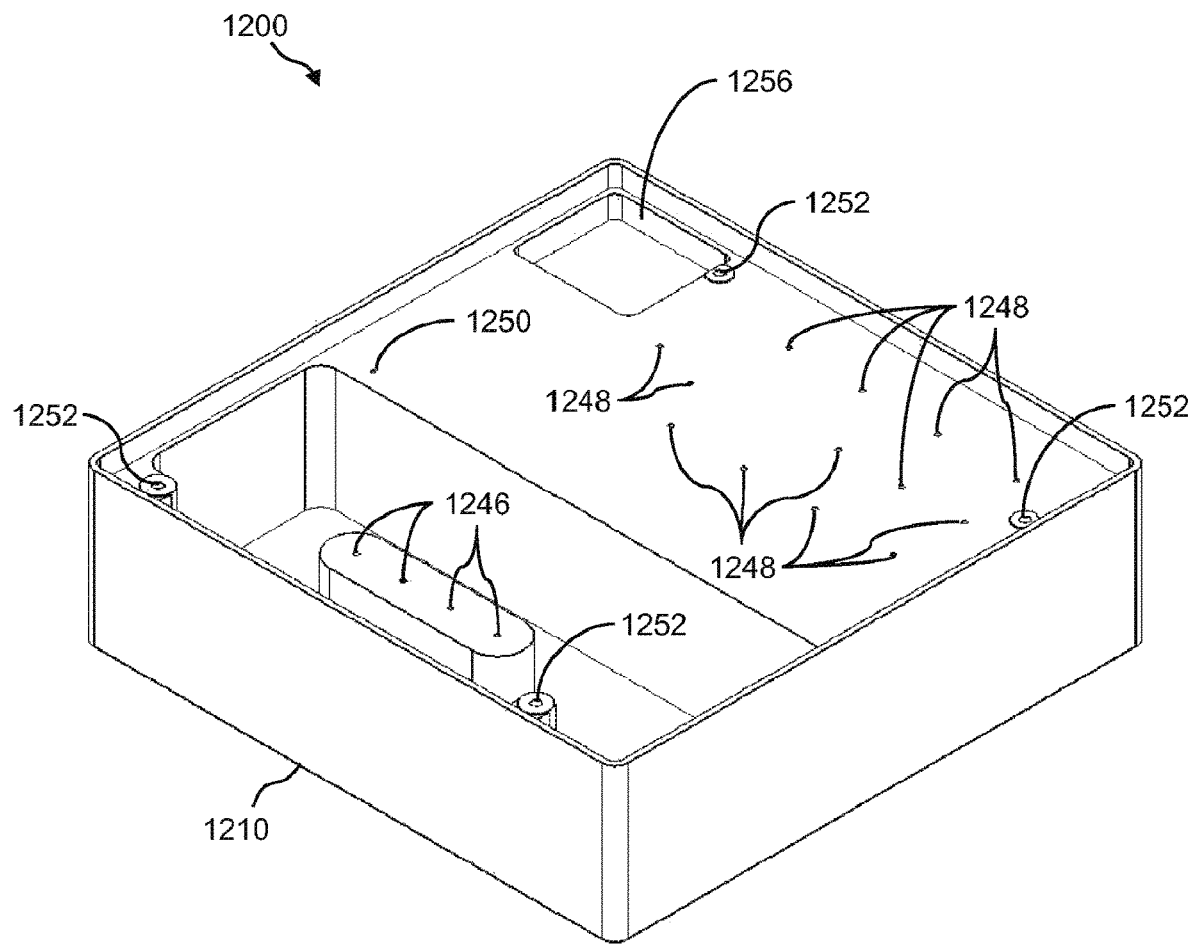

Referring now to FIG. 40, both fluidics layers 200 and flexible PCB heater 1412 have been removed from housing 1210. In this view, the flow paths in housing 1210 that are associated with sample loading ports 1214, the thirteen reagent reservoirs 1216, and waste reservoir 1218 are visible. For example, housing 1210 includes openings 1246 to sample loading ports 1214, openings 1248 to the thirteen reagent reservoirs 1216, and opening 1250 to waste reservoir 1218. FIG. 40 also shows four treaded holes 1252 for receiving screws 1238. Further, FIG. 40 shows CMOS image sensor 262 and a portion of a protective cap 1254 that is covering CMOS image sensor 262. Referring now to FIG. 41, CMOS image sensor 262 has been removed so that protective cap 1254 is fully visible. Referring now to FIG. 42, protective cap 1254 has been removed showing a clearance region 1256 in housing 1210 that is associated with CMOS image sensor 262.

Figure 43:
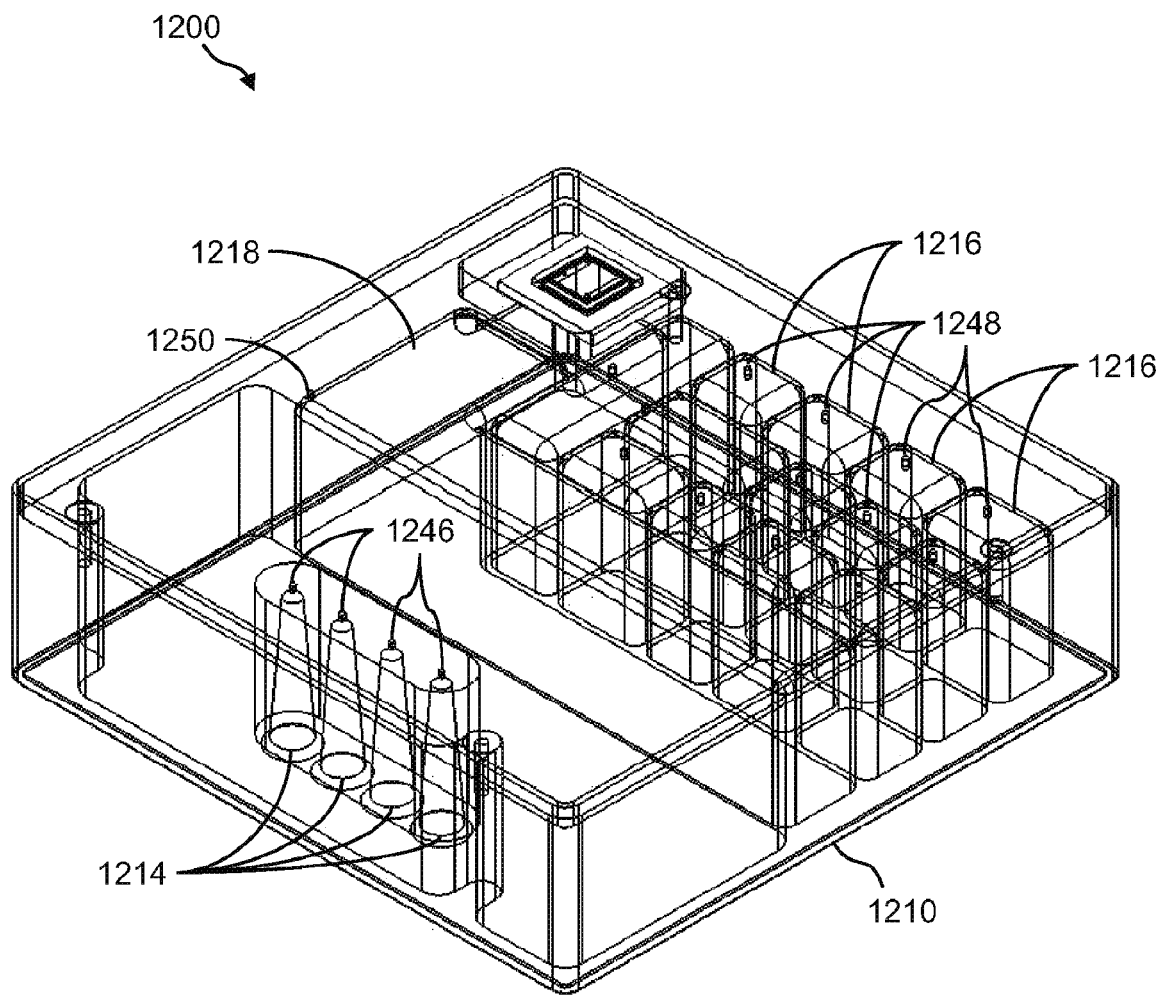
FIG. 43 shows a transparent perspective view of a portion of the microfluidic cartridge assembly of FIG. 25 and showing the various reagent fluid reservoirs and sample loading ports thereof.

FIG. 43 shows a transparent perspective view of housing 1210 of microfluidic cartridge assembly 1200 in order to show the positions of the openings with respect to sample loading ports 1214, reagent reservoirs 1216, and waste reservoir 1218. Namely, in this view one can see the positions of openings 1246 with respect to sample loading ports 1214, the positions of openings 1248 with respect to reagent reservoirs 1216, and the position of opening 1250 with respect to waste reservoir 1218.

Figure 44:
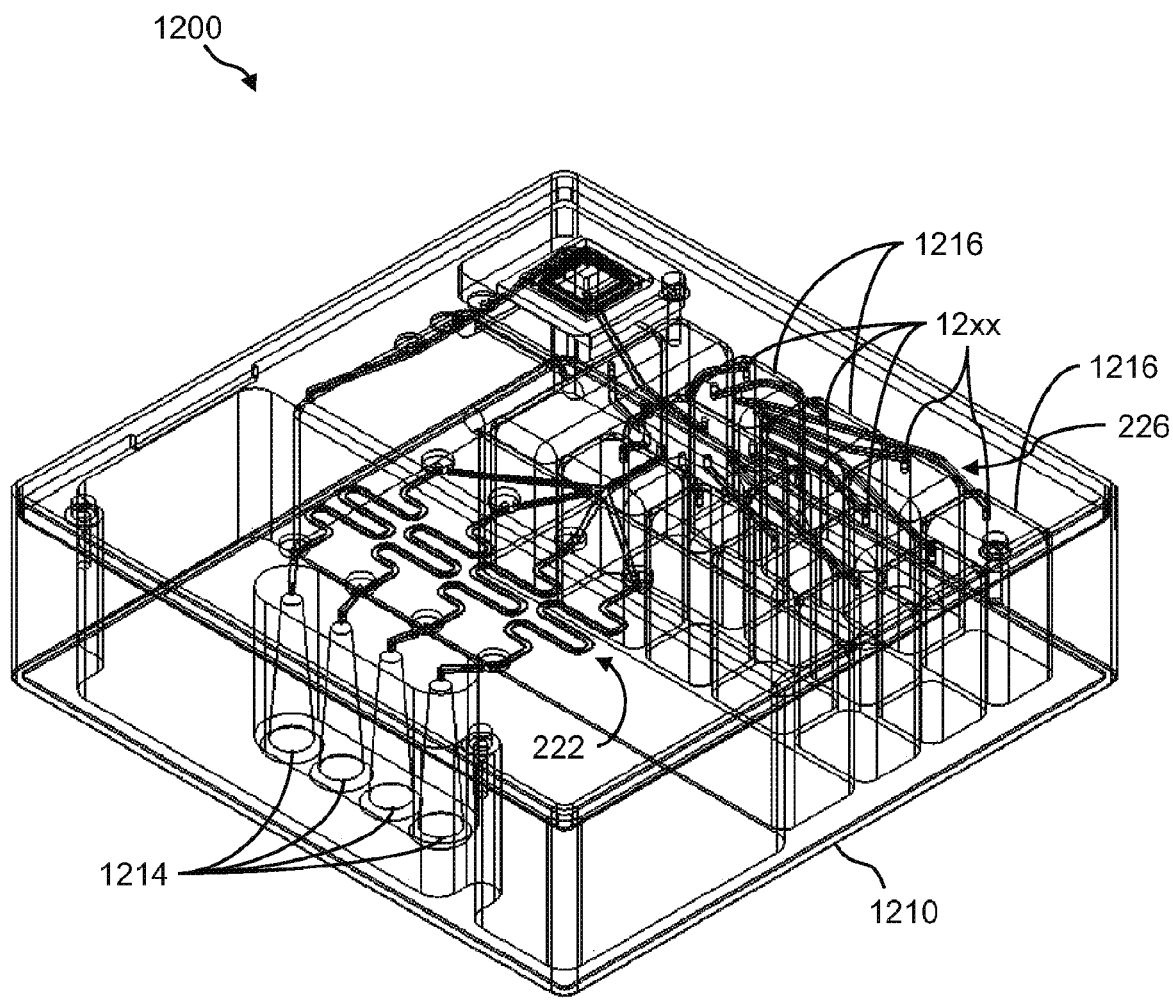
FIG. 44 shows another transparent perspective view of a portion of the microfluidic cartridge assembly of FIG. 25 and further showing the fluidics channels thereof.
Figure 45:
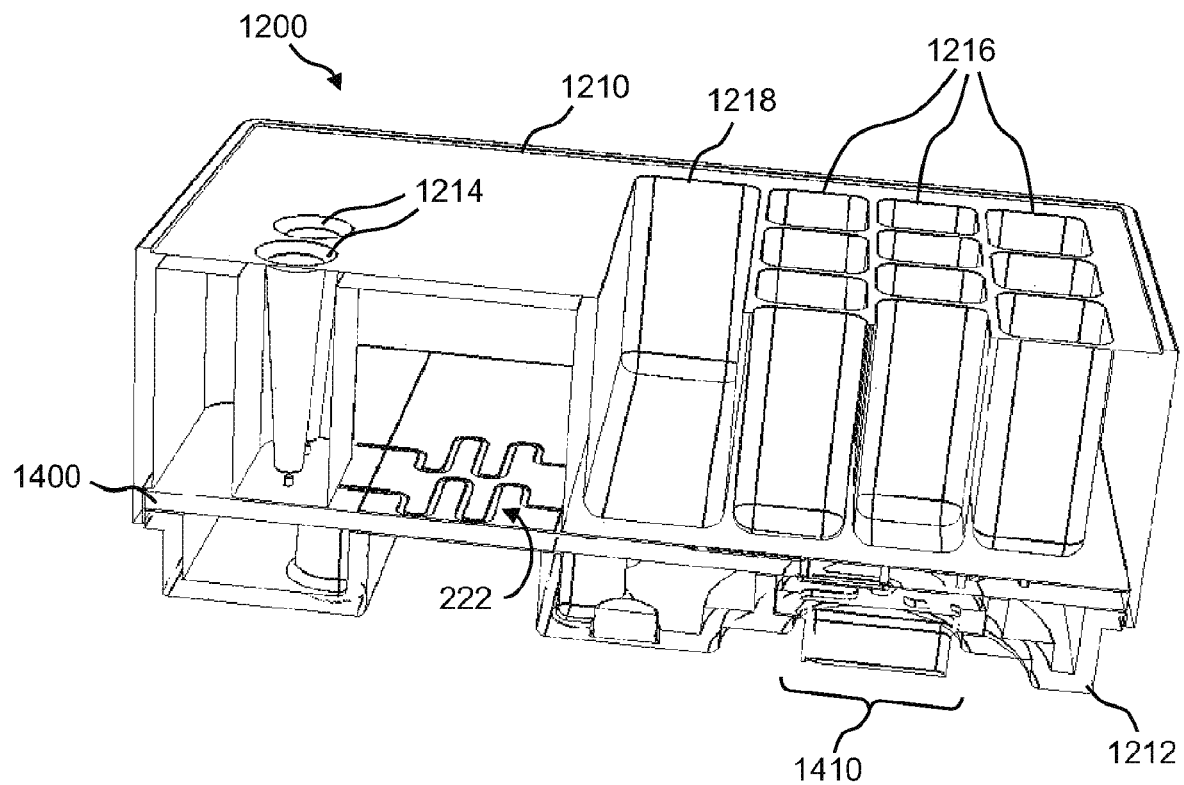
FIG. 45 shows a cross-sectional view of the microfluidic cartridge assembly of FIG. 25, which shows more details thereof.

FIG. 44 shows a transparent perspective view of housing 1210 of microfluidic cartridge assembly 1200 with the various fluidics channels overlaid thereon. Namely, in this view one can see the positions of the various fluidics channels with respect to sample loading ports 1214, reagent reservoirs 1216, and waste reservoir 1218. FIG. 45 shows a cross-sectional view of microfluidic cartridge assembly 1200 of FIG. 25, which shows more details thereof.

Figure 46A:
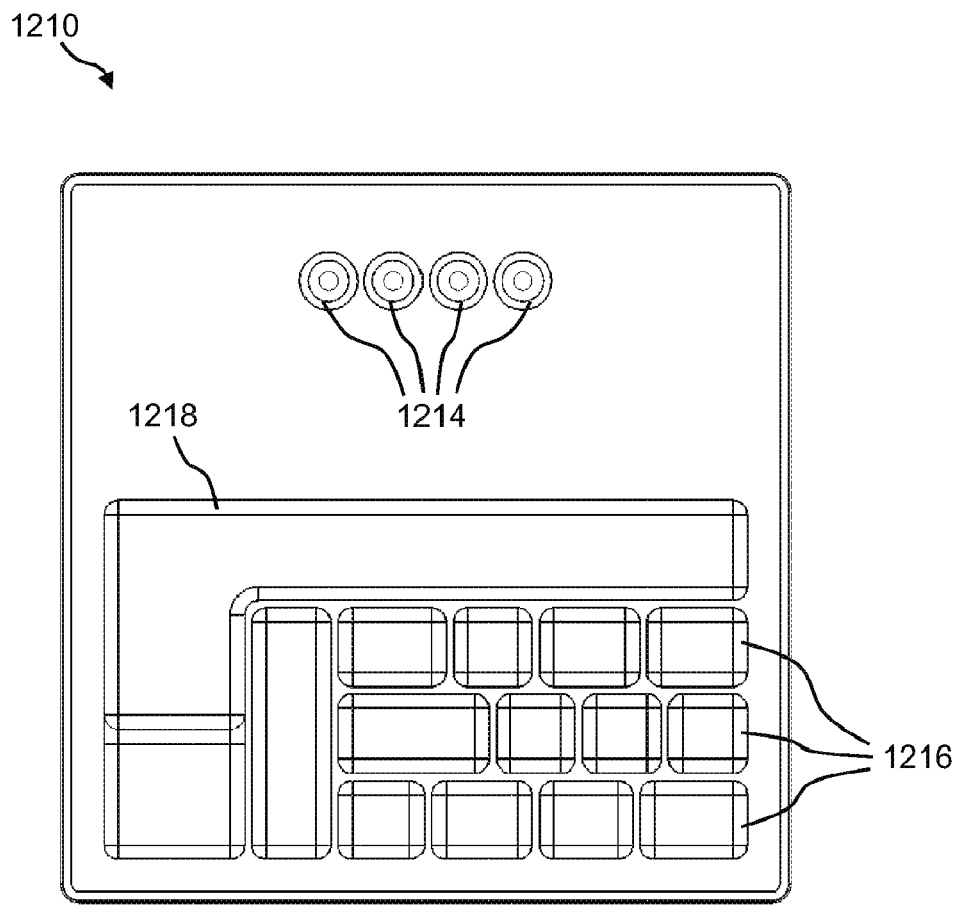
FIGS. 46A, 46B, 47A, 47B, and 48 show various views of the housing of the microfluidic cartridge assembly of FIG. 25, which shows more details thereof.
Figure 46B:
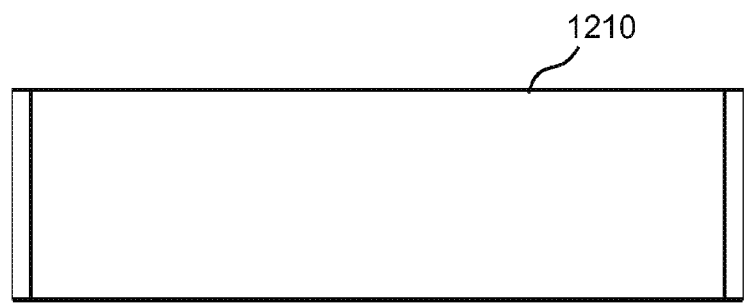
Figure 47A:
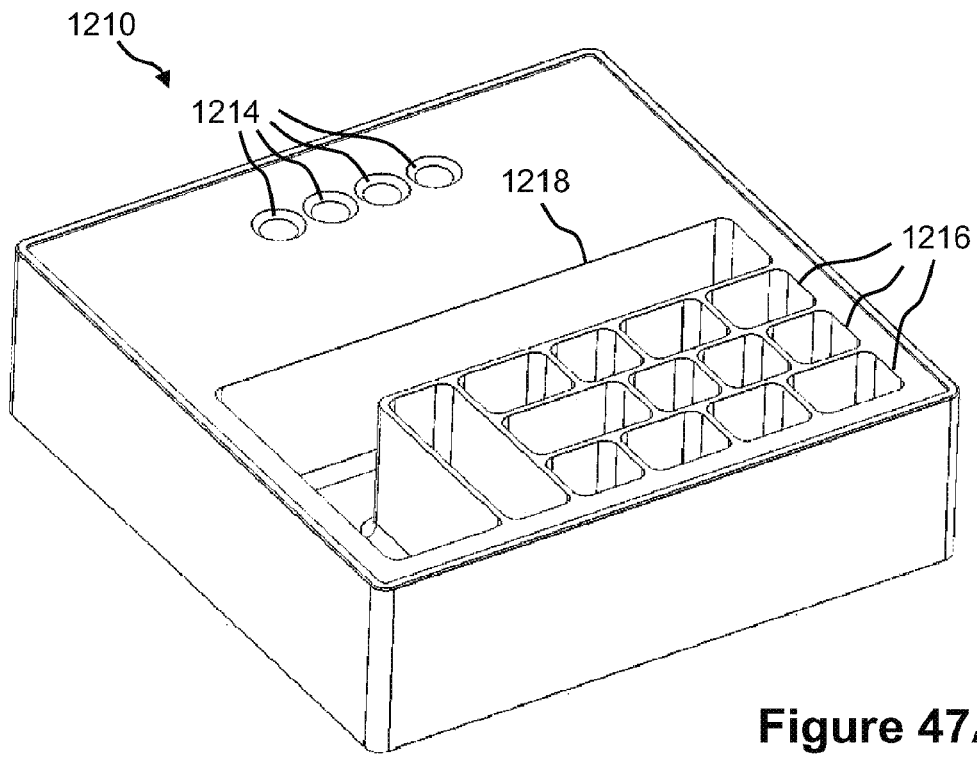
Figure 47B:
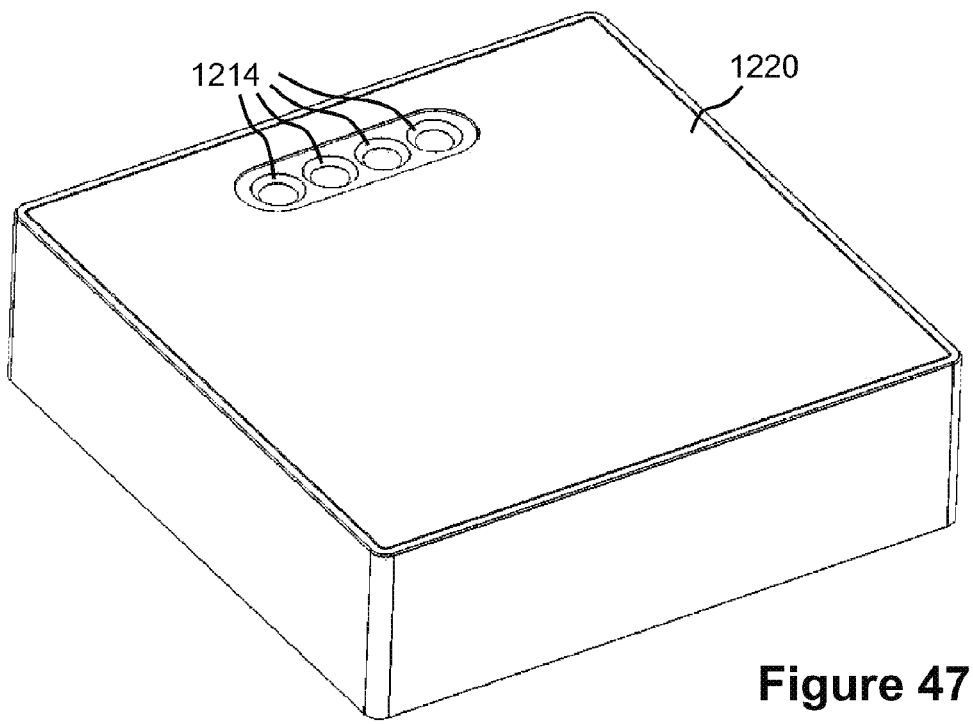
Figure 48:
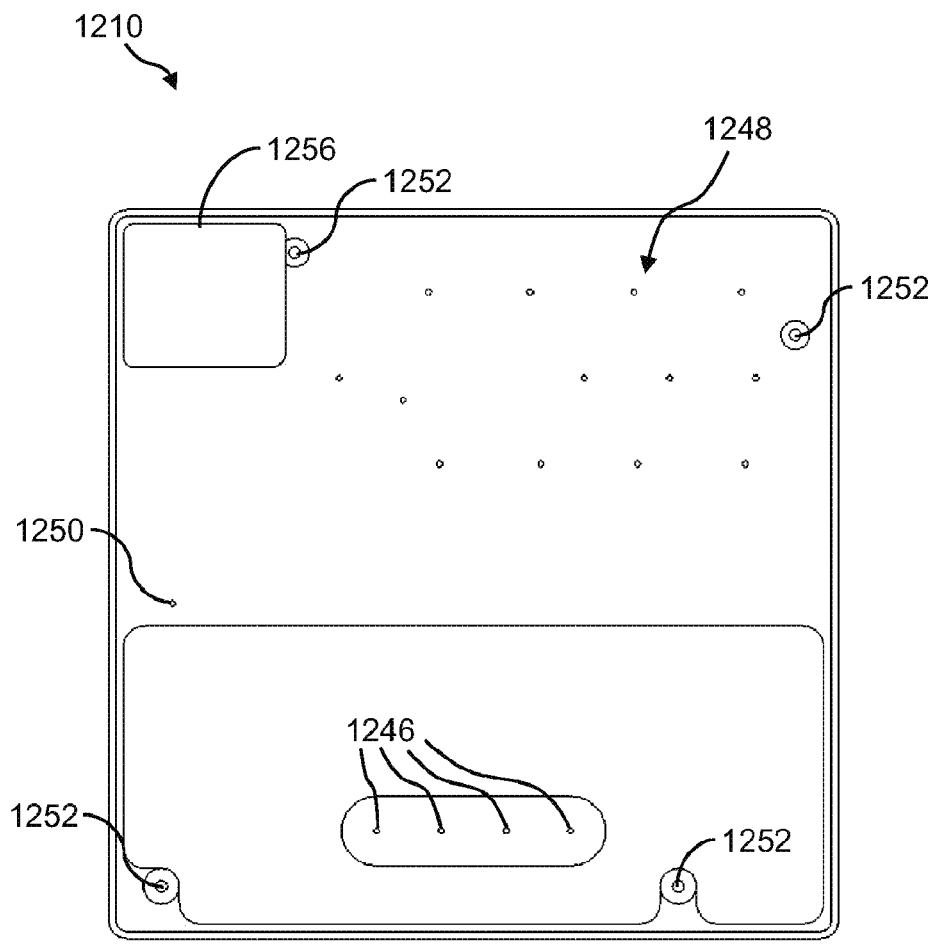

FIGS. 46A, 46B, 47A, 47B, and 48 show various views of housing 1210 of microfluidic cartridge assembly 1200 of FIG. 25, which shows more details thereof. Namely, FIGS. 46A and 46B show a plan view and a side view, respectively, of housing 1210. In one example, housing 1210 is from about 12 mm to about 100 mm in height, from about 100 mm to about 200 mm in length, from about 100 mm to about 200 mm in width. FIG. 47A shows a perspective view of housing 1210 without foil seal 1220 installed. FIG. 47B shows a perspective view of housing 1210 with foil seal 1220 installed. While FIGS. 46A, 46B, 47A, and 47B show the outside of housing 1210, FIG. 48 shows a plan view of the inside of housing 1210.

Figure 49:
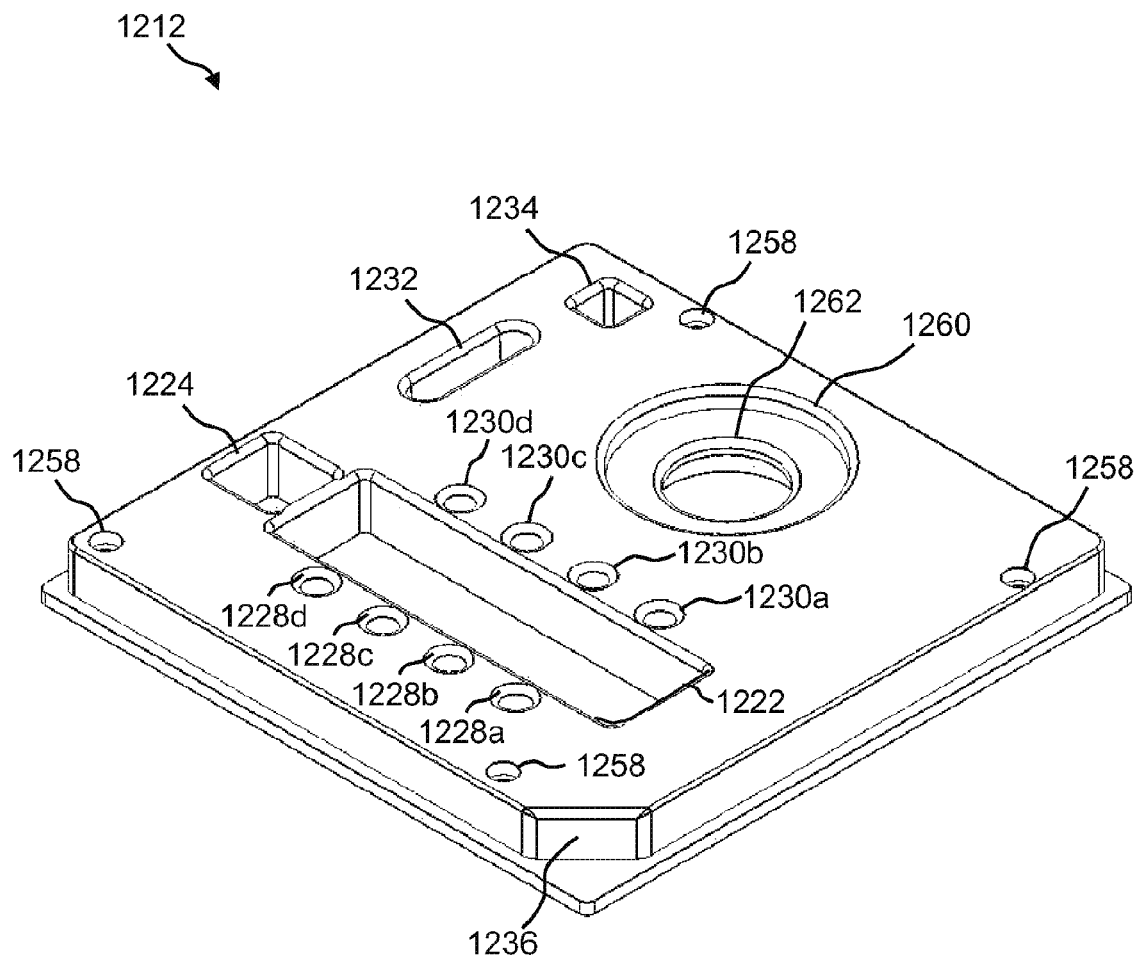
FIGS. 49, 50, 51A, 51B, and 52 show various views of the base plate of the microfluidic cartridge assembly of FIG. 25, which shows more details thereof.
Figure 50:
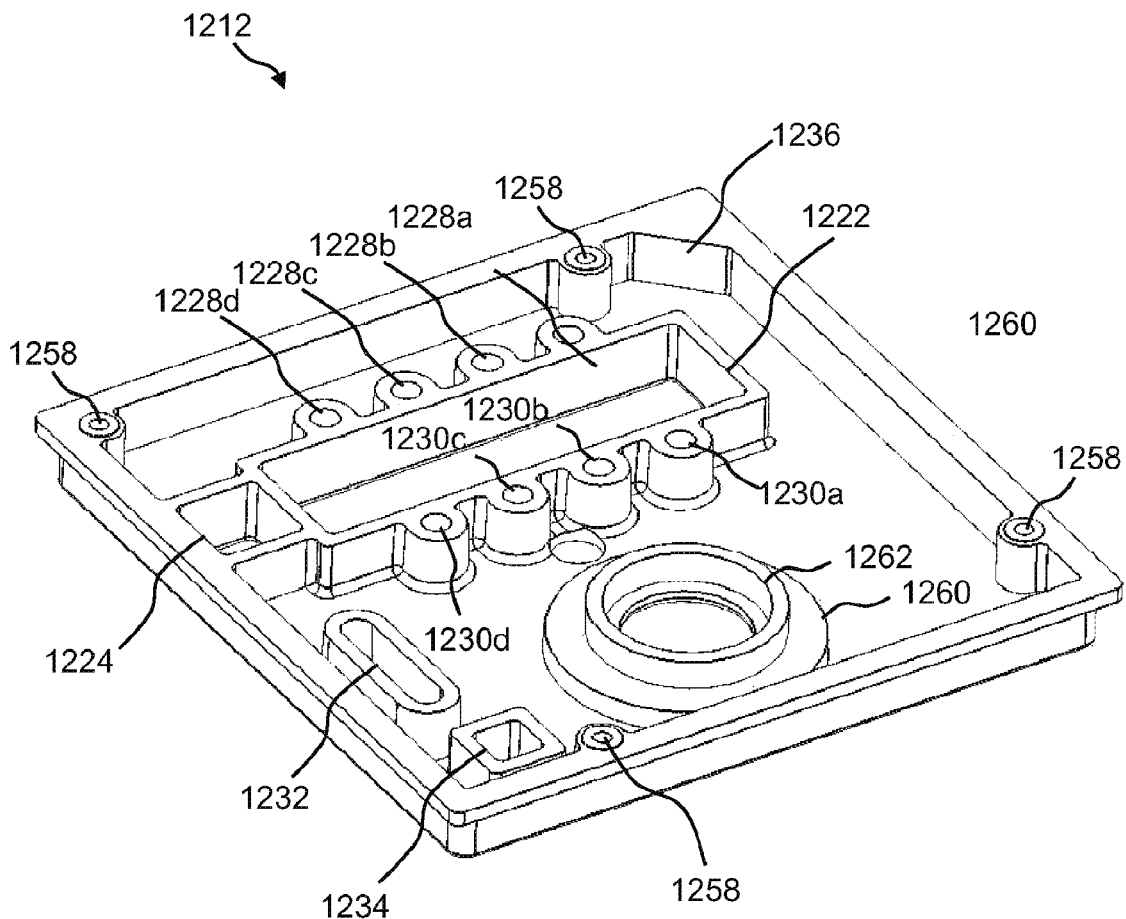
Figure 51A:
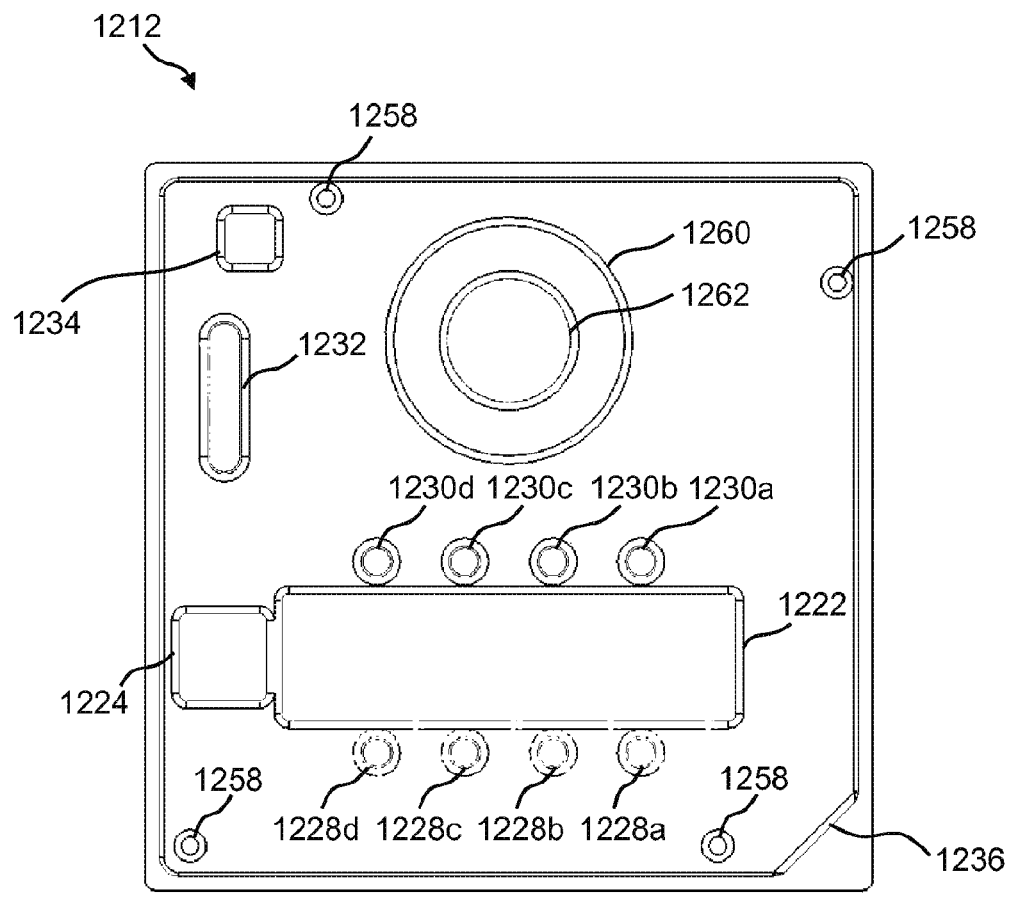
Figure 51B:
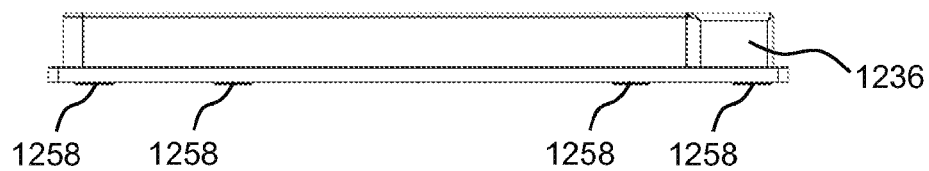
Figure 52:
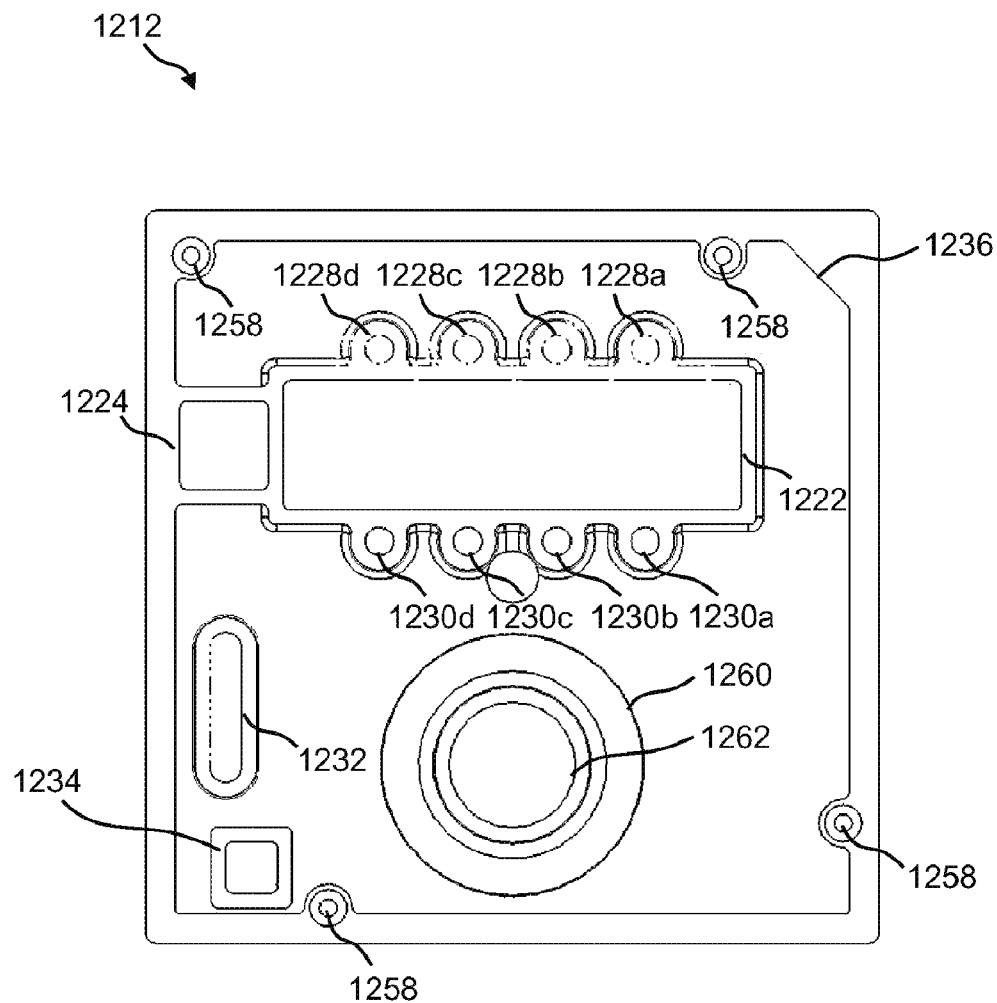

FIGS. 49, 50, 51A, 51B, and 52 show various views of base plate 1212 of microfluidic cartridge assembly 1200 of FIG. 25, which shows more details thereof. Namely, FIGS. 49 and 50 show perspective views of the outside and inside, respectively, of base plate 1212. FIG. 41A shows a plan view of the outside of base plate 1212, while FIG. 41B shows a side view of base plate 1212. FIGS. 49, 50, 51A, 38B, and 39 show that base plate 1212 further includes four holes 1258 for receiving screws 1238, a recessed region 1260 with an opening 1262 at its center for receiving grip portion 1240 and flow controller portion 1242 of rotatable valve assembly 1410.

Figure 53A:
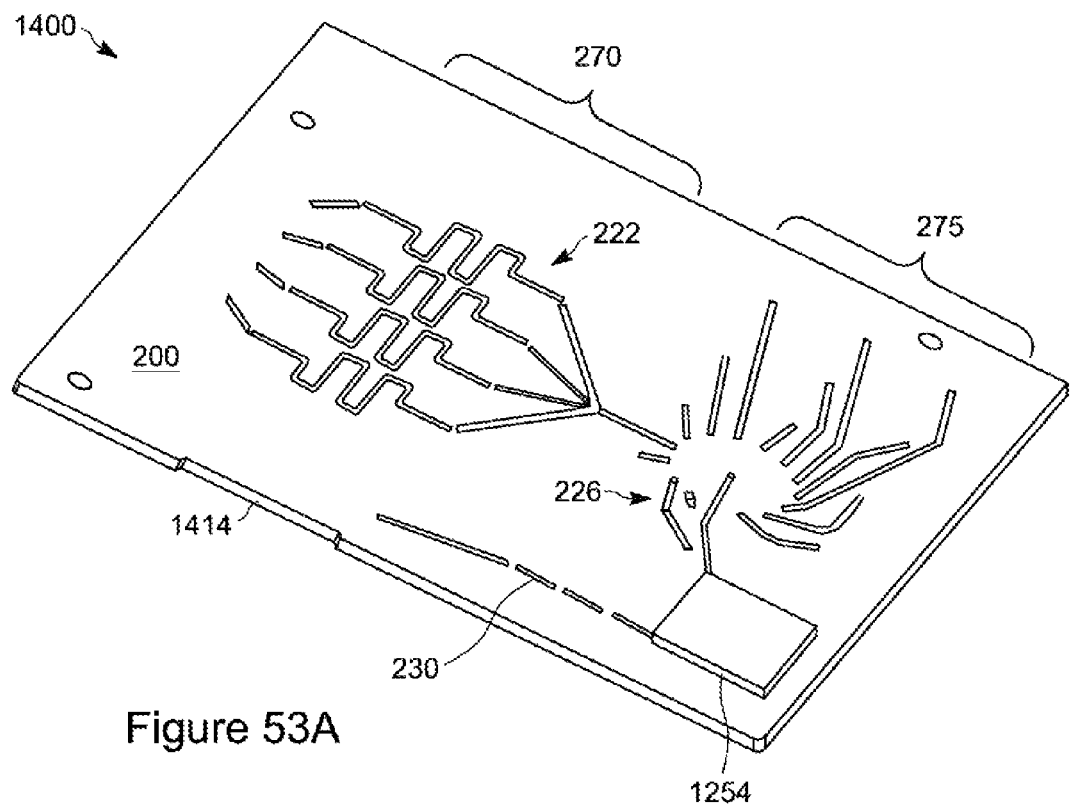
FIGS. 53A and 53B illustrate other perspective views of the fluidics assembly of the microfluidic cartridge assembly showing more details thereof.
Figure 53B:
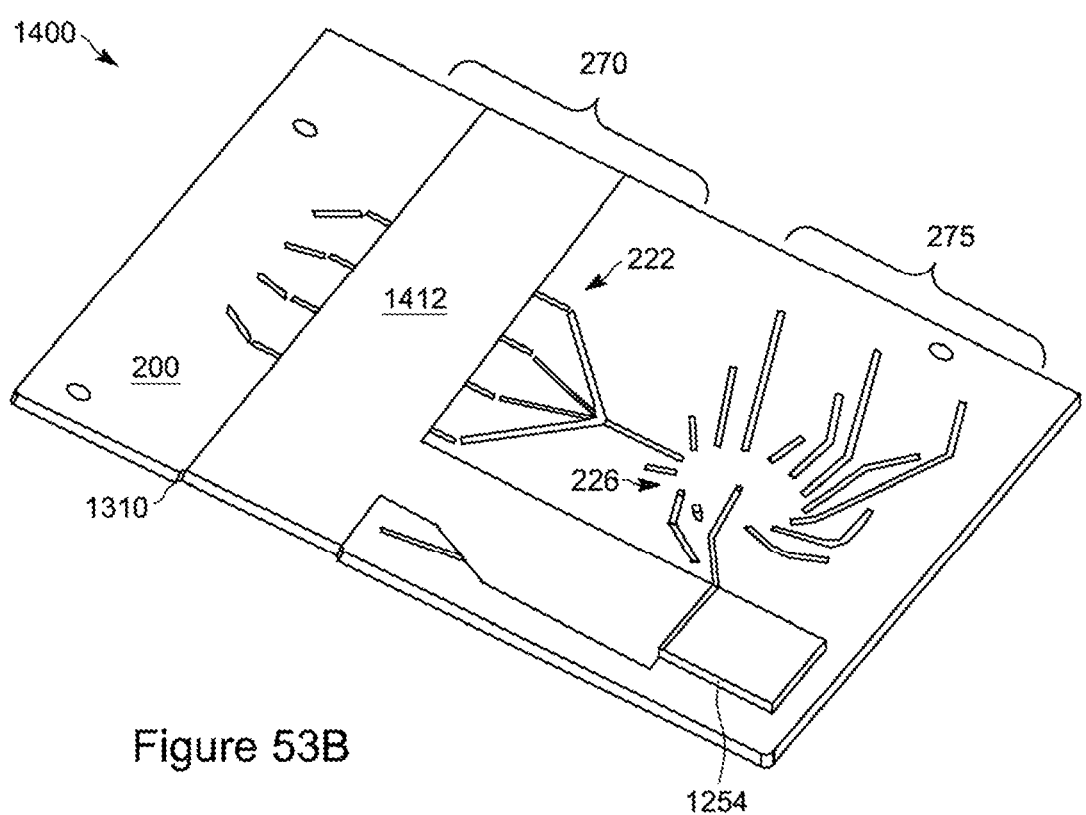

FIGS. 53A and 53B illustrate other perspective views of fluidics assembly 1400 of microfluidic cartridge assembly 1200 showing more details thereof. Namely, FIGS. 53A and 53B each show a perspective view of fluidics assembly 1400. FIG. 53A shows fluidics assembly 1400 without flexible PCB heater 1412, whereas FIG. 53B shows fluidics assembly 1400 with flexible PCB heater 1412 installed. Further, there is a notch 1414 on one edge of fluidics layers 200 and within PCR region 270. Notch 1414 is designed to receive flexible PCB heater 1412.

Figure 54A:
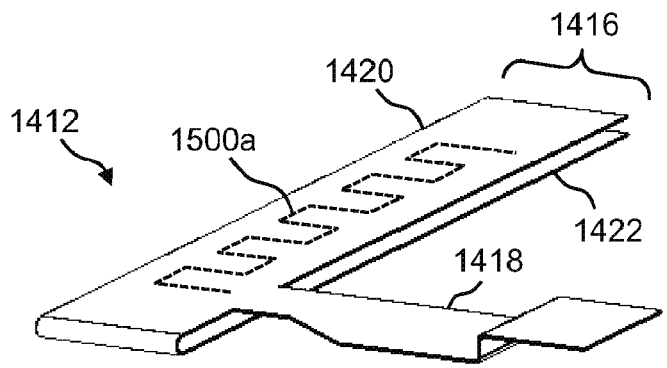
FIGS. 54A, 54B, and 54C illustrate other views showing more details of the flexible PCB heater of the fluidics assembly of the microfluidic cartridge assembly.
Figure 54B:
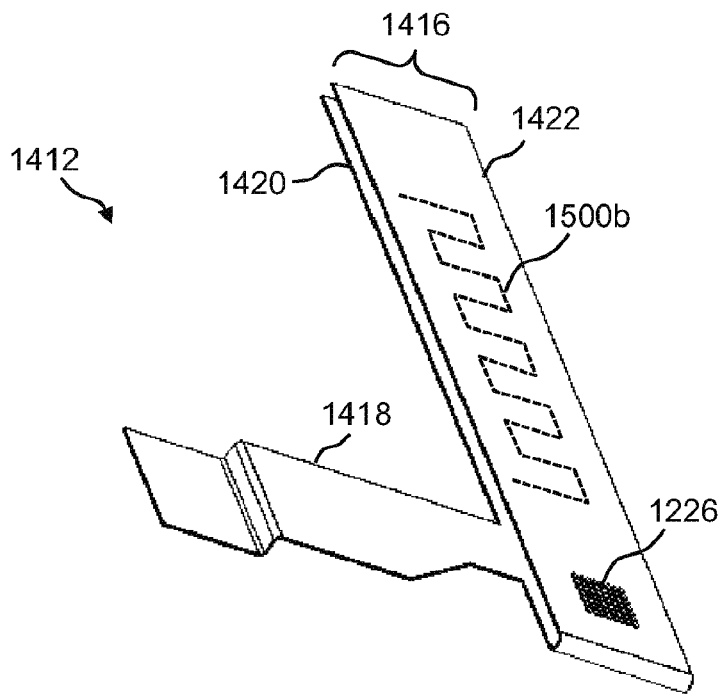
Figure 54C:
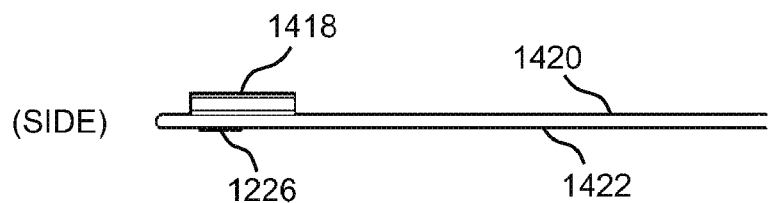

FIGS. 54A, 54B, and 54C illustrate various views showing more details of flexible PCB heater 1412 of fluidics assembly 1400 of microfluidic cartridge assembly 1200. Namely, FIGS. 54A and 54B show perspective views of each side, respectively, of flexible PCB heater 1412, while FIG. 54C shows a side view of flexible PCB heater 1412. Flexible PCB heater 1412 comprises a U-shaped wraparound panel 1416 and a side extension panel 1418, all formed using flexible PCB technology. The U-shaped wraparound panel 1416 comprises a panel 1420 and a panel 1422, each having a heater trace 1500 patterned therein, e.g., heater traces 1500a and 1500b. An example of heater trace 1500 is shown in FIGS. 28A and 28B. The space between panel 1420 and panel 1422 is set so that flexible PCB heater 1412 can be press-fitted onto PCR region 270 of fluidics layers 200 and fitted into notch 1414, as shown in FIG. 53B. FIGS. 54B and 41C also show I/O pads 1226, which provide the electrical connections to the two heater traces 1500 as well as to CMOS image sensor 262.

Side extension panel 1418 extends from panel 1420 near the bend in the U-shaped wraparound panel 1416. Side extension panel 1418 is designed to extend towards CMOS image sensor 262. As shown in FIG. 53B, the end of side extension panel 1418 farthest from the U-shaped wraparound panel 1416 is shaped to be fitted against CMOS image sensor 262. The purpose of side extension panel 1418 is to provide the electrical connection to CMOS image sensor 262, which is assembled atop the rigid or flexible PCB.

Figure 55A:
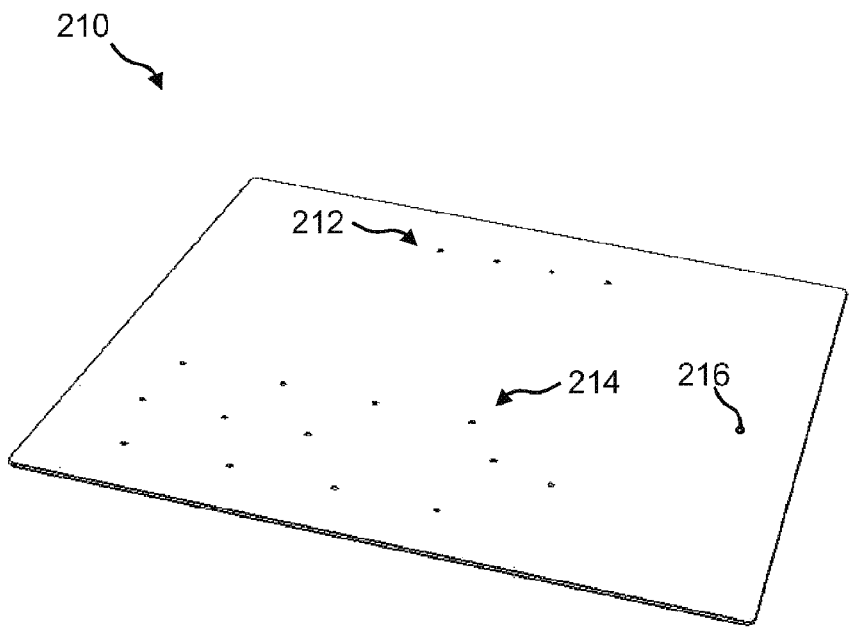
FIGS. 55A and 55B show a perspective view and plan view, respectively, of the inlet/outlet ports layer of the fluidics layers shown in FIG. 15 and FIG. 27.
Figure 55B:
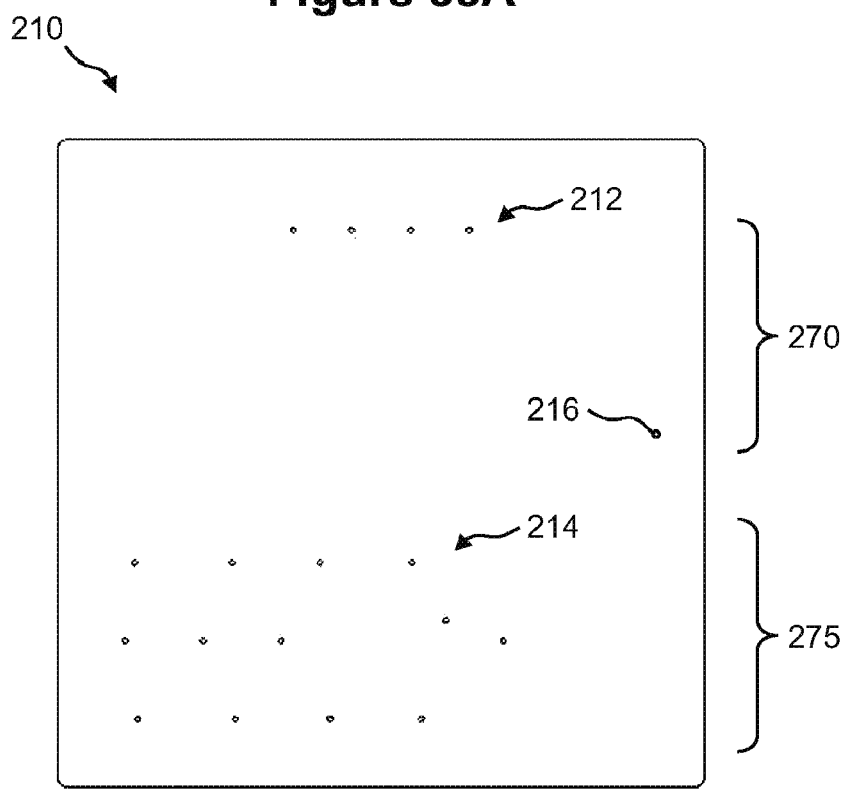

FIGS. 55A and 55B show a perspective view and plan view, respectively, of inlet/outlet ports layer 210 of fluidics layers 200 shown in FIG. 15 and FIG. 27. Again, inlet/outlet ports layer 210 can be formed of, for example, polycarbonate or any other materials that are suitable for use with a R2R process. Inlet/outlet ports layer 210 provides the interface between fluidics layers 200 and housing 1210 of microfluidic cartridge assembly 1200. Namely, inlet/outlet ports layer 210 provides the fluid paths from sample loading ports 1214, the thirteen reagent reservoirs 1216, and waste reservoir 1218 of housing 1210 to fluidics channels layer 220 of fluidics layers 200. For example, inlet/outlet ports layer 210 includes a set of openings 212 that substantially align with openings 1246 of sample loading ports 1214 in housing 1210. Inlet/outlet ports layer 210 includes a set of openings 214 that substantially align with openings 1248 of reagent reservoirs 1216 in housing 1210. Inlet/outlet ports layer 210 also includes an opening 216 that substantially align with opening 1250 of waste reservoir 1218 in housing 1210.

Figure 56A:
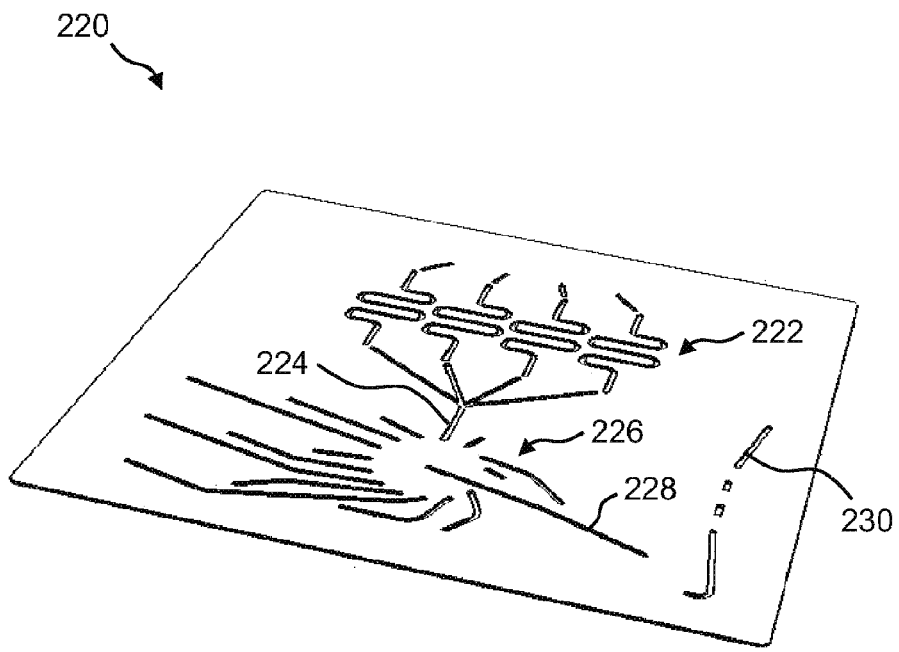
FIGS. 56A and 56B show a perspective view and plan view, respectively, of the fluidics channels layer of the fluidics layers shown in FIG. 15 and FIG. 27.
Figure 56B:
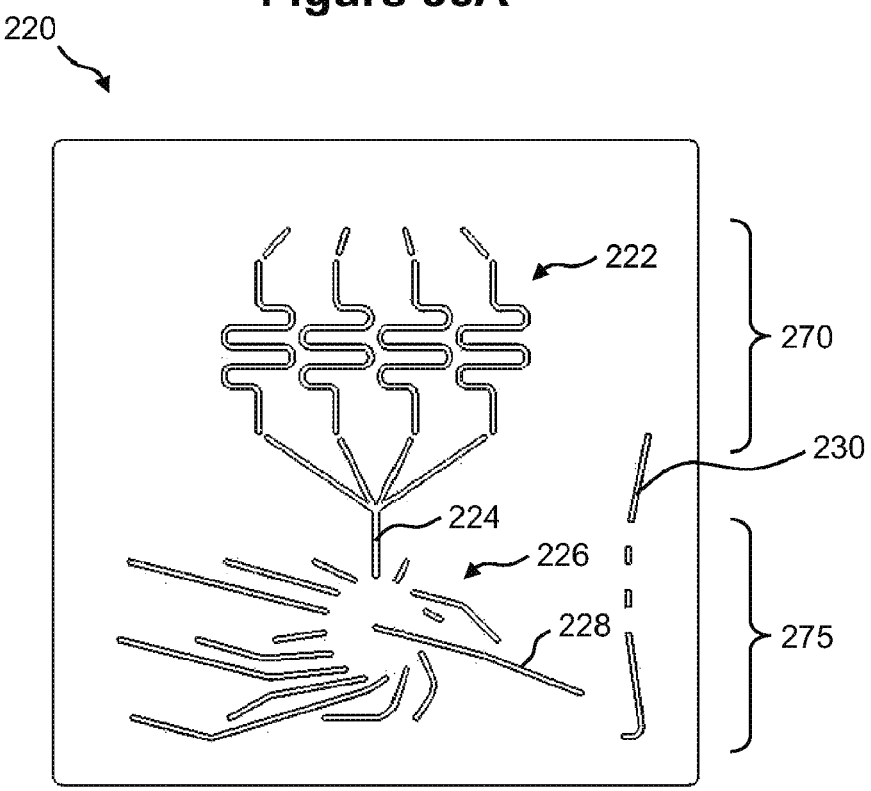

FIGS. 56A and 56B show a perspective view and plan view, respectively, of fluidics channels layer 220 of fluidics layers 200 shown in FIG. 15 and FIG. 27. Again, fluidics channels layer 220 can be formed of, for example, polycarbonate or any other materials that are suitable for use with a R2R process. Fluidics channels layer 220 is the layer of fluidics layers 200 at which the flow of all liquids is facilitated. Namely, all PCR and sequencing operations take place at fluidics channels layer 220. PCR operations take place in PCR channels 222 at PCR region 270. PCR output channel 224 supplies reagent mixing and distribution region 275. Reagent distribution takes place using reagent channels 226 at reagent mixing and distribution region 275. The thirteen reagent channels 226 are patterned to supply rotatable valve assembly 1410. Sequencing feed channel 228 supplies the inlet of sequencing chamber 258 of sequencing chamber layer 250 shown in FIGS. 58A and 58B. Then, sequencing outlet channel 230 is fluidly connected to the outlet of sequencing chamber 258.

Figure 57A:
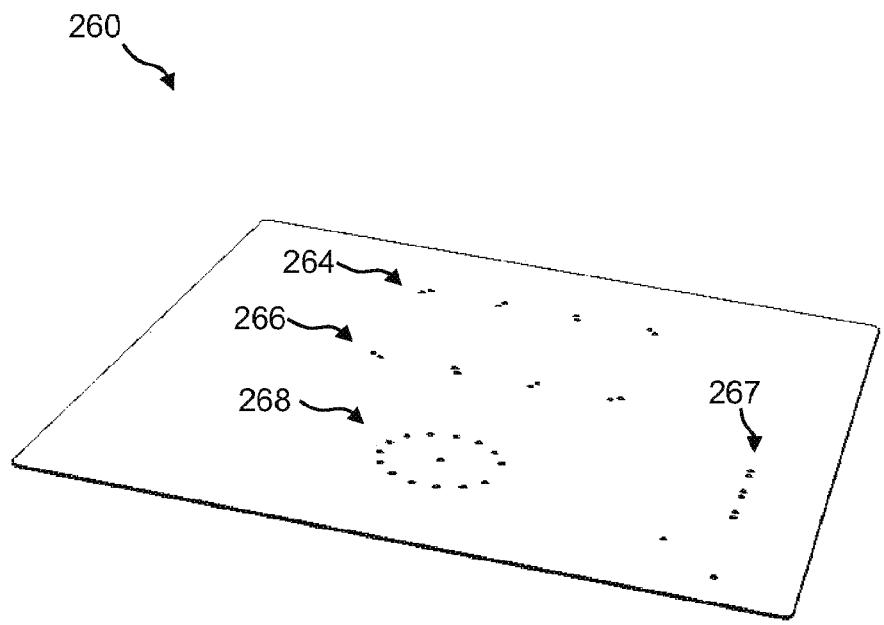
FIGS. 57A and 57B show a perspective view and plan view, respectively, of the flexible PCB layer of the fluidics layers shown in FIG. 15 and FIG. 27.
Figure 57B:
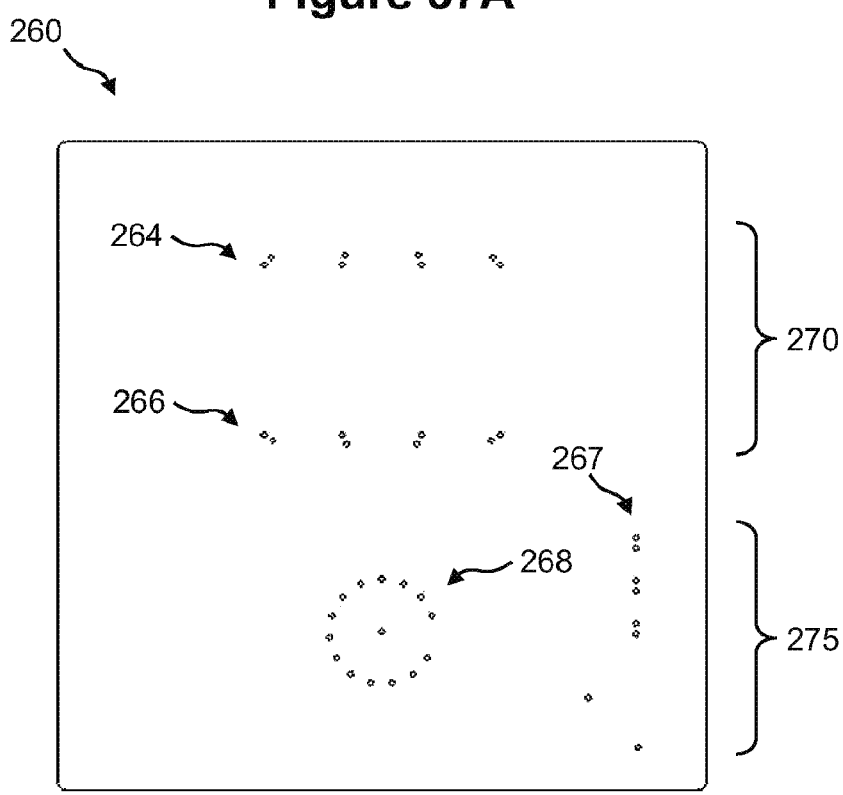

FIGS. 57A and 57B show a perspective view and plan view, respectively, of flexible PCB layer 260 of fluidics layers 200 shown in FIG. 15 and FIG. 27. Again, flexible PCB layer 260 can be formed of, for example, polyimide or any other materials that are suitable for use with a R2R process. Flexible PCB layer 260 includes a set of openings (or holes) 264 that correlate to the inlets/outlets of membrane valves 242. Flexible PCB layer 260 also includes a set of openings (or holes) 266 that correlate to the inlets/outlets of membrane valves 244. If membrane valves 246 are present, flexible PCB layer 260 includes a set of openings (or holes) 267 that correlate to the inlets/outlets of membrane valves 246. Further, flexible PCB layer 260 includes a set of openings 268 that substantially align with and provide fluid paths to rotatable valve assembly 1410.

Figure 58A:
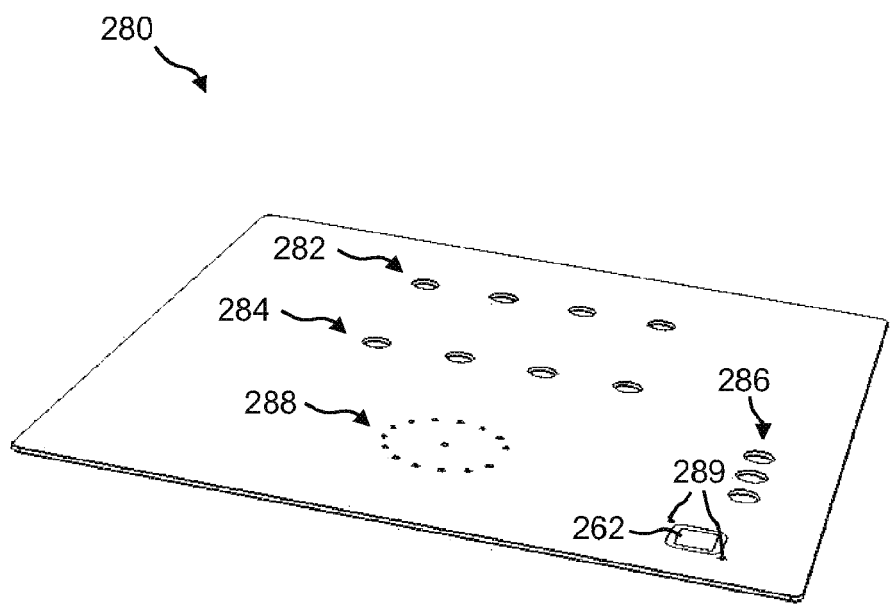
FIGS. 58A and 58B show a perspective view and plan view, respectively, of the sequencing chamber bottom layer of the fluidics layers shown in FIG. 15 and FIG. 27.
Figure 58B:
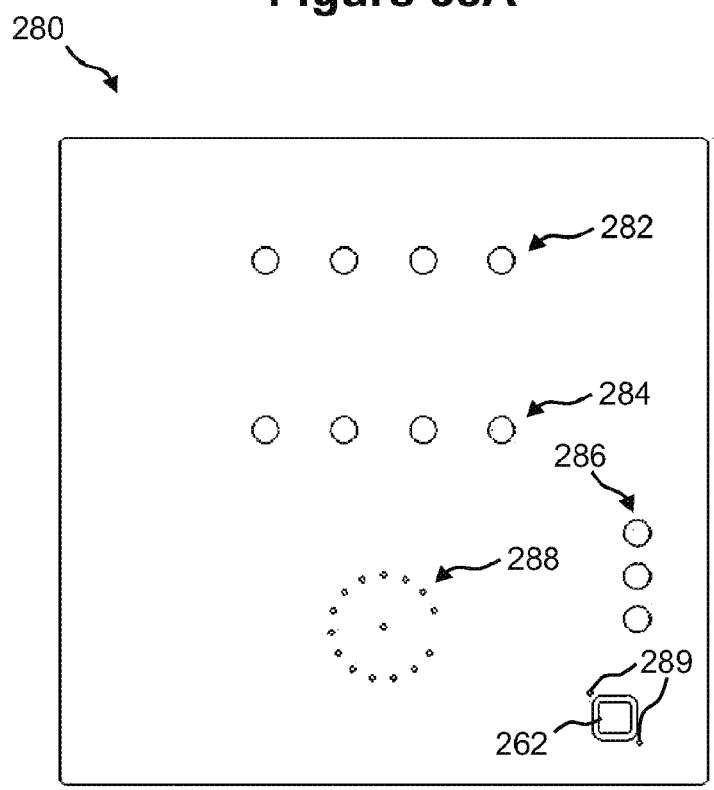

FIGS. 58A and 58B show a perspective view and plan view, respectively, of sequencing chamber bottom layer 280 of fluidics layers 200 shown in FIG. 15 and FIG. 27. Again, sequencing chamber bottom layer 280 can be formed of, for example, polycarbonate or any other materials that are suitable for use with a R2R process. Sequencing chamber bottom layer 280 includes a set of openings 282 for forming membrane valves 242 within the stack of fluidics layers 200. Sequencing chamber bottom layer 280 also includes a set of openings 284 for forming membrane valves 244 within the stack of fluidics layers 200. If membrane valves 246 are present, sequencing chamber bottom layer 280 includes a set of openings 286 for forming membrane valves 246 within the stack of fluidics layers 200. Further, sequencing chamber bottom layer 280 includes a set of openings 288 that substantially align with and provide fluid paths to rotatable valve assembly 1410. Additionally, sequencing chamber bottom layer 280 includes a pair of openings 289, which fluidly couple to sequencing chamber 258 of sequencing chamber layer 250.

Sequencing chamber bottom layer 280 is the layer of fluidics layers 200 at which the CMOS technology is integrated. Namely, CMOS image sensor 262 is installed on sequencing chamber bottom layer 280. The position of CMOS image sensor 262 substantially corresponds to the position of sequencing chamber 258 of sequencing chamber layer 250.

Figure 59A:
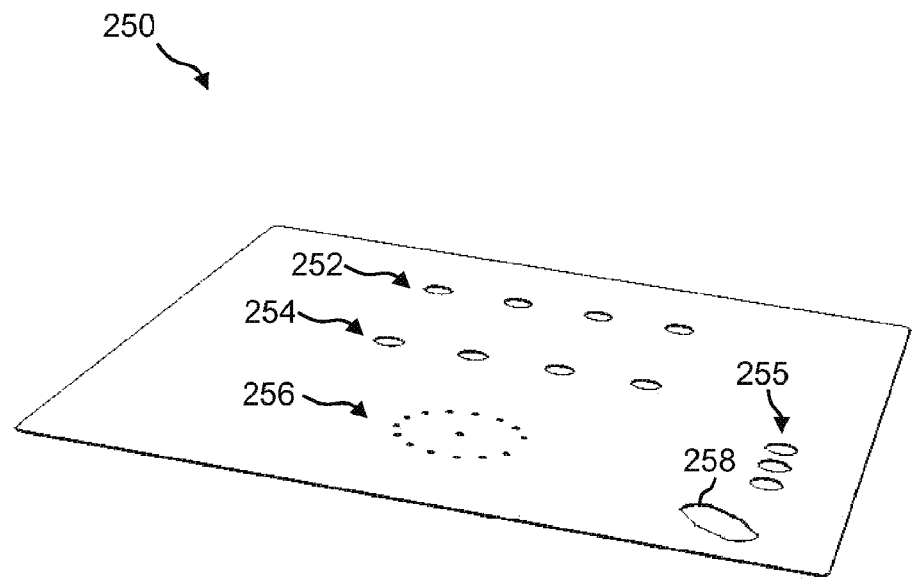
FIGS. 59A and 59B show a perspective view and plan view, respectively, of the sequencing chamber layer of the fluidics layers shown in FIG. 15 and FIG. 27.
Figure 59B:
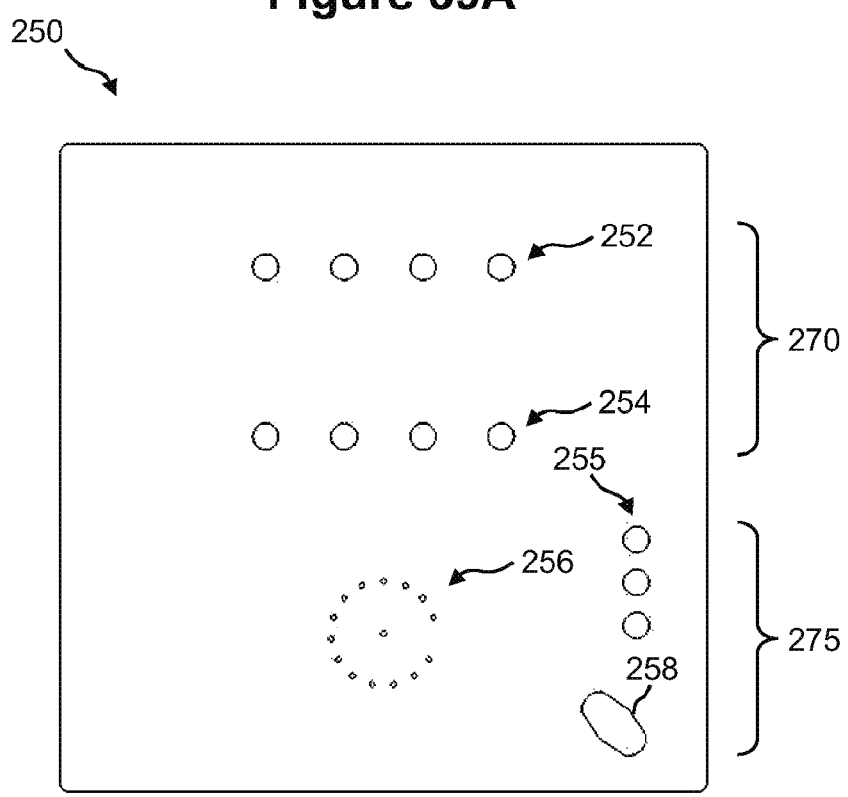

FIGS. 59A and 59B show a perspective view and plan view, respectively, of sequencing chamber layer 250 of fluidics layers 200 shown in FIG. 15 and FIG. 27. Again, sequencing chamber layer 250 can be formed of, for example, polycarbonate or any other materials that are suitable for use with a R2R process. Sequencing chamber layer 250 is the layer of fluidics layers 200 at which sequencing operations occur; namely, using sequencing chamber 258.

Sequencing chamber layer 250 includes a set of openings 252 for forming membrane valves 242 within the stack of fluidics layers 200. Sequencing chamber layer 250 also includes a set of openings 254 for forming membrane valves 244 within the stack of fluidics layers 200. If membrane valves 246 are present, sequencing chamber layer 250 includes a set of openings 255 for forming membrane valves 246 within the stack of fluidics layers 200. Further, sequencing chamber layer 250 includes a set of openings 256 that substantially align with and provide fluid paths to rotatable valve assembly 1410.

Figure 60A:
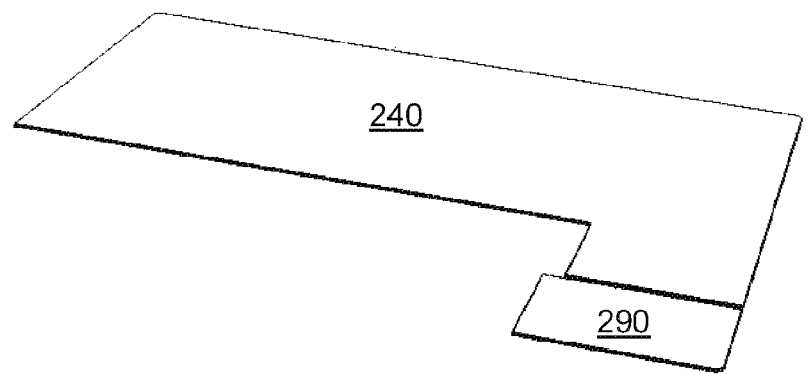
FIGS. 60A and 60B show a perspective view and plan view, respectively, of the membrane layer and the sequencing chamber top layer of the fluidics layers shown in FIG. 15 and FIG. 27.
Figure 60B:
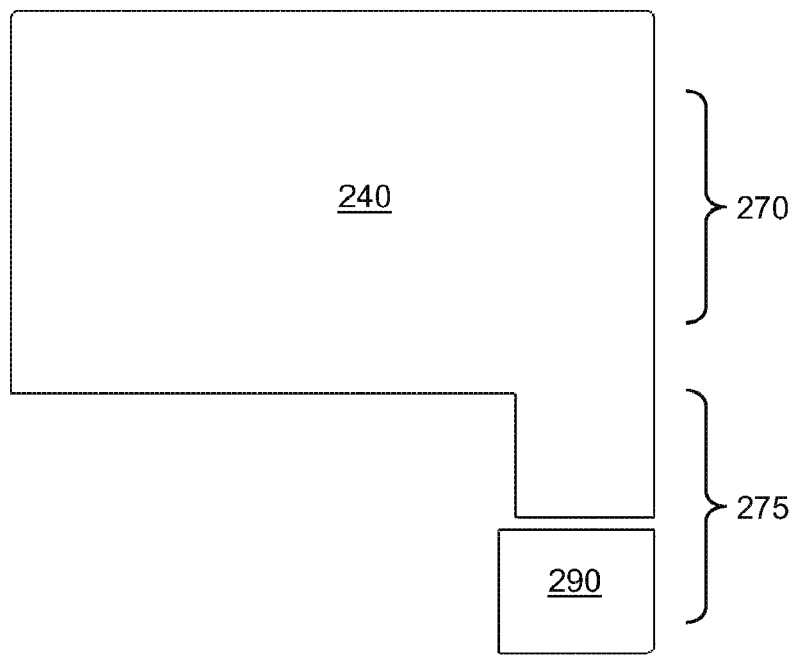

FIGS. 60A and 60B show a perspective view and plan view, respectively, of membrane layer 240 and sequencing chamber top layer 290 of fluidics layers 200 shown in FIG. 15 and FIG. 27. Membrane layer 240 can be formed of, for example, silicone elastomer, while sequencing chamber top layer 290 can be formed of, for example, COC. Membrane layer 240 serves as the elastic membrane for opening and closing membrane valves 242, 244, and 246 within the stack of fluidics layers 200, wherein membrane valves 242, 244, and 246 are created by the combination of, in order, flexible PCB layer 260, sequencing chamber bottom layer 280, sequencing chamber layer 250, and membrane layer 240. FIGS. 60A and 60B also shows sequencing chamber top layer 290, which is used to cover sequencing chamber 258 of sequencing chamber layer 250.

Figure 61A:
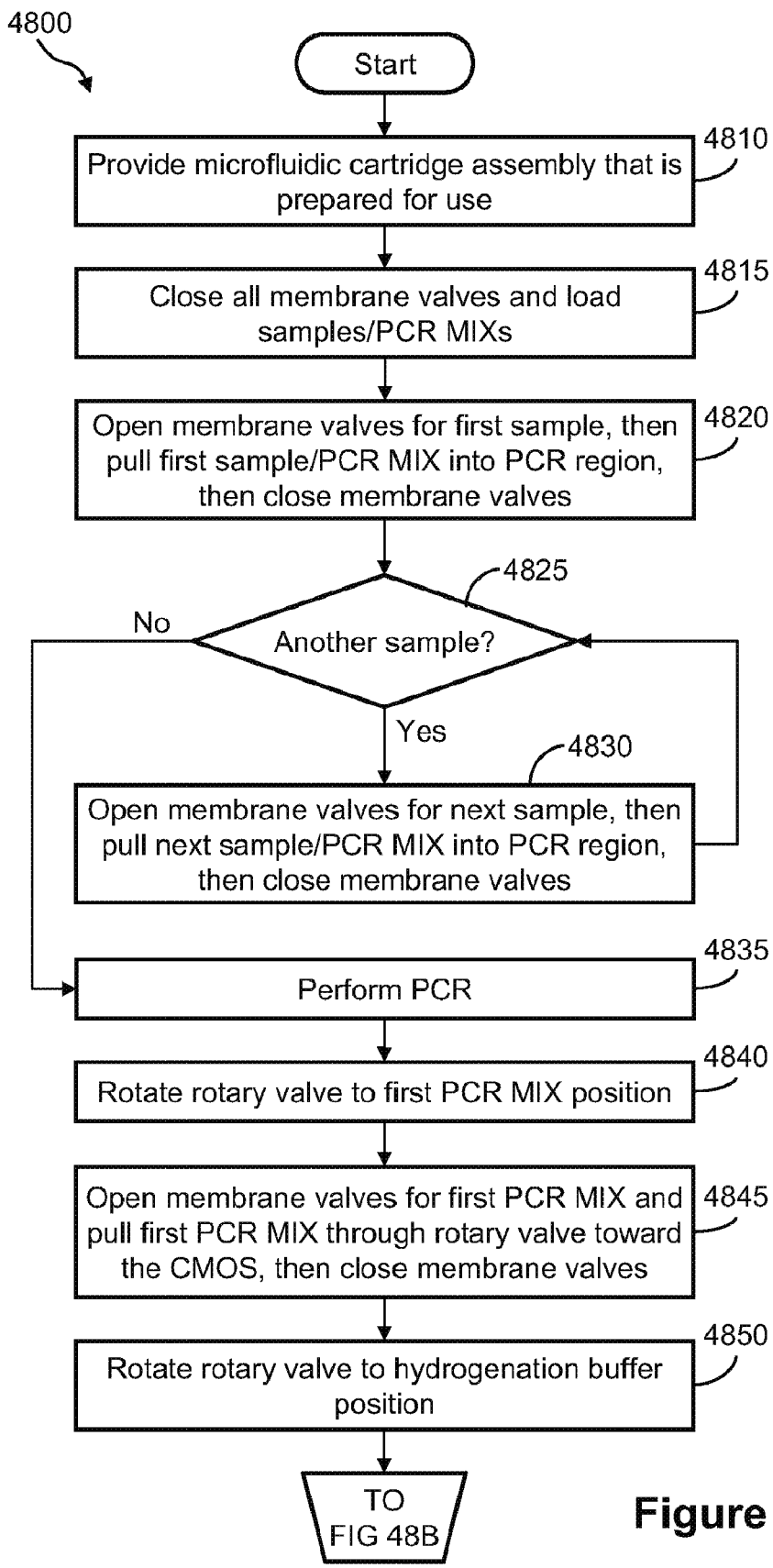
FIGS. 61A and 61B illustrate a flow diagram of an example of a method of using the microfluidic cartridge assembly to perform multiplex PCR and downstream mixing needed for sequencing.
Figure 61B:
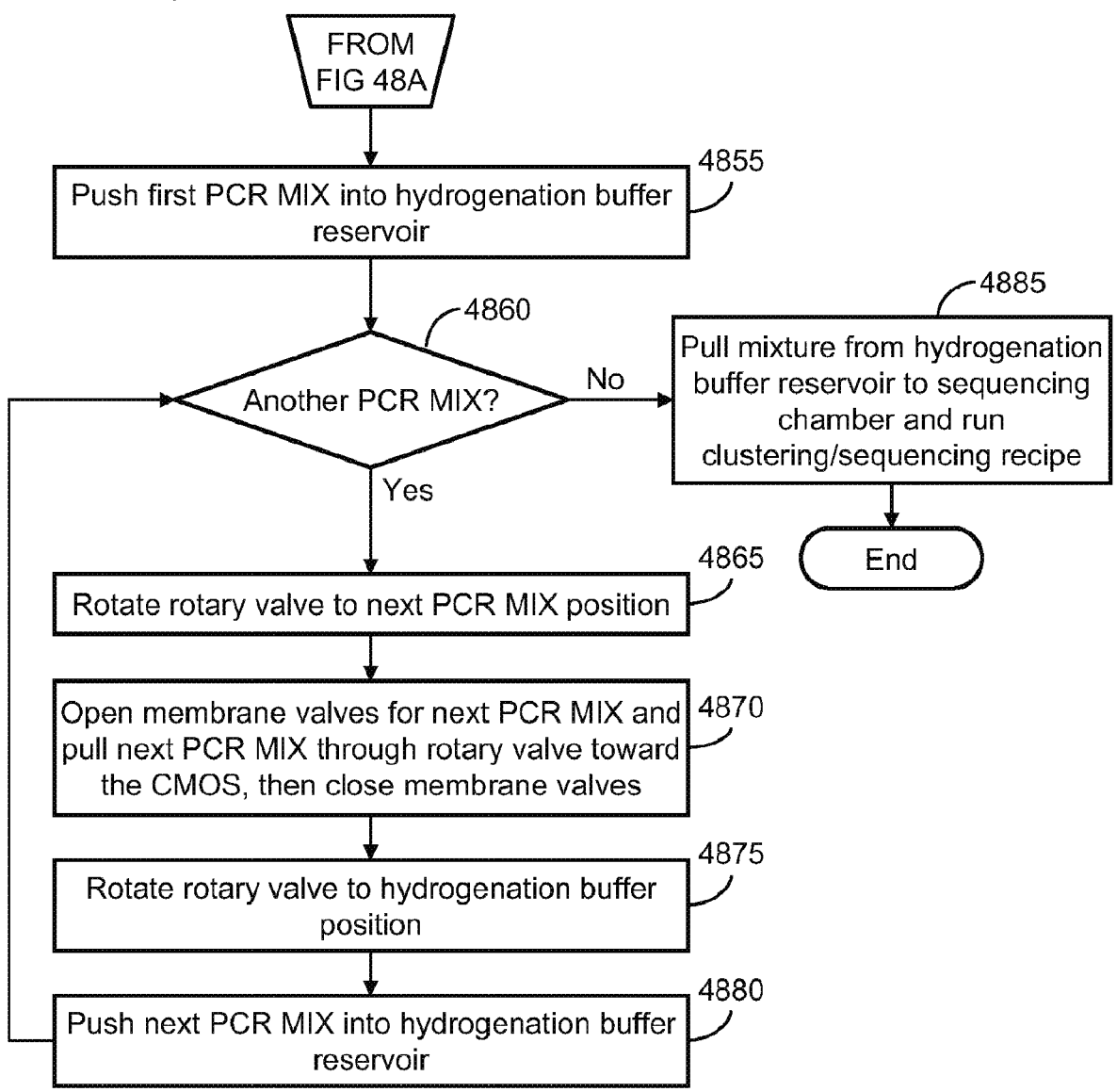

FIGS. 61A and 61B illustrate a flow diagram of an example of a method 4800 of using microfluidic cartridge assembly 1200 to perform multiplex PCR and the downstream mixing needed for sequencing. Because microfluidic cartridge assembly 1200 is based on microfluidic cartridge 1100 shown in FIG. 24, microfluidic cartridge assembly 1200 is configured for 4× sample multiplexing. Further, in method 4800 the thirteen reagent reservoirs 1216 are designated reagent reservoirs 1216a, 1216b, 1216c, 1216d, 1216e, 1216f, 1216g, 1216h, 1216i, 1216j, 1216k, 1216l, and 1216m. Further, method 4800 utilizes outlet pump 1114, which is fluidly connected to microfluidic cartridge assembly 1200. Outlet pump 1114 is positioned downstream of sequencing chamber 258. Outlet pump 1114 is capable of providing both positive pressure and negative pressure (i.e., vacuum pressure). Method 4800 includes, but is not limited to, the following steps.

At a step 4810, microfluidic cartridge assembly 1200 is provided that has been prepared for use. Namely, microfluidic cartridge assembly 1200 is provided with one or more of its reservoirs loaded with the desired liquids. For example, reagent reservoirs 1216 can be filled with the same or different reagent liquid. In one example, all of the reagent reservoirs 1216a-m are filled with hydrogenation buffer (HT1). Method 4800 proceeds to step 4815.

At a step 4815, all membrane valves are closed and then the samples/PCR MIX are loaded. "PCR MIX" means a PCR Master Mix that is optimized for use in routine PCR for amplifying DNA templates. In this step, membrane valves 242a and 244a are closed, membrane valves 242b and 244b are closed, membrane valves 242c and 244c are closed, and membrane valves 242d and 244d are closed. In this way, PCR channels 222a, 222b, 222c, and 222d are all completely sealed off. Then, a first sample liquid is mixed with a PCR MIX (hereafter called sample/PCR_MIX1) and loaded into sample loading port 1214a. A second sample liquid is mixed with a PCR MIX (hereafter called sample/PCR_MIX2) and loaded into sample loading port 1214b. A third sample liquid is mixed with a PCR MIX (hereafter called sample/PCR_MIX3) and loaded into sample loading port 1214c. A fourth sample liquid is mixed with a PCR MIX (hereafter called sample/PCR_MIX4) and loaded into sample loading port 1214d. At the completion of this step, a volume of sample/PCR MIX is sitting in each of the sample loading ports 1214 and ready for processing. Method 4800 proceeds to step 4820.

At a step 4820, the membrane valves for the first sample are opened. Then, the first sample is pulled into the PCR region. Then, the membrane valves for the first sample are closed. For example, membrane valves 242a and 244a for PCR channel 222a are opened. Then, using outlet pump 1114, sample/PCR_MIX1 is pulled into PCR channel 222a. Then, membrane valves 242a and 244a for PCR channel 222a are closed, wherein a volume of sample/PCR_MIX1 is now sealed inside of PCR channel 222a. Method 4800 proceeds to step 4825.

At a decision step 4825, it is determined whether another sample awaits to be loaded into the PCR region, i.e., into PCR region 270. If yes, then method 4800 proceeds to step 4830. If no, then method 4800 proceeds to step 4835.

At a step 4830, the membrane valves for the next sample are opened. Then, the next sample is pulled into the PCR region. Then, the membrane valves for the next sample are closed. In one example, membrane valves 242b and 244b for PCR channel 222b are opened. Then, using outlet pump 1114, sample/PCR_MIX2 is pulled into PCR channel 222b. Then, membrane valves 242b and 244b for PCR channel 222b are closed, wherein a volume of sample/PCR_MIX2 is now sealed inside of PCR channel 222b.

In another example, membrane valves 242c and 244c for PCR channel 222c are opened. Then, using outlet pump 1114, sample/PCR_MIX3 is pulled into PCR channel 222c. Then, membrane valves 242c and 244c for PCR channel 222c are closed, wherein a volume of sample/PCR_MIX3 is now sealed inside of PCR channel 222c.

In yet another example, membrane valves 242d and 244d for PCR channel 222d are opened. Then, using outlet pump 1114, sample/PCR_MIX4 is pulled into PCR channel 222d. Then, membrane valves 242d and 244d for PCR channel 222d are closed, wherein a volume of sample/PCR_MIX4 is now sealed inside of PCR channel 222d.

Method 4800 returns to step 4825.

At a step 4835, with sample/PCR_MIX1 in PCR channel 222a, sample/PCR_MIX2 in PCR channel 222b, sample/PCR_MIX3 in PCR channel 222c, and sample/PCR_MIX4 in PCR channel 222d, PCR operations are performed. Upon completion of the PCR operations, sample/PCR_MIX1 is now referred to as PCR_MIX1, sample/PCR_MIX2 is now referred to as PCR_MIX2, sample/PCR_MIX3 is now referred to as PCR_MIX3, and sample/PCR_MIX4 is now referred to as PCR_MIX4. Method 4800 proceeds to step 4840.

At a step 4840, the rotatable valve is rotated to the first PRC MIX position. For example, by rotating grip portion 1240 of rotatable valve assembly 1410, the position of rotatable valve assembly 1410 is set to PCR channel 222a, which is holding PCR_MIX1. Method 4800 proceeds to step 4845.

At a step 4845, the membrane valves for the first PCR MIX are opened. Then, the first PCR MIX is pulled through the rotatable valve toward the CMOS device. Then, the membrane valves for the first PCR MIX are closed. For example, membrane valves 242a and 244a for PCR channel 222a are opened. Then, using outlet pump 1114, PCR_MIX1 is pulled out of PCR channel 222a, into PCR output channel 224, and through rotatable valve assembly 1410. Then, membrane valves 242a and 244a are closed. Method 4800 proceeds to step 4850.

At a step 4850, the rotatable valve is rotated to the hydrogenation buffer (HT1) position, meaning to the reagent reservoir 1216 that is holding HT1. In method 4800, at least one reagent reservoir 1216 is holding a volume of HT1. By way of example, reagent reservoir 1216k is holding the volume of HT1. Therefore, by rotating grip portion 1240 of rotatable valve assembly 1410, the position of rotatable valve assembly 1410 is now set to reagent reservoir 1216k, which is holding the HT1. Method 4800 proceeds to step 4855.

At a step 4855, the first PCR MIX is pushed into the HT1 reservoir. For example, using outlet pump 1114, PCR_MIX1 is pushed through rotatable valve assembly 1410 and into reagent reservoir 1216k and mixed with the HT1 therein. Method 4800 proceeds to step 4860.

At a decision step 4860, it is determined whether another PCR MIX awaits to be mixed with the HT1. If yes, then method 4800 proceeds to step 4865. If no, then method 4800 proceeds to step 4885.

At a step 4865, the rotatable valve is rotated to the next PRC MIX position. In one example, by rotating grip portion 1240 of rotatable valve assembly 1410, the position of rotatable valve assembly 1410 is set to PCR channel 222b, which is holding PCR_MIX2. In another example, by rotating grip portion 1240 of rotatable valve assembly 1410, the position of rotatable valve assembly 1410 is set to PCR channel 222c, which is holding PCR_MIX3. In yet another example, by rotating grip portion 1240 of rotatable valve assembly 1410, the position of rotatable valve assembly 1410 is set to PCR channel 222d, which is holding PCR_MIX4. Method 4800 proceeds to step 4870.

At a step 4870, the membrane valves for the next PCR MIX are opened. Then, the next PCR MIX is pulled through the rotatable valve toward the CMOS device. Then, the membrane valves for the next PCR MIX are closed. In one example, membrane valves 242b and 244b for PCR channel 222b are opened. Then, using outlet pump 1114, PCR_MIX2 is pulled out of PCR channel 222b, into PCR output channel 224, and through rotatable valve assembly 1410. Then, membrane valves 242b and 244b are closed. In another example, membrane valves 242c and 244c for PCR channel 222c are opened. Then, using outlet pump 1114, PCR_MIX3 is pulled out of PCR channel 222c, into PCR output channel 224, and through rotatable valve assembly 1410. Then, membrane valves 242c and 244c are closed. In yet another example, membrane valves 242d and 244d for PCR channel 222d are opened. Then, using outlet pump 1114, PCR_MIX4 is pulled out of PCR channel 222d, into PCR output channel 224, and through rotatable valve assembly 1410. Then, membrane valves 242d and 244d are closed. Method 4800 proceeds to step 4875.

At a step 4875, the rotatable valve is rotated to the HT1 position. For example, by rotating grip portion 1240 of rotatable valve assembly 1410, the position of rotatable valve assembly 1410 is returned to reagent reservoir 1216k, which is holding the HT1. Method 4800 proceeds to step 4880.

At a step 4880, the next PCR MIX is pushed into the HT1 reservoir. In one example, using outlet pump 1114, PCR_MIX2 is pushed through rotatable valve assembly 1410 and into reagent reservoir 1216k and mixed with the HT1 therein. In another example, using outlet pump 1114, PCR_MIX3 is pushed through rotatable valve assembly 1410 and into reagent reservoir 1216k and mixed with the HT1 therein. In yet another example, using outlet pump 1114, PCR_MIX4 is pushed through rotatable valve assembly 1410 and into reagent reservoir 1216k and mixed with the HT1 therein. Method 4800 returns to step 4860.

At a step 4885, the mixture from the HT1 reservoir is pulled into the sequencing chamber and the clustering/sequencing recipe is executed. For example, with reagent reservoir 1216k now holding a mixture of the HT1, PCR_MIX1, PCR_MIX2, PCR_MIX3, and PCR_MIX4, this mixture is pulled out of reagent reservoir 1216k, then pulled along sequencing feed channel 228 and into sequencing chamber 258. Then, using CMOS image sensor 262, the clustering/sequencing recipe is executed. Method 4800 ends.

One or more embodiments may include CMOS Flow Cell having an accessible biosensor active area. For instance, a CMOS flow cell may be designed as a single use consumable item. Accordingly, it may be beneficial for the CMOS flow cell to be a small and inexpensive device. In a small CMOS flow cell it is important to use as much of the biosensor active area as possible. However, current CMOS flow cell designs do not allow for 100 percent utilization of the biosensor active area. Therefore, new approaches are needed to provide increased utilization of the biosensor active area in a CMOS flow cell. Embodiments set forth herein may include a CMOS flow cell, wherein most or up to about 100% of the biosensor active area is accessible for reagent delivery and illumination, as shown and described herein below with reference to FIGS. 62 through 75.

Figure 62:
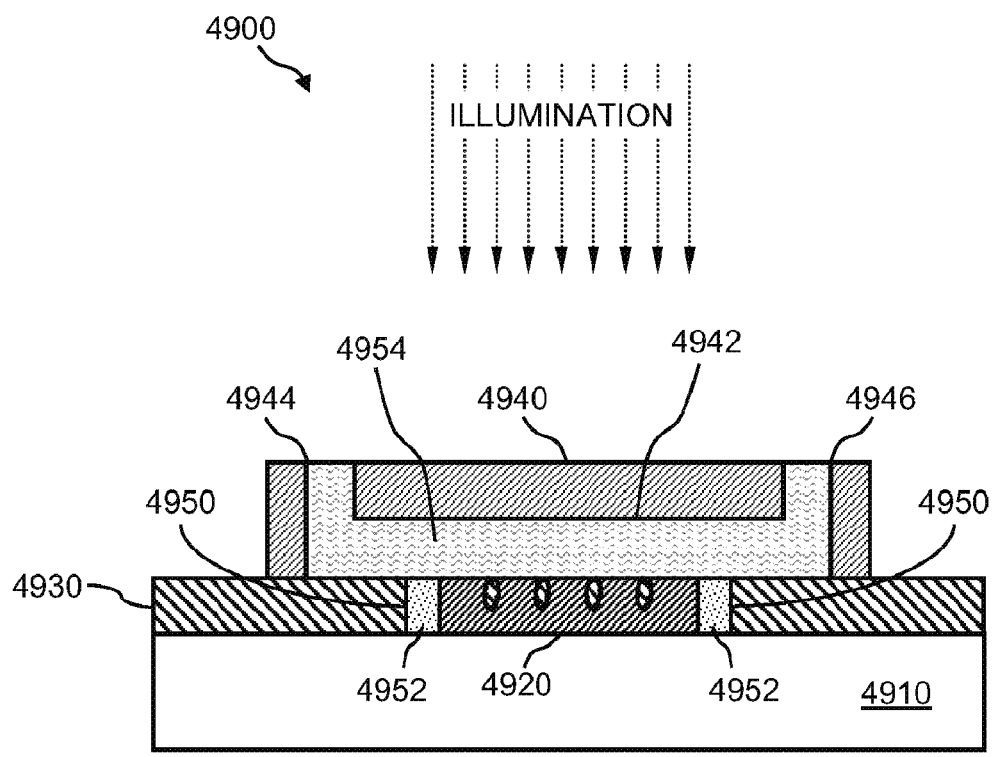
FIG. 62 illustrates a side view of an example of a CMOS flow cell, wherein up to about 100% of the biosensor active area is accessible for reagent delivery and illumination.

FIG. 62 illustrates a side view of an example of a CMOS flow cell 4900, wherein most or up to about 100% of the biosensor active area is accessible for reagent delivery and illumination. CMOS flow cell 4900 includes a PCB substrate 4910, which is, for example, a flexible PCB substrate. Atop PCB substrate 4910 is a CMOS biosensor device 4920. CMOS biosensor device 4920 is a CMOS image sensor with a biolayer thereon. Also atop PCB substrate 4910 and surrounding CMOS biosensor device 4920 is a laminate film 4930. Laminate film 4930 can be formed, for example, of epoxy, polyimide or other plastic film, silicon, Kapton®, Bismaleimide-Triazine (BT) substrates, and the like. PCB substrate 4910 and laminate film 4930 can be formed using flexible PCB technology. A planarization surface can also be created by machining a cavity in the PCB substrate The purpose of laminate film 4930 is to provide an extended surface around the perimeter of CMOS biosensor device 4920 that is substantially planar with the top of CMOS biosensor device 4920. In one example, if the die thickness of CMOS biosensor device 4920 is about 100 µm, then the thickness of laminate film 4930 is about 100 µm±about 5 µm.

A slight gap between PCB substrate 4910 and laminate film 4930 forms a trench or channel 4950 around the perimeter of CMOS biosensor device 4920. The width of trench or channel 4950 can be, for example, from about 100 µm to about 1000 µm. Trench or channel 4950 is filled with filler material 4952 in order to form a substantially continuous planar surface across both CMOS biosensor device 4920 and laminate film 4930. Filler material 4952 is a material that does not interfere with the reactions that take place atop CMOS biosensor device 4920. Filler material 4952 can be, for example, ultraviolet (UV)-cured epoxy, thermal-cured epoxy, or the like.

Atop CMOS biosensor device 4920 and laminate film 4930 is a flow cell lid 4940 in which a flow channel 4942 is integrated. Further, flow cell lid 4940 includes a first port 4944 and a second port 4946 that provide inlet/outlet ports to flow channel 4942. Flow cell lid 4940 is formed of a material that is optically transparent and has low or no autoflourescence in the part of the spectrum that will be used for analytical detection, such as, but not limited to, cyclic olefin copolymer (COC). The overall thickness of flow cell lid 4940 can be, for example, from about 300 µm to about 1000 µm. A bond area exists outside of flow channel 4942 for bonding flow cell lid 4940 to laminate film 4930. Bonding can be via a low autoflourescence adhesive.

Because a substantially continuous planar surface exists across both CMOS biosensor device 4920 and laminate film 4930, the area of flow channel 4942 within flow cell lid 4940 can be sized to span across the full CMOS biosensor device 4920; namely, it can span about 100% of the biosensor active area. In one example, if the die size of CMOS biosensor device 4920 is about 8 mm×9 mm, then the active area is about 7 mm×8 mm. However, the die size of CMOS biosensor device 4920 can range, for example, up to about 25 mm×25 mm, with a proportionately larger active area.

FIG. 62 shows, for example, a reagent fluid 4954 filling flow channel 4942. Chemical reactions take place in reagent fluid 4954 in flow channel 4942, which is atop CMOS biosensor device 4920. When illuminated through flow cell lid 4940, CMOS biosensor device 4920 is used to sense the chemical reactions that take place in flow channel 4942. Electrical connections (not shown) are provided through PCB substrate 4910 for acquiring the signals from CMOS biosensor device 4920. In CMOS flow cell 4900, about 100% of the biosensor active area of CMOS biosensor device 4920 is accessible for reagent delivery and illumination.

Figure 63:
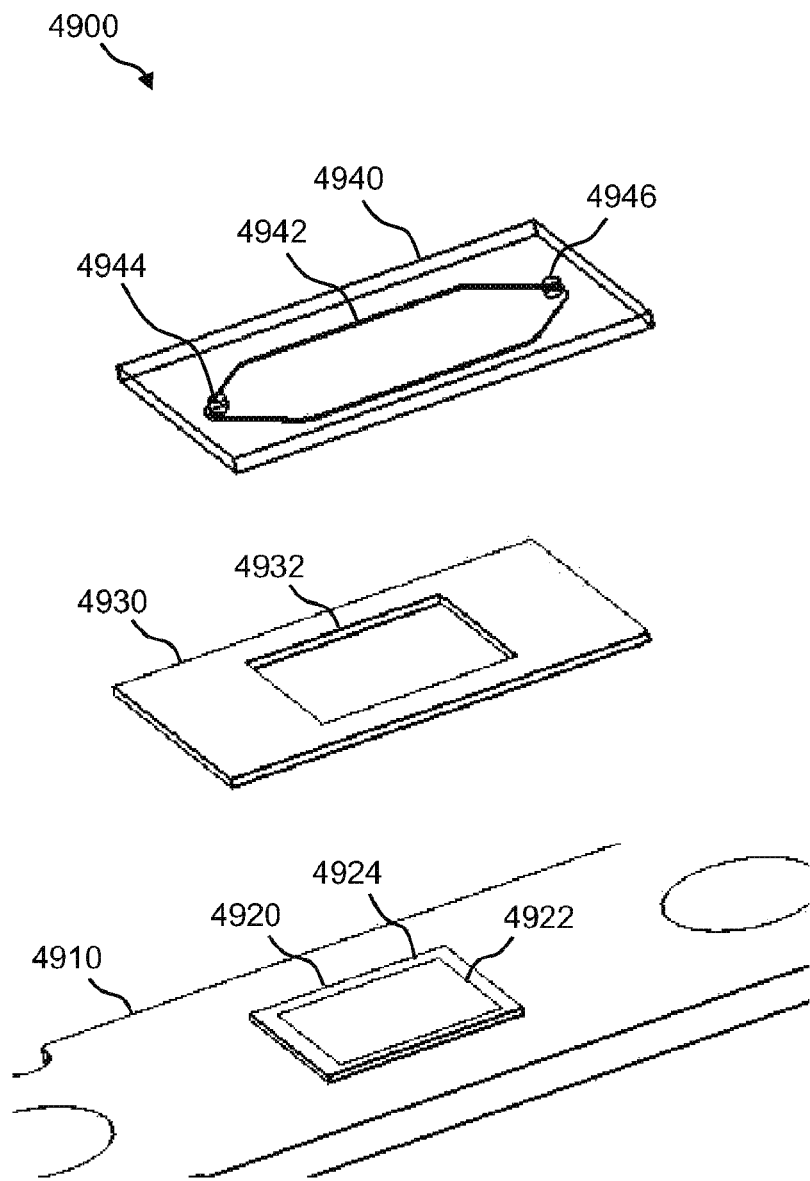
FIG. 63 illustrates an exploded view of an example of one instantiation of the CMOS flow cell shown in FIG. 49.
Figure 64:
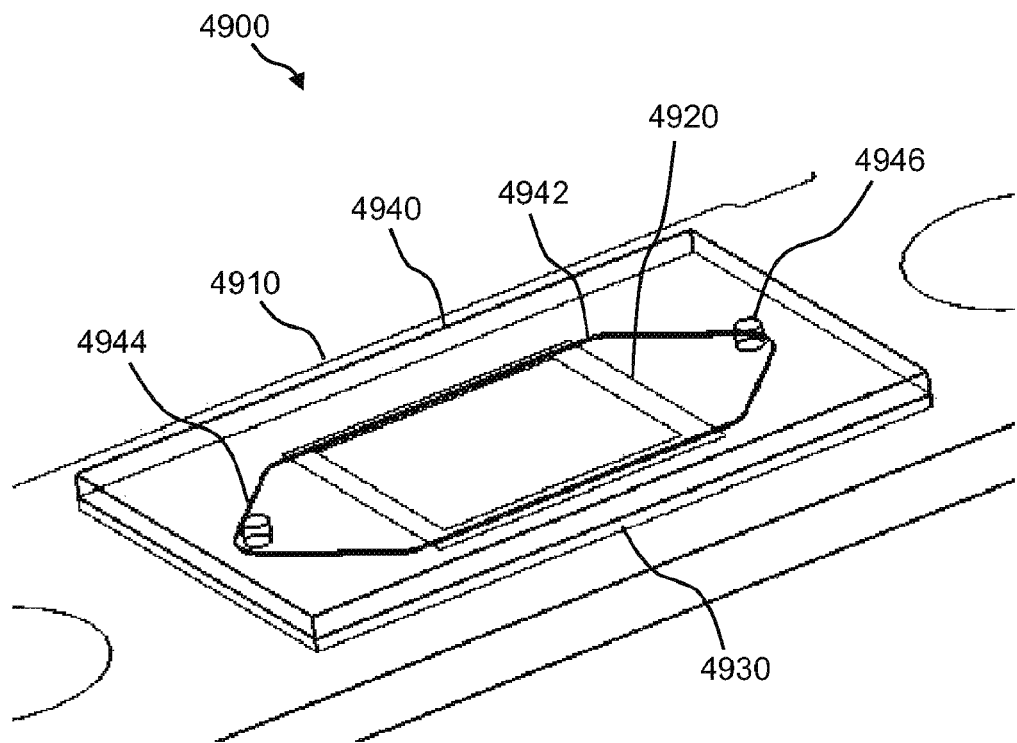
FIGS. 64 and 65 illustrate a perspective view and a side view, respectively, of the CMOS flow cell shown in FIG. 63 when fully assembled.
Figure 65:
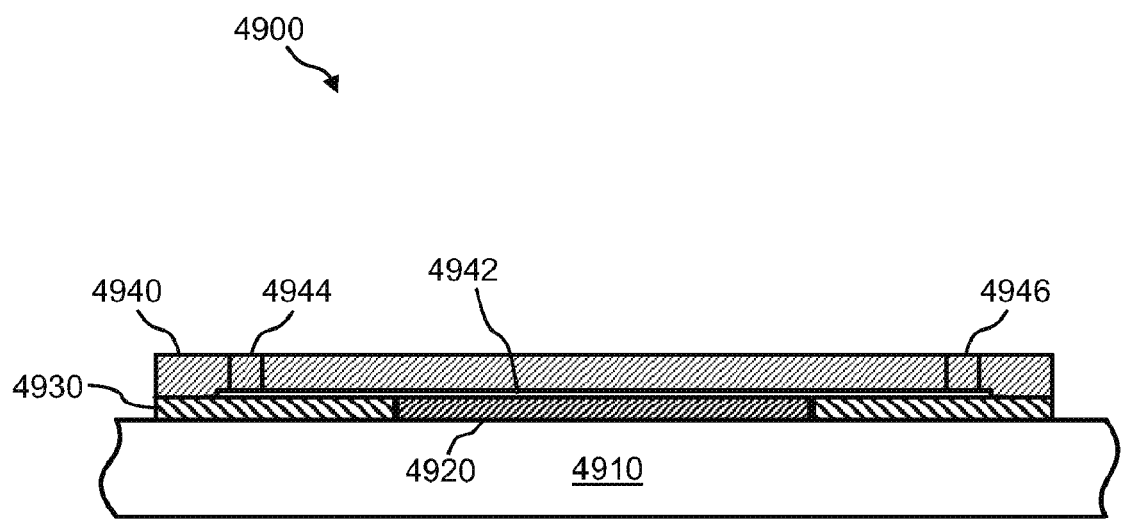

FIG. 63 illustrates an exploded view of an example of one instantiation of CMOS flow cell 4900 shown in FIG. 62. FIG. 63 shows that CMOS biosensor device 4920 includes an active area 4922. Any portion of CMOS biosensor device 4920 outside of active area 4922 is inactive area 4924. CMOS biosensor device 4920 can be attached to PCB substrate 4910 using, for example, flip-chip technology. Further, laminate film 4930 includes an opening or window 4932 that is sized for receiving CMOS biosensor device 4920 when laminated against PCB substrate 4910. Opening or window 4932 is provided in laminate film 4930 in advance of laminating laminate film 4930 to PCB substrate 4910. When flow cell lid 4940 is bonded to laminate film 4930, flow channel 4942 substantially aligns with CMOS biosensor device 4920 and its area extends beyond the area of CMOS biosensor device 4920. In FIG. 63, flow cell lid 4940 is shown as transparent. FIGS. 64 and 65 illustrate a perspective view and a side view, respectively, of CMOS flow cell 4900 shown in FIG. 63 when fully assembled.

Figure 66:
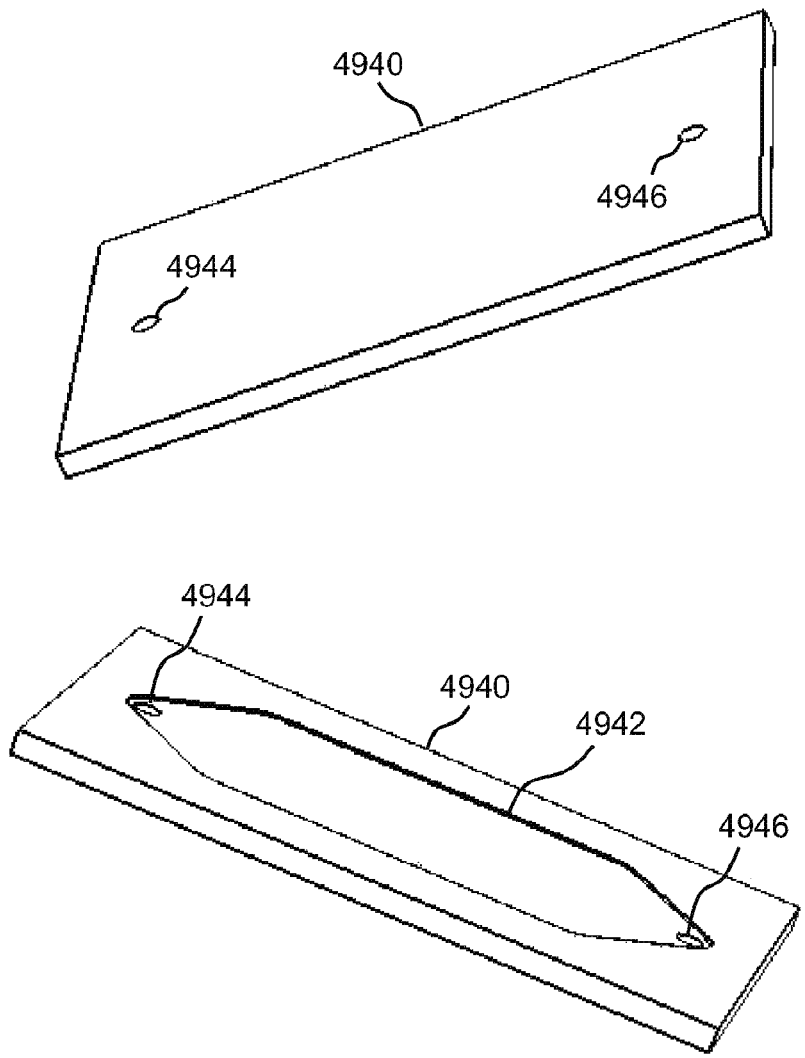
FIG. 66 illustrates perspective views of an example of the flow cell lid of the CMOS flow cell shown in FIGS. 63, 64, and 65.

FIG. 66 illustrates perspective views of an example of flow cell lid 4940 of CMOS flow cell 4900 shown in FIGS. 63, 64, and 65. Namely, FIG. 66 shows a top and bottom perspective view of flow cell lid 4940 of CMOS flow cell 4900 shown in FIGS. 63, 64, and 65. In this example, the diameter of first port 4944 and second port 4946 can be about 750 µm. Further, the depth or height of flow channel 4942 can be about 100 µm.

FIGS. 67, 68, 69, and 70 illustrate an example of a process of providing an extended planar surface in a CMOS flow cell, upon which a flow cell lid may be mounted.

Figure 67:
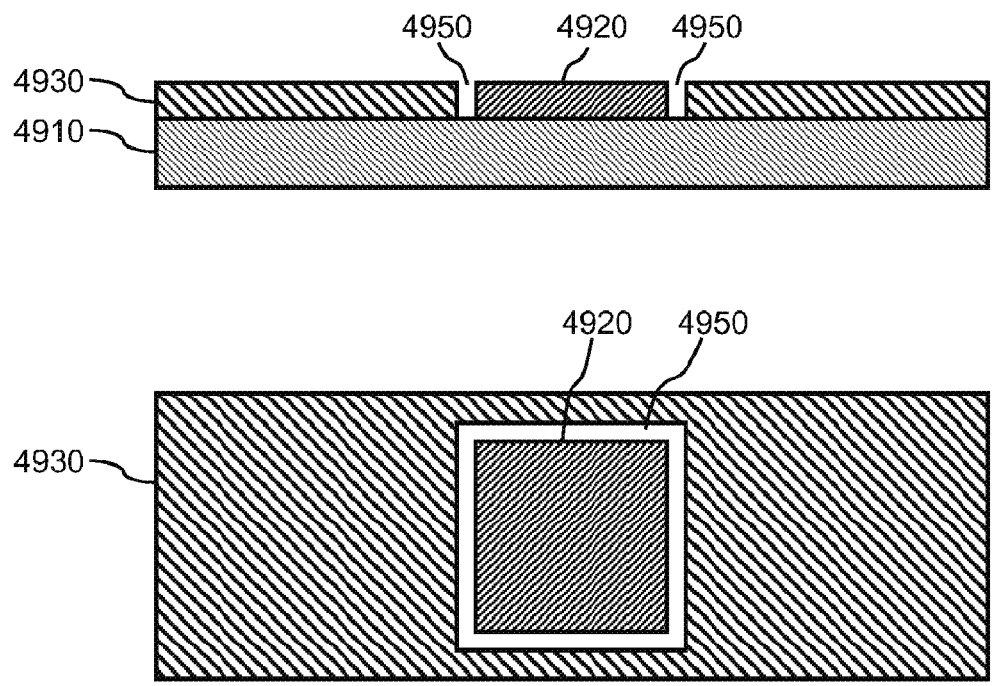
FIGS. 67, 68, 69, and 70 illustrate an example of a process of providing an extended planar surface in the CMOS flow cell, upon which the flow cell lid may be mounted.

In a first step and referring now to FIG. 67, laminate film 4930 and CMOS biosensor device 4920 are provide atop PCB substrate 4910. Trench or channel 4950 exists around the perimeter of CMOS biosensor device 4920. Trench or channel 4950 exists because opening or window 4932 in laminate film 4930 is slightly larger than CMOS biosensor device 4920.

Figure 68:
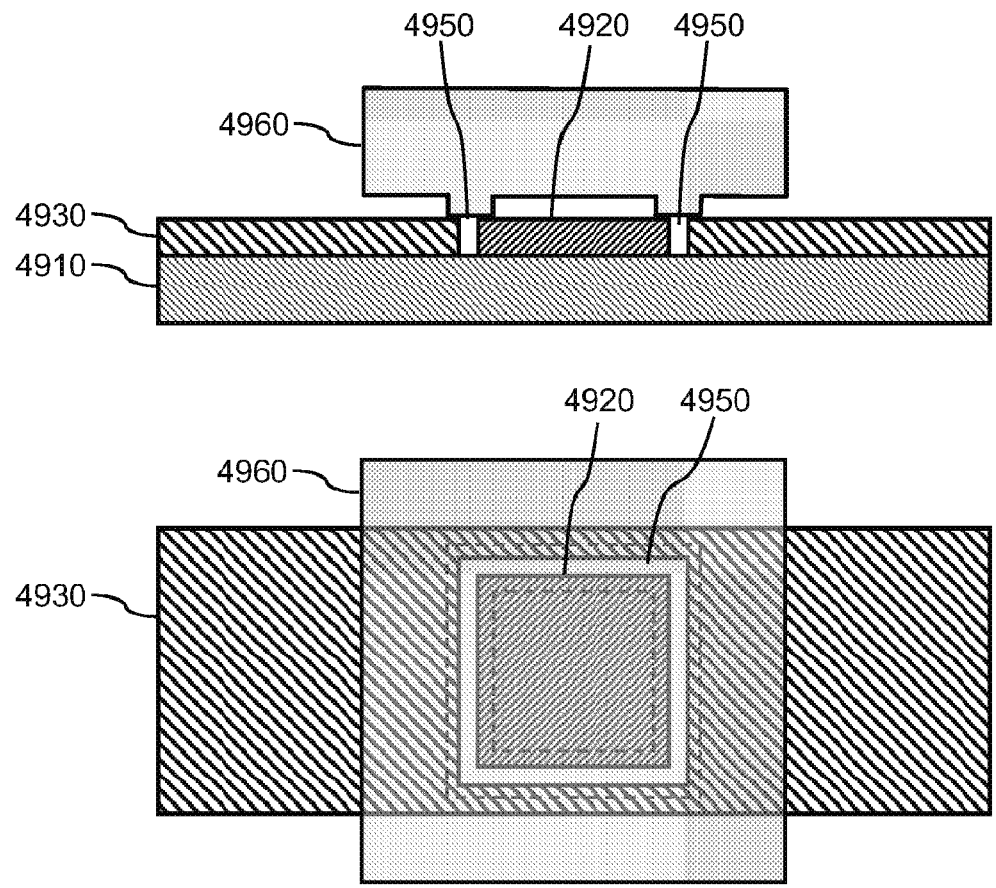

In a next step and referring now to FIG. 68, the upper side of trench or channel 4950 is sealed with, for example, an optically transparent elastomer 4960 that has features for fitting tightly against trench or channel 4950. Elastomer 4960 is optically transparent so that UV light can pass therethrough. The purpose of elastomer 4960 is to block the top of trench or channel 4950 in preparation for filling.

Figure 69:
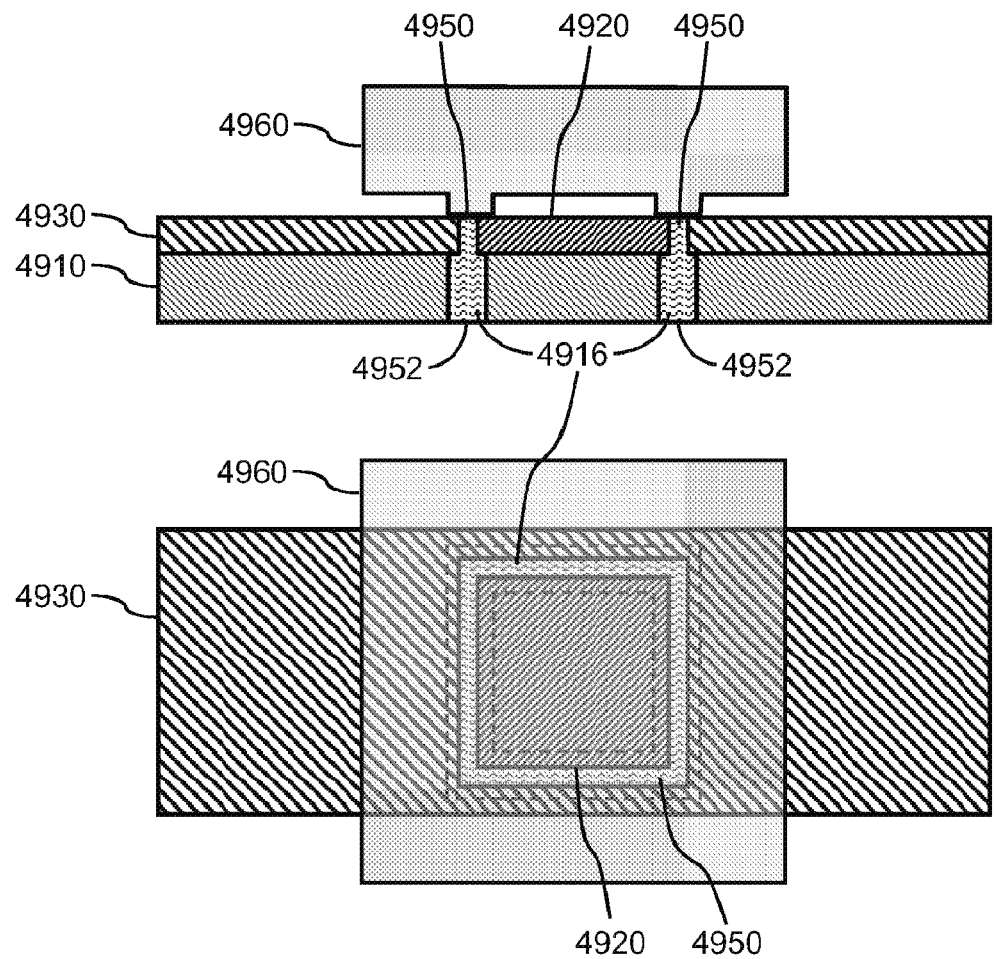

In a next step and referring now to FIG. 69, using, for example, a pair of through-holes 4916 in PCB substrate 4910, trench or channel 4950 is filled with filler material 4952, such as UV-cured epoxy, which is the reason that elastomer 4960 is optically transparent.

Figure 70:
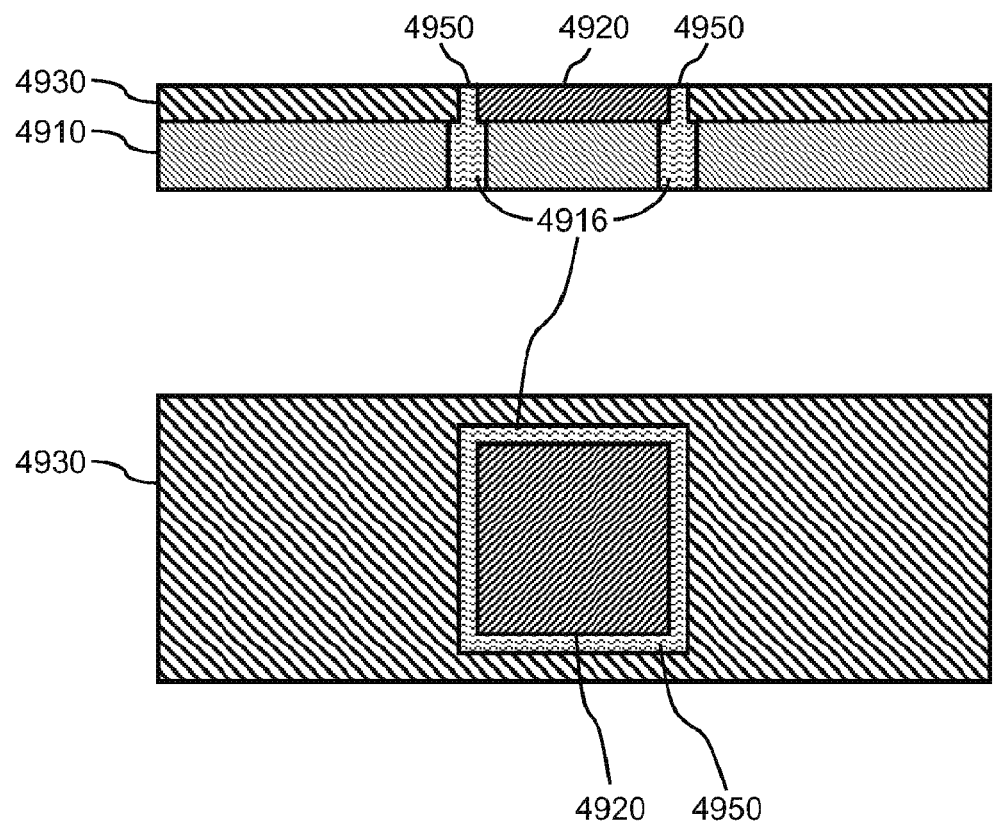

In a next step and referring now to FIG. 70, once filler material 4952 is cured, elastomer 4960 is removed and a substantially continuous planer surface is now present in the flow cell for receiving a flow cell lid, such as flow cell lid 4940.

FIGS. 71A, 71B, 71C, and 71D illustrate another example of a process of providing an extended planar surface in a CMOS flow cell, upon which a flow cell lid may be mounted.

Figure 71A:
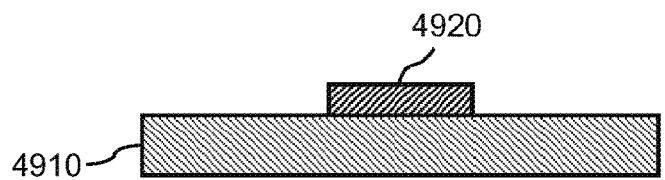
FIGS. 71A, 71B, 71C, and 71D illustrate another example of a process of providing an extended planar surface in the CMOS flow cell, upon which the flow cell lid may be mounted.

In a first step and referring now to FIG. 71A, CMOS biosensor device 4920 is provided atop PCB substrate 4910.

Figure 71B:
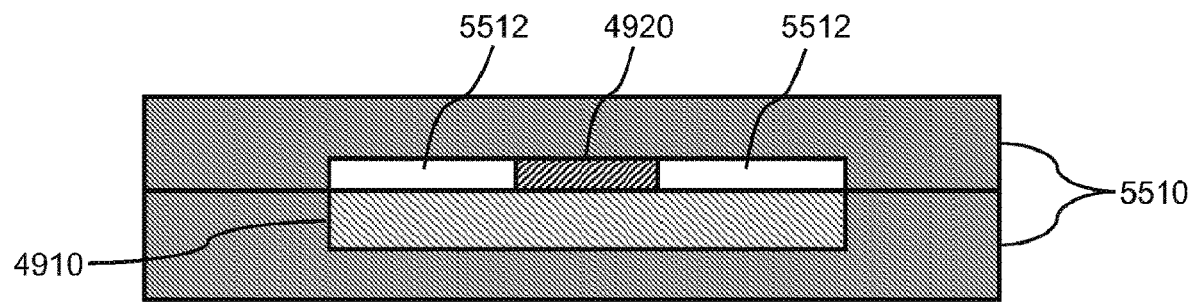

In a next step and referring now to FIG. 71B, a mold 5510 (e.g., a clamshell type mold) is provided around CMOS biosensor device 4920 and PCB substrate 4910. Mold 5510 provides a space or void 5512 atop PCB substrate 4910 and around the perimeter of CMOS biosensor device 4920.

Figure 71C:
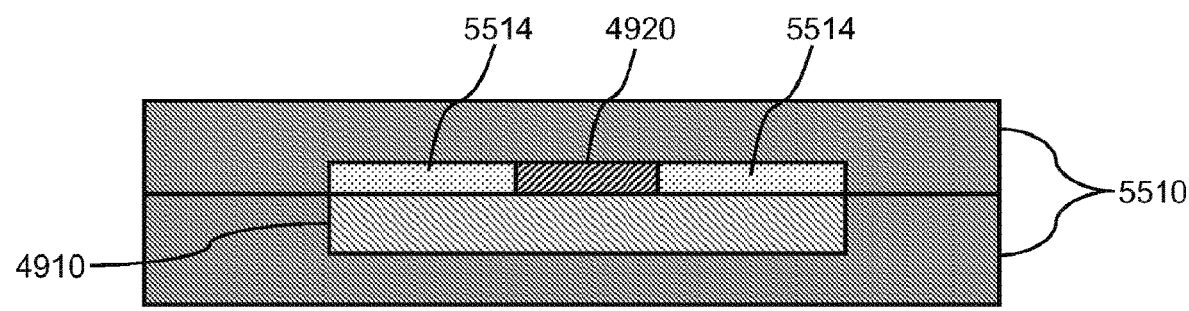

In a next step and referring now to FIG. 71C, using, for example, a low pressure injection molding process or a reaction injection molding process, space or void 5512 in mold 5510 is filled with filler material 4952, such as UV-cured or thermal-cured epoxy.

Figure 71D:
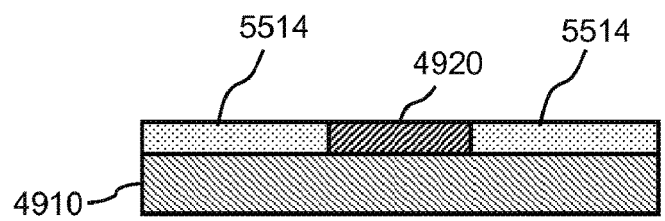

In a next step and referring now to FIG. 71D, once filler material 4952 is cured, mold 5510 is removed and a substantially continuous planer surface is now present in the flow cell for receiving a flow cell lid, such as flow cell lid 4940.

FIGS. 72, 73, 74, and 75 illustrate yet another example of a process of providing an extended planar surface in a CMOS flow cell, upon which a flow cell lid may be mounted.

Figure 72:
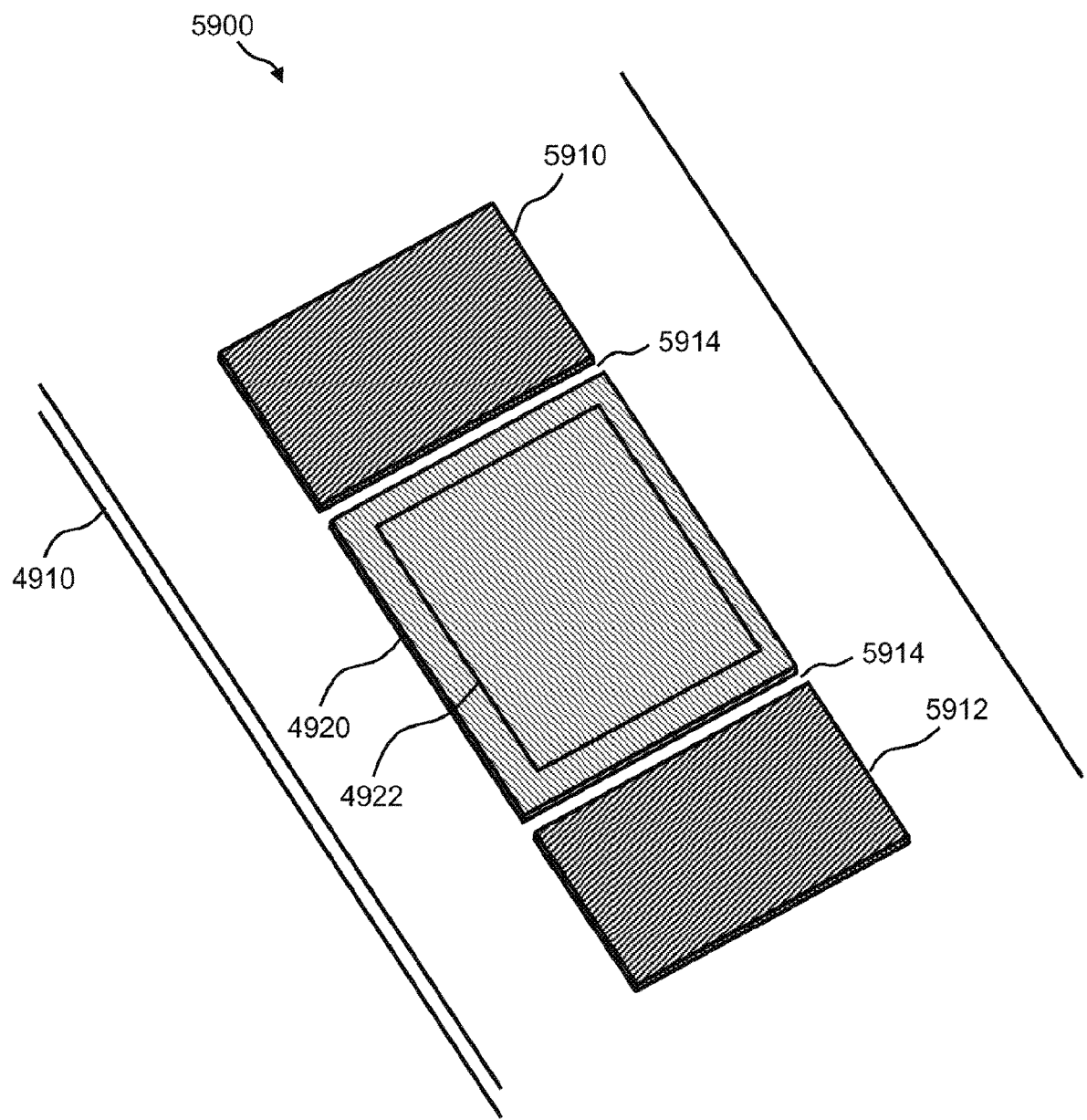
FIGS. 72, 73, 74, and 75 illustrate yet another example of a process of providing an extended planar surface in the CMOS flow cell, upon which the flow cell lid may be mounted.

In a first step and referring now to FIG. 72, CMOS biosensor device 4920 is provided atop PCB substrate 4910. Also, a mechanical material piece 5910 is provided atop PCB substrate 4910 and at one end of CMOS biosensor device 4920. Similarly, a mechanical material piece 5912 is provided atop PCB substrate 4910 and at the other end of CMOS biosensor device 4920. Mechanical material pieces 5910 and 5912 can be, for example, blank silicon, glass, or plastic. A trench or channel 5914 is between mechanical material piece 5910 and CMOS biosensor device 4920. Another trench or channel 5914 is between mechanical material piece 5912 and CMOS biosensor device 4920.

Figure 73:
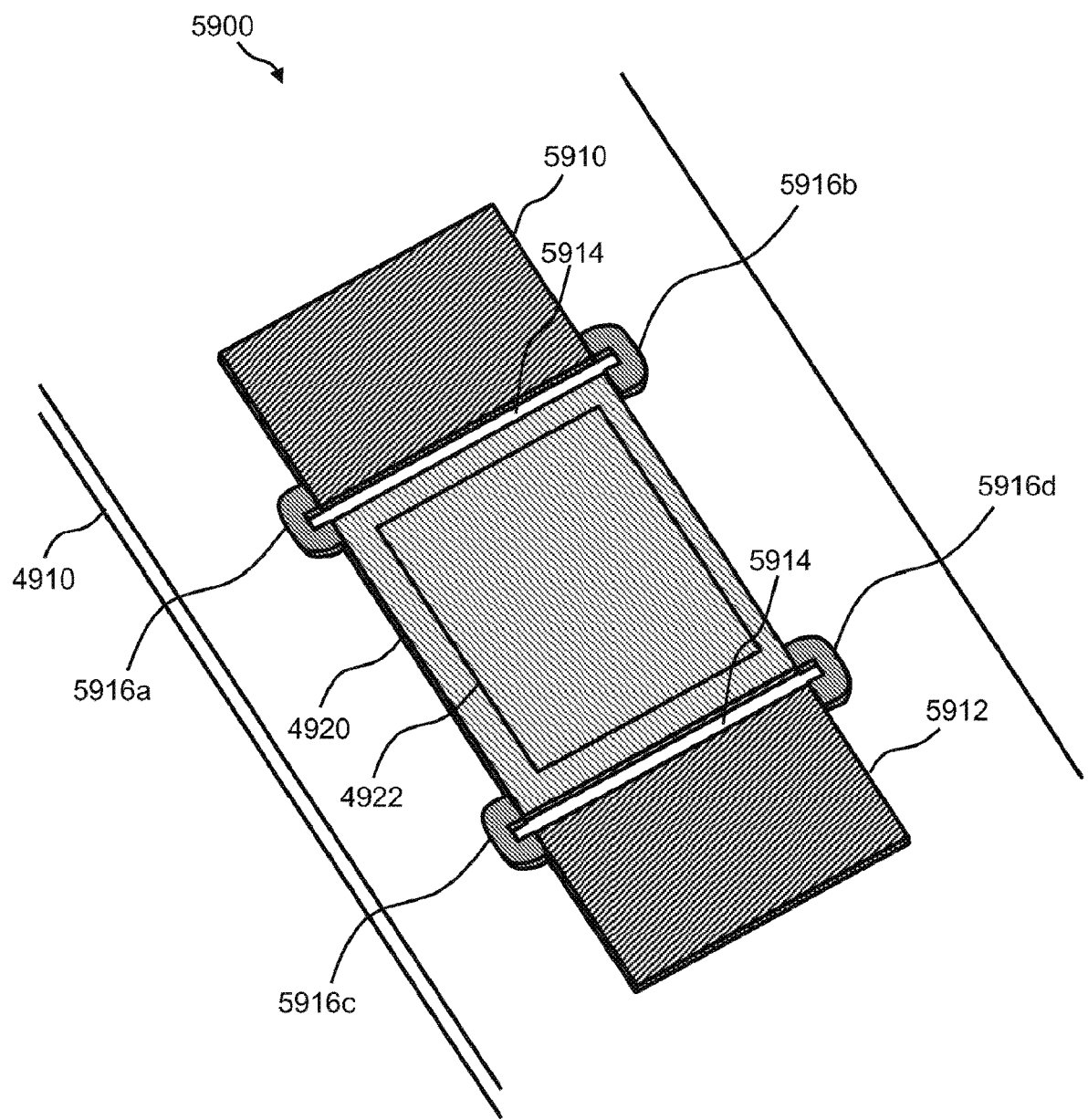

In a next step and referring now to FIG. 73, a set of barriers 5916 are provided at the ends of trenches or channels 5914. For example, barriers 5916a and 5916b are blocking the ends of one trench or channel 5914 and barriers 5916c and 5916d are blocking the ends of the other trench or channel 5914 in preparation for filling.

Figure 74:
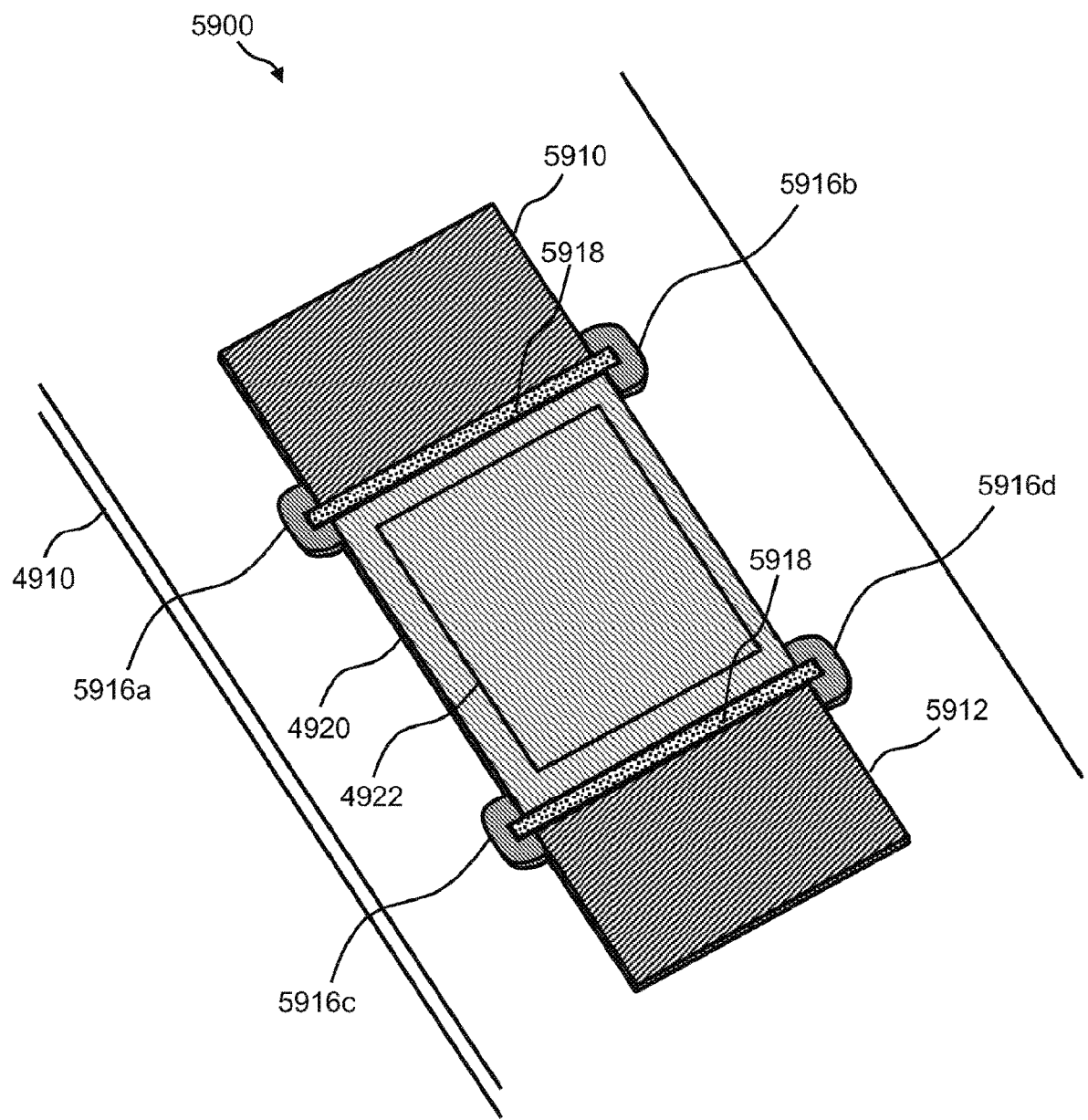

In a next step and referring now to FIG. 74, trenches or channels 5914 are filled with filler material 4952, such as UV-cured or thermal-cured epoxy. Filler material 4952 is retained between barriers 5916a and 5916b and between barriers 5916c and 5916d.

Figure 75:
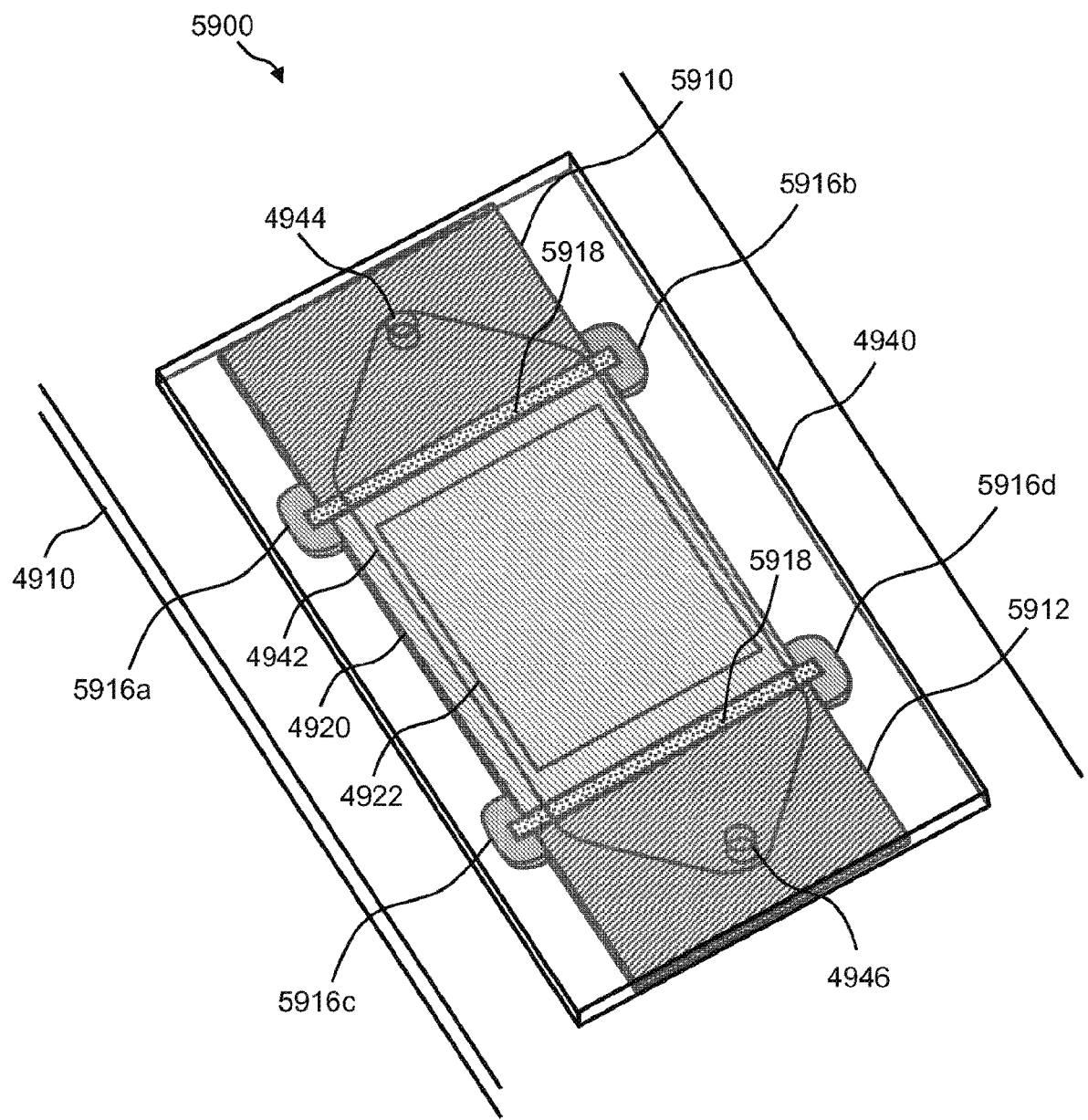

In a next step and referring now to FIG. 75, once filler material 4952 is cured, a substantially continuous planer surface is now present in the flow cell for receiving a flow cell lid, such as flow cell lid 4940.

It will be appreciated that various aspects of the present disclosure may be embodied as a method, system, computer readable medium, and/or computer program product. Aspects of the present disclosure may take the form of hardware embodiments, software embodiments (including firmware, resident software, micro-code, etc.), or embodiments combining software and hardware aspects that may all generally be referred to herein as a "circuit," "module," or "system." Furthermore, the methods of the present disclosure may take the form of a computer program product on a computer-usable storage medium having computer-usable program code embodied in the medium.

Any suitable computer useable medium may be utilized for software aspects of the present disclosure. The computer-usable or computer-readable medium may be, for example but not limited to, an electronic, magnetic, optical, electromagnetic, infrared, or semiconductor system, apparatus, device, or propagation medium. The computer readable medium may include transitory and/or non-transitory embodiments. More specific examples (a non-exhaustive list) of the computer-readable medium would include some or all of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Program code for carrying out operations of the methods and apparatus set forth herein may be written in an object oriented programming language such as Java, Smalltalk, C++ or the like. However, the program code for carrying out operations of the methods and apparatus set forth herein may also be written in conventional procedural programming languages, such as the "C" programming language or similar programming languages. The program code may be executed by a processor, application specific integrated circuit (ASIC), or other component that executes the program code. The program code may be simply referred to as a software application that is stored in memory (such as the computer readable medium discussed above). The program code may cause the processor (or any processor-controlled device) to produce a graphical user interface ("GUI"). The graphical user interface may be visually produced on a display device, yet the graphical user interface may also have audible features. The program code, however, may operate in any processor-controlled device, such as a computer, server, personal digital assistant, phone, television, or any processor-controlled device utilizing the processor and/or a digital signal processor.

The program code may locally and/or remotely execute. The program code, for example, may be entirely or partially stored in local memory of the processor-controlled device. The program code, however, may also be at least partially remotely stored, accessed, and downloaded to the processor-controlled device. A user's computer, for example, may entirely execute the program code or only partly execute the program code. The program code may be a stand-alone software package that is at least partly on the user's computer and/or partly executed on a remote computer or entirely on a remote computer or server. In the latter scenario, the remote computer may be connected to the user's computer through a communications network.

The methods and apparatus set forth herein may be applied regardless of networking environment. The communications network may be a cable network operating in the radio-frequency domain and/or the Internet Protocol (IP) domain. The communications network, however, may also include a distributed computing network, such as the Internet (sometimes alternatively known as the "World Wide Web"), an intranet, a local-area network (LAN), and/or a wide-area network (WAN). The communications network may include coaxial cables, copper wires, fiber optic lines, and/or hybrid-coaxial lines. The communications network may even include wireless portions utilizing any portion of the electromagnetic spectrum and any signaling standard (such as the IEEE 802 family of standards, GSM/CDMA/TDMA or any cellular standard, and/or the ISM band). The communications network may even include powerline portions, in which signals are communicated via electrical wiring. The methods and apparatus set forth herein may be applied to any wireless/wireline communications network, regardless of physical componentry, physical configuration, or communications standard(s).

Certain aspects of present disclosure are described with reference to various methods and method steps. It will be understood that each method step can be implemented by the program code and/or by machine instructions. The program code and/or the machine instructions may create means for implementing the functions/acts specified in the methods.

The program code may also be stored in a computer-readable memory that can direct the processor, computer, or other programmable data processing apparatus to function in a particular manner, such that the program code stored in the computer-readable memory produce or transform an article of manufacture including instruction means which implement various aspects of the method steps.

The program code may also be loaded onto a computer or other programmable data processing apparatus to cause a series of operational steps to be performed to produce a processor/computer implemented process such that the program code provides steps for implementing various functions/acts specified in the methods of the present disclosure.

In an embodiment, a system is provided that includes a removable cartridge having a cartridge housing. The removable cartridge also includes a fluidic network that is disposed within the cartridge housing. The fluidic network is configured to receive and fluidically direct a biological sample to conduct at least one of sample analysis or sample preparation. The removable cartridge also includes a flow-control valve that is operably coupled to the fluidic network and is movable relative to the fluidic network to control flow of the biological sample therethrough. The cartridge housing includes a housing side that defines an exterior of the removable cartridge and permits operative access to the flow-control valve. The system also includes a base instrument having a control side that is configured to separably engage the housing side of the removable cartridge. The housing and control sides collectively define a system interface. The base instrument includes a valve actuator that engages the flow-control valve through the system interface. The removable cartridge also includes a detection assembly that is held by at least one of the removable cartridge or the base instrument. The detection assembly includes an imaging detector and a reaction chamber that is in flow communication with the fluidic network. The imaging detector is configured to detect designated reactions within the reaction chamber.

In one aspect, the control side of a base instrument set forth herein and the housing side of a removable cartridge set forth herein are generally planar and face each other. The system interface may be a single-sided interface in which the base instrument and the removable cartridge are operably coupled to each other only through the housing side and the control side. Optionally, the base instrument and the removable cartridge may be operably coupled such that the base instrument and the removable cartridge are secured to each other at the system interface with at least one of a fluidic coupling, an electric coupling, or a thermal coupling established through the system interface.

In another aspect, the control side of a base instrument set forth herein may represent a top of the base instrument, with respect to gravity, such that the removable cartridge sits on and is supported by the base instrument.

In another aspect, the valve actuator of a base instrument set forth herein may include an elongated actuator body that extends through the housing side and into the cartridge housing.

In another aspect, the flow-control valve of a removable cartridge set forth herein may include an elongated actuator body that extends through the control side and into the base instrument.

In another aspect, a base instrument set forth herein may have an instrument side that faces in an opposite direction with respect to the control side. The base instrument may have an instrument dimension that extends between the control side and the instrument side. The base instrument and the removable cartridge may have a combined dimension that is greater than the instrument dimension.

In another aspect, each of a removable cartridge and a base instrument may include a contact array of electrical contacts. The contact arrays may be electrically coupled to one another at the system interface.

In another aspect, the housing side of a removable cartridge set forth herein may be a first housing side and the cartridge housing may also include a second housing side. The first and second housing sides face in different directions. The system interface is a multi-sided interface in which the base instrument and the removable cartridge are operably coupled to each other along each of the first and second housing sides.

Optionally, the first and second housing sides of a removable cartridge set forth herein may be generally perpendicular to each other. The base instrument may have an instrument housing that includes first and second control sides that face in perpendicular directions and form an open-sided recess of the base instrument. At least a portion of the removable cartridge may be disposed within the open-sided recess such that the first and second housing sides engage the first and second control sides.

In one aspect, the valve actuator of a base instrument set forth herein may include an elongated body that extends through the system interface between the first housing side and the first control side. The second housing side and the second control side may include respective contact arrays of electrical contacts. The contact arrays may be electrically coupled to each other along the system interface.

In another aspect, the first and second housing sides of a removable cartridge set forth herein face in generally opposite directions. The base instrument may have an instrument side and a cartridge-receiving slot that opens to the instrument side. The removable cartridge may be disposed within the cartridge-receiving slot.

In another aspect, the removable cartridge and the base instrument are fluidically coupled along the first housing side and electrically coupled along the second housing side. Optionally, the base instrument includes a locking mechanism that engages at least one of the first housing side or the second housing side to hold the removable cartridge within the base instrument.

In another aspect, each of the removable cartridge and the base instrument may include a flow port. The flow ports fluidically couple to each other at the system interface.

In another aspect, a system set forth herein may include a locking mechanism that is attached to at least one of the removable cartridge or the base instrument. The locking mechanism is configured to removably secure the cartridge housing to the base instrument.

In another aspect, an imaging detector of a system set forth herein may be held by the base instrument and the reaction chamber may be held by the removable cartridge.

In another aspect, the flow-control valve of a removable cartridge set forth herein may include a flexible membrane that is configured to control the flow of the biological sample through the fluidic network. The flexible membrane may be flexed between first and second conditions by the valve actuator.

In another aspect, the housing side of the cartridge housing of a removable cartridge set forth herein may include an access opening therethrough that receives the valve actuator.

In another aspect, the flow-control valve of a base instrument set forth herein may include a rotatable valve that is configured to control the flow of the fluid through the fluidic network. The rotatable valve may be rotated by the valve actuator.

In another aspect, a base instrument set forth herein may include a thermal block and the fluidic network of the cartridge housing may include a sample channel where designated reactions with the biological sample occur. The housing side may include an access opening that extends along the sample channel and is configured to receive the thermal block for changing a temperature of the sample channel.

In another aspect, the fluidic network of a removable cartridge set forth herein may include a plurality of channels and a storage module. The storage module may include a plurality of reservoirs for storing reagents that are used for at least one of sample preparation or sample analysis.

In another aspect, a base instrument set forth herein includes a system controller having a valve-control module configured to control operation of the valve actuator to control flow of the biological sample through the fluidic network.

In an embodiment, a method of sequencing nucleic acids is provided. The method includes providing a removable cartridge having a cartridge housing, a fluidic network disposed within the cartridge housing, and a flow-control valve that is operably coupled to the fluidic network and movable relative to the fluidic network. The cartridge housing includes a housing side that defines an exterior of the removable cartridge. The method also includes contacting the removable cartridge to a base instrument. The housing side of the removable cartridge separably engages a control side of the base instrument to collectively define a system interface. The base instrument includes a valve actuator that engages the flow-control valve through the system interface. The method also includes fluidically directing a biological sample to flow through the fluidic network of the cartridge to conduct at least one of sample analysis or sample preparation in the cartridge. The biological sample is directed to flow into a reaction chamber, wherein the flow of the biological sample is controlled by action of the valve actuator on the flow-control valve. The method also includes detecting the biological sample using an imaging detector directed to the reaction chamber, wherein the detection assembly is held by at least one of the removable cartridge or the base instrument.

In one aspect, a method set forth herein may also include removing the removable cartridge from the base instrument. The removable cartridge can be replaced by functionally mating a second removable cartridge with the base instrument. Several removable cartridges can be sequentially mated with the base instrument, used to prepare and/or analyze a sample while mated with the base instrument and then removed from the base instrument.

Accordingly, the method may include contacting a second removable cartridge with the base instrument, wherein the housing side of the second removable cartridge separably engages the control side of the base instrument to collectively define the system interface.

In another aspect, a method set forth herein includes removing the removable cartridge from the base instrument. Optionally, the method includes contacting a second removable cartridge with the base instrument, wherein the housing side of the second removable cartridge separably engages the control side of the base instrument to collectively define the system interface.

In another aspect of a method set forth herein, fluidically directing a biological sample and imaging the biological sample are repeated multiple times in sequence in a single removable cartridge.

In another aspect, a method set forth herein includes sealing the biological sample within a sample-preparation region of the fluidic network and amplifying the biological sample while the biological sample is sealed within the sample-preparation region.

In another aspect, the flow-control valve used in a method set forth herein includes a movable valve having at least one flow channel that extends between valve ports, the valve actuator configured to move the movable between different positions.

In another aspect, the movable valve used in a method set forth herein is in a sample position when the biological sample flows through the flow channel and is directed into the reaction chamber, the method further comprising moving the movable valve to a component position and flowing a reagent through the flow channel into the reaction chamber, the reagent reacting with the biological sample in the reaction chamber.

In another aspect of a method set forth herein, the component position includes a plurality of component positions, the method further comprising moving the movable valve between the component positions in accordance with a predetermined sequence to flow different reagents into the reaction chamber.

In another aspect, the biological sample used in a method set forth herein includes nucleic acids and the predetermined sequence is in accordance with a sequencing-by-synthesis (SBS) protocol.

In another aspect, a flow cell used in a method set forth herein includes the reaction chamber. The biological sample is immobilized to one or more surfaces of the flow cell.

In an embodiment, a removable cartridge is provided that includes a cartridge housing having a sample port that opens to an exterior of the cartridge housing and is configured to receive a biological sample. The cartridge housing has an array of electrical contacts and a mechanical interface that are exposed to the exterior. The cartridge housing is configured to be removably coupled to a base instrument. The removable cartridge may also include a fluidic network having a plurality of channels, a reaction chamber, and a storage module. The storage module includes a plurality of reservoirs for storing reagents. The fluidic network is configured to direct reagents from the reservoirs to the reaction chamber, wherein the mechanical interface is movable relative to the fluidic network to control flow of fluid through the fluidic network. The system also includes an imaging device disposed within the cartridge housing and positioned to detect designated reactions within the reaction chamber. The imaging device is electrically coupled to the array of electrical contacts for communicating with the base instrument. The mechanical interface may be configured to be moved by a base instrument when the removable cartridge is coupled to the base instrument.

In one aspect, the mechanical interface of a removable cartridge set forth herein may include a channel valve that is configured to control the flow of the fluid through one of the channels of the fluidic network.

In another aspect, the cartridge housing of a removable cartridge set forth herein may include an access opening that permits access to the mechanical interface. Optionally, the mechanical interface includes a rotatable valve.

In another aspect, the cartridge housing of a removable cartridge set forth herein may include an access opening that is exposed to the exterior, and the channels include a sample channel that is in flow communication with the sample port. The access opening may extend along the sample channel and may be configured to receive a thermal block for controlling a temperature of the sample channel.

In another aspect, the cartridge housing of a removable cartridge set forth herein may include a fluidic-coupling port that is exposed to the exterior and is in flow communication with the fluidic network. The fluidic-coupling port is configured to engage an instrument port to receive fluid therethrough.

In another aspect, the cartridge housing of a removable cartridge set forth herein may include first and second housing sides that face in opposite directions. The first housing side may include the array of electrical contacts. The second housing side may include the mechanical interface.

In another aspect, the removable cartridge also includes a locking mechanism that may be attached to the cartridge housing. The locking mechanism may be configured to removably secure the cartridge housing to the base instrument.

In an embodiment, a removable cartridge is provided that includes a cartridge housing having a sample port that opens to an exterior of the cartridge housing and is configured to receive a biological sample. The removable cartridge may also include a rotatable valve that is disposed within the cartridge housing. The rotatable valve has a fluidic side and a plurality of valve ports that open at the fluidic side. The rotatable valve has at least one flow channel extending between the valve ports, wherein the rotatable valve is rotatable between different rotational positions. The removable cartridge may also include a microfluidic body having a body side that is slidably coupled to the fluidic side of the rotatable valve. The microfluidic body may at least partially define a fluidic network that includes a sample channel in flow communication with the sample port. The sample channel has a network port that opens to the body side of the microfluidic body. The fluidic network may also include a reservoir configured to hold a reagent. The reservoir is in flow communication with a reservoir port that opens to the fluidic side of the microfluidic body. The fluidic network also includes a feed channel in flow communication with a reaction chamber of the fluidic network. The feed channel has a feed port that opens to the body side of the microfluidic body. The rotatable valve is configured to rotate between first and second rotational positions. The network port is fluidically coupled to the feed port through the rotatable valve when the rotatable valve is in the first rotational position. The reservoir port is fluidically coupled to the feed port through the rotatable valve when the rotatable valve is in the second rotational position.

In one aspect, the cartridge housing of a removable cartridge set forth herein may have an exterior side that is configured to engage a base instrument. The rotatable valve may include a mechanical interface that is accessible at the exterior side and is configured to engage the base instrument.

In another aspect, the rotatable valve in the first rotational position may be configured, in a removable cartridge set forth herein, to receive a sample liquid when a suction force draws the sample liquid toward the feed port. The rotatable valve in the second rotational position may be configured to allow the sample liquid to be displaced into the reservoir when a displacement force pushes the sample liquid away from the feed port into the reservoir.

In another aspect, the rotatable valve of a removable cartridge set forth herein rotates about an axis. The feed port may be aligned with the axis.

In an embodiment, a removable cartridge is provided that includes a cartridge housing having a sample port that opens to an exterior of the cartridge housing and is configured to receive a biological sample. The cartridge housing may include a mating side that is configured to face and removably couple to a base instrument. The removable cartridge also includes a fluidic network that is disposed within the housing. The fluidic network includes a sample channel that is in flow communication with the sample port. The removable cartridge also includes a channel valve having a flex member that is configured to move between first and second positions. The flex member blocks flow through the sample channel when in the first position and permits flow through the sample channel when in the second position. The mating side of the cartridge housing includes an access opening that exposes the channel valve to the exterior of the cartridge housing. The access opening is configured to receive an actuator of the base instrument for moving the flex member between the first and second positions.

In another aspect, the flex member of a removable cartridge set forth herein may include a flexible layer that covers an interior cavity of the fluidic network. The flexible layer may be configured to be pushed into the cavity to block flow therethrough.

In another aspect, the removable cartridge also includes a rotatable valve that is disposed within the cartridge housing. The rotatable valve is configured to rotate between different positions to change a flow path of the fluidic network. The rotatable valve may include a mechanical interface that is accessible along the mating side.

In another aspect, the fluidic network of a removable cartridge set forth herein may include a network port in flow communication with the sample channel, a feed port in flow communication with a reaction chamber, and a reservoir port in flow communication with a reservoir that is configured to store a reagent. The removable cartridge may also include a rotatable valve disposed within the cartridge housing. The rotatable valve may fluidically couple the feed port and the network port when in a first rotational position and fluidically couple the feed port and the reservoir port when in a second rotational position.

In another aspect, the mating side of a removable cartridge set forth herein may be a first mating side and the removable cartridge may include a second mating side. The first and second mating sides face in opposite directions. The second mating side is configured to engage the instrument mechanically, fluidically, or thermally.

In an embodiment, a base instrument is provided that includes a system housing having a control side that is configured to engage a removable cartridge. The base instrument also includes a rotating motor that is configured to engage a rotatable valve of the removable cartridge. The base instrument also includes an actuator that is configured to engage a channel valve of the removable cartridge and an array of electrical contacts configured to electrically couple to the removable cartridge. The base instrument also includes a system controller that is configured to control the rotating motor and the actuator to perform an assay protocol within the removable cartridge. The system controller is configured to receive imaging data from the removable cartridge through the array of electrical contacts. Optionally, the base instrument includes a thermal block for heating a portion of the removable cartridge.

In an embodiment, a removable cartridge is provided that includes a cartridge housing having a sample port that opens to an exterior of the cartridge housing and is configured to receive a biological sample. The cartridge housing includes a mating side that is configured to face and removably couple to a base instrument. The removable cartridge also includes a microfluidic body disposed within the cartridge housing. The microfluidic body has a body side and includes a fluidic network. The fluidic network has a plurality of discrete channels and corresponding ports that open at the body side at a valve-receiving area. The removable cartridge also includes a rotatable valve disposed within the cartridge housing. The rotatable valve has a fluidic side and at least one flow channel that extends between a plurality of valve ports. The valve ports open to the fluidic side. The fluidic side is rotatably coupled to the valve-receiving area of the body side of the microfluidic body, wherein the rotatable valve is movable between different rotational positions to fluidically couple the discrete channels. The rotatable valve has a mechanical interface that is accessible along the mating side and configured to engage the base instrument such that the rotatable valve is controlled by the base instrument.

In an embodiment, a removable cartridge is provided that includes a cartridge housing having a sample port that opens to an exterior of the cartridge housing and is configured to receive a biological sample. The cartridge housing has a mating side that is configured to removably couple to a base instrument. The removable cartridge also includes a microfluidic structure that is disposed within the cartridge housing and includes a plurality of stacked printed circuit board (PCB) layers. The PCB layers includes fluidic layers that define channels and a reaction chamber when the PCB layers are stacked. The PCB layers also include a wiring layer. The removable cartridge also includes a CMOS imager that is configured to be mounted to the microfluidic structure and electrically coupled to the wiring layer. The CMOS imager is oriented to detect designated reactions within the reaction chamber.

In one aspect, the removable cartridge includes input/output (I/O) contacts that are exposed to an exterior of the cartridge housing. The I/O contacts may be electrically coupled to the CMOS imager.

In one aspect, the microfluidic structure of a removable cartridge set forth herein includes a channel valve in which at least a portion of the channel valve is defined by the PCB layers. The channel valve is configured to be actuated to block and permit flow through one of the channels.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements whether or not they have that property.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a given module or unit may be added, or a given module or unit may be omitted.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third." etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

The invention claimed is:

1. A system, comprising:
   a removable cartridge, comprising:
      a cartridge housing having a sample port that opens to an exterior of the cartridge housing and is adapted to receive a biological sample, the cartridge housing having a mating side, a first array of electrical contacts disposed along the mating side, a mechanical interface that is exposed to the exterior, and an access opening of the cartridge housing that permits access to the mechanical interface;
      a fluidic network configured to fluidically direct a flow of fluid for conducting an analysis of the biological sample, the fluidic network comprising a plurality of channels, a reaction chamber, and one or more reservoirs for storing reagents, the fluidic network configured to direct the biological sample to the reaction chamber, and the fluidic network configured to direct reagents from the reservoirs to the reaction chamber; and
      an imaging device disposed within the cartridge housing and positioned to detect designated reactions within the reaction chamber; and
   a base instrument having a valve actuator and a control side configured to engage the mating side of the cartridge housing to removably couple the removable cartridge to the base instrument,
   wherein when the removable cartridge is coupled to the base instrument, the valve actuator is aligned with and received by the access opening of the cartridge housing to control the flow of fluid through the fluidic network, and
   wherein the imaging device is electrically coupled to the first array of electrical contacts for communicating the detected designated reactions to the base instrument.

2. The system of claim 1, wherein the control side of the base instrument includes a second array of electrical contacts configured to be electrically connected with the first array of electrical contacts when the removable cartridge is coupled to the base instrument, and wherein the base instrument includes a detection module configured to control the imaging device, via the second array of electrical contacts, to obtain data about the biological sample.

3. The system of claim 1, wherein the imaging device is positioned immediately adjacent the first array of electrical contacts.

4. The system of claim 1, wherein the imaging device is positioned between the reaction chamber and the first array of electrical contacts.

5. The system of claim 1, wherein the cartridge housing has an exterior side that is configured to engage the base instrument when the removable cartridge is coupled to the base instrument, and wherein the first array of electrical contacts is arranged on the exterior side.

6. The system of claim 1, wherein each electrical contact of the first array of electrical contacts is a flexible contact that is repositionable relative to the exterior of the cartridge housing.

7. The system of claim 1, wherein the fluidic network includes a sample channel in fluid communication with the sample port, wherein the base instrument comprises a thermal block for controlling a temperature of the sample channel, and wherein the cartridge housing further includes an access opening that is exposed to the exterior and is configured to receive the thermal block.

8. The system of claim 1, wherein the mechanical interface comprises one or more valves disposed within the cartridge housing, and wherein when the removable cartridge is coupled to the base instrument, the one or more valves are movable by the base instrument to change the flow of fluid through the fluidic network.

9. The system of claim 8, wherein the base instrument comprises a valve actuator configured to operably engage the one or more valves of the removable cartridge, via the access opening, to move the one or more valves to change the flow of fluid through the fluidic network.

10. The system of claim 8, wherein the fluidic network includes a sample channel in fluid communication with the sample port, wherein one or more valves comprise a channel valve that is movable between first and second positions by the base instrument, and wherein the channel valve blocks flow through the sample channel when in the first position and permits flow through the sample channel when in the second position.

11. The system of claim 8, wherein the one or more valves comprise a rotatable valve that is rotatable between different positions to change the flow of fluid through the fluidic network.

12. The system of claim 1, wherein the fluidic network includes a sample channel in fluid communication with the sample port, a network port in fluid communication with the sample channel, a feed port in fluid communication with the reaction chamber, and a reservoir port in fluid communication with the one or more reservoirs, wherein the mechanical interface of the removable cartridge comprises a rotatable valve carried by the cartridge housing, the rotatable valve fluidically coupling the feed port and the network port when in a first rotational position and fluidically coupling the feed port and the reservoir port when in a second rotational position.

13. The system of claim 12, wherein the rotatable valve rotates about an axis, the feed port being aligned with the axis.

14. The system of claim 1, further comprising a locking mechanism configured to removably secure the cartridge housing to the base instrument, the locking mechanism comprising a latch engaging element carried by one of the cartridge housing and the base instrument and a rotatable latch carried by the other of the cartridge housing and the base instrument and configured to releasably engage the latch engaging element.

15. The system of claim 1, wherein the removable cartridge includes a first flow port, wherein the base instrument includes a second flow port and a system pump, wherein the second flow port is fluidly coupled to the first flow port when the removable cartridge is removably coupled to the base instrument, and wherein when the second flow port is fluidly coupled to the first flow port, the system pump is configured to selectively induce the flow of fluid through the fluidic network.

16. The system of claim 1,
wherein the base instrument comprises:
a light source; and
wherein the removable cartridge comprises:
a plurality of reservoirs for storing the reagents; and
a flow cell assembly comprising a flow channel, ports to enable fluid flow into and out of the flow channel, and an optically transparent portion providing optical access to the flow channel,
wherein the imaging device includes an image sensor;
wherein the mechanical interface includes a rotatable valve that controls fluid flow between the reservoirs and the flow cell assembly;
wherein the system further comprises a pump to control flow of fluid from the reservoirs to the flow cell assembly,
wherein the valve actuator is configured to access the mechanical interface and actuate the rotatable valve; and
wherein the light source is configured to illuminate the flow channel through the optically transparent portion and the image sensor is configured to detect light signals in response to the illumination.

17. The system of claim 16, wherein the base instrument comprises the pump.

18. The system of claim 17, wherein the pump provides positive pressure to flow fluid through the removable cartridge under positive pressure.

19. The system of claim 16, wherein the removable cartridge comprises membrane valves that control fluid flow.

20. The system of claim 16, further comprising an outlet pump fluidly coupled to and downstream of the flow channel.

21. The system of claim 20, wherein the removable cartridge comprises the outlet pump.

22. The system of claim 16, wherein the base instrument comprises a thermal block and the removable cartridge comprises a side having an access opening to receive the thermal block, the thermal block to control a temperature of the flow channel.

23. The system of claim 16, wherein the base instrument comprises a cartridge receptacle and the removable cartridge is to be received by the cartridge receptacle.

24. The system, of claim 23, wherein the cartridge receptacle comprises a cartridge-receiving slot and the removable cartridge is to be received within the cartridge-receiving slot.

25. The system of claim 16, further comprising reagent contained within each of the reservoirs.

26. The system of claim 25, wherein the reagent comprises liquid reagent.

27. The system of claim 16, wherein the removable cartridge carries a heater.

28. The system of claim 27, wherein the removable cartridge comprises a channel coupled to the rotatable valve, the heater adjacent the channel.

29. The system of claim 28, wherein the removable cartridge comprises a sample supply and wherein the channel is to be coupled between the sample supply and the rotatable valve.

* * * * *